(12) United States Patent
Mihara et al.

(10) Patent No.: US 7,800,832 B2
(45) Date of Patent: Sep. 21, 2010

(54) IMAGE FORMING OPTICAL SYSTEM AND ELECTRONIC IMAGE PICKUP APPARATUS USING IMAGE FORMING OPTICAL SYSTEM

(75) Inventors: Shinichi Mihara, Tama (JP); Kanato Adachi, Kawasaki (JP); Keisuke Ichikawa, Hachioji (JP); Yasunobu Iga, Hachioji (JP); Koji Matsumoto, Hachioji (JP); Kazuaki Murayama, Hachioji (JP); Keigo Matsuo, Hachioji (JP); Hideki Nagata, Hachioji (JP)

(73) Assignee: Olympus Corporation, Tokyo (JP)

( * ) Notice: Subject to any disclaimer, the term of this patent is extended or adjusted under 35 U.S.C. 154(b) by 231 days.

(21) Appl. No.: 11/991,920

(22) PCT Filed: Sep. 11, 2006

(86) PCT No.: PCT/JP2006/318447

§ 371 (c)(1),
(2), (4) Date: Mar. 11, 2008

(87) PCT Pub. No.: WO2007/032509

PCT Pub. Date: Mar. 22, 2007

(65) Prior Publication Data
US 2009/0279185 A1    Nov. 12, 2009

(30) Foreign Application Priority Data

| Sep. 13, 2005 | (JP) | ............. 2005-264601 |
| Sep. 13, 2005 | (JP) | ............. 2005-264605 |
| Sep. 6, 2006 | (JP) | ............. 2006-241446 |
| Sep. 6, 2006 | (JP) | ............. 2006-241488 |

(51) Int. Cl.
G02B 15/14    (2006.01)

(52) U.S. Cl. .................. 359/683; 359/686; 359/689; 359/691; 359/726; 359/740; 359/793

(58) Field of Classification Search .......... 359/563–795
See application file for complete search history.

(56) References Cited

U.S. PATENT DOCUMENTS

| 5,796,530 | A * | 8/1998 | Oshita ................ 359/683 |
| 6,381,079 | B1 * | 4/2002 | Ogawa ................ 359/795 |
| 2003/0160902 | A1 | 8/2003 | Mihara et al. | |
| 2006/0274168 | A1 | 12/2006 | Watanabe et al. | |

FOREIGN PATENT DOCUMENTS

| JP | 07-209582 | 8/1995 |
| JP | 08-320434 | 12/1996 |
| JP | 2000-305014 | 11/2000 |
| JP | 2000-330016 | 11/2000 |
| JP | 2001-033701 | 2/2001 |
| JP | 2002-365545 | 12/2002 |
| JP | 2003-043354 | 2/2003 |
| JP | 2004-069808 | 3/2004 |
| JP | 2004-264786 | 9/2004 |
| JP | 2005-181499 | 7/2005 |

OTHER PUBLICATIONS

International Preliminary Report on Patentability and Written Opinion, International Application No. PCT/JP2006/318446, filed Sep. 11, 2006.

* cited by examiner

*Primary Examiner*—Evelyn A. Lester
(74) *Attorney, Agent, or Firm*—Kenyon & Kenyon LLP

(57) ABSTRACT

An optical system has a positive lens group, a negative lens group, and an aperture stop. The negative lens group is disposed at an object side of the aperture stop and has a cemented lens, and in a rectangular coordinate system in which a horizontal axis is Nd and a vertical axis is vd, when a straight line indicated by $Nd=\alpha \times vd+\beta$ where $\alpha=-0.017$ is set, Nd and vd of at least one lens forming the cemented lens are included in both an area determined by a line when a lower limit value is in a range of expression (1a) and a line when an upper limit value is in a range of the expression (1a), and an area determined by expressions (2a) and (3a): $1.45<\beta<2.15$ (1a); $1.30<Nd<2.20$ (2a); and $3<vd<12$ (3a); where Nd denotes a refractive index, and vd denotes an Abbe's number.

11 Claims, 83 Drawing Sheets

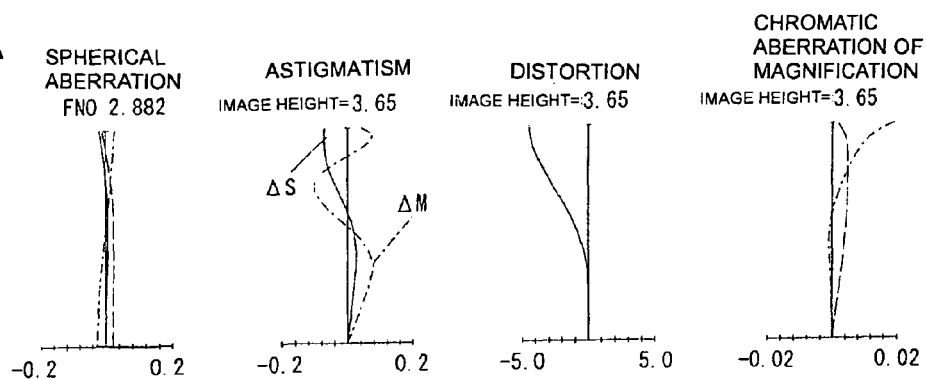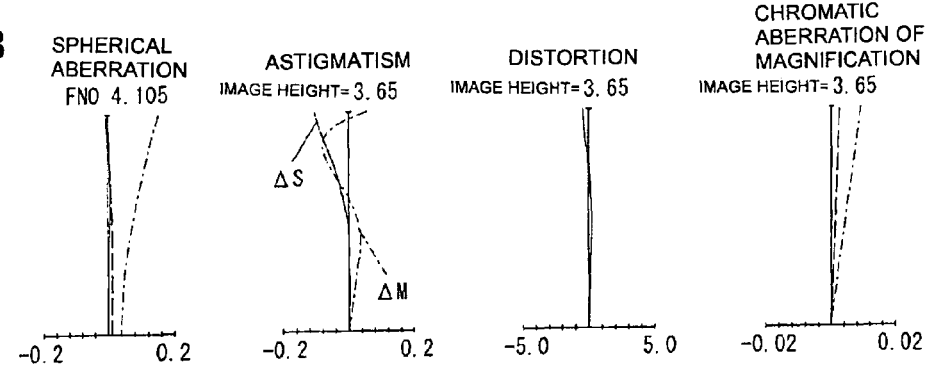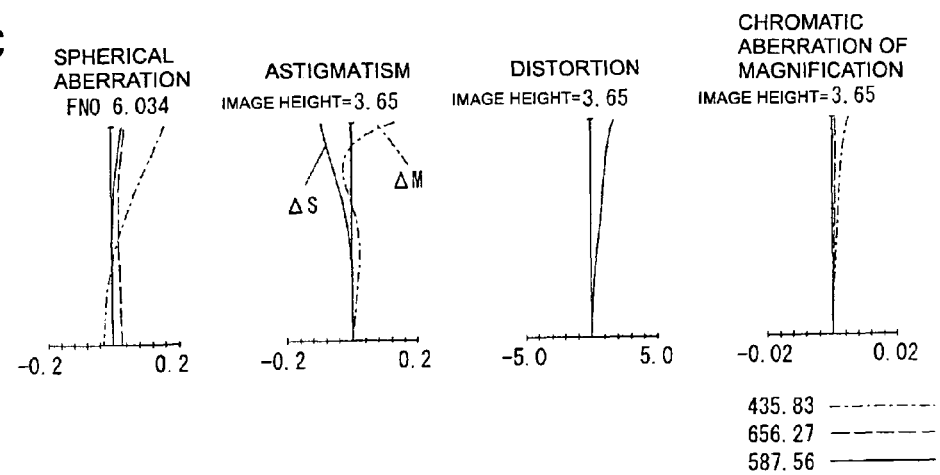

435.83 —·—·—
656.27 — — —
587.56 ———

435.83 — — — — —
656.27 — — — — —
587.56 ————

435.83 — · · —
656.27 — — —
587.56 ———

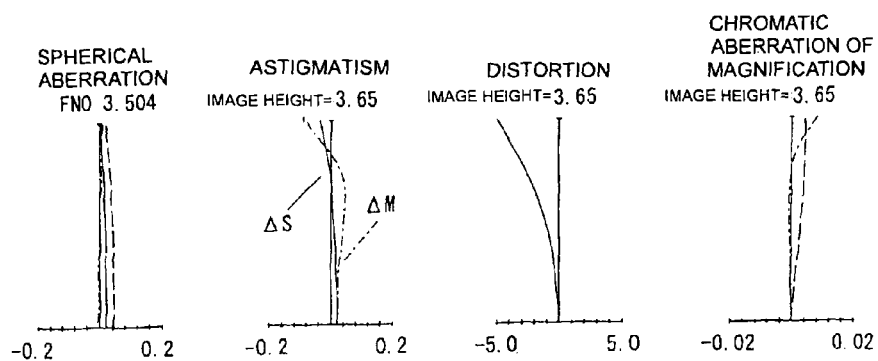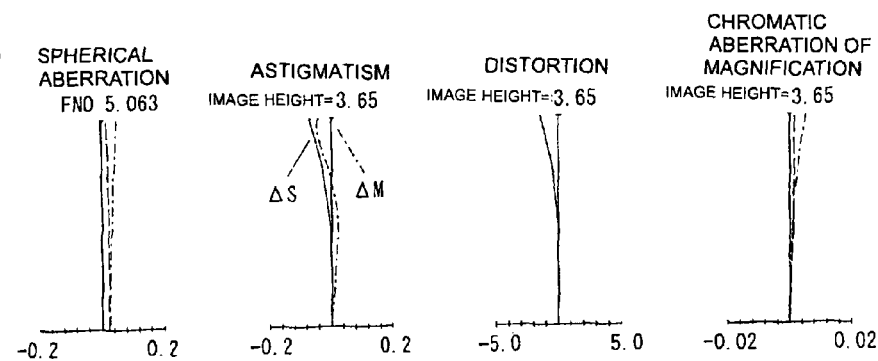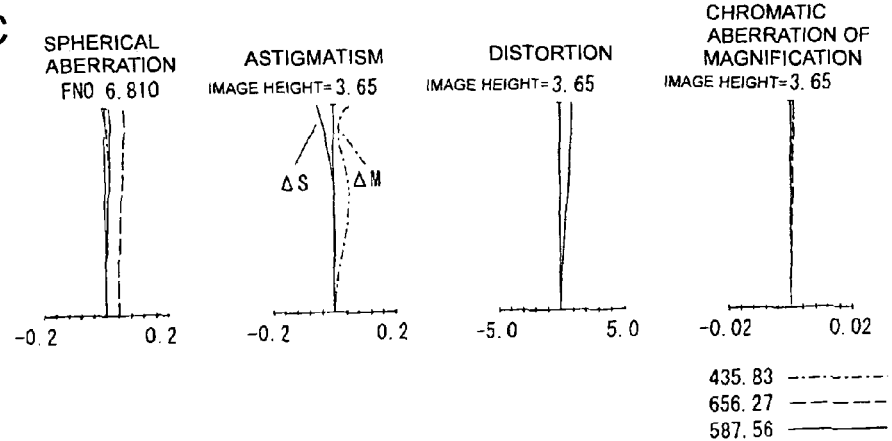

435.83 —·—·—
656.27 — — —
587.56 ———

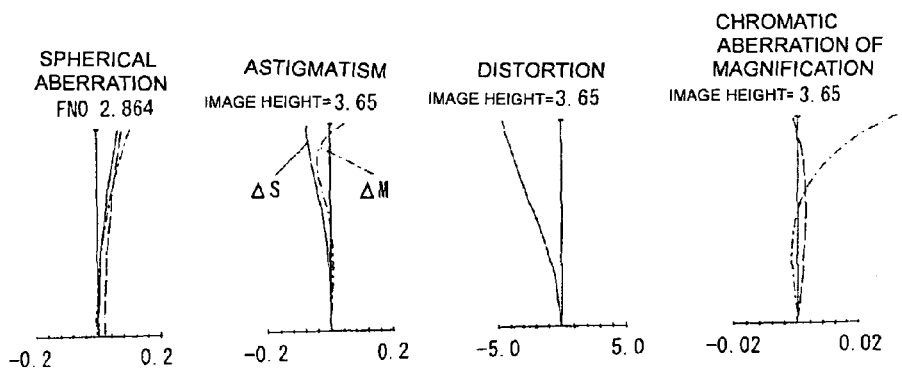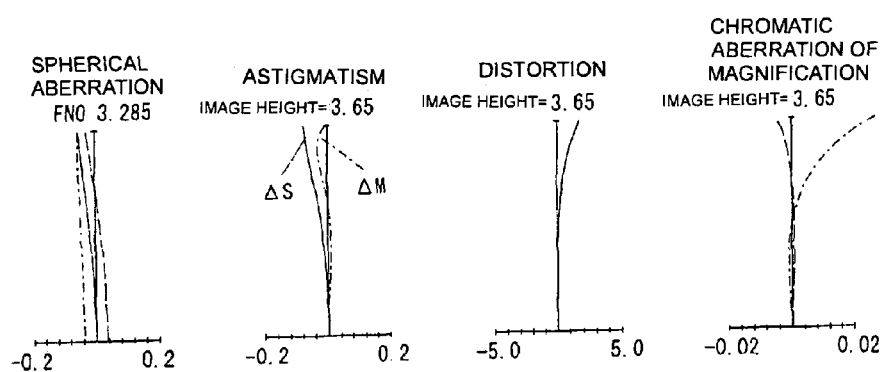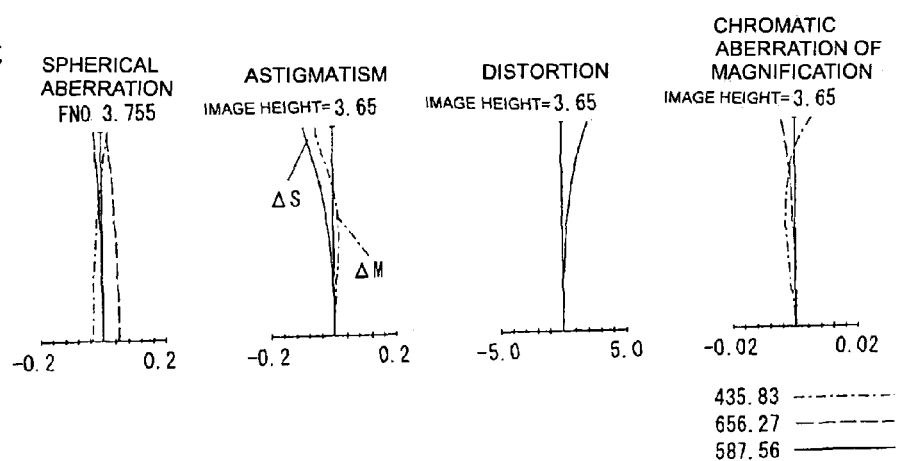

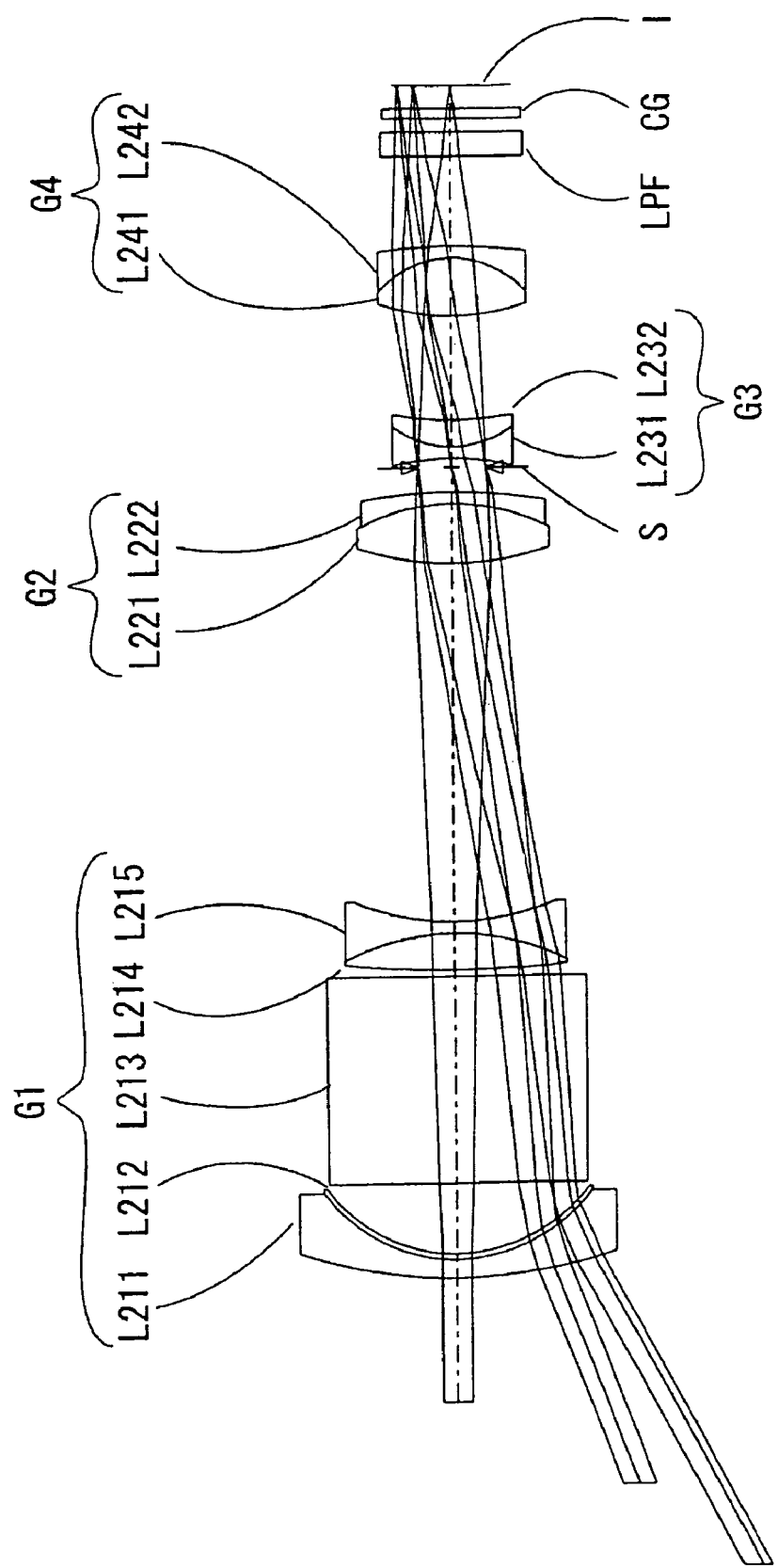

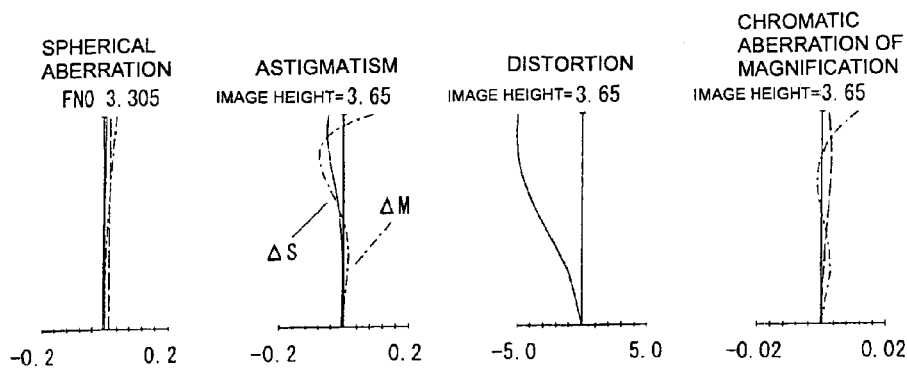
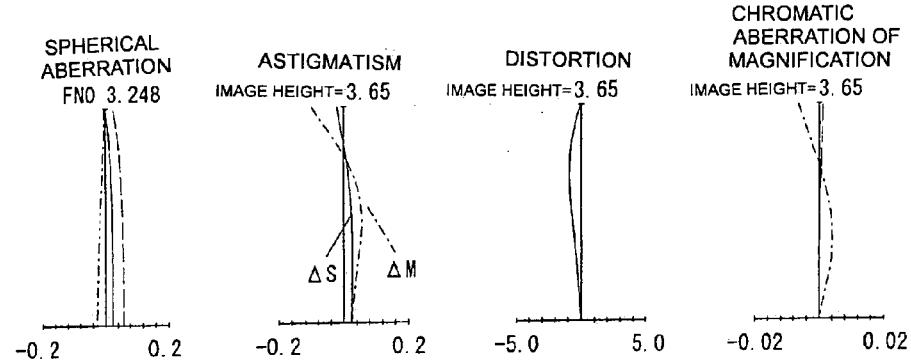
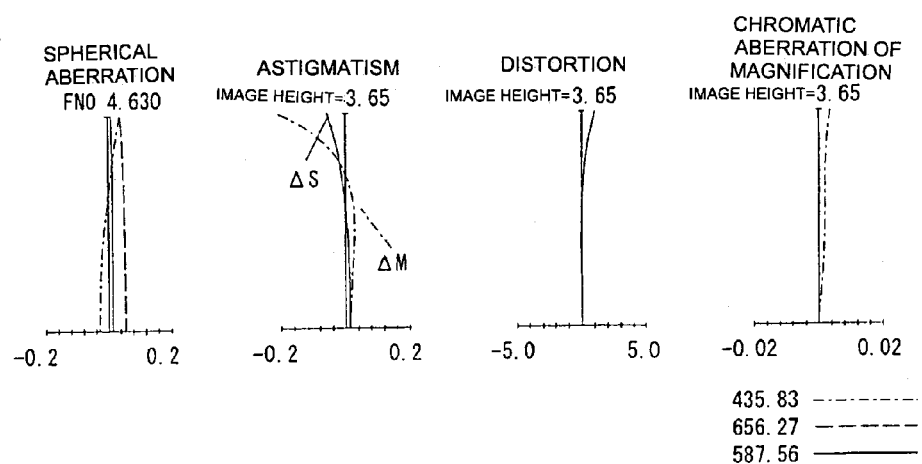

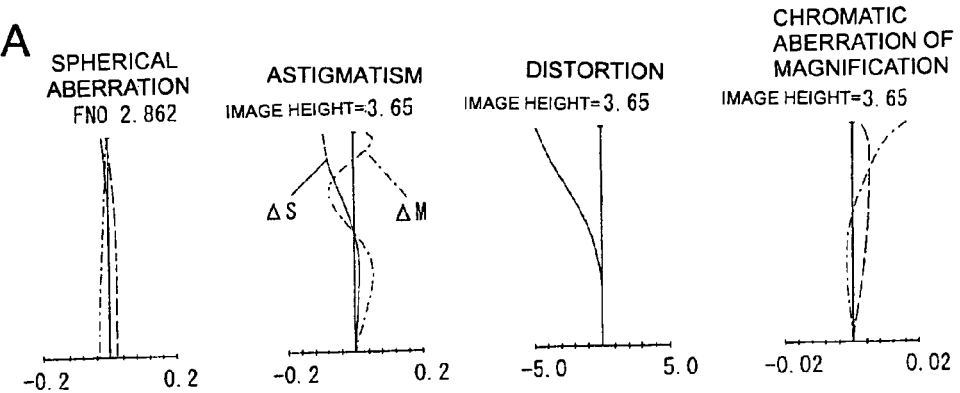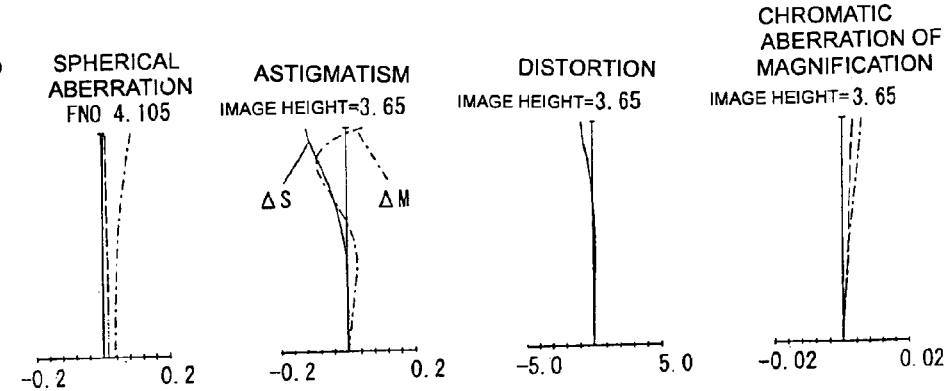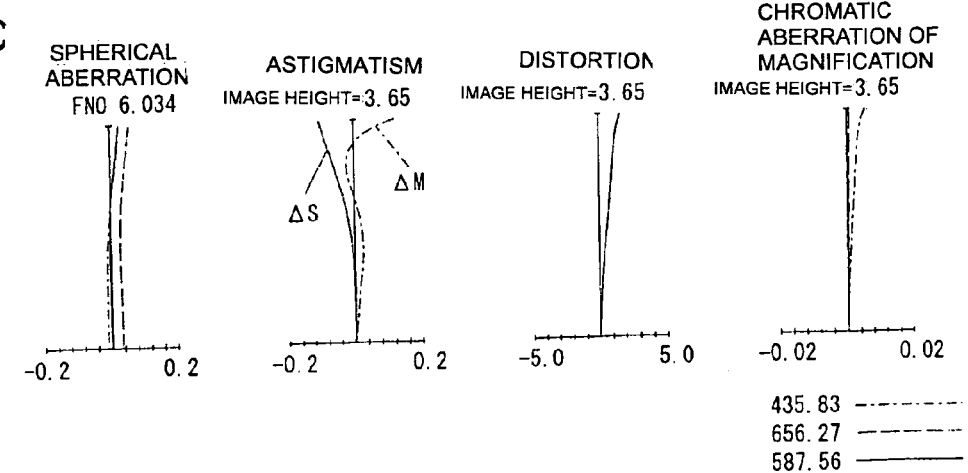

435.83 — · — · —
656.27 — — — —
587.56 ———

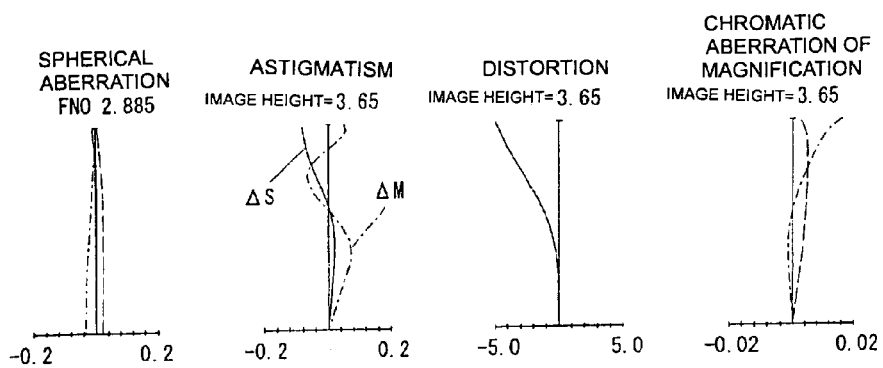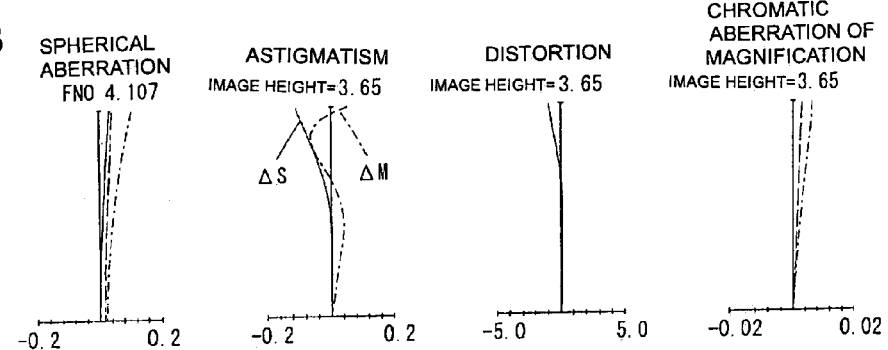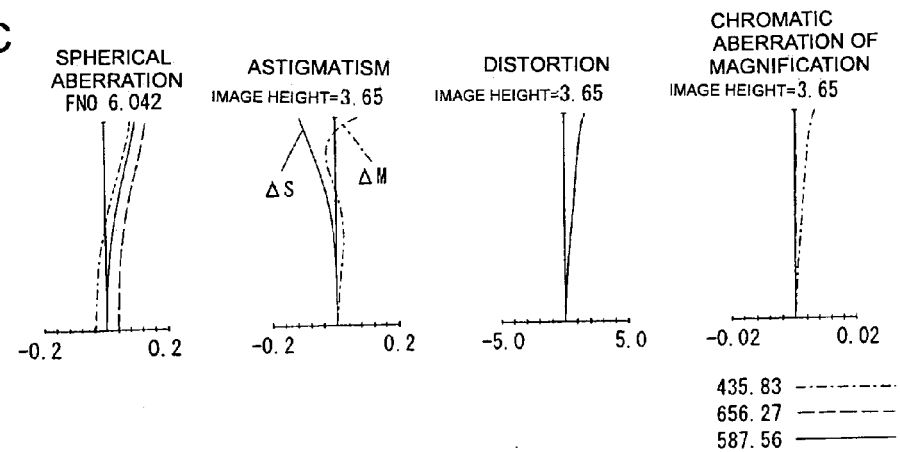

435.83 —··—··—
656.27 — — —
587.56 ———

435.83 —··—··—
656.27 — — — —
587.56 ———

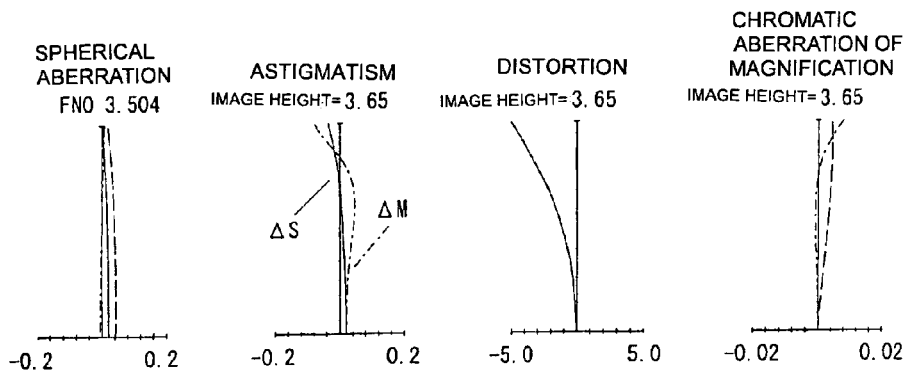
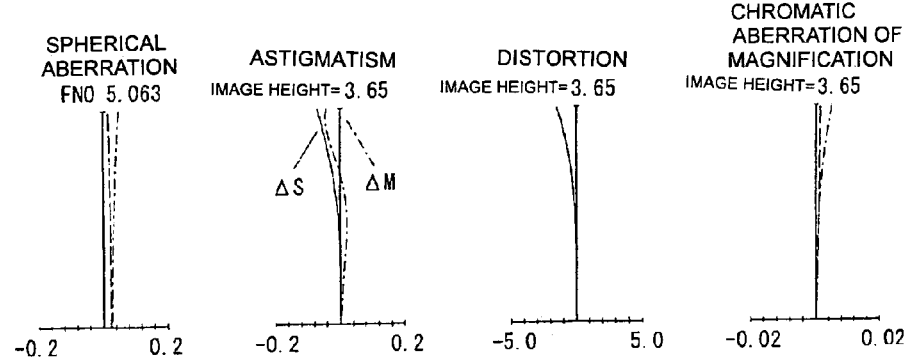
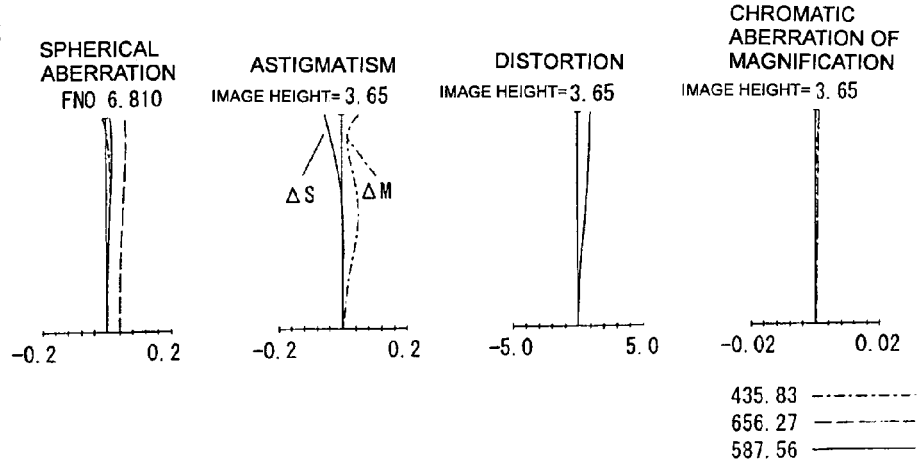

435.83 —·—·—
656.27 — — —
587.56 ————

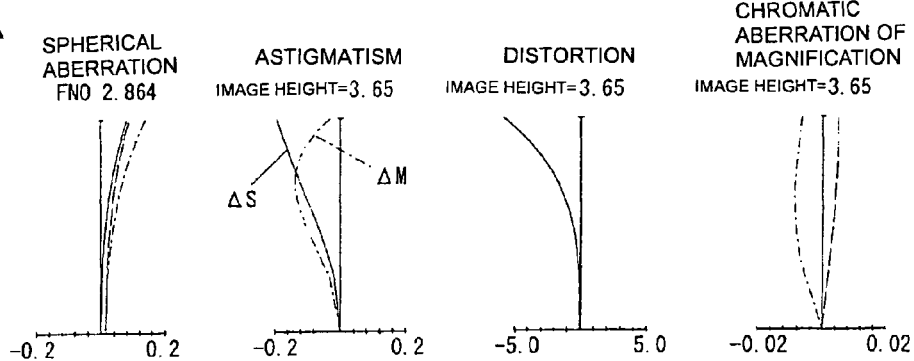
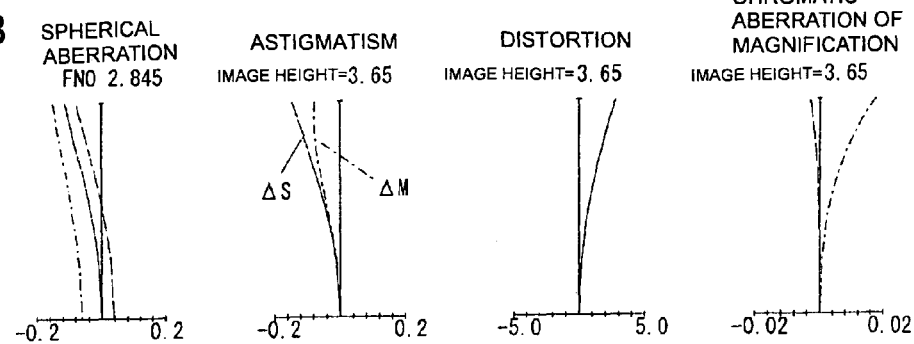
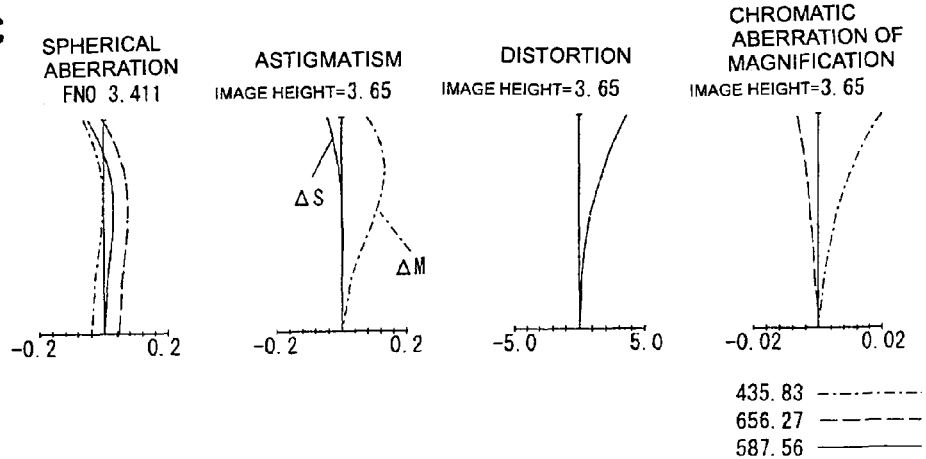

435.83 —·—·—
656.27 — — —
587.56 ———

435.83 —·—·—·—
656.27 — — — —
587.56 ———————

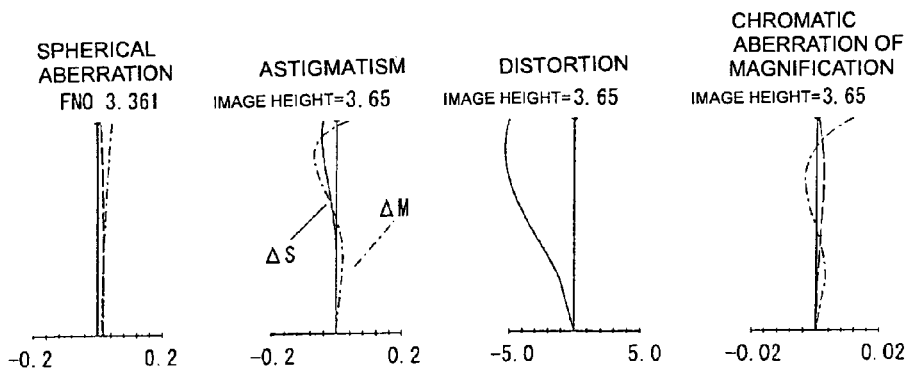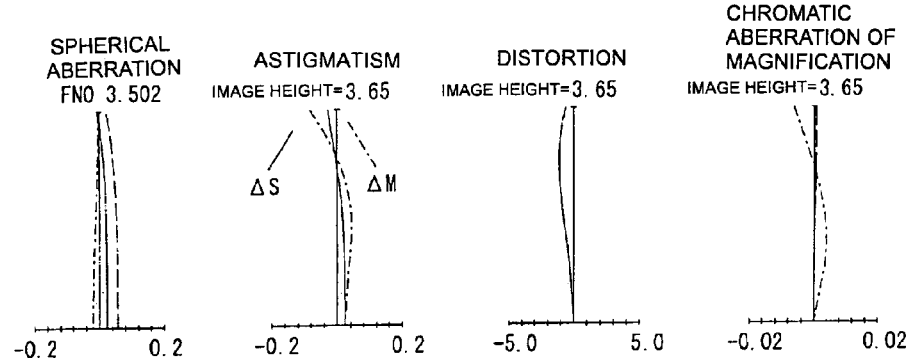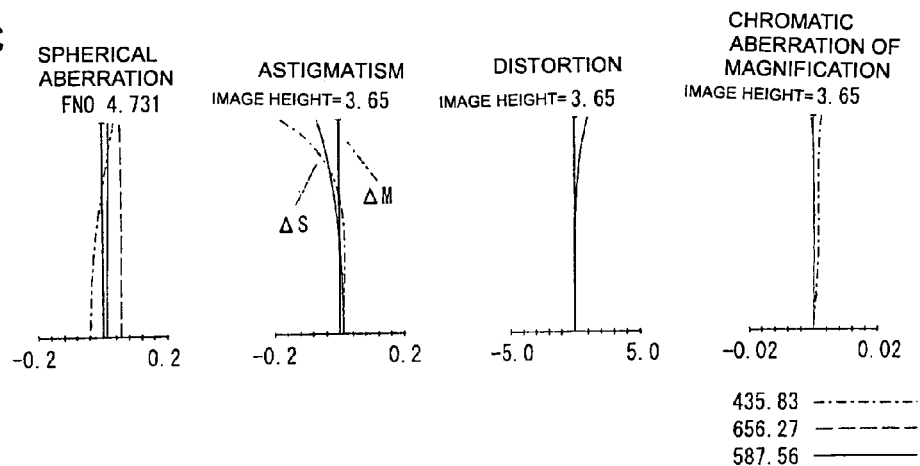

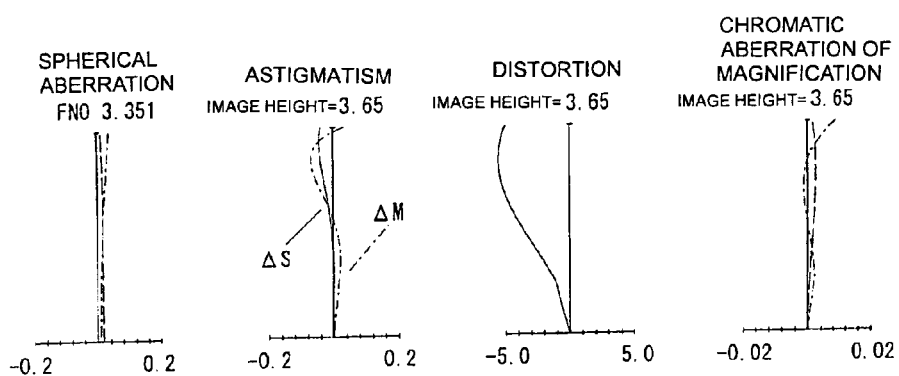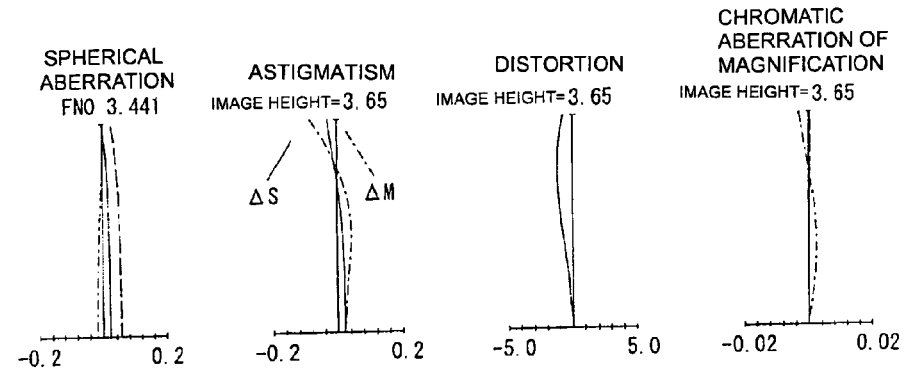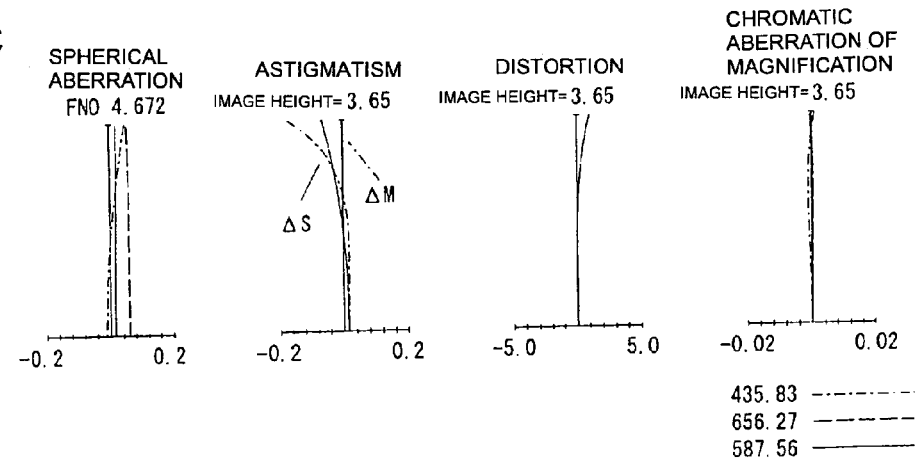

435.83 —·—·—
656.27 — — —
587.56 ———

IMAGE FORMING OPTICAL SYSTEM AND ELECTRONIC IMAGE PICKUP APPARATUS USING IMAGE FORMING OPTICAL SYSTEM

CROSS-REFERENCE TO RELATED APPLICATION

The present application is based upon and claims the benefit of priority from the prior Japanese Patent Application Nos. 2005-264601 filed on Sep. 13, 2005, 2005-264605 filed on Sep. 13, 2005, 2006-241446 filed on Sep. 6, 2006, and 2006-241488 filed on Sep. 6, 2006, the entire contents of which are incorporated herein by reference.

TECHNICAL FIELD

The present invention relates to an image forming optical system which is used in an extremely small image pickup module, and an electronic image pickup apparatus which includes the image forming optical system.

BACKGROUND ART

In recent years, a digital camera has been widely used as a next generation camera replacing a silver salt 35 mm film camera. Recently, there has been an increasing reduction in a size, and thinning of a digital camera. Moreover, a camera function (hereinafter called as an 'image pickup module') has been mounted even in a portable telephone, the use of which has also been increasing widely. For mounting this image pickup module in the portable telephone, an optical system has to be smaller and thinner than an optical system of the digital camera. Particularly, in a zoom lens, the reduction in size and the thinning have been sought. However, a zoom lens having a size reduced to be capable of being mounted in the portable telephone has not been known much.

As a typical means for reducing the size and thinning the zoom lens, the following two means can be taken into consideration. In other words, A. To use a collapsible lens barrel, and to accommodate the optical system in a thickness (depth) of a casing. This collapsible lens barrel is a lens barrel having a structure in which, the optical system protrudes from a camera casing at the time of taking a picture, and is accommodated in the camera while carrying.

B. To accommodate the optical system in a direction of width or in a direction of height of the casing by adopting a dioptric system. This dioptric system is an optical system having a structure in which, an optical path (optical axis) of the optical system is folded by a reflecting optical element such as a mirror or a prism.

However, in the structure in which the abovementioned means A is used, the number of lenses forming the optical system or the number of movable lens groups is still large, and it is difficult to carry out the reduction in the size, and the thinning of the casing.

Moreover, in the structure in which the abovementioned means B is used, it is easy to make the casing thin as compared to a case in which the means in the abovementioned A is used, but an amount of movement of the movable lens group at the time of zooming, and the number of lenses forming the optical system tend to increase. Therefore, volumetrically, it is not at all suitable for the reduction in size.

DISCLOSURE OF THE INVENTION

An image forming optical system according to the present invention is characterized in that, in an image forming optical system having a positive lens group, a negative lens group, and an aperture stop, the negative lens group is disposed at an object side of the aperture stop, the negative lens group has a cemented lens which is formed by cementing a plurality of lenses, and in a rectangular coordinate system in which, a horizontal axis is let to be Nd and a vertical axis is let to be vd, when a straight line indicated by $Nd=\alpha \times vd + \beta$ (where, $\alpha=-0.017$) is set, Nd and vd of at least one lens forming the cemented lens are included in both of areas namely, an area which is determined by a line when a lower limit value is in a range of a following conditional expression (1a), and a line when an upper limit value is in a range of the following conditional expression (1a), and an area determined by following conditional expressions (2a) and (3a).

$$1.45 < \beta < 2.15 \quad (1a)$$

$$1.30 < Nd < 2.20 \quad (2a)$$

$$3 < vd < 12 \quad (3a)$$

Here, Nd denotes a refractive index, and vd denotes an Abbe's number.

Moreover, an image forming optical system according to the present invention is characterized in that, in an image forming optical system having a positive lens group, a negative lens group, and an aperture stop, the negative lens group is disposed at the object side of the aperture stop, the negative lens group has a cemented lens which is formed by cementing a plurality of lenses, and in a rectangular coordinate system in which, a horizontal axis is let to be Nd and a vertical axis is let to be vd, when a straight line indicated by $Nd=\alpha \times vd + \beta$ (where, $\alpha=-0.017$) is set, Nd and vd of at least one lens forming the cemented lens are included in both of area namely, an area which is determined by a line when a lower limit value is in a range of a following conditional expression (1b), and a line when an upper limit value is in a range of the following conditional expression (1b), and an area determined by following conditional expressions (2b) and (3b).

$$1.45 < \beta < 2.15 \quad (1b)$$

$$1.58 < Nd < 2.20 \quad (2b)$$

$$3 < vd < 40 \quad (3b)$$

Here, Nd denotes a refractive index, and vd denotes an Abbe's number.

Moreover, an electronic image pickup apparatus of the present invention is characterized in that the electronic image pickup apparatus includes an image forming optical system mentioned in any one above, an electronic image pickup element, and an image processing means which is capable of processing image data obtained by image pickup by the electronic image pickup element of an image which is formed through the image forming optical system, and outputting image data in which, a shape is changed upon processing, and in which the image forming optical system is a zoom lens, and the zoom lens satisfies a following conditional expression at a time of infinite object point focusing.

$$0.7 < y_{07}/(f_w \cdot \tan \omega_{07w}) < 0.96$$

where, $y_{07}$ is indicated as $y_{07} = 0.7\, y_{10}$ when, in an effective image pickup surface (surface in which, image pickup is possible), a distance from a center up to a farthest point (maximum image height) is let to be $y_{10}$. Moreover, $\omega_{07w}$ is an angle with respect to an optical axis in a direction of an object point corresponding to an image point connecting from a center on the image pickup surface in a wide angle end up to a position of $y_{07}$.

According to the present invention, it is possible to achieve a thinning and a size reduction of a volume of the image forming optical system, and further to have both of a widening of an angle and a favorable correction of various aberrations in the electronic image pickup apparatus of the present invention.

BRIEF DESCRIPTION OF THE DRAWINGS

FIG. 2A, FIG. 2B, and FIG. 2C are diagrams showing a spherical aberration, an astigmatism, a distortion, and a chromatic aberration of magnification at the time of the infinite object point focusing of the zoom lens according to the first embodiment, where, FIG. 2A shows a state at the wide angle end, FIG. 2B shows an intermediate state, and FIG. 2C shows a state at a telephoto end;

FIG. 4A shows the state at the wide angle end, FIG. 4B shows the intermediate state, and FIG. 4C shows the state at the telephoto end;

FIG. 6A shows the state at the wide angle end, FIG. 6B shows the intermediate state, and FIG. 6C shows the state at the telephoto end;

FIG. 8A shows the state at the wide angle end, FIG. 8B shows the intermediate state, and FIG. 8C shows the state at the telephoto end;

FIG. 10A shows the state at the wide angle end, FIG. 10B shows the intermediate state, and FIG. 10C shows the state at the telephoto end;

FIG. 12A shows the state at the wide angle end, FIG. 12B shows the intermediate state, and FIG. 12C shows the state at the telephoto end;

FIG. 14A shows the state at the wide angle end, FIG. 14B shows the intermediate state, and FIG. 14C shows the state at the telephoto end;

FIG. 16A, FIG. 16B, and FIG. 16C are diagrams showing the spherical aberration, the astigmatism, the distortion, and the chromatic aberration of magnification at the time of the infinite object point focusing of the zoom lens according to the eighth embodiment, where, FIG. 16A shows the state at the wide angle end, FIG. 16B shows the intermediate state, and FIG. 16C shows the state at the telephoto end;

FIG. 18A shows the state at the wide angle end, FIG. 18B shows the intermediate state, and FIG. 18C shows the state at the telephoto end;

FIG. 20A shows the state at the wide angle end, FIG. 20B shows the intermediate state, and FIG. 20C shows the state at the telephoto end;

FIG. 22A shows the state at the wide angle end, FIG. 22B shows the intermediate state, and FIG. 22C shows the state at the telephoto end;

FIG. 24A, FIG. 24B, and FIG. 24C are diagrams showing the spherical aberration, the astigmatism, the distortion, and the chromatic aberration of magnification at the time of the infinite object point focusing of the zoom lens according to the twelfth embodiment, where, FIG. 24A shows the state at the wide angle end, FIG. 24B shows the intermediate state, and FIG. 24C shows the state at the telephoto end;

FIG. 26A shows the state at the wide angle end, FIG. 26B shows the intermediate state, and FIG. 26C shows the state at the telephoto end;

FIG. 28A shows the state at the wide angle end, FIG. 28B shows the intermediate state, and FIG. 28C shows the state at the telephoto end;

FIG. 30A shows the state at the wide angle end, FIG. 30B shows the intermediate state, and FIG. 30C shows the state at the telephoto end;

FIG. 32A shows the state at the wide angle end, FIG. 32B shows the intermediate state, and FIG. 32C shows the state at the telephoto end;

FIG. 34A shows the state at the wide angle end, FIG. 34B shows the intermediate state, and FIG. 34C shows the state at the telephoto end;

FIG. 35 is a cross-sectional view along the optical axis showing an optical arrangement at the time of the infinite object point focusing at the wide angle end of a zoom lens according to an eighteenth embodiment of the present invention;

FIG. 36A, FIG. 36B, and FIG. 36C are diagrams showing the spherical aberration, the astigmatism, the distortion, and the chromatic aberration of magnification at the time of the infinite object point focusing of the zoom lens according to the eighteenth embodiment, where, FIG. 36A shows the state at the wide angle end, FIG. 36B shows the intermediate state, and FIG. 36C shows the state at the telephoto end;

FIG. 38A, FIG. 38B, and FIG. 38C are diagrams showing the spherical aberration, the astigmatism, the distortion, and the chromatic aberration of magnification at the time of the infinite object point focusing of the zoom lens according to the nineteenth embodiment, where, FIG. 38A shows the state at the wide angle end, FIG. 38B shows the intermediate state, and FIG. 38C shows the state at the telephoto end;

FIG. 40A shows the state at the wide angle end, FIG. 40B shows the intermediate state, and FIG. 40C shows the state at the telephoto end;

FIG. 42A, FIG. 42B, and FIG. 42C are diagrams showing the spherical aberration, the astigmatism, the distortion, and the chromatic aberration of magnification at the time of the infinite object point focusing of the zoom lens according to the twenty first embodiment, where, FIG. 42A shows the state at the wide angle end, FIG. 42B shows the intermediate state, and FIG. 42C shows the state at the telephoto end;

FIG. 44A shows the state at the wide angle end, FIG. 44B shows the intermediate state, and FIG. 44C shows the state at the telephoto end;

FIG. 46A shows the state at the wide angle end, FIG. 46B shows the intermediate state, and FIG. 46C shows the state at the telephoto end;

FIG. 48A shows the state at the wide angle end, FIG. 48B shows the intermediate state, and FIG. 48C shows the state at the telephoto end;

FIG. 50A shows the state at the wide angle end, FIG. 50B shows the intermediate state, and FIG. 50C shows the state at the telephoto end;

FIG. 52A shows the state at the wide angle end, FIG. 52B shows the intermediate state, and FIG. 52C shows the state at the telephoto end;

FIG. 54A, FIG. 54B, and FIG. 54C are diagrams showing the spherical aberration, the astigmatism, the distortion, and the chromatic aberration of magnification at the time of the infinite object point focusing of the zoom lens according to the twenty seventh embodiment, where, FIG. 54A shows the state at the wide angle end, FIG. 54B shows the intermediate state, and FIG. 54C shows the state at the telephoto end;

FIG. 56A shows the state at the wide angle end, FIG. 56B shows the intermediate state, and FIG. 56C shows the state at the telephoto end;

FIG. 58A shows the state at the wide angle end, FIG. 58B shows the intermediate state, and FIG. 58C shows the state at the telephoto end;

FIG. 60A shows the state at the wide angle end, FIG. 60B shows the intermediate state, and FIG. 60C shows the state at the telephoto end;

FIG. 62A shows the state at the wide angle end, FIG. 62B shows the intermediate state, and FIG. 62C shows the state at the telephoto end;

FIG. 64A, FIG. 64B, and FIG. 64C are diagrams showing the spherical aberration, the astigmatism, the distortion, and the chromatic aberration of magnification at the time of the infinite object point focusing of the zoom lens according to the thirty second embodiment, where, FIG. 64A shows the state at the wide angle end, FIG. 64B shows the intermediate state, and FIG. 64C shows the state at the telephoto end;

FIG. 66A shows the state at the wide angle end, FIG. 66B shows the intermediate state, and FIG. 66C shows the state at the telephoto end;

FIG. 68A shows the state at the wide angle end, FIG. 68B shows the intermediate state, and FIG. 68C shows the state at the telephoto end;

FIG. 70A, FIG. 70B, and FIG. 70C are diagrams showing the spherical aberration, the astigmatism, the distortion, and the chromatic aberration of magnification at the time of the infinite object point focusing of the zoom lens according to the thirty fifth embodiment, where, FIG. 70A shows the state at the wide angle end, FIG. 70B shows the intermediate state, and FIG. 70C shows the state at the telephoto end;

FIG. 72A, FIG. 72B, and FIG. 72C are diagrams showing the spherical aberration, the astigmatism, the distortion, and the chromatic aberration of magnification at the time of the infinite object point focusing of the zoom lens according to the thirty sixth embodiment, where, FIG. 72A shows the state at the wide angle end, FIG. 72B shows the intermediate state, and FIG. 72C shows the state at the telephoto end;

FIG. 74A shows the state at the wide angle end, FIG. 74B shows the intermediate state, and FIG. 74C shows the state at the telephoto end;

FIG. 76A shows the state at the wide angle end, FIG. 76B shows the intermediate state, and FIG. 76C shows the state at the telephoto end;

FIG. 83A is a front view of a portable telephone 400, FIG. 83B is a side view of the portable telephone 400, and FIG. 83C is a cross-sectional view of a taking optical system 405.

BEST MODE FOR CARRYING OUT THE INVENTION

Figure 1:
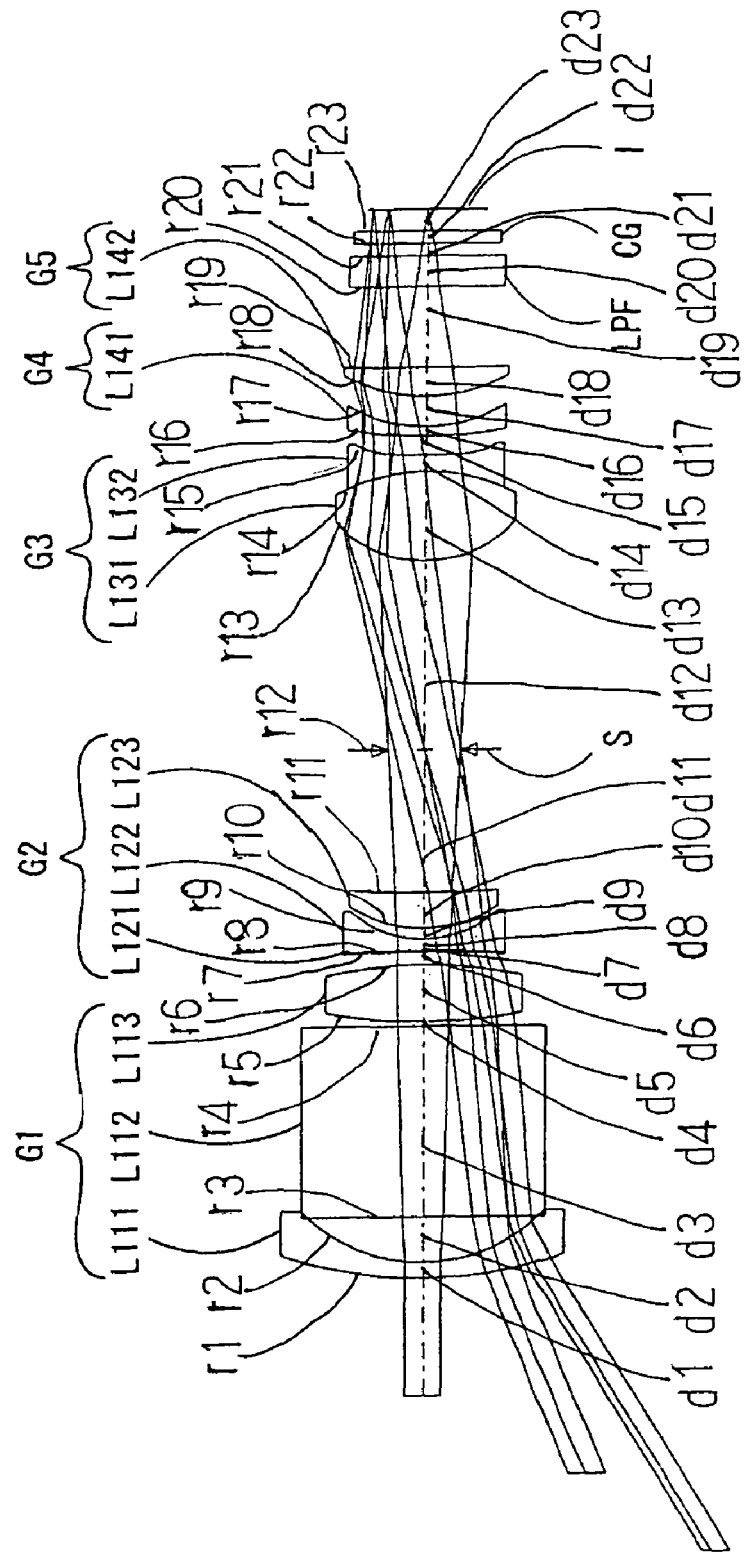
FIG. 1 is a cross-sectional view along an optical axis showing an optical arrangement at the time of an infinite object point focusing at a wide angle end of a zoom lens according to a first embodiment of the present invention.

Prior to a description of embodiments, an action and an effect of the present invention will be described below.

An image forming optical system of the present invention, where the image forming optical system includes a positive lens group, a negative lens group, and an aperture stop, has a basic structure in which the negative lens group is disposed at an object side of the aperture stop, and the negative lens group includes a cemented lens which is formed by cementing a plurality of lenses.

In this manner, in the basic structure, since the cemented lens is used in the negative lens group which is at the object side of the aperture stop, a change in a chromatic aberration of magnification in a zoom lens, at the time of zooming, is easily suppressed. Moreover, with a fewer number of lenses, it is possible to suppress sufficiently an occurrence of color spreading over a zoom range. Moreover, although it is effective to enhance a refracting power of the lens group for making small the entire optical system, in this basic structure, since the refracting power can be easily imparted without making thick as far as possible, the negative lens group (the negative lens group on the object side of the aperture stop) of which the refractive index is to be made strong, it is easy to make small the entire optical system.

Further, in the abovementioned basic structure, it is preferable that at least one lens forming the cemented lens has the following characteristics. In other words, in a rectangular coordinate system in which, a horizontal axis is let to be Nd and a vertical axis is let to be vd, when a straight line indicated by Nd=α×vd+β (where, α=−0.017) is set, it is desirable that Nd and vd of at least one lens forming the cemented lens are included in both of areas namely, an area which is determined by a line when a lower limit value is in a range of a following conditional expression (1a), and a line when an upper limit value is in a range of the following conditional expression (1a), and an area determined by following conditional expressions (2a) and (3a).

$$1.45 < \beta < 2.15 \tag{1a}$$

$$1.30 < Nd < 2.20 \tag{2a}$$

$$3 < vd < 12 \tag{3a}$$

Here, Nd denotes a refractive index, and vd denotes an Abbe's number.

Here, a glass means a lens material such as a glass and a resin. Moreover, as a cemented lens, a lens in which a plurality of lenses made of a glass selected appropriately is cemented, is used.

When a value is lower than the lower limit value in the conditional expression (1a), since a refractive index is low, an effect when an aspheric surface is provided on a side which is in contact with air is small, and a correction of a spherical aberration, a coma aberration, and a distortion becomes difficult. Or, since the Abbe's number is low, a correction of a chromatic aberration, as an extremely thin cemented lens is possible, but when the side in contact with air is made to be an aspheric surface, a chromatic coma and a chromatic aberration of magnification of high order are susceptible to occur, and a degree of freedom of an aberration correction is decreased.

When a value is higher than an upper limit value in the conditional expression (1a), since a power and a thickness of the cemented lens is required to be more than a certain magnitude for the correction of the chromatic aberration, it becomes susceptible to be effected by optical characteristics which depend on an environment of the material.

When a value is lower than a lower limit value in the conditional expression (2a), the effect when the aspheric surface is provided on the side which is in contact with air is small, and the correction of the spherical aberration, the coma aberration, and the distortion becomes difficult.

When a value is higher than an upper limit value in the conditional expression (2a), in a case of a material which includes organic properties, when the refractive index is excessively high, a temperature variance becomes excessively high, and optical characteristics which depend on the environment are susceptible to become unstable. Moreover, a reflectivity becomes excessively high, and a ghost is susceptible to occur even when coating is optimized.

When a value is lower than a lower limit value in the conditional expression (3a), the correction of the chromatic aberration, as an extremely thin cemented lens is possible, but when the side in contact with air is made to be an aspheric surface, the chromatic coma and the chromatic aberration of magnification of high order are susceptible to occur, and the degree of freedom of the aberration correction is decreased.

When a value is higher than an upper limit value in the conditional expression (3a), it is necessary to enhance a refracting power of the cemented lens for correcting the chromatic aberration, and it is advantageous for a correction of a Petzval's sum, but it becomes susceptible to be effected by the optical characteristics which depend on the environment of the material.

It is more preferable when a following conditional expression (1a') is satisfied.

$$1.48<\beta<2.04 \quad (1a')$$

Furthermore, it is even more preferable when a following conditional expression (1a") is satisfied.

$$1.50<\beta<2.00 \quad (1a")$$

Moreover, it is more preferable when a following conditional expression (2a') is satisfied.

$$1.58<Nd<2.10 \quad (2a')$$

Furthermore, it is more preferable when a following conditional expression (2a") is satisfied.

$$1.63<Nd<1.95 \quad (2a")$$

Moreover, it is more preferable when a following conditional expression (3a') is satisfied.

$$5<vd<10 \quad (3a')$$

Furthermore, it is more preferable when a following conditional expression (3a") is satisfied.

$$6<vd<9 \quad (3a")$$

Or, in the abovementioned basic structure, it is preferable that at least one lens forming the cemented lens has the following characteristics. In other words, in a rectangular coordinate system in which, a horizontal axis is let to be Nd and a vertical axis is let to be vd, when a straight line indicated by Nd=$\alpha$×vd+$\beta$ (where, $\alpha$=−0.017) is set, it is desirable that Nd and vd of at least one lens forming the cemented lens is included in both of areas namely, an area which is determined by a line when a lower limit value is in a range of a following conditional expression (1b), and a line when an upper limit value is in a range of the following conditional expression (1b), and an area determined by following conditional expressions (2b) and (3b).

$$1.45<\beta<2.15 \quad (1b)$$

$$1.58<Nd<2.20 \quad (2b)$$

$$3<vd<40 \quad (3b)$$

Here, Nd denotes the refractive index, and vd denotes the Abbe's number.

When a value is lower than a lower limit value in the conditional expression (1b), since the refractive index is low, the effect when the aspheric surface is provided on the side which is in contact with air is small, and the correction of the spherical aberration, the coma aberration, and the distortion becomes difficult. Or, since the Abbe's number is low, the correction of the chromatic aberration, as an extremely thin cemented lens is possible, but when the side in contact with air is made to be an aspheric surface, the chromatic coma, and the chromatic aberration of magnification of high order are susceptible to occur, and the degree of freedom of the aberration correction is decreased.

When a value is higher than an upper limit value in the conditional expression (1b), a correction level of the chromatic aberration and the Petzval's sum become same as of a general optical glass lens, and characteristics of the present invention are not achieved.

When a value is lower than a lower limit value in the conditional expression (2b), the effect when the aspheric surface is provided on the side which is in contact with air is small, and the correction of the spherical aberration, the coma aberration, and the distortion becomes difficult.

When a value is higher than an upper limit value in the conditional expression (2b), in the case of a material which includes organic properties, when the refractive index is excessively high, the temperature variance becomes excessively high, and the optical characteristics which depend on the environment are susceptible to become unstable. Moreover, the reflectivity becomes excessively high, and a ghost is susceptible to occur even when the coating is optimized.

When a value is lower than a lower limit value in the conditional expression (3b), the correction of the chromatic aberration, as an extremely thin cemented lens is possible, but when the side in contact with air is made to be an aspheric surface, the chromatic coma and the chromatic aberration of magnification of high order are susceptible to occur, and the degree of freedom of the aberration correction is decreased.

When a value is higher than an upper limit value in the conditional expression (3b), it is necessary to enhance the refracting power of the cemented lens for correcting the chromatic aberration, and it is advantageous for the correction of the Petzval's sum, but it becomes susceptible to be effected by the optical characteristics which depend on the environment of the material.

It is more preferable when a following conditional expression (1b') is satisfied.

$$1.48 < \beta < 2.04 \tag{1b'}$$

Furthermore, it is even more preferable when a following conditional expression (1b") is satisfied.

$$1.50 < \beta < 2.00 \tag{1b"}$$

Moreover, it is more preferable when a following conditional expression (2b') is satisfied.

$$1.60 < Nd < 2.10 \tag{2b'}$$

Furthermore, it is more preferable when a following conditional expression (2b") is satisfied.

$$1.63 < Nd < 1.95 \tag{2b"}$$

Moreover, it is more preferable when a following conditional expression (3b') is satisfied.

$$5 < vd < 30 \tag{3b'}$$

Furthermore, it is more preferable when a following conditional expression (3b") is satisfied.

$$6 < vd < 25 \tag{3b"}$$

Moreover, it is preferable that the cemented lens is formed by a lens (hereinafter, called as a 'predetermined lens') having the values of Nd and vd which are included in both the areas mentioned above, and a lens other than the predetermined lens, and a center thickness along an optical axis of the predetermined lens is less than a center thickness along an optical axis of the other lens. By making such an arrangement, it is possible to realize a more favorable correction of each aberration mentioned above, and thinning of the lens group.

Moreover, the cemented lens may be a compound lens which is formed by closely adhering and hardening a resin on a lens surface (lens surface of the other lens), in order to improve a manufacturing accuracy. Here, the resin which is adhered closely and hardened corresponds to the predetermined lens.

Moreover, the cemented lens may be a compound lens which is formed by closely adhering and hardening a glass on the lens surface (lens surface of the other lens), as it is advantageous for resistance such as a light resistance and a chemical resistance. Here, the glass which is adhered closely and hardened corresponds to the predetermined lens.

Furthermore, in the cemented lens, a center thickness t1 along the optical axis of the predetermined lens (one lens in which Nd and vd are included in both the areas mentioned above) may satisfy a following conditional expression (4), in order to make a size small and to carry out molding stably.

$$0.22 < t1 < 2.0 \tag{4}$$

It is more preferable that a following conditional expression (4') is satisfied.

$$0.3 < t1 < 1.5 \tag{4'}$$

Furthermore, it is even more preferable that a following conditional expression (4") is satisfied.

$$0.32 < t1 < 1.0 \tag{4"}$$

Moreover, the image forming optical system may be a zoom lens of which, a group on the closest side of an object is a positive lens group, from a viewpoint of having a high, magnification of the zoom and an improvement in a brightness of the lens.

Moreover, the image forming optical system may be a zoom lens of which, a group on the closest side of an object is a negative lens group, for making the size small.

Moreover, the image forming optical system may have a prism for folding, for facilitating thinning of an optical system with respect to a direction of taking a photo.

Moreover, in the image forming optical system, the prism may be in a group on the closest side of an object, for further facilitating thinning.

Incidentally, when a pixel size of the electronic image pickup element becomes smaller than a certain size, a component of a frequency higher than a Nyquist frequency is eliminated due to an effect of diffraction. Therefore, when this is used, it is possible to omit an optical low-pass filter. This is preferable from a point of making the entire optical system as thin as possible.

For this, it is preferable that a following conditional expression (6) is satisfied.

$$Fw \geq a(\mu m) \tag{6}$$

where, Fw is a full-aperture F value, and a is a distance between pixels (unit: μm) in a horizontal direction of the electronic image pickup element.

When the conditional expression (6) is satisfied, the optical low-pass filter is not required to be disposed in an optical path. Accordingly, it is possible to make the optical system small.

In a case of satisfying the conditional expression (6), it is preferable that the aperture stop is let to be open only. This means that the optical system in this case is an optical system with a constant diameter of the aperture stop all the time. Moreover, in the optical system in this case, since an operation of narrowing is not necessary, it is possible to omit a narrowing mechanism. Accordingly, the size can be made small saving that much space. When the conditional expression (6) is not satisfied, the optical low-pass filter is necessary.

Moreover, it is more preferable that a conditional expression (6') is satisfied.

$$Fw \geq 1.2a(\mu m) \tag{6'}$$

Furthermore, it is even more preferable that a conditional expression (6") is satisfied.

$$Fw \geq 1.4a(\mu m) \tag{6"}$$

Finally, an electronic image pickup apparatus will be described below. As the electronic image pickup apparatus, an electronic image pickup apparatus in which, both a thinning of depth and a widening of image angle are realized is preferable.

Here, it is assumed that an infinite object is imaged by an optical system which has no distortion. In this case, since the image which is formed has no distortion, $$f = y/\tan \omega$$

holds.

Here, y is a height of an image point from an optical axis, f is a focal length of the image forming system, and ω is an angle with respect to an optical axis in a direction of an object point corresponding to the image point connecting from a center on an image pickup surface, up to a position of y.

On the other hand, when the optical system has a barrel distortion, $$f > y/\tan \omega$$

holds. In other words, when f and y are let to be constant values, ω becomes a substantial value.

Therefore, in the electronic image pickup apparatus, it is preferable to use a zoom lens as the image forming optical system. As a zoom lens, particularly in a focal length near a wide angle end, an optical system having a substantial barrel distortion may be used intentionally. In this case, since a purpose is served without correcting the distortion, it is possible to achieve the widening of the image angle of the optical system. However, an image of the object is formed on the electronic image pickup element, in a state of having the barrel distortion. Therefore, in the electronic image pickup apparatus, image data obtained by the electronic image pickup element is processed by an image processing. In this process, the image data (a shape of the image data) is changed such that the barrel distortion is corrected. By changing the image data, image data which is obtained finally, takes a shape almost similar to the object. Accordingly, based on this image data, the image of the object may be output to a CRT or a printer.

Here, as the image forming optical system (zoom lens), an image forming optical system which satisfies a following conditional expression (7) at the time of infinite object point focusing may be adopted.

$$0.7 < y_{07}/(fw \cdot \tan \omega_{07w}) < 0.96 \quad (7)$$

where, $y_{07}$ is indicated as $y_{07}=0.7y_{10}$ when, in an effective image pickup plane (plane in which image pickup is possible), a distance from a center up to a farthest point (maximum image height) is let to be $y_{10}$. Moreover, $\omega_{07w}$ is an angle with respect to an optical axis in a direction of an object point corresponding to an image point connecting from a center on the image pickup surface in a wide angle end, up to a position of $y_{07}$.

The conditional expression (7) mentioned above is an expression in which, a degree of the barrel distortion in a zoom wide angle end is regulated. When the conditional expression (7) is satisfied, it is possible to fetch information of the wide image angle without making the optical system enlarged. An image which is distorted to barrel shape is subjected to photoelectric conversion, and becomes image data which is distorted to barrel shape. However, on the image data which is distorted to the barrel shape, a process equivalent to a shape change of the image is carried out electrically by the image processing means which is a signal processing system of the electronic image pickup apparatus. When this process is carried out, even when the image data output from the image processing means is reproduced finally by a display apparatus, the distortion is corrected, and an image almost similar to a shape of an object to be photographed is obtained.

Here, when a value is higher than an upper limit value in the conditional expression (7), particularly, when a value close to 1 is to be taken, it is possible to carry out by the image processing means, a correction equivalent to a correction in which, the distortion is corrected favorably optically, but it is difficult to fetch an image over a wide angle of visibility. On the other hand, when a value is lower than a lower limit value in the conditional expression (7), a rate of enlarging in a direction of radiating in a portion around an image angle when the image distortion due to the distortion of the optical system is corrected by the image processing means, becomes excessively high. As a result of this, a deterioration in a sharpness of the area around the image becomes remarkable.

On the other hand, by satisfying the conditional expression (7), it is possible to widen the angle (make an angle in a vertical direction in the distortion to be 38° or more) and to make small the optical system.

Moreover, it is more preferable when a following conditional expression (7') is satisfied.

$$0.75 < y_{07}/(fw \cdot \tan \omega_{07w}) < 0.94 \quad (7')$$

Furthermore, it is even more preferable when a following conditional expression (7") is satisfied.

$$0.80 < y_{07}/(fw \cdot \tan \omega_{07w}) < 0.92 \quad (7")$$

The image forming optical system of the present invention, even when an electronic image pickup element of a large number of pixels is used, is capable of achieving thinning and reduction in size of a volume of the image forming optical system, by satisfying or providing each of conditional expressional and structural characteristics mentioned above, and realizing a favorable correction of aberration. Moreover, the image forming optical system of the present invention is capable of providing (satisfying) in combination the conditional expressional and structural characteristics mentioned above. In this case, it is possible to achieve further reduction in size and thinning, or the favorable aberration correction. Moreover, in the electronic image pickup apparatus having the image forming optical system of the present invention, it is possible to achieve the thinning and reduction in size of the volume of the image forming optical system, and further, to have both of the favorable correction of various aberrations, and widening of the angle.

Embodiments of the present invention will be described below by using the accompanying diagrams.

As a zoom lens of the present invention, a five-group structure or a four-group structure can be taken into consideration. In a zoom lens of the five-group structure, it is preferable to dispose from an object side, each lens group in order of a first lens group having a positive refracting power, a second lens group having a negative refracting power, a third lens group having a positive refracting power, a fourth lens group having a negative refracting power, and a fifth lens group having a positive refracting power.

Here, it is preferable that the first lens group includes a negative lens, a prism, and a positive lens. At this time, it is more preferable to dispose these in order of the negative lens, the prism, and the positive lens, from the object side. Moreover, the first lens group may include only one negative lens, one prism, and one positive lens.

Moreover, it is preferable that the second lens group includes a cemented lens and a positive lens. At this time, it is more preferable to dispose the positive lens on an image side of the cemented lens. Moreover, it is preferable to form the cemented lens by a positive lens and a negative lens, and to dispose the cemented lens such that the negative lens is positioned at the image side. Or, it is preferable to form the second lens group by a negative lens, and to dispose the cemented lens such that the negative lens having a thin center-thickness is positioned at the object side. The second lens group may include only one cemented lens and one positive lens. In this case, the cemented lens is formed by one positive lens and one negative lens, or two negative lenses.

Moreover, it is preferable that the third lens group includes a positive lens and a negative lens. At this time, it is more preferable to form a cemented lens by the positive lens and the negative lens, and to dispose the cemented lens such that the positive lens is positioned at the object side. The third lens group may be formed by only one cemented lens. In this case, the cemented lens is formed by one positive lens and one negative lens.

Moreover, it is preferable that the fourth lens group includes a negative lens. At this time, it is preferable to form the fourth lens group by only one negative lens.

Moreover, it is preferable that the fifth lens group includes a positive lens. At this time, it is preferable to form the fifth lens group by only one positive lens.

Moreover, in a zoom lens of the four-group structure, it is preferable to dispose each lens group in order of a first lens group having a negative refracting power, a second lens group having a positive refracting power, a third lens group having a negative refracting power, and a fourth lens group having a positive refracting power, from the object side.

Here, it is preferable that the first lens group-includes a prism and at least two cemented lenses. At this time, it is more preferable to dispose these in order of one cemented lens, the prism, and the other cemented lens, from the object side. Moreover, it is preferable to form the one cemented lens by a positive lens and a negative lens, and to dispose the one cemented lens such that the negative lens is positioned at the object side. Or, the one cemented lens may be formed by only a negative lens, and may be disposed such that the negative lens having thin center-thickness is positioned at the object side.

Moreover, it is preferable to form the other cemented lens by a positive lens and a negative lens, and to dispose the other cemented lens such that the positive lens is positioned at the object side. Or, the other cemented lens may be formed by only a negative lens.

The first lens group may include only one prism and two cemented lenses. In this case, the cemented lens is formed by one positive lens and one negative lens, or by two negative lenses.

Moreover, it is preferable that the second lens group includes a positive lens and a negative lens. At this time, it is more preferable to form a cemented lens by a positive lens and a negative lens, and to dispose the cemented lens such that the positive lens is positioned at the object side. The second lens group may be formed by only one cemented lens. In this case, the cemented lens is formed by one positive lens and one negative lens.

Moreover, it is preferable that the third lens group includes a positive lens and a negative lens, or a negative lens. At this time, it is more preferable to form a cemented lens by a positive lens and a negative lens, and to dispose the cemented lens such that the negative lens is positioned at the object side. Or, the cemented lens may be formed by two negative lenses. The third lens group may include only one cemented lens. In this case, the cemented lens is formed by one positive lens and one negative lens, or two negative lenses.

Moreover, it is preferable that the fourth lens group includes a positive lens and a negative lens. At this time, it is preferable to form a cemented lens by a positive lens and a negative lens, and to dispose the cemented lens such that the positive lens is positioned at the object side. The fourth lens group may be formed by only one cemented lens. In this case, the cemented lens includes one positive lens and one negative lens.

It is possible to distribute a refracting power of one lens into two lenses. Accordingly, in each of the lens groups mentioned above, it is possible to substitute one lens by two lenses. However, from a point of view of the reduction in size and thinning, it is preferable to let the number of lenses to be substituted by two lenses in each lens group, to be only one.

First Embodiment

FIG. 1 is a cross-sectional view along an optical axis showing an optical arrangement at the time of an infinite object point focusing at a wide angle end of a zoom lens according to a first embodiment;

FIG. 2A, FIG. 2B, and FIG. 2C are diagrams showing a spherical aberration, an astigmatism, a distortion, and a chromatic aberration of magnification at the time of the infinite object point focusing of the zoom lens according to the first embodiment, where, FIG. 2A shows a state at the wide angle end, FIG. 2B shows an intermediate state, and FIG. 2C shows a state at a telephoto end.

The zoom lens of the first embodiment, as shown in FIG. 1, has in order from an object side thereof, a first lens group G1, a second lens group G2, an aperture stop S, a third lens group G3, a fourth lens group G4, and a fifth lens group G5. In the diagrams, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a positive meniscus lens L121 having a convex surface directed toward an image side and a biconcave lens L122, and a positive meniscus lens L123 having a convex surface directed toward the object side, and has a negative refracting power as a whole. The positive meniscus lens L121 having the convex surface directed toward the image side is a lens having a thin center-thickness.

The third lens group G3 includes a cemented lens which is formed by a biconvex lens L131 and a biconcave lens L132 and has a positive refracting power as a whole.

The fourth lens group G4 includes a negative meniscus lens L141 having a convex surface directed toward the object side, and has a negative refracting power as a whole.

The fifth lens group G5 includes a positive meniscus lens L142 having a convex surface directed toward the object side, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface toward the object side, of the biconvex lens L113 in the first lens group G1, a surface toward the object side of the positive meniscus lens L121 having the convex surface directed toward the image side, and a surface toward the image side of the biconvex lens L122 in the second lens group G2, a surface toward the object side of the biconvex lens L131, and a surface toward the image side of the biconcave lens L132 in the third lens group G3, and a surface toward the object side of the positive meniscus lens L142 having the convex surface directed toward the object side in the fifth lens group G5.

Next, numerical data of optical members forming the zoom lens of the first embodiment will be enumerated.

In the numerical data of the first embodiment, r1, r2, . . . denote a radius of curvature of each lens surface; d1, d2, . . . denote a thickness or an air space of each lens; nd1, nd2, . . . denote a refractive index at line d of each lens; vd1, vd2, denote the Abbe's number for each lens; Fno. denotes an F number; f denotes a focal length of an overall system; and D0 denotes a distance from the object to the first surface.

An aspheric surface shape is expressed by a following expression when a direction of an optical axis is let to be z, a direction orthogonal to the optical axis is let to be y, a conical coefficient is let to be K, and an aspheric coefficient is let to be A4, A6, A8, and A10.

$$z=(y^2/r)/[1+\{1-(1+K)(y/r)^2\}^{1/2}]+A4y^4+A6y^6+A8y^8+A10y^{10}$$

Moreover, E denotes a power of 10. These symbols of data values are common even in numerical data of embodiments which will be described later. The conical coefficient might also be denoted by k.

Next, numerical data of the first embodiment will be enumerated.

| Numerical data 1 | | | |
|---|---|---|---|
| r1 = 25.36 | d1 = 1 | Nd1 = 1.8061 | vd1 = 40.92 |
| r2 = 10.004 | d2 = 2.9 | | |
| r3 = ∞ | d3 = 12 | Nd3 = 1.8061 | vd3 = 40.92 |
| r4 = ∞ | d4 = 0.3 | | |
| r5 = 33.927 | d5 = 3.54 | Nd5 = 1.741 | vd5 = 52.64 |
| (Aspheric surface) | | | |
| r6 = −27.177 | d6 = D6 | | |
| r7 = −461.447 | d7 = 0.1 | Nd7 = 1.41244 | vd7 = 12.42 |
| (Aspheric surface) | | | |
| r8 = −92.289 | d8 = 0.7 | Nd8 = 1.8044 | vd8 = 39.59 |
| r9 = 6.012 | d9 = 0.7 | | |
| (Aspheric surface) | | | |
| r10 = 8.081 | d10 = 2.2 | Nd10 = 1.7552 | vd10 = 27.51 |
| r11 = 63.91 | d11 = D11 | | |
| r12 = Aperture stop | d12 = D12 | | |
| r13 = 7.812 | d13 = 5.49 | Nd13 = 1.6935 | vd13 = 53.21 |
| (Aspheric surface) | | | |
| r14 = −11.451 | d14 = 1 | Nd14 = 1.84666 | vd14 = 23.78 |
| r15 = 33.504 | d15 = D15 | | |
| (Aspheric surface) | | | |
| r16 = 26.9 | d16 = 0.6 | Nd16 = 1.48749 | vd16 = 70.23 |
| r17 = 9.047 | d17 = D17 | | |
| r18 = 9.921 | d18 = 1.8 | Nd18 = 1.7432 | vd18 = 49.34 |
| (Aspheric surface) | | | |
| r19 = 236.372 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

| Aspherical coefficients |
|---|
| 5th surface |
| k = 0 |
| A4 = 1.21460E−05 |
| A6 = 2.15403E−07 |
| A8 = 0 |
| 7th surface |
| k = 0 |
| A4 = −6.49637E−04 |
| A6 = 4.67785E−05 |
| A8 = −1.11723E−06 |
| 9th surface |
| k = 0 |
| A4 = −7.36988E−04 |
| A6 = 3.10428E−05 |
| A8 = −1.20842E−06 |
| 13th surface |
| k = 0 |
| A4 = 1.33646E−04 |
| A6 = 1.99909E−06 |
| A8 = 8.19731E−08 |
| 15th surface |
| k = 0 |
| A4 = 7.65187E−04 |
| A6 = 4.66680E−06 |
| A8 = 1.27977E−06 |
| 18th surface |
| k = 0 |
| A4 = −7.77242E−05 |

| Numerical data 1 |
|---|
| A6 = 8.66914E−06 |
| A8 = −2.36765E−07 |

| Zoom data When D0 (distance from object up to 1st surface) is ∞ | | | |
|---|---|---|---|
| | wide-angle end | intermediate | telephoto end |
| Focal length | 6.005 | 13.699 | 17.993 |
| FNO. | 2.88 | 4.93 | 6.03 |
| D6 | 0.8 | 7.08 | 8.33 |
| D11 | 8.92 | 2.64 | 1.38 |
| D12 | 11.78 | 4.21 | 1.19 |
| D15 | 1.21 | 12.51 | 14.59 |
| D17 | 1.92 | 2.3 | 3.68 |
| D19 | 5.08 | 0.96 | 0.51 |
| D23 | 1.36 | 1.36 | 1.36 |

Second Embodiment

Figure 3:
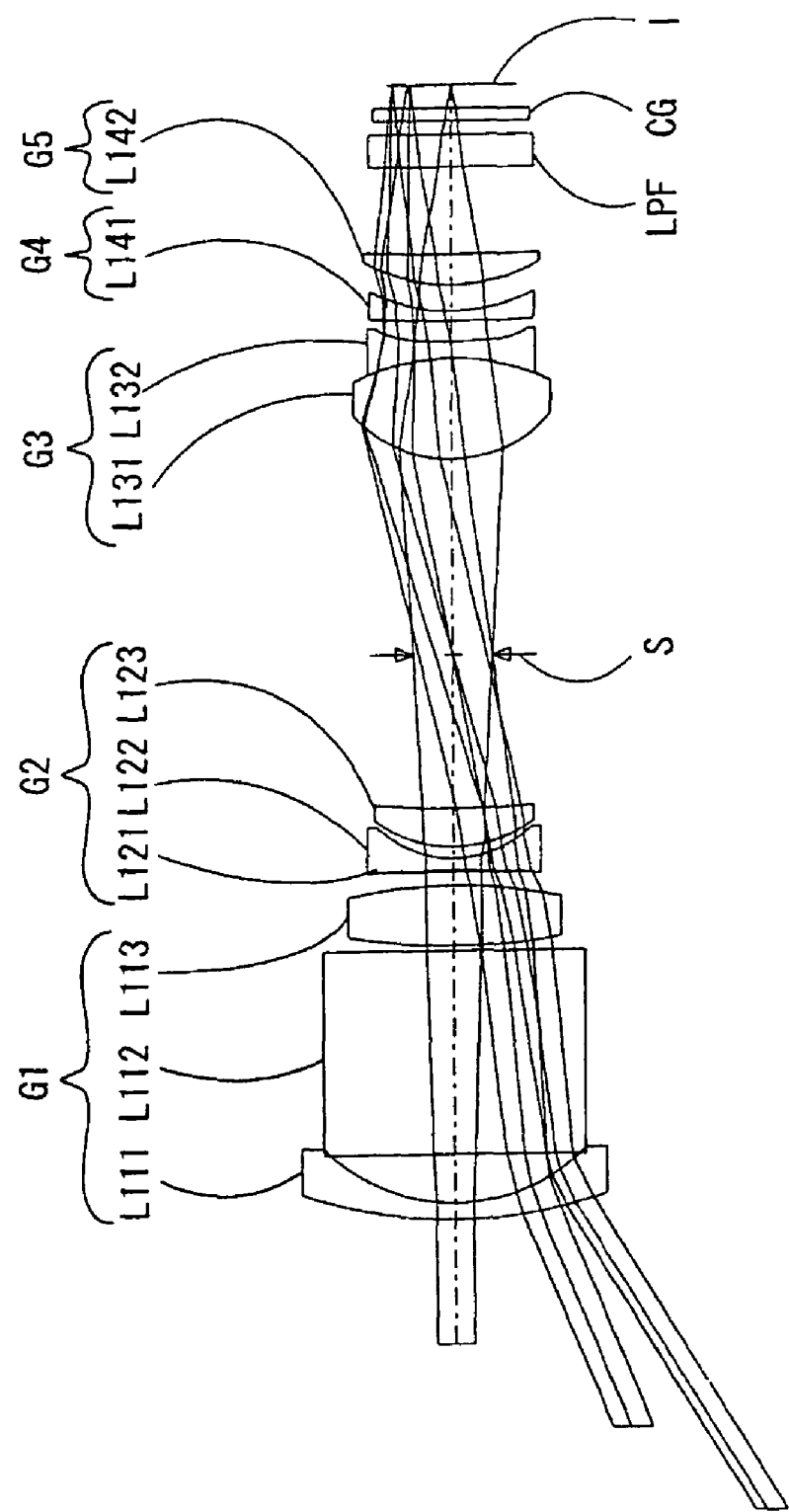
FIG. 3 is a cross-sectional view along the optical axis showing an optical arrangement at the time of the infinite object point focusing at the wide angle end of a zoom lens according to a second embodiment of the present invention.

FIG. 3 is a cross-sectional view along the optical axis showing an optical arrangement at the time of the infinite object point focusing at the wide angle end of a zoom lens according to a second embodiment of the present invention.

Figure 4A:
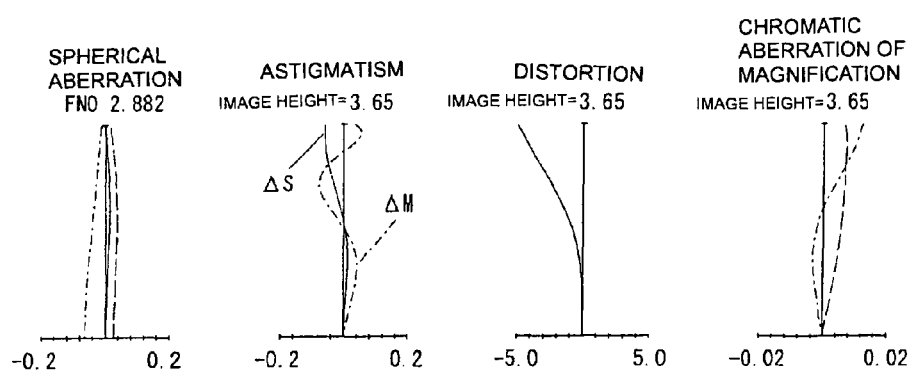
FIG. 4A, FIG. 4B, and FIG. 4C are diagrams showing the spherical aberration, the astigmatism, the distortion, and the chromatic aberration of magnification at the time of the infinite object point focusing of the zoom lens according to the second embodiment, where.
Figure 4B:
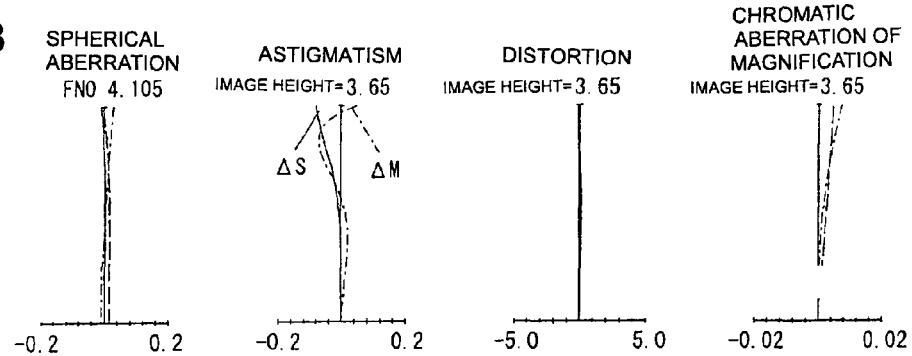
Figure 4C:
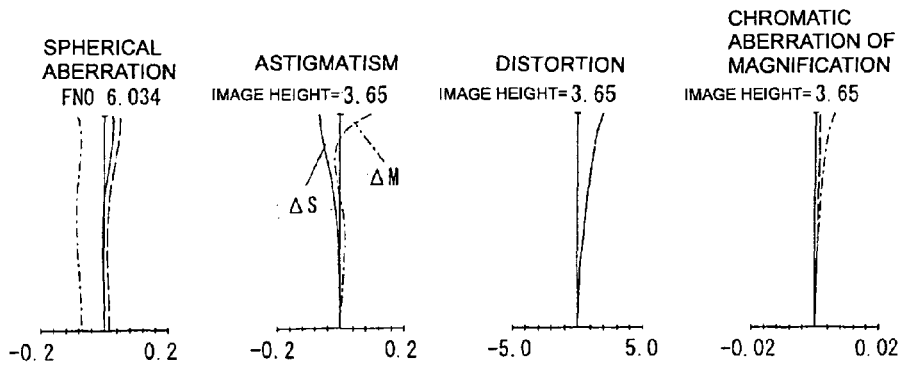

FIG. 4A, FIG. 4B, and FIG. 4C are diagrams showing the spherical aberration, the astigmatism, the distortion, and the chromatic aberration of magnification at the time of the infinite object point focusing of the zoom lens according to the second embodiment, where, FIG. 4A shows the state at the wide angle end, FIG. 4B shows the intermediate state, and FIG. 4C shows the state at the telephoto end.

The zoom lens of the second embodiment, as shown in FIG. 2, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a positive meniscus lens L121 having a convex surface directed toward an image side and a biconcave lens L122, and a positive meniscus lens L123 having a convex surface directed toward the object side, and has a negative refracting power as a whole. The positive meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a positive meniscus lens L142 having a convex surface directed toward the object side, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface toward the object side of the biconvex lens L113 in the first lens group G1, a surface on the object side of the positive meniscus lens L121 having the convex surface directed toward the image side, and a surface on the image side of the biconcave lens L122 in the second lens group G2, a surface on the object side of the biconvex lens L131 and a surface on the image side of the biconcave lens L132 in the third lens group G3, and a surface on the object side of the positive meniscus lens L142 having the convex surface directed toward the object side in the fifth lens group G5.

Next, numerical data of the second embodiment will be enumerated.

| Numerical data 2 | | | |
|---|---|---|---|
| r1 = 24.594 | d1 = 1 | Nd1 = 1.8061 | vd1 = 40.92 |
| r2 = 10.001 | d2 = 2.9 | | |
| r3 = ∞ | d3 = 12 | Nd3 = 1.8061 | vd3 = 40.92 |
| r4 = ∞ | d4 = 0.3 | | |
| r5 = 36.646 | d5 = 3.54 | Nd5 = 1.741 | vd5 = 52.64 |
| (Aspheric surface) | | | |
| r6 = −28.175 | d6 = D6 | | |
| r7 = −412.042 | d7 = 0.1 | Nd7 = 1.42001 | vd7 = 6.55 |
| (Aspheric surface) | | | |
| r8 = −82.408 | d8 = 0.7 | Nd8 = 1.804 | vd8 = 46.57 |
| r9 = 5.748 | d9 = 0.7 | | |
| (Aspheric surface) | | | |
| r10 = 7.508 | d10 = 2.2 | Nd10 = 1.762 | vd10 = 40.1 |
| r11 = 49.209 | d11 = D11 | | |
| r12 = Aperture stop | d12 = D12 | | |
| r13 = 7.579 | d13 = 5.88 | Nd13 = 1.6935 | vd13 = 53.21 |
| (Aspheric surface) | | | |
| r14 = −12.379 | d14 = 1 | Nd14 = 1.84666 | vd14 = 23.78 |
| r15 = 33.143 | d15 = D15 | | |
| (Aspheric surface) | | | |
| r16 = 75.485 | d16 = 0.6 | Nd16 = 1.48749 | vd16 = 70.23 |
| r17 = 9.793 | d17 = D17 | | |
| r18 = 9.468 | d18 = 1.8 | Nd18 = 1.7432 | vd18 = 49.34 |
| (Aspheric surface) | | | |
| r19 = 110.758 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

| Aspherical coefficients |
|---|
| 5th surface |
| k = 0 |
| A4 = 1.75267E−05 |
| A6 = 3.00970E−07 |
| A8 = 0 |
| 7th surface |
| k = 0 |
| A4 = 8.41987E−05 |
| A6 = 2.81257E−06 |
| A8 = −4.40220E−07 |
| 9th surface |
| k = 0 |
| A4 = −3.40594E−04 |
| A6 = 1.28078E−05 |
| A8 = −1.47015E−06 |
| 13th surface |
| k = 0 |
| A4 = 9.29393E−05 |
| A6 = 2.27583E−06 |
| A8 = 2.74322E−08 |

| -continued |
|---|
| Numerical data 2 |
| 15th surface |
| k = 0 |
| A4 = 8.13829E−04 |
| A6 = 7.34253E−06 |
| A8 = 1.33131E−06 |
| 18th surface |
| k = 0 |
| A4 = −8.92455E−05 |
| A6 = 6.36509E−06 |
| A8 = −1.97541E−07 |

| Zoom data When D0 (distance from object up to 1st surface) is ∞ | | | |
|---|---|---|---|
| | wide-angle end | intermediate | telephoto end |
| Focal length | 6.004 | 13.7 | 17.996 |
| FNO. | 2.88 | 4.93 | 6.03 |
| D6 | 0.8 | 7.2 | 8.34 |
| D11 | 8.93 | 2.53 | 1.39 |
| D12 | 11.51 | 4.24 | 1.2 |
| D15 | 1.2 | 11.76 | 14.36 |
| D17 | 1.55 | 2.58 | 3.35 |
| D19 | 5.15 | 0.83 | 0.5 |
| D23 | 1.36 | 1.36 | 1.36 |

Third Embodiment

Figure 5:
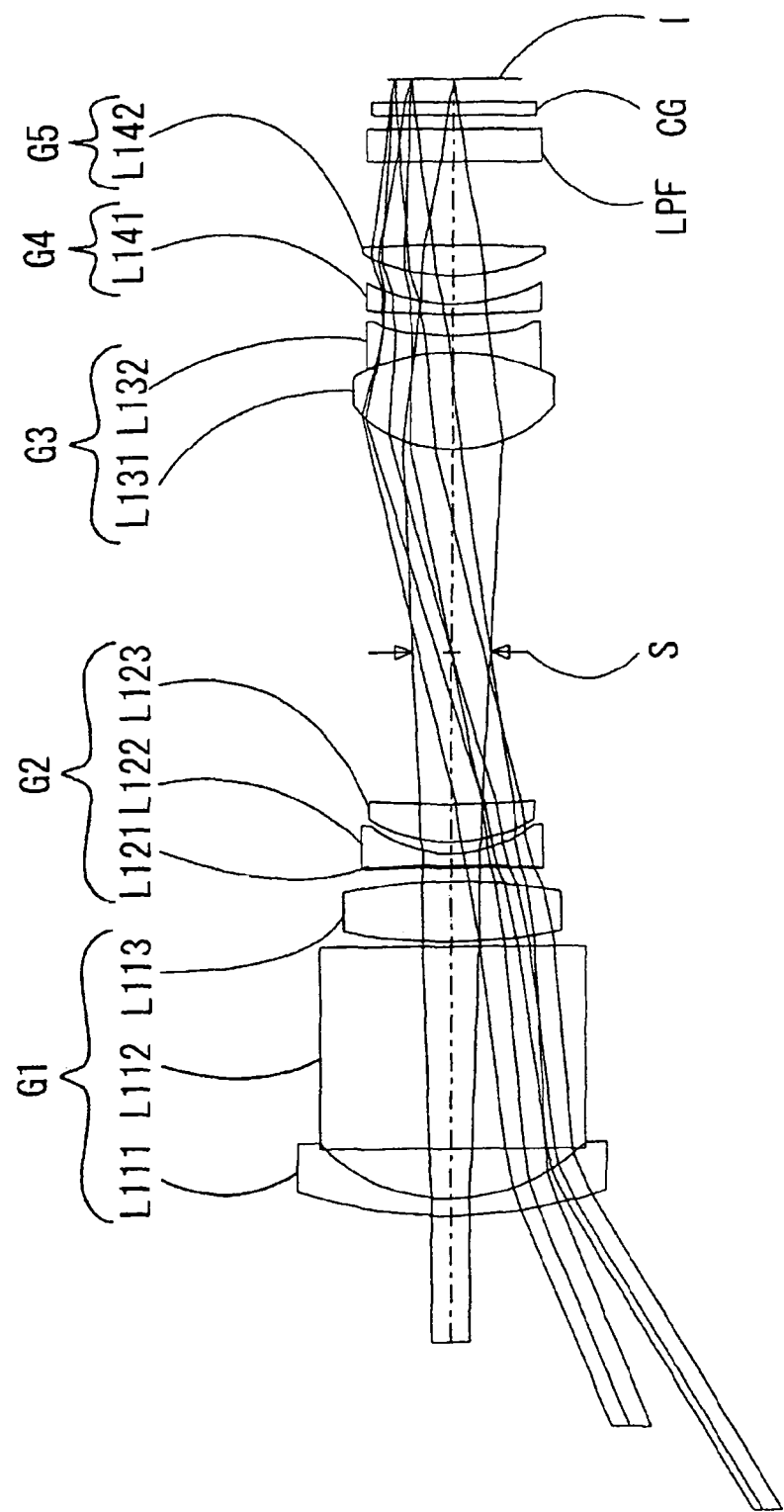
FIG. 5 is a cross-sectional view along the optical axis showing an optical arrangement at the time of the infinite object point focusing at the wide angle end of a zoom lens according to a third embodiment of the present invention.

FIG. 5 is a cross-sectional view along the optical axis showing an optical arrangement at the time of the infinite object point focusing at the wide angle end of a zoom lens according to a third embodiment of the present invention.

Figure 6A:
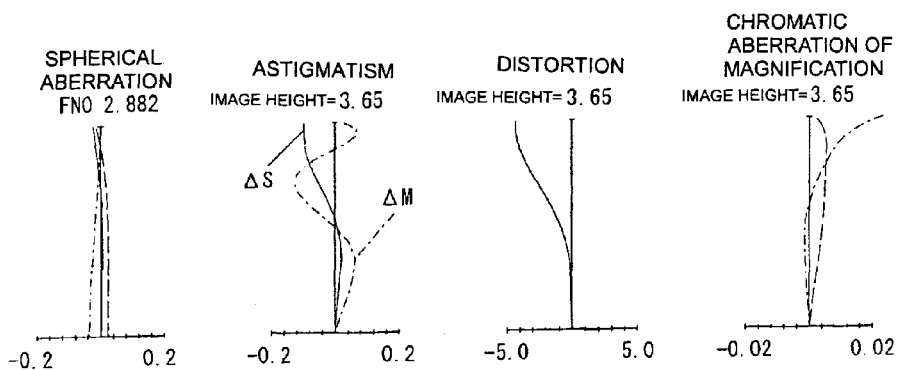
FIG. 6A, FIG. 6B, and FIG. 6C are diagrams showing the spherical aberration, the astigmatism, the distortion, and the chromatic aberration of magnification at the time of the infinite object point focusing of the zoom lens according to the third embodiment, where.
Figure 6B:
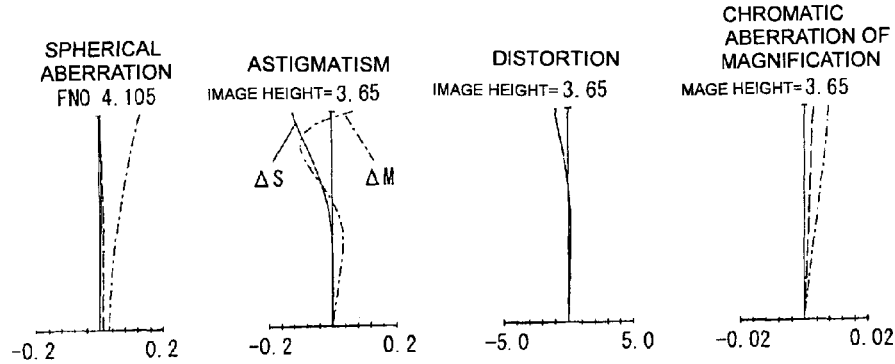
Figure 6C:
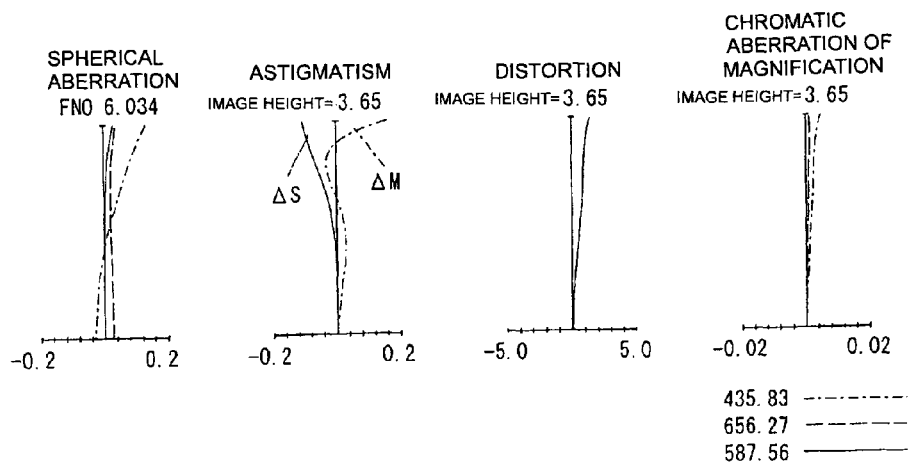

FIG. 6A, FIG. 6B and FIG. 6C are diagrams showing the spherical aberration, the astigmatism, the distortion, and the chromatic aberration of magnification at the time of the infinite object point focusing of the zoom lens according to the third embodiment, where, FIG. 6A shows the state at the wide angle end, FIG. 6B shows the intermediate state, and FIG. 6C shows the state at the telephoto end.

The zoom lens of the third embodiment, as shown in FIG. 5, has in order from the object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a positive meniscus lens L121 having a convex surface directed toward an image side and a biconcave lens L122, and a positive meniscus lens L123 having a convex surface directed toward the image side, and has a negative refracting power as a whole. The positive meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface toward the object side of the biconvex lens L113 in the first lens group G1, a surface toward the object side of the positive meniscus lens L121 having the convex surface directed toward the image side, and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the third embodiment will be enumerated.

Numerical data 3

| | | | |
|---|---|---|---|
| r1 = 26.034 | d1 = 1 | Nd1 = 1.8061 | vd1 = 40.92 |
| r2 = 10.008 | d2 = 2.9 | | |
| r3 = ∞ | d3 = 12 | Nd3 = 1.8061 | vd3 = 40.92 |
| r4 = ∞ | d4 = 0.3 | | |
| r5 = 31.427 (Aspheric surface) | d5 = 3.54 | Nd5 = 1.741 | vd5 = 52.64 |
| r6 = −28.242 | d6 = D6 | | |
| r7 = −450.644 (Aspheric surface) | d7 = 0.1 | Nd7 = 1.51824 | vd7 = 12.85 |
| r8 = −90.128 | d8 = 0.7 | Nd8 = 1.8044 | vd8 = 39.59 |
| r9 = 6.379 (Aspheric surface) | d9 = 0.7 | | |
| r10 = 8.418 | d10 = 2.2 | Nd10 = 1.7552 | vd10 = 27.51 |
| r11 = 53.205 | d11 = D11 | | |
| r12 = Aperture stop | d12 = D12 | | |
| r13 = 7.744 (Aspheric surface) | d13 = 5.68 | Nd13 = 1.6935 | vd13 = 53.21 |
| r14 = −11.578 | d14 = 1 | Nd14 = 1.84666 | vd14 = 23.78 |
| r15 = 29.590 (Aspheric surface) | d15 = D15 | | |
| r16 = 50.592 | d16 = 0.6 | Nd16 = 1.48749 | vd16 = 70.23 |
| r17 = 9.911 | d17 = D17 | | |
| r18 = 10.239 (Aspheric surface) | d18 = 1.8 | Nd18 = 1.7432 | vd18 = 49.34 |
| r19 = −99.931 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 1.17810E−05
A6 = 1.82657E−07
A8 = 0

7th surface k = 0
A4 = −4.42069E−04
A6 = 3.26119E−05
A8 = −6.84627E−07

9th surface k = 0
A4 = −6.04325E−04
A6 = 2.50939E−05
A8 = −7.15313E−07

-continued

Numerical data 3

13th surface k = 0
A4 = 1.11989E−04
A6 = 2.08910E−06
A8 = 6.26649E−08

15th surface k = 0
A4 = 7.60266E−04
A6 = 7.40588E−06
A8 = 1.27917E−06

18th surface k = 0
A4 = −1.02638E−04
A6 = 9.54050E−06
A8 = −2.57130E−07

Zoom data
When D0 (distance from object up to 1st surface) is ∞

| | wide-angle end | intermediate | telephoto end |
|---|---|---|---|
| Focal length | 6.005 | 13.699 | 17.987 |
| FNO. | 2.88 | 4.93 | 6.03 |
| D6 | 0.8 | 6.95 | 8.31 |
| D11 | 8.88 | 2.73 | 1.37 |
| D12 | 11.72 | 4.04 | 1.18 |
| D15 | 1.21 | 12.15 | 14.34 |
| D17 | 1.63 | 2.17 | 3.45 |
| D19 | 4.93 | 1.12 | 0.52 |
| D23 | 1.36 | 1.36 | 1.36 |

Fourth Embodiment

Figure 7:
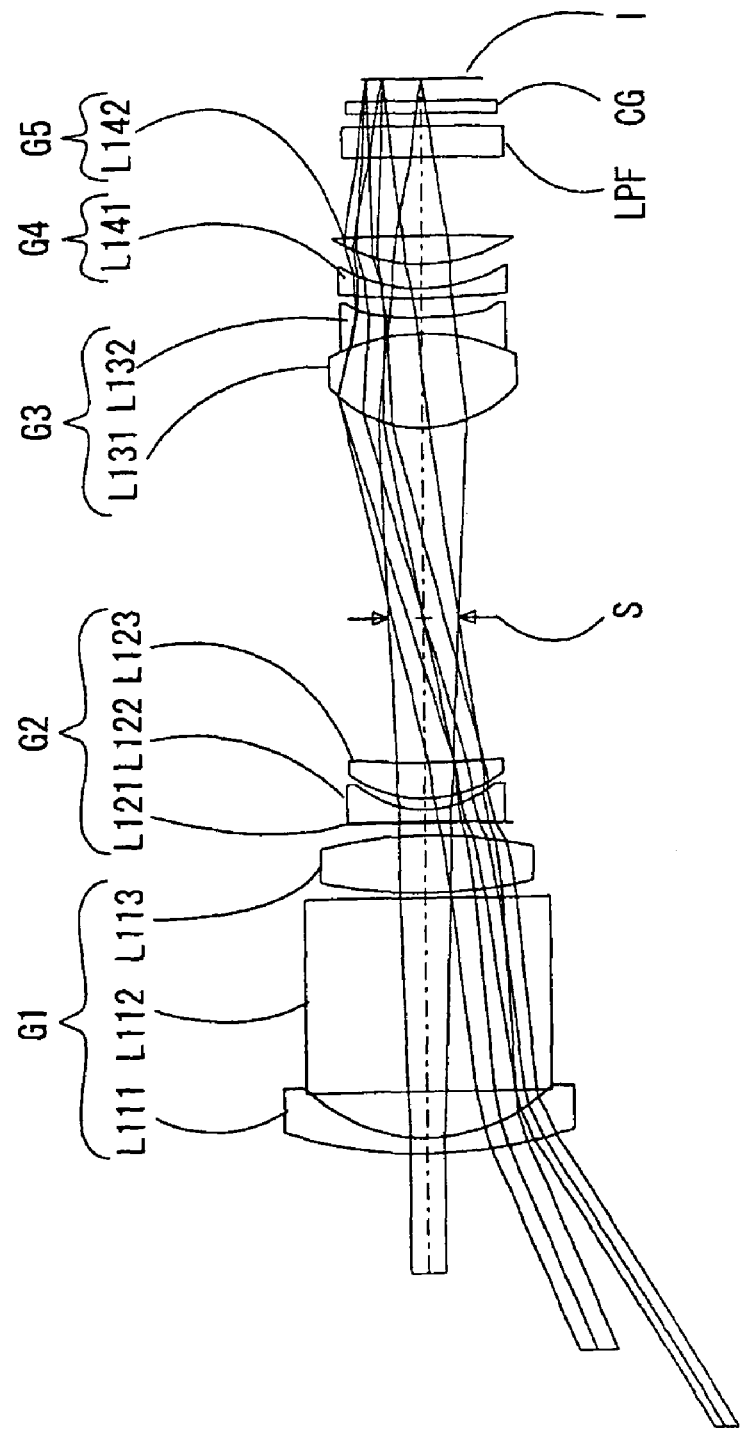
FIG. 7 is a cross-sectional view along the optical axis showing an optical arrangement at the time of the infinite object point focusing at the wide angle end of a zoom lens according to a fourth embodiment of the present invention.

FIG. 7 is a cross-sectional view along the optical axis showing an optical arrangement at the time of the infinite object point focusing at the wide angle end of a zoom lens according to a fourth embodiment of the present invention.

Figure 8A:
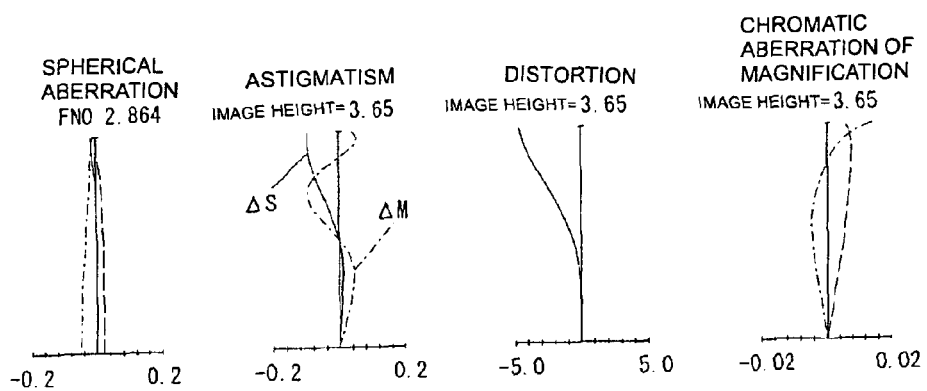
FIG. 8A, FIG. 8B, and FIG. 8C are diagrams showing the spherical aberration, the astigmatism, the distortion, and the chromatic aberration of magnification at the time of the infinite object point focusing of the zoom lens according to the fourth embodiment, where.
Figure 8B:
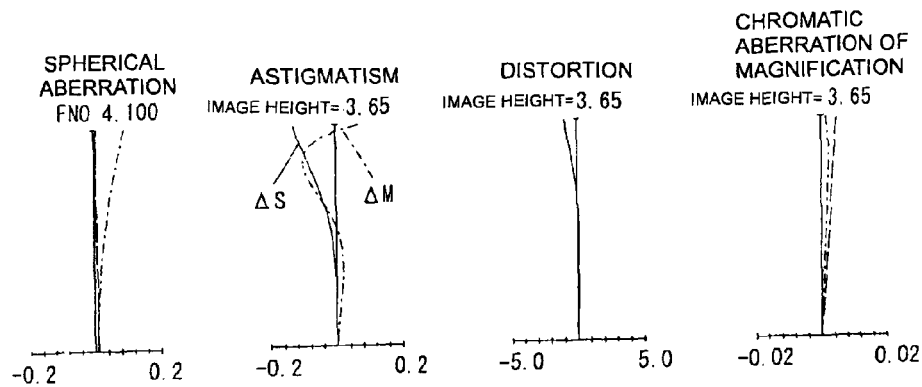
Figure 8C:
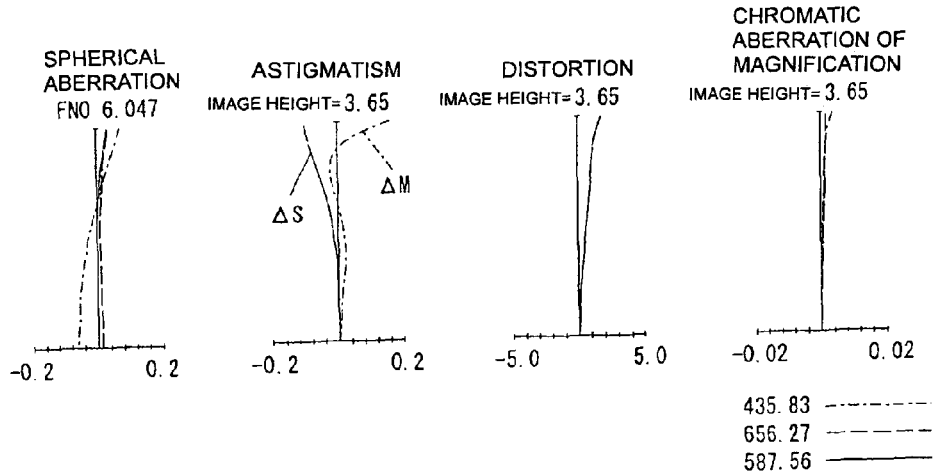

FIG. 8A, FIG. 8B, and FIG. 8C are diagrams showing the spherical aberration, the astigmatism, the distortion, and the chromatic aberration of magnification at the time of the infinite object point focusing of the zoom lens according to the fourth embodiment, where, FIG. 8A shows the state at the wide angle end, FIG. 8B shows the intermediate state, and FIG. 8C shows the state at the telephoto end.

The zoom lens of the fourth embodiment, as shown in FIG. 7, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a positive meniscus lens L121 having a convex surface directed toward an image side and a biconcave lens L122, and a positive meniscus lens L123 having a convex surface directed toward the object side, and has a negative refracting power as a whole. The positive meniscus lens L121 having the convex surface directed toward the object side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface toward the object side of the biconvex lens L113 in the first lens group G1, a surface on the object side of the positive meniscus lens L121 having the convex surface directed toward the image side and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the fourth embodiment will be enumerated.

Numerical data 4

| | | | |
|---|---|---|---|
| r1 = 26.322 | d1 = 1 | Nd1 = 1.8061 | vd1 = 40.92 |
| r2 = 10.013 | d2 = 2.9 | | |
| r3 = ∞ | d3 = 12 | Nd3 = 1.8061 | vd3 = 40.92 |
| r4 = ∞ | d4 = 0.3 | | |
| r5 = 29.452 | d5 = 3.54 | Nd5 = 1.741 | vd5 = 52.64 |
| (Aspheric surface) | | | |
| r6 = −27.694 | d6 = D6 | | |
| r7 = −531.522 | d7 = 0.1 | Nd7 = 1.54856 | vd7 = 7.04 |
| (Aspheric surface) | | | |
| r8 = −106.303 | d8 = 0.7 | Nd8 = 1.801 | vd8 = 34.97 |
| r9 = 5.870 | d9 = 0.7 | | |
| (Aspheric surface) | | | |
| r10 = 7.8 | d10 = 2.2 | Nd10 = 1.7552 | vd10 = 27.51 |
| r11 = 53.964 | d11 = D11 | | |
| r12 = Aperture stop | d12 = D12 | | |
| r13 = 7.924 | d13 = 5.76 | Nd13 = 1.6935 | vd13 = 53.21 |
| (Aspheric surface) | | | |
| r14 = −12.116 | d14 = 1 | Nd14 = 1.84666 | vd14 = 23.78 |
| r15 = 29.891 | d15 = D15 | | |
| (Aspheric surface) | | | |
| r16 = 39.978 | d16 = 0.6 | Nd16 = 1.48749 | vd16 = 70.23 |
| r17 = 9.323 | d17 = D17 | | |
| r18 = 9.450 | d18 = 1.8 | Nd18 = 1.7432 | vd18 = 49.34 |
| (Aspheric surface) | | | |
| r19 = −189.465 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 9.75478E−06
A6 = 1.51579E−07
A8 = 0
 7th surface k = 0
A4 = −1.95112E−04

-continued

Numerical data 4

A6 = 1.43936E−05
A8 = −2.98225E−07
 9th surface k = 0
A4 = −5.10533E−04
A6 = 1.21310E−05
A8 = −6.59060E−07
 13th surface k = 0
A4 = 1.12806E−04
A6 = 1.80736E−06
A8 = 4.78959E−08
 15th surface k = 0
A4 = 7.17631E−04
A6 = 7.87011E−06
A8 = 9.76118E−07
 18th surface k = 0
A4 = −9.54875E−05
A6 = 7.46371E−06
A8 = −2.00942E−07

Zoom data
When D0 (distance from object up to 1st surface) is ∞

| | wide-angle end | intermediate | telephoto end |
|---|---|---|---|
| Focal length | 5.995 | 13.694 | 17.985 |
| FNO. | 2.86 | 4.93 | 6.05 |
| D6 | 0.79 | 6.91 | 8.34 |
| D11 | 8.92 | 2.81 | 1.37 |
| D12 | 11.67 | 3.89 | 1.18 |
| D15 | 1.21 | 12.04 | 14.24 |
| D17 | 1.53 | 2.07 | 3.35 |
| D19 | 4.89 | 1.29 | 0.52 |
| D23 | 1.36 | 1.37 | 1.37 |

Fifth Embodiment

Figure 9:
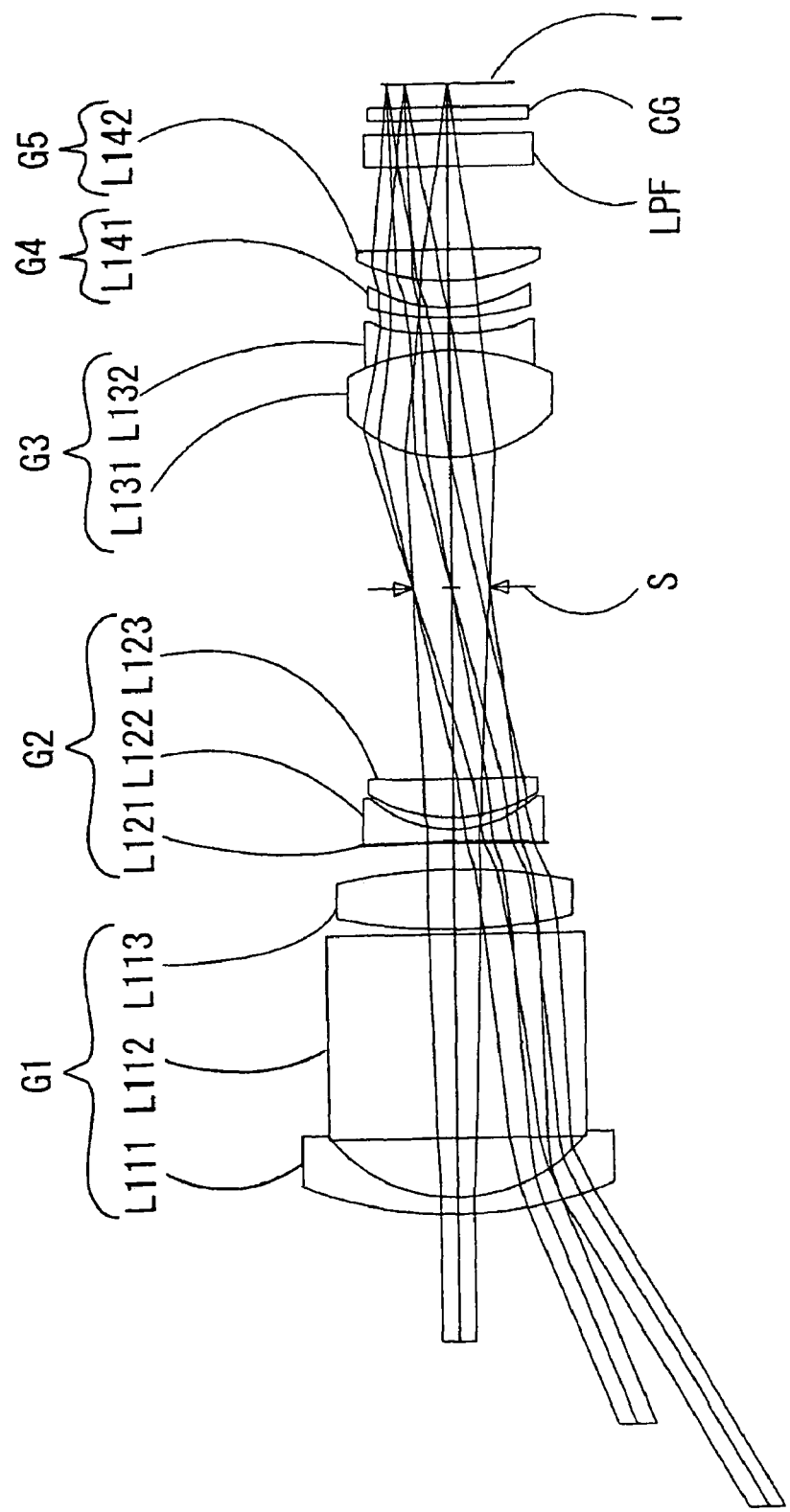
FIG. 9 is a cross-sectional view along the optical axis showing an optical arrangement at the time of the infinite object point focusing at the wide angle end of a zoom lens according to a fifth embodiment of the present invention.

FIG. 9 is a cross-sectional view along the optical axis showing an optical arrangement at the time of the infinite object point focusing at the wide angle end of a zoom lens according to a fifth embodiment of the present invention.

Figure 10A:
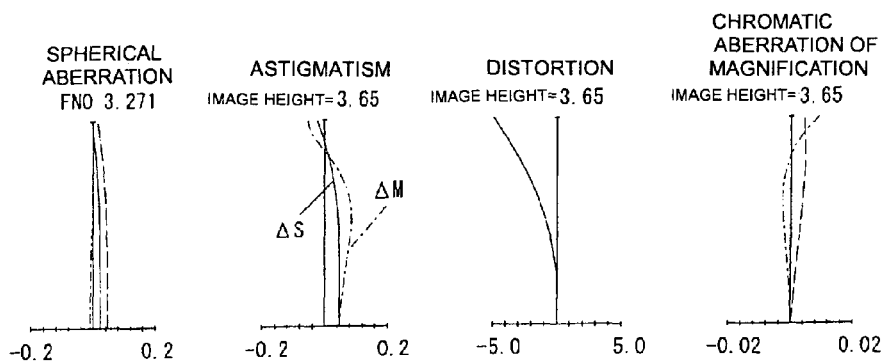
FIG. 10A, FIG. 10B, and FIG. 10C are diagrams showing the spherical aberration, the astigmatism, the distortion, and the chromatic aberration of magnification at the time of the infinite object point focusing of the zoom lens according to the fifth embodiment, where.
Figure 10B:
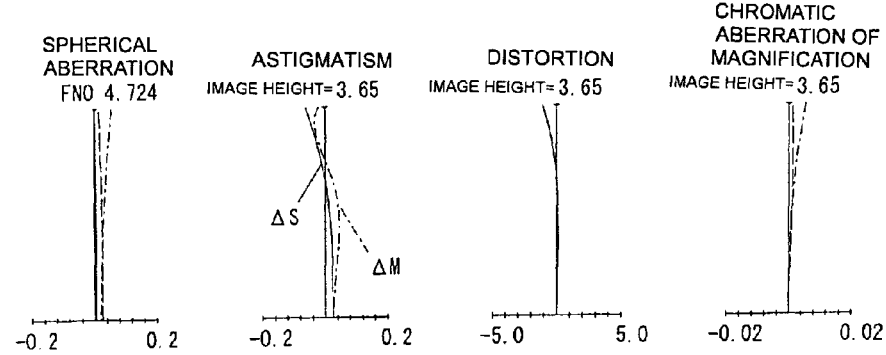
Figure 10C:
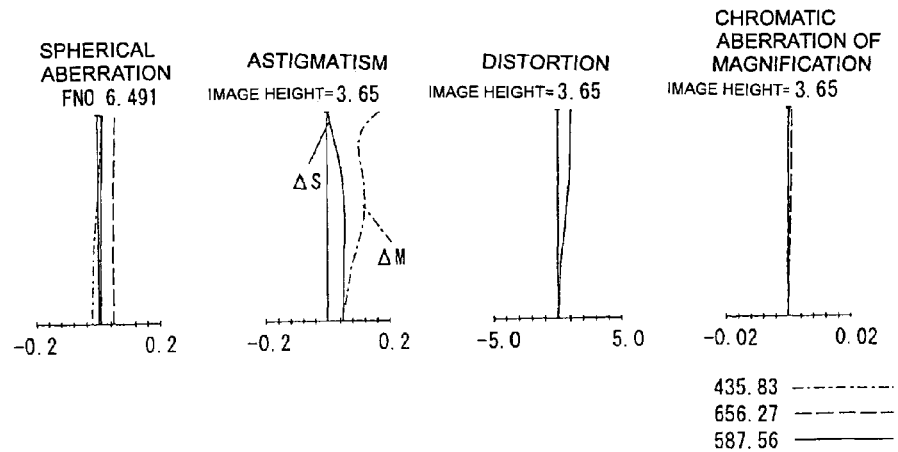

FIG. 10A, FIG. 10B, and FIG. 10C are diagrams showing the spherical aberration, the astigmatism, the distortion, and the chromatic aberration of magnification at the time of the infinite object point focusing of the zoom lens according to the fifth embodiment, where, FIG. 10A shows the state at the wide angle end, FIG. 10B shows the intermediate state, and FIG. 10C shows the state at the telephoto end.

The zoom lens of the fifth embodiment, as shown in FIG. 9, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a positive meniscus lens L121 having a convex surface directed toward an image side and a biconcave lens L122, and a positive meniscus lens L123 having a convex surface directed toward the object side, and has a negative refracting power as a whole. The positive meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface toward the object side of the biconvex lens L113 in the first lens group G1, a surface on the object side of the positive meniscus lens L121 having the convex surface directed toward the image side, and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the fifth embodiment will be enumerated.

Numerical data 5

| r1 = 22.06 | d1 = 1 | Nd1 = 1.8061 | vd1 = 40.92 |
|---|---|---|---|
| r2 = 8.728 | d2 = 3.48 | | |
| r3 = ∞ | d3 = 12 | Nd3 = 1.8061 | vd3 = 40.92 |
| r4 = ∞ | d4 = 0.3 | | |
| r5 = 30.986 (Aspheric surface) | d5 = 3.54 | Nd5 = 1.741 | vd5 = 52.64 |
| r6 = −27.99 | d6 = D6 | | |
| r7 = −115.268 (Aspheric surface) | d7 = 0.1 | Nd7 = 1.65228 | vd7 = 12.75 |
| r8 = −126.689 | d8 = 0.7 | Nd8 = 1.8044 | vd8 = 39.59 |
| r9 = 5.968 (Aspheric surface) | d9 = 0.7 | | |
| r10 = 8.311 | d10 = 2.2 | Nd10 = 1.7552 | vd10 = 27.51 |
| r11 = 176.709 | d11 = D11 | | |
| r12 = Aperture stop | d12 = D12 | | |
| r13 = 7.790 (Aspheric surface) | d13 = 6.26 | Nd13 = 1.6935 | vd13 = 53.21 |
| r14 = −11.462 | d14 = 1 | Nd14 = 1.84666 | vd14 = 23.78 |
| r15 = 28.003 (Aspheric surface) | d15 = D15 | | |
| r16 = 15.819 | d16 = 0.6 | Nd16 = 1.48749 | vd16 = 70.23 |
| r17 = 8.139 | d17 = D17 | | |
| r18 = 11.145 (Aspheric surface) | d18 = 1.8 | Nd18 = 1.7432 | vd18 = 49.34 |
| r19 = −741.85 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 2.56867E−05

Numerical data 5

A6 = 2.52676E−07
A8 = 0

7th surface k = 0
A4 = −1.22696E−04
A6 = 8.55567E−06
A8 = −7.67236E−08

9th surface k = 0
A4 = −5.12267E−04
A6 = 4.37980E−06
A8 = −3.04805E−07

13th surface k = 0
A4 = 6.62474E−05
A6 = 1.59411E−06
A8 = 2.28358E−08

15th surface k = 0
A4 = 6.81156E−04
A6 = 1.15567E−05
A8 = 8.59263E−07

18th surface k = 0
A4 = −5.99348E−05
A6 = 9.65602E−06
A8 = −1.88588E−07

Zoom data
When D0 (distance from object up to 1st surface) is ∞

| | wide-angle end | intermediate | telephoto end |
|---|---|---|---|
| Focal length | 6.1 | 13.42 | 17.995 |
| FNO. | 3.27 | 5.28 | 6.49 |
| D6 | 1.53 | 8.13 | 9.28 |
| D11 | 11.01 | 2.98 | 0.41 |
| D12 | 7.5 | 2.21 | 0.4 |
| D15 | 0.9 | 11.71 | 14.54 |
| D17 | 1.54 | 2.08 | 3.46 |
| D19 | 4.85 | 1.27 | 0.39 |
| D23 | 1.36 | 1.36 | 1.36 |

Sixth Embodiment

Figure 11:
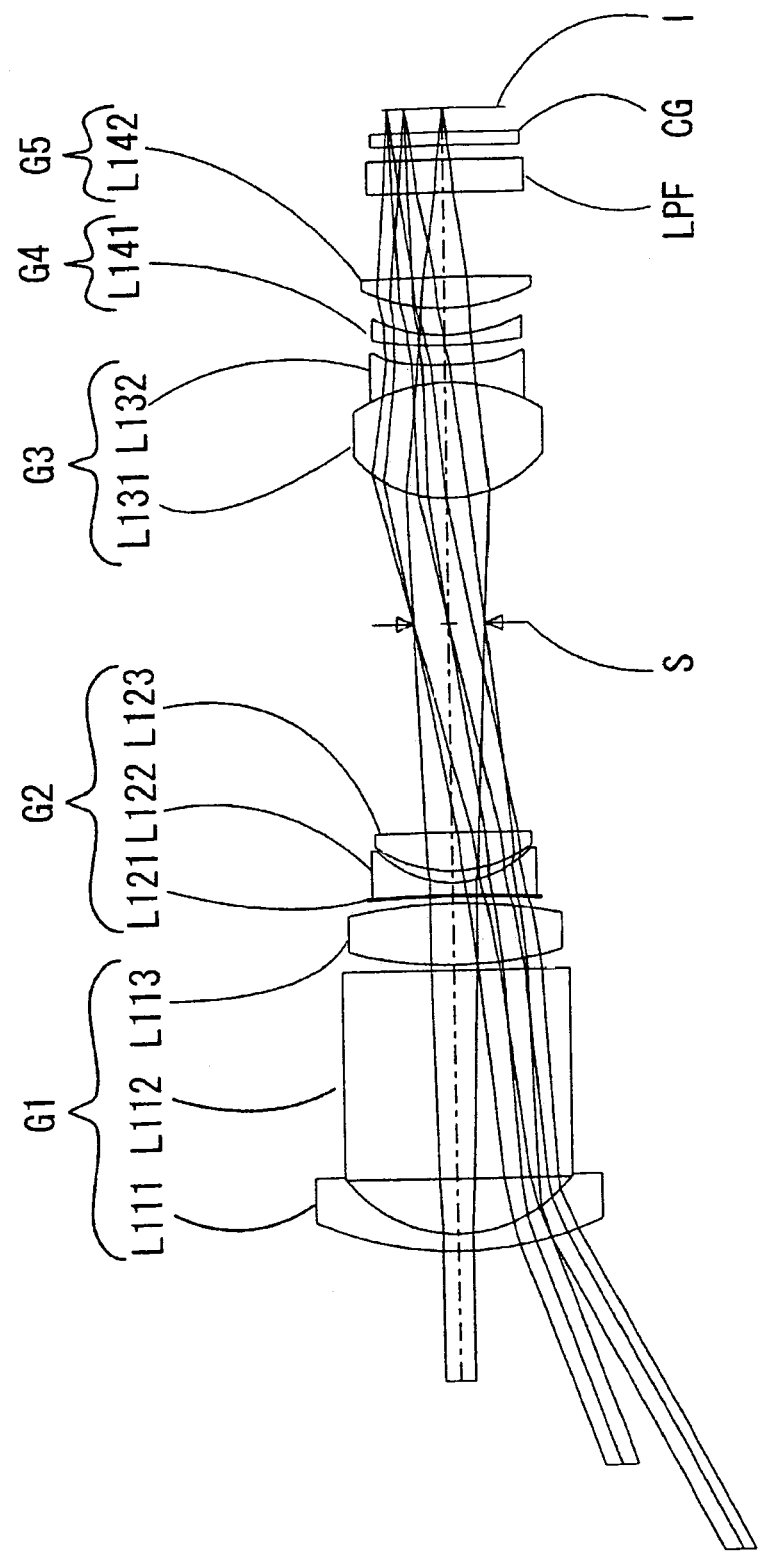
FIG. 11 is a cross-sectional view along the optical axis showing an optical arrangement at the time of the infinite object point focusing at the wide angle end of a zoom lens according to a sixth embodiment of the present invention.

FIG. 11 is a cross-sectional view along the optical axis showing an optical arrangement at the time of the infinite object point focusing at the wide angle end of a zoom lens according to a sixth embodiment of the present invention.

Figure 12A:
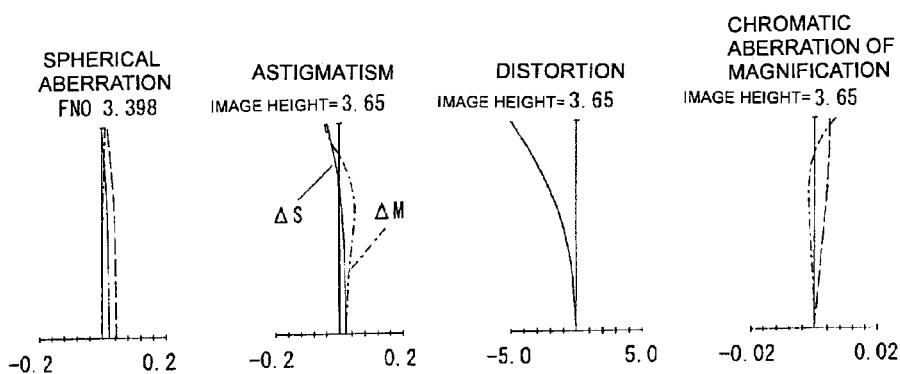
FIG. 12A, FIG. 12B, and FIG. 12C are diagrams showing the spherical aberration, the astigmatism, the distortion, and the chromatic aberration of magnification at the time of the infinite object point focusing of the zoom lens according to the sixth embodiment, where.
Figure 12B:
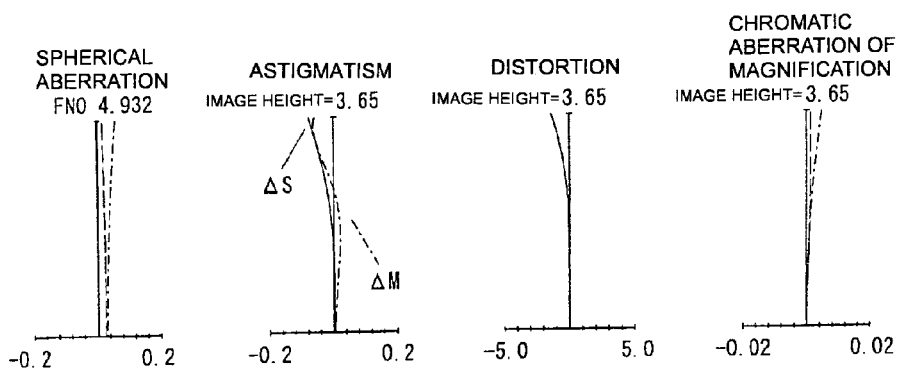
Figure 12C:
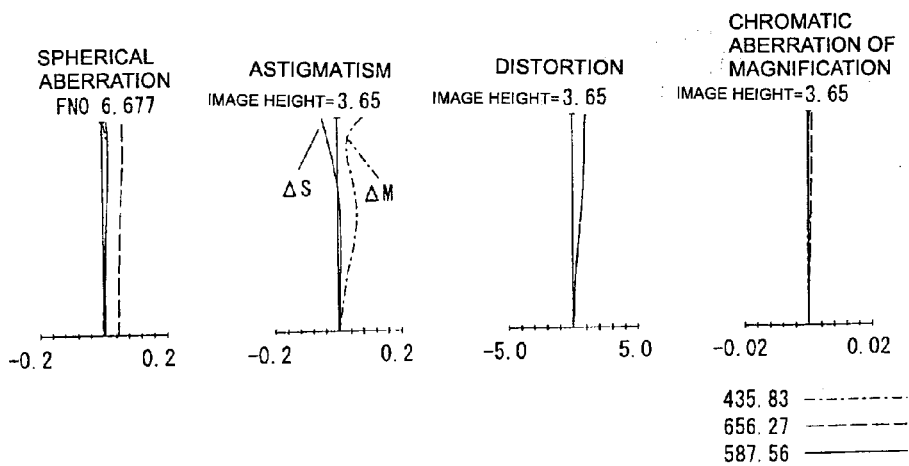

FIG. 12A, FIG. 12B, and FIG. 12C are diagrams showing the spherical aberration, the astigmatism, the distortion, and the chromatic aberration of magnification at the time of the infinite object point focusing of the zoom lens according to the sixth embodiment, where, FIG. 12A shows the state at the wide angle end, FIG. 12B shows the intermediate state, and FIG. 12C shows the state at the telephoto end.

The zoom lens of the sixth embodiment, as shown in FIG. 11, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a negative meniscus lens L121 having a convex surface directed toward an image side and a biconcave lens L122, and a biconvex lens L123, and has a negative refracting power as a whole. The negative meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142 and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the negative meniscus lens L121 having the convex surface directed toward the image side and a surface on the image side of the biconcave lens L122 in the second lens group G2, a surface on the object side of the biconvex lens L131 and a surface on the image side of the biconcave lens in the third lens group G3, and a surface on the object side of the biconvex lens L142 in the fifth lens group G5.

Next, numerical data of the sixth embodiment will be enumerated.

Numerical data 6

| | | | |
|---|---|---|---|
| r1 = 22.209 | d1 = 1 | Nd1 = 1.8061 | vd1 = 40.92 |
| r2 = 8.697 | d2 = 3.18 | | |
| r3 = ∞ | d3 = 12 | Nd3 = 1.8061 | vd3 = 40.92 |
| r4 = ∞ | d4 = 0.3 | | |
| r5 = 27.453 | d5 = 3.54 | Nd5 = 1.741 | vd5 = 52.64 |
| (Aspheric surface) | | | |
| r6 = −31.911 | d6 = D6 | | |
| r7 = −75.168 | d7 = 0.1 | Nd7 = 1.59885 | vd7 = 6.52 |
| (Aspheric surface) | | | |
| r8 = −83.815 | d8 = 0.7 | Nd8 = 1.8044 | vd8 = 39.59 |
| r9 = 5.799 | d9 = 0.7 | | |
| (Aspheric surface) | | | |
| r10 = 8.228 | d10 = 2.2 | Nd10 = 1.7552 | vd10 = 27.51 |
| r11 = −407.116 | d11 = D11 | | |
| r12 = Aperture stop | d12 = D12 | | |
| r13 = 7.739 | d13 = 6.54 | Nd13 = 1.6935 | vd13 = 53.21 |
| (Aspheric surface) | | | |
| r14 = −10.834 | d14 = 1 | Nd14 = 1.84666 | vd14 = 23.78 |
| r15 = 27.091 | d15 = D15 | | |
| (Aspheric surface) | | | |
| r16 = 25.56 | d16 = 0.6 | Nd16 = 1.48749 | vd16 = 70.23 |
| r17 = 9.672 | d17 = D17 | | |
| r18 = 11.326 | d18 = 1.8 | Nd18 = 1.7432 | vd18 = 49.34 |
| (Aspheric surface) | | | |
| r19 = −227.342 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Numerical data 6

Aspherical coefficients

5th surface k = 0
A4 = 2.88429E−05
A6 = 2.98793E−07
A8 = 0

7th surface k = 0
A4 = −2.83811E−05
A6 = 1.81353E−06
A8 = 1.62198E−08

9th surface k = 0
A4 = −4.89938E−04
A6 = −2.91999E−06
A8 = −3.73006E−07

13th surface k = 0
A4 = 5.58218E−05
A6 = 1.85250E−06
A8 = −3.45414E−09

15th surface k = 0
A4 = 6.90896E−04
A6 = 1.56789E−05
A8 = 7.47064E−07

18th surface k = 0
A4 = −8.76384E−05
A6 = 8.91453E−06
A8 = −1.89454E−07

Zoom data
When D0 (distance from object up to 1st surface) is ∞

| | wide-angle end | intermediate | telephoto end |
|---|---|---|---|
| Focal length | 6.1 | 13.42 | 17.995 |
| FNO. | 3.4 | 5.52 | 6.68 |
| D6 | 0.41 | 7.3 | 8.56 |
| D11 | 11.8 | 3.71 | 0.48 |
| D12 | 7.08 | 1.49 | 0.4 |
| D15 | 1.1 | 11.71 | 14.56 |
| D17 | 1.54 | 2.07 | 3.45 |
| D19 | 4.85 | 1.28 | 0.4 |
| D23 | 1.36 | 1.36 | 1.36 |

Seventh Embodiment

Figure 13:
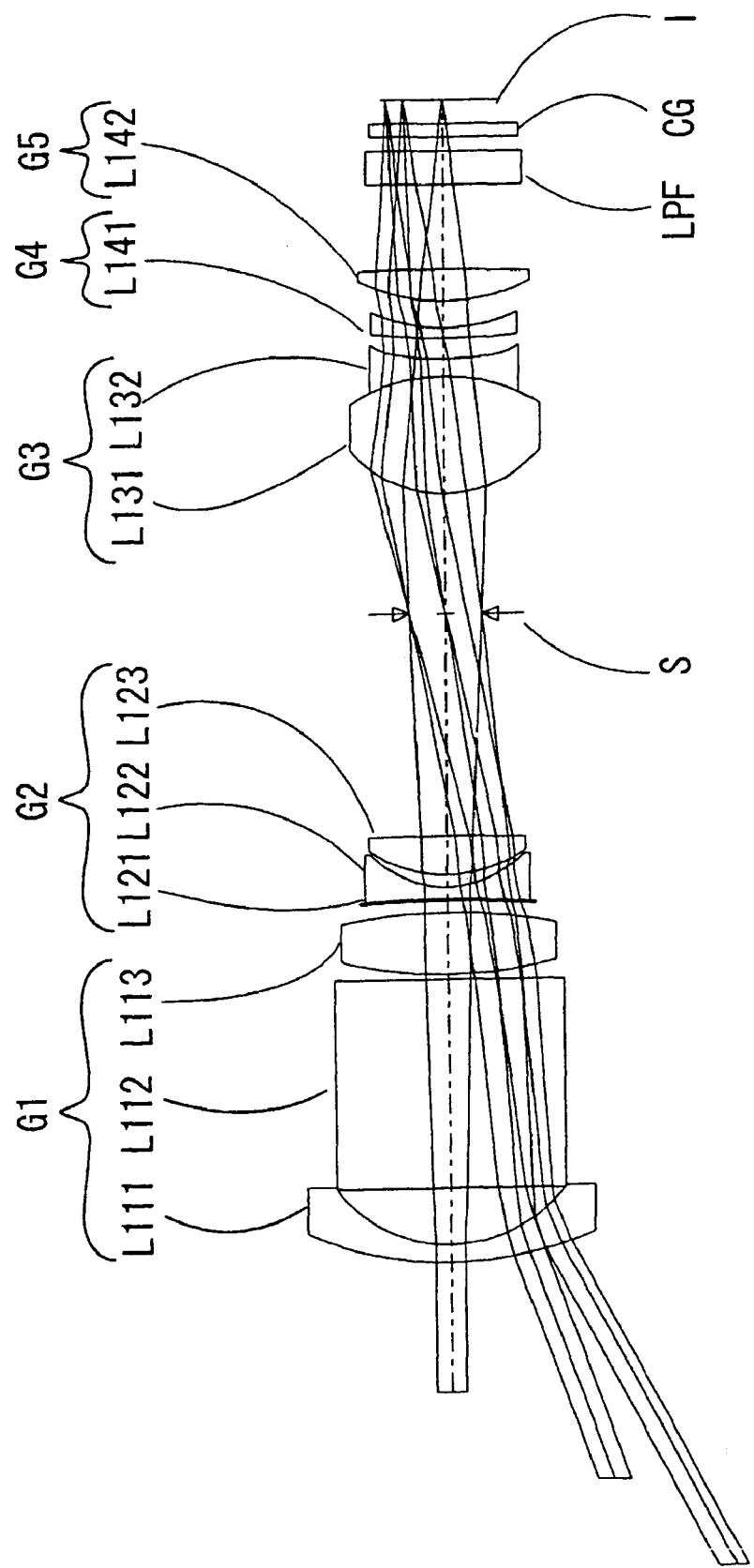
FIG. 13 is a cross-sectional view along the optical axis showing an optical arrangement at the time of the infinite object point focusing at the wide angle end of a zoom lens according to a seventh embodiment of the present invention.

FIG. 13 is a cross-sectional view along the optical axis showing an optical arrangement at the time of the infinite object point focusing at the wide angle end of a zoom lens according to a seventh embodiment of the present invention.

Figure 14A:
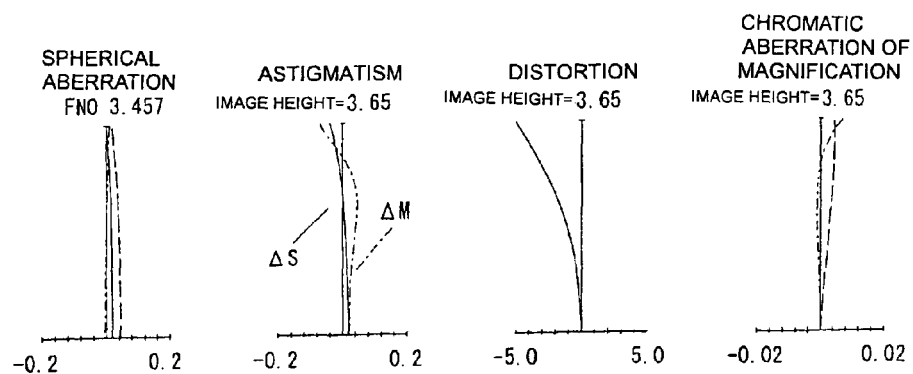
FIG. 14A, FIG. 14B, and FIG. 14C are diagrams showing the spherical aberration, the astigmatism, the distortion, and the chromatic aberration of magnification at the time of the infinite object point focusing of the zoom lens according to the seventh embodiment, where.
Figure 14B:
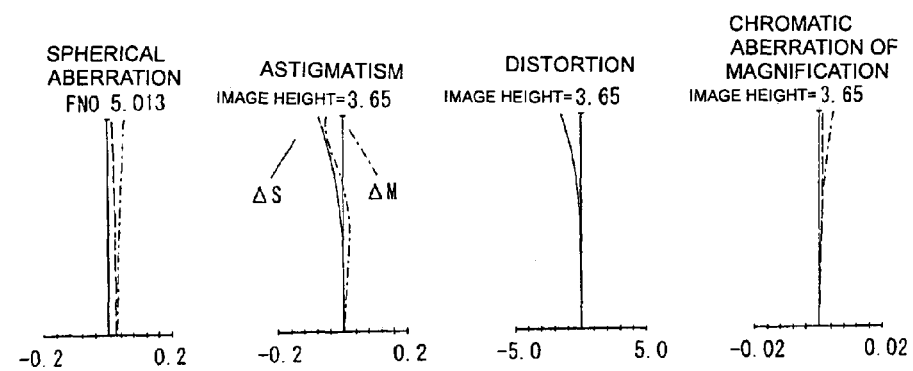
Figure 14C:
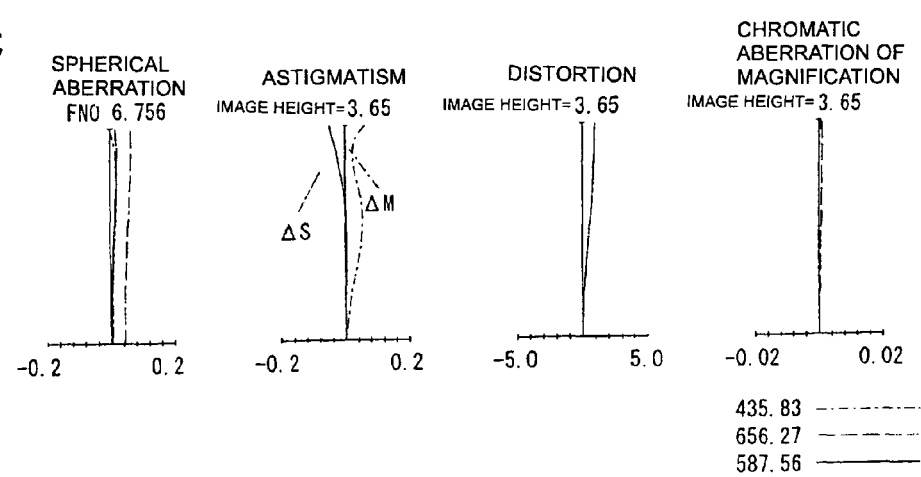

FIG. 14A, FIG. 14B, and FIG. 14C are diagrams showing the spherical aberration, the astigmatism, the distortion, and the chromatic aberration of magnification at the time of the infinite object point focusing of the zoom lens according to the seventh embodiment, where, FIG. 14A shows the state at the wide angle end, FIG. 14B shows the intermediate state, and FIG. 14C shows the state at the telephoto end.

The zoom lens of the seventh embodiment, as shown in FIG. 13, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a negative meniscus lens L121 having a convex surface directed toward an image side and a biconcave lens L122, and a biconvex lens L123, and has a negative refracting power as a whole. The negative meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the negative meniscus lens L121 having the convex surface directed toward the image side, and a surface on the image side of the biconcave lens L122 in the second lens group G2, a surface on the object side of the biconvex lens L131 and a surface on the image side of the biconcave lens in the third lens group G3, and a surface on the object side of the biconvex lens L142 in the fifth lens group G5.

Next, numerical data of the seventh embodiment will be enumerated.

Numerical data 7

| | | | |
|---|---|---|---|
| r1 = 22.655 | d1 = 1 | Nd1 = 1.8061 | vd1 = 40.92 |
| r2 = 8.785 | d2 = 3.24 | | |
| r3 = ∞ | d3 = 12 | Nd3 = 1.8061 | vd3 = 40.92 |
| r4 = ∞ | d4 = 0.3 | | |
| r5 = 28.098 | d5 = 3.54 | Nd5 = 1.741 | vd5 = 52.64 |
| (Aspheric surface) | | | |
| r6 = −33.03 | d6 = D6 | | |
| r7 = −73.397 | d7 = 0.1 | Nd7 = 1.79525 | vd7 = 9.95 |
| (Aspheric surface) | | | |
| r8 = −88.456 | d8 = 0.7 | Nd8 = 1.8044 | vd8 = 39.59 |
| r9 = 5.854 | d9 = 0.7 | | |
| (Aspheric surface) | | | |
| r10 = 8.306 | d10 = 2.2 | Nd10 = 1.7552 | vd10 = 27.51 |
| r11 = −244.362 | d11 = D11 | | |
| r12 = Aperture stop | d12 = D12 | | |
| r13 = 7.717 | d13 = 6.62 | Nd13 = 1.6935 | vd13 = 53.21 |
| (Aspheric surface) | | | |
| r14 = −10.82 | d14 = 1 | Nd14 = 1.84666 | vd14 = 23.78 |
| r15 = 26.804 | d15 = D15 | | |
| (Aspheric surface) | | | |
| r16 = 38.158 | d16 = 0.6 | Nd16 = 1.48749 | vd16 = 70.23 |
| r17 = 10.759 | d17 = D17 | | |
| r18 = 11.628 | d18 = 1.8 | Nd18 = 1.7432 | vd18 = 49.34 |

-continued

Numerical data 7

| | | | |
|---|---|---|---|
| (Aspheric surface) | | | |
| r19 = −136.914 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 2.99107E−05
A6 = 2.84593E−07
A8 = 0

7th surface k = 0
A4 = −1.93689E−05
A6 = 1.33119E−06
A8 = 2.74251E−08

9th surface k = 0
A4 = −4.76470E−04
A6 = −3.16782E−06
A8 = −3.04345E−07

13th surface k = 0
A4 = 5.07612E−05
A6 = 1.80052E−06
A8 = −5.82045E−09

15th surface k = 0
A4 = 6.95232E−04
A6 = 1.61806E−05
A8 = 7.52248E−07

18th surface k = 0
A4 = −9.66932E−05
A6 = 8.24751E−06
A8 = −1.78280E−07

Zoom data
When D0 (distance from object up to 1st surface) is ∞

| | wide-angle end | intermediate | telephoto end |
|---|---|---|---|
| Focal length | 6.1 | 13.414 | 17.987 |
| FNO. | 3.46 | 5.61 | 6.76 |
| D6 | 0.64 | 7.62 | 8.96 |
| D11 | 12.56 | 3.88 | 0.5 |
| D12 | 6.75 | 1.31 | 0.4 |
| D15 | 1.16 | 11.69 | 14.54 |
| D17 | 1.54 | 2.07 | 3.45 |
| D19 | 4.85 | 1.28 | 0.4 |
| D23 | 1.36 | 1.36 | 1.36 |

Eighth Embodiment

Figure 15:
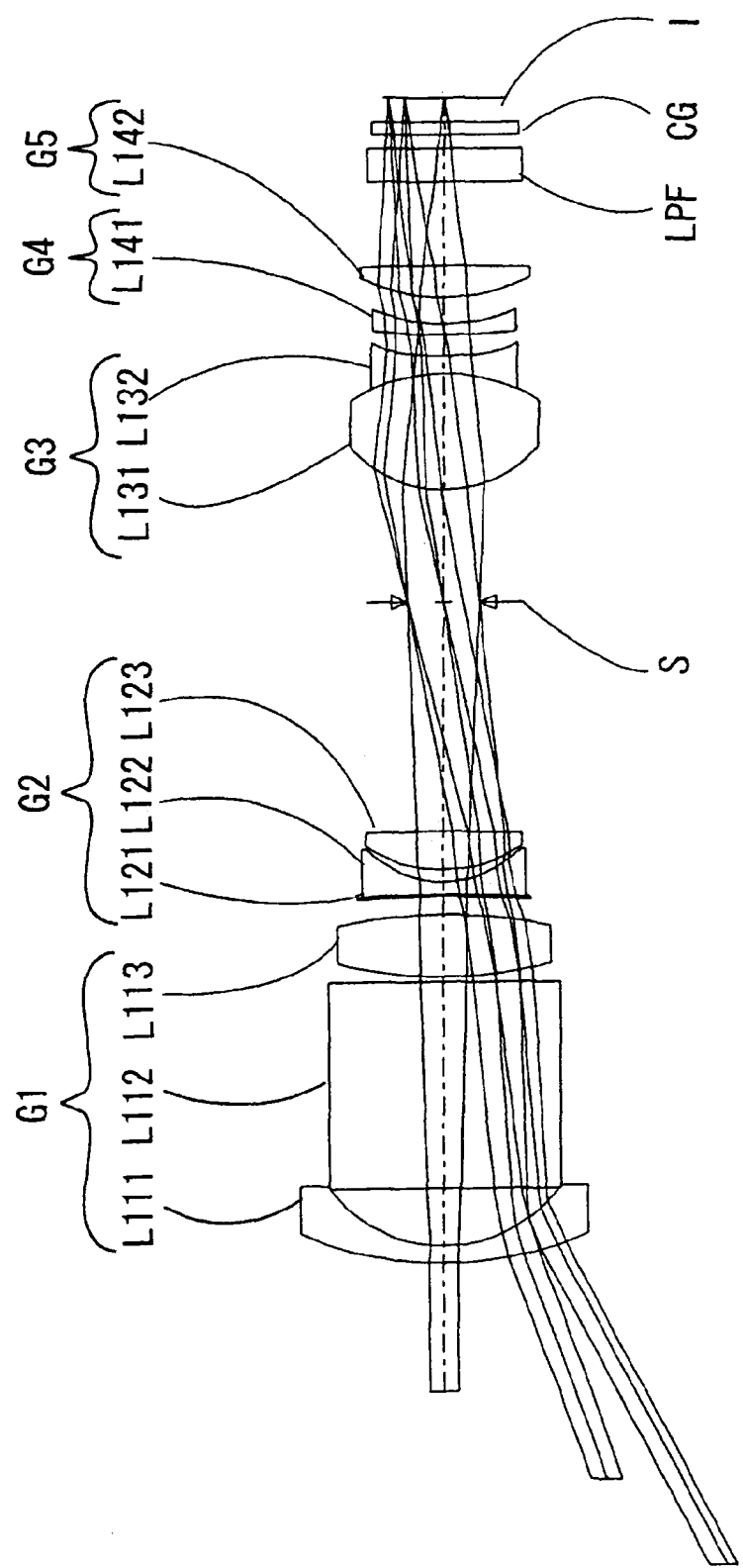
FIG. 15 is a cross-sectional view along the optical axis showing an optical arrangement at the time of the infinite object point focusing at the wide angle end of a zoom lens according to an eighth embodiment of the present invention.

FIG. 15 is a cross-sectional view along the optical axis showing an optical arrangement at the time of the infinite object point focusing at the wide angle end of a zoom lens according to an eighth embodiment of the present invention.

FIG. 16A, FIG. 16B, and FIG. 16C are diagrams showing the spherical aberration, the astigmatism, the distortion, and the chromatic aberration of magnification at the time of the infinite object point focusing of the zoom lens according to the eighth embodiment, where, FIG. 16A shows the state at the wide angle end, FIG. 16B shows the intermediate state, and FIG. 16C shows the state at the telephoto end.

The zoom lens of the eighth embodiment, as shown in FIG. 15, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a negative meniscus lens L121 having a convex surface directed toward an image side and a biconcave lens L122, and a biconvex lens L123, and has a negative refracting power as a whole. The negative meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface toward the object side of the biconvex lens L113 in the first lens group G1, a surface on the object side of the negative meniscus lens L121 having the convex surface directed toward the object side, and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the eighth embodiment will be enumerated.

| Numerical data 8 | | | | |
|---|---|---|---|---|
| r1 = 22.918 | d1 = 1 | Nd1 = 1.8061 | vd1 = 40.92 |
| r2 = 8.816 | d2 = 3.29 | | |
| r3 = ∞ | d3 = 12 | Nd3 = 1.8061 | vd3 = 40.92 |
| r4 = ∞ | d4 = 0.3 | | |
| r5 = 28.613 | d5 = 3.54 | Nd5 = 1.741 | vd5 = 52.64 |
| (Aspheric surface) | | | |
| r6 = −32.117 | d6 = D6 | | |
| r7 = −65.160 | d7 = 0.1 | Nd7 = 1.9712 | vd7 = 12.88 |
| (Aspheric surface) | | | |
| r8 = −81.741 | d8 = 0.7 | Nd8 = 1.8044 | vd8 = 39.59 |
| r9 = 5.883 | d9 = 0.7 | | |
| (Aspheric surface) | | | |
| r10 = 8.372 | d10 = 2.2 | Nd10 = 1.7552 | vd10 = 27.51 |
| r11 = −174.482 | d11 = D11 | | |
| r12 = Aperture stop | d12 = D12 | | |
| r13 = 7.706 | d13 = 6.66 | Nd13 = 1.6935 | vd13 = 53.21 |

| -continued | | | | |
|---|---|---|---|---|
| Numerical data 8 | | | | |
| (Aspheric surface) | | | | |
| r14 = −10.835 | d14 = 1 | Nd14 = 1.84666 | vd14 = 23.78 |
| r15 = 26.735 | d15 = D15 | | |
| (Aspheric surface) | | | | |
| r16 = 45.204 | d16 = 0.6 | Nd16 = 1.48749 | vd16 = 70.23 |
| r17 = 11.103 | d17 = D17 | | |
| r18 = 11.758 | d18 = 1.8 | Nd18 = 1.7432 | vd18 = 49.34 |
| (Aspheric surface) | | | | |
| r19 = −117.417 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

| Aspherical coefficients |
|---|
| 5th surface |
| k = 0 |
| A4 = 2.87784E−05 |
| A6 = 2.66348E−07 |
| A8 = 0 |
| 7th surface |
| k = 0 |
| A4 = −1.38102E−05 |
| A6 = 1.38465E−06 |
| A8 = 2.55312E−08 |
| 9th surface |
| k = 0 |
| A4 = −4.75969E−04 |
| A6 = −3.07587E−06 |
| A8 = −2.61770E−07 |
| 13th surface |
| k = 0 |
| A4 = 4.93597E−05 |
| A6 = 1.70693E−06 |
| A8 = −4.25329E−09 |
| 15th surface |
| k = 0 |
| A4 = 7.00683E−04 |
| A6 = 1.60807E−05 |
| A8 = 7.69068E−07 |
| 18th surface |
| k = 0 |
| A4 = −9.75190E−05 |
| A6 = 7.97130E−06 |
| A8 = −1.72283E−07 |

| Zoom data When D0 (distance from object up to 1st surface) is ∞ | | | |
|---|---|---|---|
| | wide-angle end | intermediate | telephoto end |
| Focal length | 6.1 | 13.42 | 17.995 |
| FNO. | 3.5 | 5.64 | 6.81 |
| D6 | 1.05 | 7.71 | 9.02 |
| D11 | 13.1 | 3.96 | 0.63 |
| D12 | 6.34 | 1.25 | 0.33 |
| D15 | 1.21 | 11.71 | 14.56 |
| D17 | 1.54 | 2.07 | 3.45 |
| D19 | 4.85 | 1.28 | 0.4 |
| D23 | 1.36 | 1.36 | 1.36 |

Ninth Embodiment

Figure 17:
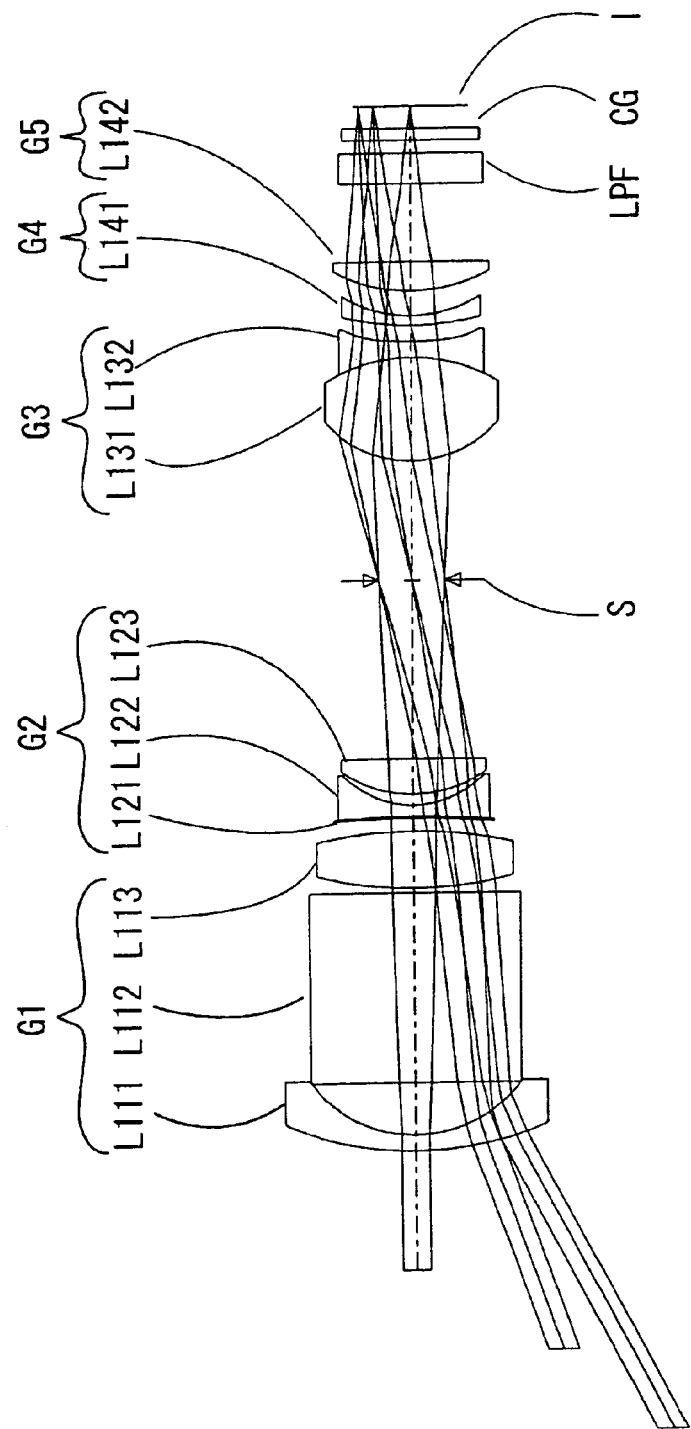
FIG. 17 is a cross-sectional view along the optical axis showing an optical arrangement at the time of the infinite object point focusing at the wide angle end of a zoom lens according to a ninth embodiment of the present invention.

FIG. 17 is a cross-sectional view along the optical axis showing an optical arrangement at the time of the infinite object point focusing at the wide angle end of a zoom lens according to a ninth embodiment of the present invention.

Figure 18A:
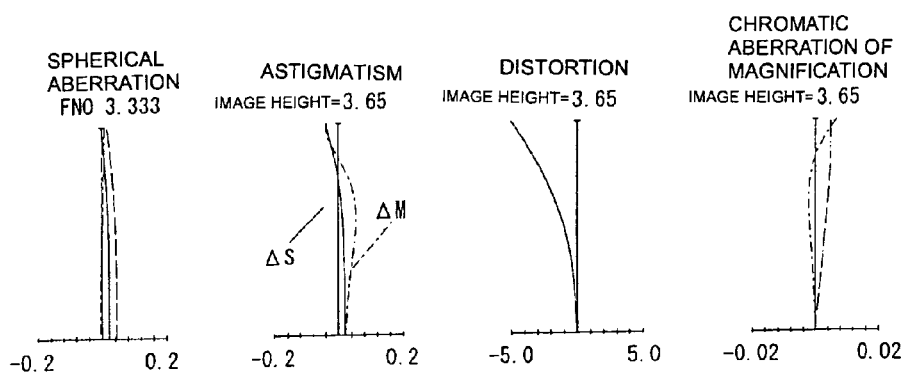
FIG. 18A, FIG. 18B, and FIG. 18C are diagrams showing the spherical aberration, the astigmatism, the distortion, and the chromatic aberration of magnification at the time of the infinite object point focusing of the zoom lens according to the ninth embodiment, where.
Figure 18B:
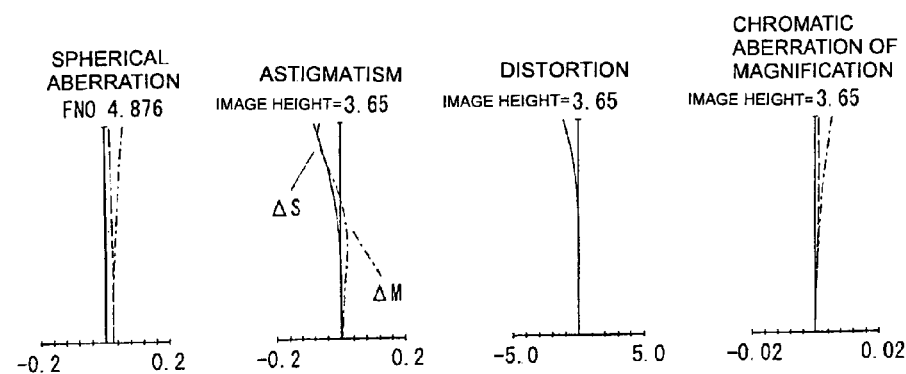
Figure 18C:
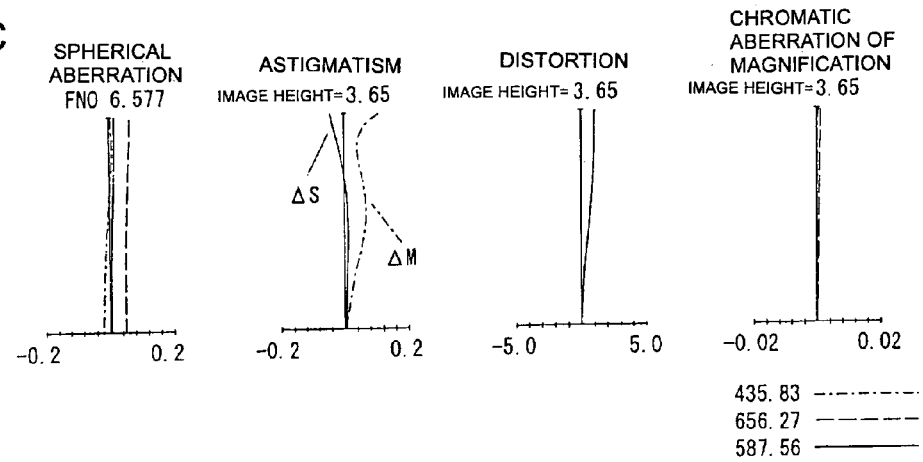

FIG. 18A, FIG. 18B, and FIG. 18C are diagrams showing the spherical aberration, the astigmatism, the distortion, and the chromatic aberration of magnification at the time of the infinite object point focusing of the zoom lens according to the ninth embodiment, where, FIG. 18A shows the state at the wide angle end, FIG. 18B shows the intermediate state, and FIG. 18C shows the state at the telephoto end.

The zoom lens of the ninth embodiment, as shown in FIG. 17, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a negative meniscus lens L121 having a convex surface directed toward an image side and a biconcave lens L122, and a biconvex lens L123, and has a negative refracting power as a whole.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the negative meniscus lens L121 having the convex surface directed toward the image side and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the ninth embodiment will be enumerated.

Numerical data 9

| | | | |
|---|---|---|---|
| r1 = 22.569 | d1 = 1 | Nd1 = 1.8061 | vd1 = 40.92 |
| r2 = 8.775 | d2 = 3.24 | | |
| r3 = ∞ | d3 = 12 | Nd3 = 1.8061 | vd3 = 40.92 |
| r4 = ∞ | d4 = 0.3 | | |
| r5 = 28.397 | d5 = 3.54 | Nd5 = 1.741 | vd5 = 52.64 |
| (Aspheric surface) | | | |
| r6 = −30.066 | d6 = D6 | | |
| r7 = −68.946 | d7 = 0.1 | Nd7 = 2.0512 | vd7 = 6.28 |
| (Aspheric surface) | | | |
| r8 = −72.063 | d8 = 0.7 | Nd8 = 1.8044 | vd8 = 39.59 |
| r9 = 5.835 | d9 = 0.7 | | |

-continued

Numerical data 9

| | | | |
|---|---|---|---|
| (Aspheric surface) | | | |
| r10 = 8.288 | d10 = 2.2 | Nd10 = 1.7552 | vd10 = 27.51 |
| r11 = −350.22 | d11 = D11 | | |
| r12 = Aperture stop | d12 = D12 | | |
| r13 = 7.762 | d13 = 6.44 | Nd13 = 1.6935 | vd13 = 53.21 |
| (Aspheric surface) | | | |
| r14 = −10.924 | d14 = 1 | Nd14 = 1.84666 | vd14 = 23.78 |
| r15 = 27.463 | d15 = D15 | | |
| (Aspheric surface) | | | |
| r16 = 18.162 | d16 = 0.6 | Nd16 = 1.48749 | vd16 = 70.23 |
| r17 = 8.571 | d17 = D17 | | |
| r18 = 11.048 | d18 = 1.8 | Nd18 = 1.7432 | vd18 = 49.34 |
| (Aspheric surface) | | | |
| r19 = −683.995 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface $k = 0$
$A4 = 2.65390E−05$
$A6 = 2.74957E−07$
$A8 = 0$

7th surface $k = 0$
$A4 = −3.03094E−05$
$A6 = 2.50533E−06$
$A8 = −2.39841E−08$

9th surface $k = 0$
$A4 = −5.10845E−04$
$A6 = 1.79630E−07$
$A8 = −4.24947E−07$

13th surface $k = 0$
$A4 = 6.06181E−05$
$A6 = 1.82150E−06$
$A8 = 5.55091E−09$

15th surface $k = 0$
$A4 = 6.87453E−04$
$A6 = 1.41002E−05$
$A8 = 7.95382E−07$

18th surface $k = 0$
$A4 = −7.29457E−05$
$A6 = 9.71422E−06$
$A8 = −2.00168E−07$

Zoom data
When D0 (distance from object up to 1st surface) is ∞

| | wide-angle end | intermediate | telephoto end |
|---|---|---|---|
| Focal length | 6.1 | 13.42 | 17.997 |
| FNO. | 3.33 | 5.43 | 6.58 |
| D6 | 0.81 | 7.75 | 9.07 |
| D11 | 10.99 | 3.5 | 0.4 |
| D12 | 7.32 | 1.62 | 0.4 |
| D15 | 0.99 | 11.73 | 14.54 |
| D17 | 1.54 | 2.07 | 3.45 |
| D19 | 4.85 | 1.28 | 0.4 |
| D23 | 1.36 | 1.36 | 1.36 |

Tenth Embodiment

Figure 19:
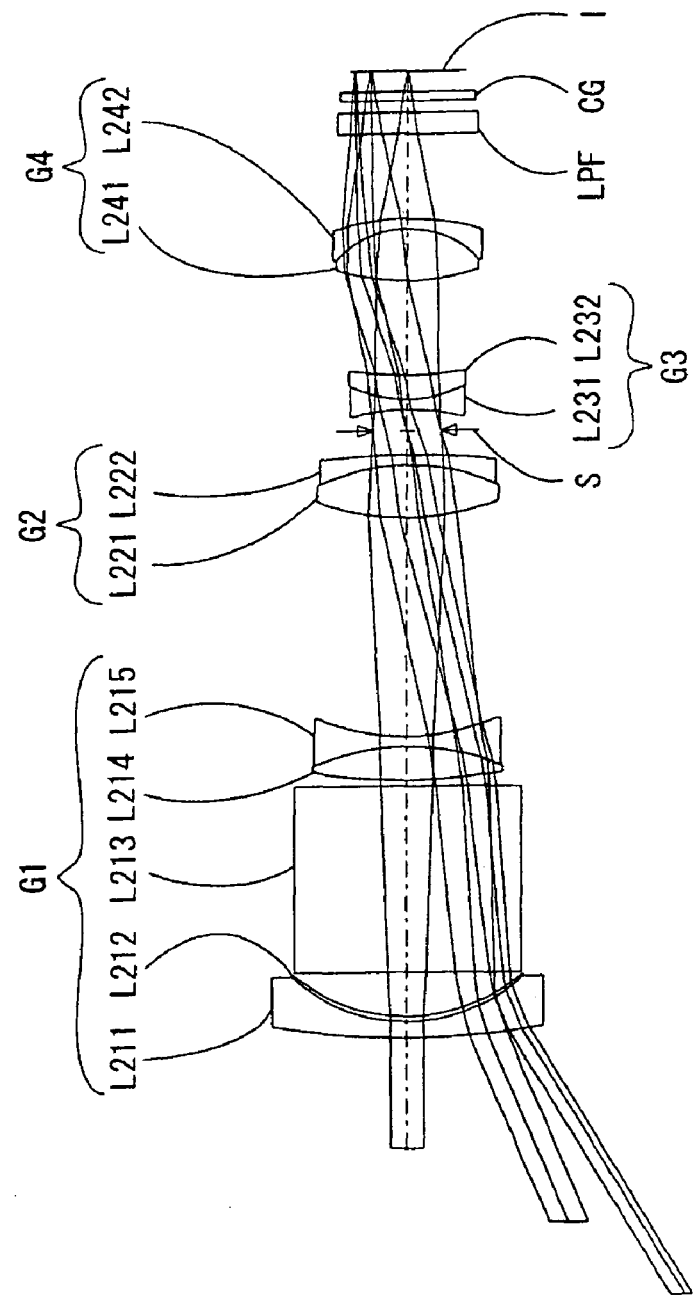
FIG. 19 is a cross-sectional view along the optical axis showing an optical arrangement at the time of the infinite object point focusing at the wide angle end of a zoom lens according to a tenth embodiment of the present invention.

FIG. 19 is a cross-sectional view along the optical axis showing an optical arrangement at the time of the infinite object point focusing at the wide angle end of a zoom lens according to a tenth embodiment of the present invention.

Figure 20A:
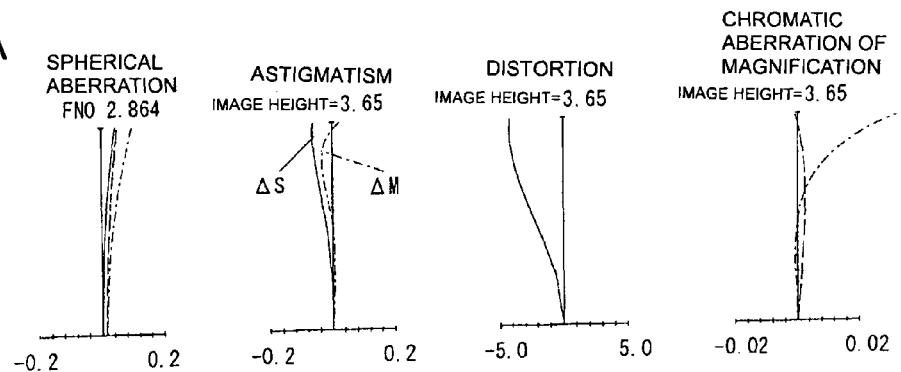
FIG. 20A, FIG. 20B, and FIG. 20C are diagrams showing the spherical aberration, the astigmatism, the distortion, and the chromatic aberration of magnification at the time of the infinite object point focusing of the zoom lens according to the tenth embodiment, where.
Figure 20B:
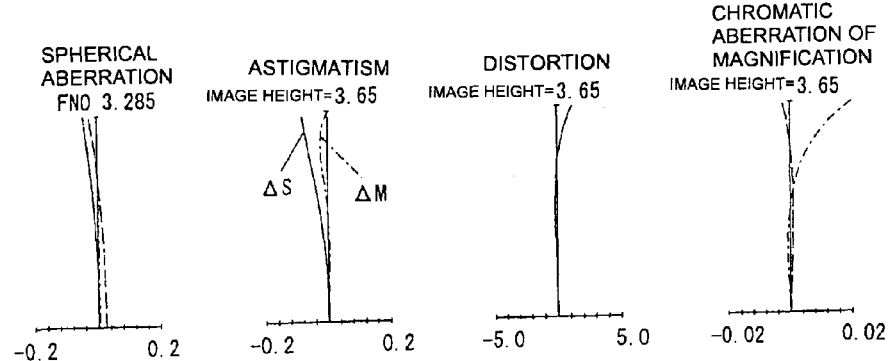
Figure 20C:
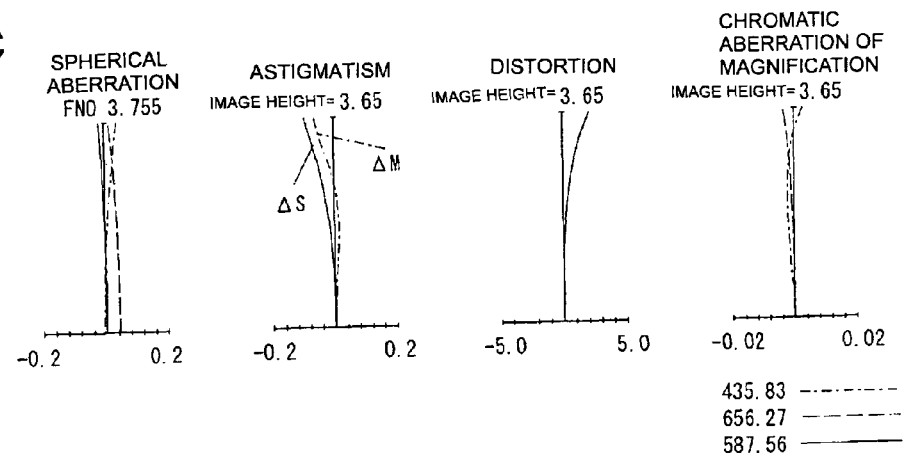

FIG. 20A, FIG. 20B, and FIG. 20C are diagrams showing the spherical aberration, the astigmatism, the distortion, and the chromatic aberration of magnification at the time of the infinite object point focusing of the zoom lens according to the tenth embodiment, where, FIG. 20A shows the state at the wide angle end, FIG. 20B shows the intermediate state, and FIG. 20C shows the state at the telephoto end.

The zoom lens of the tenth embodiment, as shown in FIG. 19, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side, and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the tenth embodiment will be enumerated.

Numerical data 10

| | | | |
|---|---|---|---|
| r1 = 47.465 | d1 = 1.1 | Nd1 = 1.7432 | vd1 = 49.34 |
| r2 = 10.5 | d2 = 0.35 | Nd2 = 1.41244 | vd2 = 12.42 |
| r3 = 10.870 (Aspheric surface) | d3 = 3 | | |
| r4 = ∞ | d4 = 12.5 | Nd4 = 1.8061 | vd4 = 40.92 |
| r5 = ∞ | d5 = 0.4 | | |
| r6 = 37.541 (Aspheric surface) | d6 = 2.2 | Nd6 = 1.8061 | vd6 = 40.92 |
| r7 = −15.157 | d7 = 0.7 | Nd7 = 1.51742 | vd7 = 52.43 |
| r8 = 14.284 | d8 = D8 | | |
| r9 = 15.765 | d9 = 3.5 | Nd9 = 1.7432 | vd9 = 49.34 |
| (Aspheric surface) | | | |
| r10 = −13 | d10 = 0.7 | Nd10 = 1.84666 | vd10 = 23.78 |
| r11 = −49.098 | d11 = D11 | | |
| r12 = Aperture stop | d12 = D12 | | |
| r13 = −12.613 | d13 = 0.7 | Nd13 = 1.51823 | vd13 = 58.9 |
| r14 = 8.154 | d14 = 1.6 | Nd14 = 1.8061 | vd14 = 40.92 |
| r15 = 23.649 | d15 = D15 | | |
| r16 = 12.829 (Aspheric surface) | d16 = 3.5 | Nd16 = 1.7432 | vd16 = 49.34 |
| r17 = −6 | d17 = 0.7 | Nd17 = 1.84666 | vd17 = 23.78 |
| r18 = −15.292 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 3.50409E−05
A6 = −6.55294E−07
A8 = 0

6th surface k = 0
A4 = 2.65545E−05
A6 = −4.67758E−08
A8 = 0.00000E+00

9th surface k = 0
A4 = −1.42649E−05
A6 = 8.45141E−10
A8 = 0.00000E+00

16th surface k = 0
A4 = −1.91950E−04
A6 = 6.33278E−09
A8 = 0.00000E+00

Zoom data
When D0 (distance from object up to 1st surface) is ∞

| | wide-angle end | intermediate | telephoto end |
|---|---|---|---|
| Focal length | 6.003 | 13.7 | 17.998 |
| FNO. | 2.86 | 3.43 | 3.76 |
| D8 | 14.55 | 4.16 | 0.8 |
| D11 | 1.6 | 11.99 | 15.35 |
| D12 | 1.4 | 6.55 | 9.17 |
| D15 | 6.27 | 4.39 | 3 |
| D18 | 5.7 | 2.43 | 1.2 |
| D22 | 1.36 | 1.36 | 1.36 |

Eleventh Embodiment

Figure 21:
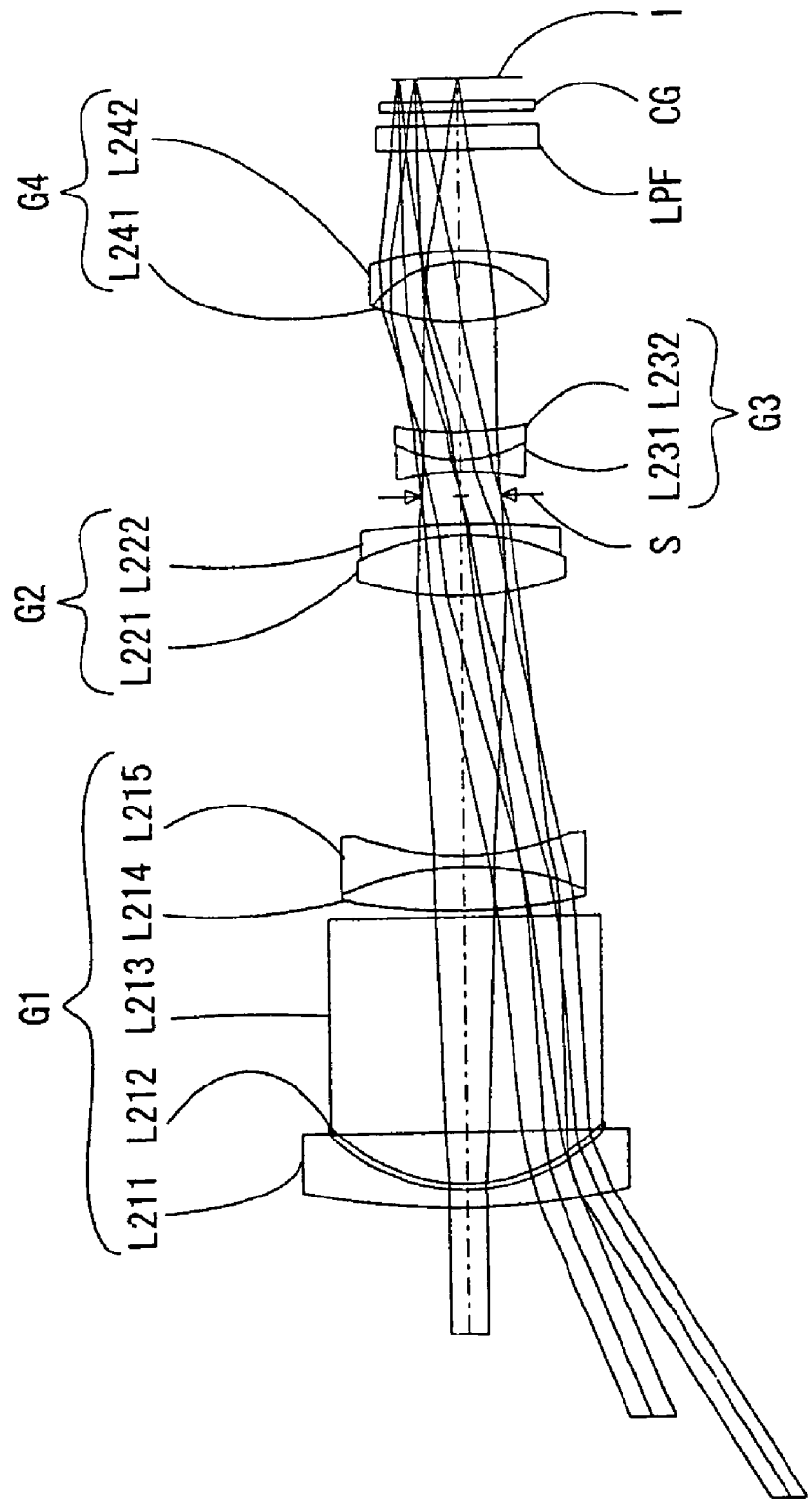
FIG. 21 is a cross-sectional view along the optical axis showing an optical arrangement at the time of the infinite object point focusing at the wide angle end of a zoom lens according to an eleventh embodiment of the present invention.

FIG. 21 is a cross-sectional view along the optical axis showing an optical arrangement at the time of the infinite object point focusing at the wide angle end of a zoom lens according to an eleventh embodiment of the present invention.

Figure 22A:
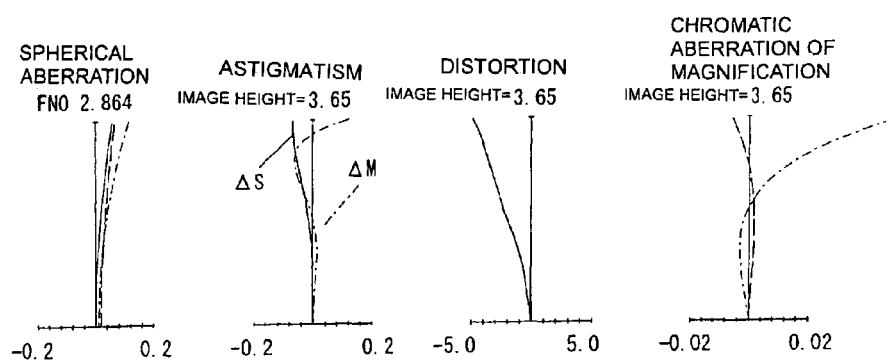
FIG. 22A, FIG. 22B, and FIG. 22C are diagrams showing the spherical aberration, the astigmatism, the distortion, and the chromatic aberration of magnification at the time of the infinite object point focusing of the zoom lens according to the eleventh embodiment, where.
Figure 22B:
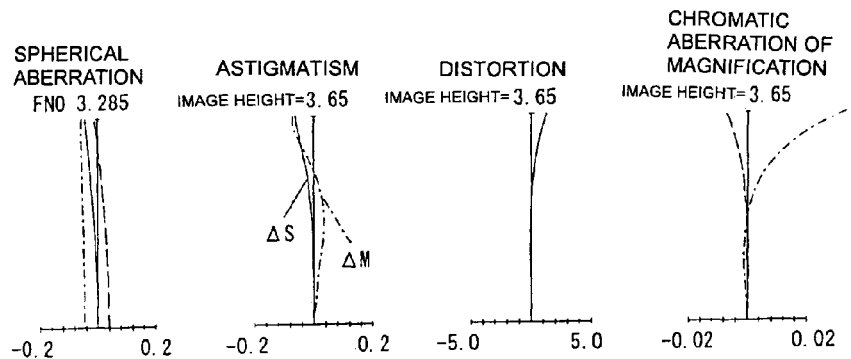
Figure 22C:
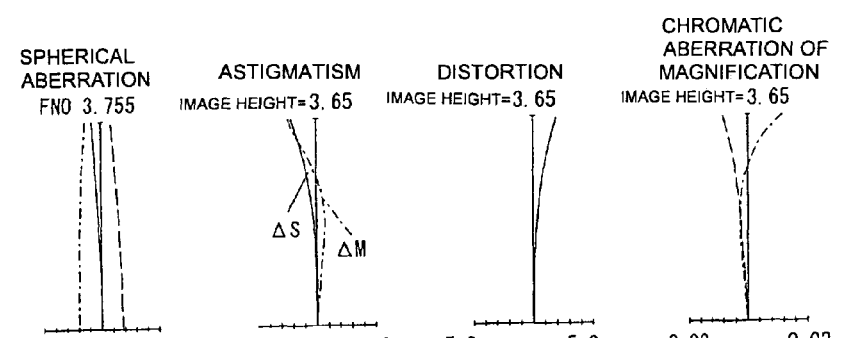

FIG. 22A, FIG. 22B, and FIG. 22C are diagrams showing the spherical aberration, the astigmatism, the distortion, and the chromatic aberration of magnification at the time of the infinite object point focusing of the zoom lens according to the eleventh embodiment, where, FIG. 22A shows the state at the wide angle end, FIG. 22B shows the intermediate state, and FIG. 22C shows the state at the telephoto end.

The zoom lens of the eleventh embodiment, as shown in FIG. 21, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a negative meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface toward the image side of the negative meniscus lens L212 having the convex surface directed toward the object side, and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the eleventh embodiment will be enumerated.

Numerical data 11

| | | | |
|---|---|---|---|
| r1 = 40.805 | d1 = 1.1 | Nd1 = 1.741 | vd1 = 52.64 |
| r2 = 10.5 | d2 = 0.35 | Nd2 = 1.42001 | vd2 = 6.55 |
| r3 = 9.747 (Aspheric surface) | d3 = 3.1 | | |
| r4 = ∞ | d4 = 12.5 | Nd4 = 1.8061 | vd4 = 40.92 |
| r5 = ∞ | d5 = 0.4 | | |
| r6 = 36.922 (Aspheric surface) | d6 = 2.5 | Nd6 = 1.8044 | vd6 = 39.59 |
| r7 = −17 | d7 = 0.7 | Nd7 = 1.51742 | vd7 = 52.43 |
| r8 = 15.572 | d8 = D8 | | |
| r9 = 17.084 (Aspheric surface) | d9 = 3.5 | Nd9 = 1.744 | vd9 = 44.78 |
| r10 = −13 | d10 = 0.7 | Nd10 = 1.84666 | vd10 = 23.78 |
| r11 = −43.272 | d11 = D11 | | |
| r12 = Aperture stop | d12 = D12 | | |
| r13 = −14.083 | d13 = 0.7 | Nd13 = 1.51633 | vd13 = 64.14 |
| r14 = 7.851 | d14 = 1.6 | Nd14 = 1.8061 | vd14 = 40.92 |
| r15 = 20.05 | d15 = D15 | | |
| r16 = 11.795 (Aspheric surface) | d16 = 3.5 | Nd16 = 1.741 | vd16 = 52.64 |
| r17 = −6 | d17 = 0.7 | Nd17 = 1.84666 | vd17 = 23.78 |
| r18 = −17.498 | d18 = D18 | | |
| r19 = ∞ | d19 = 1.44 | Nd19 = 1.54771 | vd19 = 62.84 |
| r20 = ∞ | d20 = 0.8 | | |

-continued

Numerical data 11

| | | | |
|---|---|---|---|
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = −2.71091E−06
A6 = −1.15364E−06
A8 = 0

6th surface k = 0
A4 = 2.35221E−05
A6 = 6.05500E−08
A8 = 0.00000E+00

9th surface k = 0
A4 = −9.17809E−06
A6 = −1.04149E−07
A8 = 0.00000E+00

16th surface k = 0
A4 = −1.87144E−04
A6 = 1.47652E−06
A8 = 0.00000E+00

Zoom data
When D0 (distance from object up to 1st surface) is ∞

| | wide-angle end | intermediate | telephoto end |
|---|---|---|---|
| Focal length | 5.996 | 13.701 | 18.006 |
| FNO. | 2.86 | 3.43 | 3.76 |
| D8 | 15.07 | 3.93 | 0.8 |
| D11 | 1.61 | 12.75 | 15.88 |
| D12 | 1.41 | 6.07 | 9.49 |
| D15 | 6.44 | 4.89 | 3 |
| D18 | 5.89 | 2.77 | 1.25 |
| D22 | 1.36 | 1.36 | 1.36 |

Twelfth Embodiment

Figure 23:
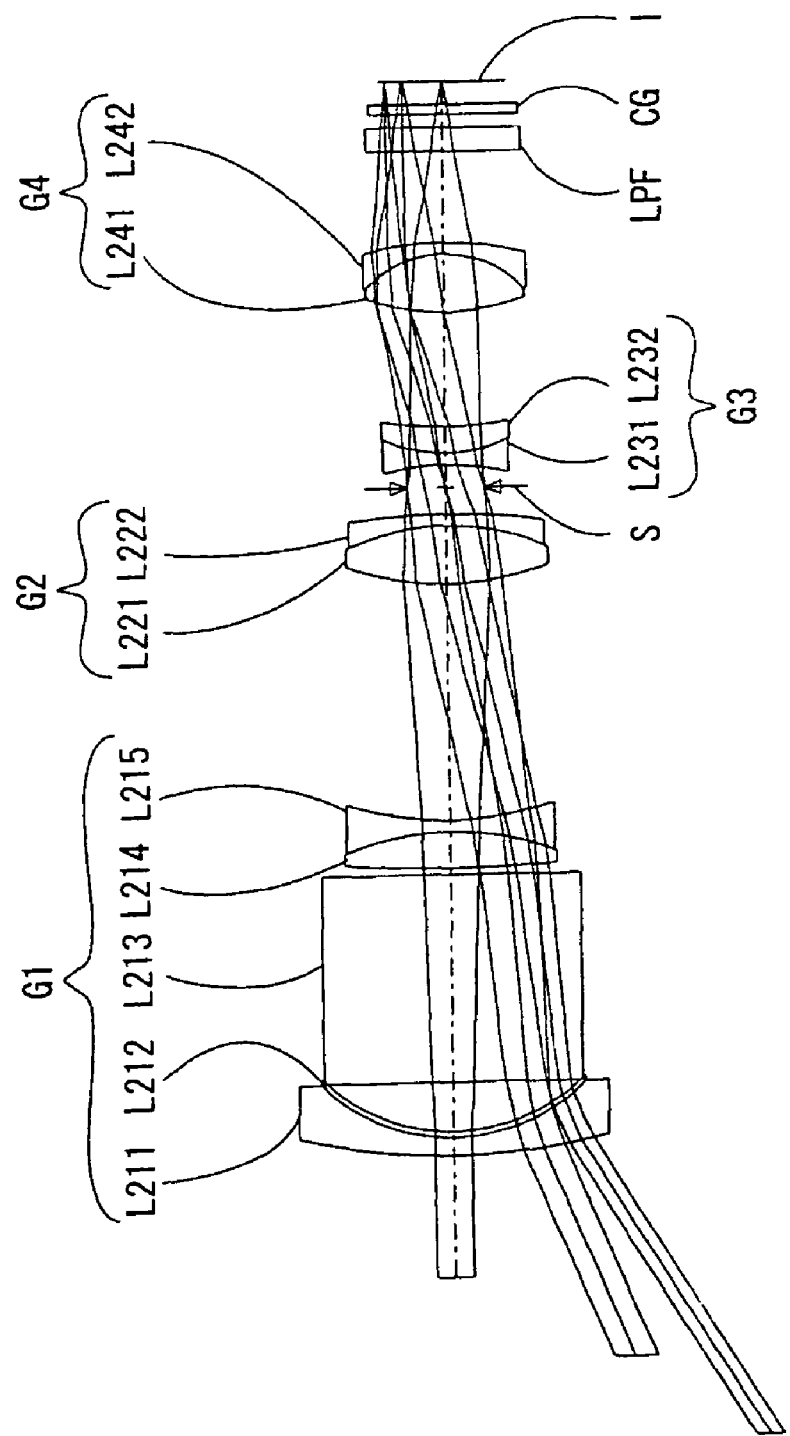
FIG. 23 is a cross-sectional view along the optical axis showing an optical arrangement at the time of the infinite object point focusing at the wide angle end of a zoom lens according to a twelfth embodiment of the present invention.

FIG. 23 is a cross-sectional view along the optical axis showing an optical arrangement at the time of the infinite object point focusing at the wide angle end of a zoom lens according to a twelfth embodiment of the present invention.

FIG. 24A, FIG. 24B, and FIG. 24c are diagrams showing the spherical aberration, the astigmatism, the distortion, and the chromatic aberration of magnification at the time of the infinite object point focusing of the zoom lens according to the twelfth embodiment, where, FIG. 24A shows the state at the wide angle end, FIG. 24B shows the intermediate state, and FIG. 24C shows the state at the telephoto end.

The zoom lens of the twelfth embodiment, as shown in FIG. 23, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a negative meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the negative meniscus lens L212 having the convex surface directed toward the object side, and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the twelfth embodiment will be enumerated.

Numerical data 12

| | | | |
|---|---|---|---|
| r1 = 35.33 | d1 = 1.1 | Nd1 = 1.741 | vd1 = 52.64 |
| r2 = 10.5 | d2 = 0.35 | Nd2 = 1.5184 | vd2 = 12.85 |
| r3 = 10.179 | d3 = 3 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 83.310 | d6 = 2.2 | Nd6 = 1.8044 | vd6 = 39.59 |
| (Aspheric surface) | | | |
| r7 = −15.779 | d7 = 0.7 | Nd7 = 1.51742 | vd7 = 52.43 |
| r8 = 17.653 | d8 = D8 | | |
| r9 = 15.957 | d9 = 3.5 | Nd9 = 1.7432 | vd9 = 49.34 |
| (Aspheric surface) | | | |
| r10 = −13 | d10 = 0.7 | Nd10 = 1.84666 | vd10 = 23.78 |
| r11 = −38.464 | d11 = D11 | | |
| r12 = Aperture stop | d12 = D12 | | |
| r13 = −13.171 | d13 = 0.7 | Nd13 = 1.51633 | vd13 = 64.14 |
| r14 = 8.317 | d14 = 1.6 | Nd14 = 1.8061 | vd14 = 40.92 |
| r15 = 22.704 | d15 = D15 | | |
| r16 = 11.950 | d16 = 3.5 | Nd16 = 1.7432 | vd16 = 49.34 |
| (Aspheric surface) | | | |
| r17 = −6 | d17 = 0.7 | Nd17 = 1.84666 | vd17 = 23.78 |
| r18 = −17.693 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = −3.96738E−06
A6 = −5.13102E−07
A8 = 0

6th surface k = 0
A4 = 2.05601E−05
A6 = 1.80893E−07
A8 = 0.00000E+00

-continued

Numerical data 12

9th surface k = 0
A4 = −1.68018E−05
A6 = −1.63553E−07
A8 = 0.00000E+00

16th surface k = 0
A4 = −1.70700E−04
A6 = 9.68010E−07
A8 = 0.00000E+00

Zoom data
When D0 (distance from object up to 1st surface) is ∞

| | wide-angle end | intermediate | telephoto end |
|---|---|---|---|
| Focal length | 6.003 | 13.7 | 17.999 |
| FNO. | 2.86 | 3.43 | 3.76 |
| D8 | 14.15 | 3.94 | 0.8 |
| D11 | 1.6 | 11.81 | 14.95 |
| D12 | 1.4 | 5.91 | 9.56 |
| D15 | 6.85 | 5.36 | 3 |
| D18 | 5.53 | 2.51 | 1.23 |
| D22 | 1.36 | 1.36 | 1.36 |

Thirteenth Embodiment

Figure 25:
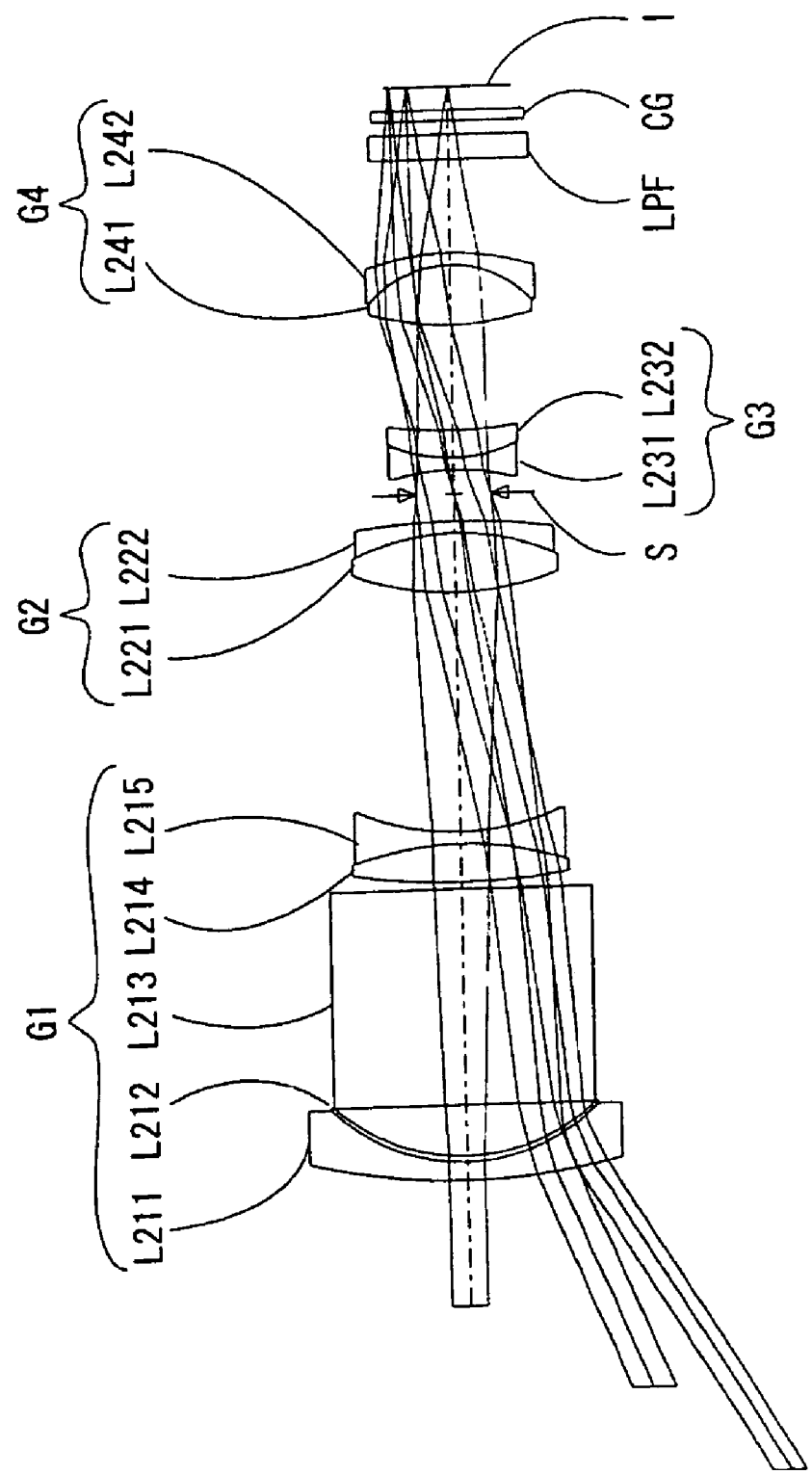
FIG. 25 is a cross-sectional view along the optical axis showing an optical arrangement at the time of the infinite object point focusing at the wide angle end of a zoom lens according to a thirteenth embodiment of the present invention.

FIG. 25 is a cross-sectional view along the optical axis showing an optical arrangement at the time of the infinite object point focusing at the wide angle end of a zoom lens according to a thirteenth embodiment of the present invention.

Figure 26A:
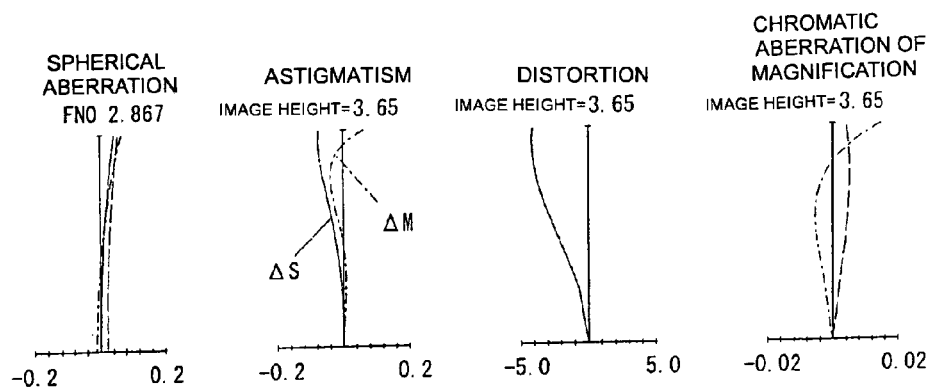
FIG. 26A, FIG. 26B, and FIG. 26C are diagrams showing the spherical aberration, the astigmatism, the distortion, and the chromatic aberration of magnification at the time of the infinite object point focusing of the zoom lens according to the thirteenth embodiment, where.
Figure 26B:
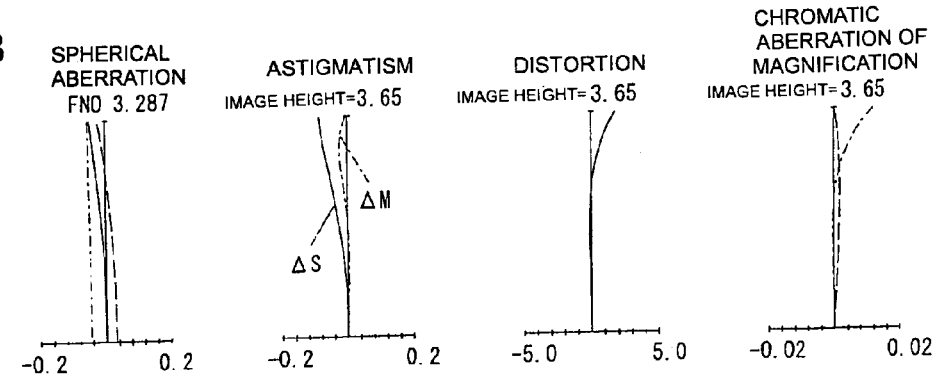
Figure 26C:
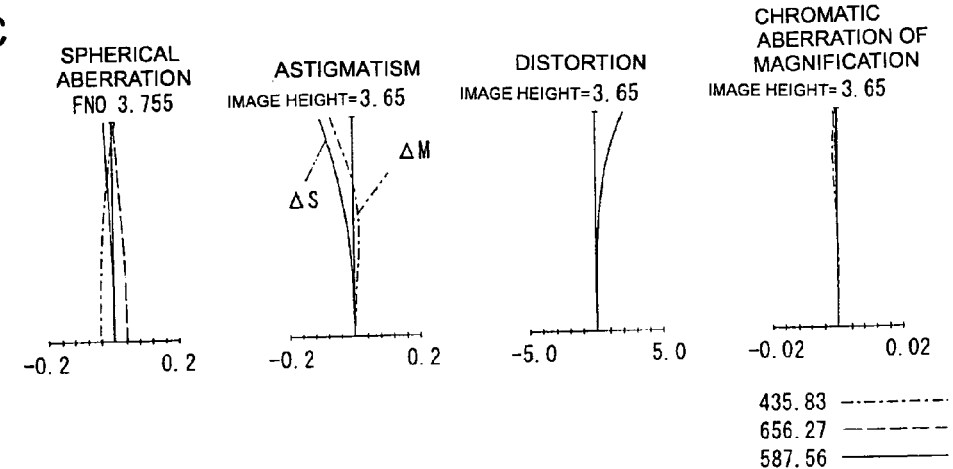

FIG. 26A, FIG. 26B, and FIG. 26C are diagrams showing the spherical aberration, the astigmatism, the distortion, and the chromatic aberration of magnification at the time of the infinite object point focusing of the zoom lens according to the thirteenth embodiment, where, FIG. 26A shows the state at the wide angle end, FIG. 26B shows the intermediate state, and FIG. 26C shows the state at the telephoto end.

The zoom lens of the thirteenth embodiment, as shown in FIG. 25, has in order from an object side thereof, a first lens group G1, a second lens group G2, and aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens having a convex surface directed toward an image side, and has a positive refracting power as a whole.

The third lens group G3 includes a cemented lens which is formed by a biconcave lens L231 and a positive meniscus lens having a convex surface directed toward the object side, and has a negative refracting power as a whole.

The fourth lens group G4 includes a cemented lens which is formed by a biconvex lens L241 and a negative meniscus lens having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the thirteenth embodiment will be enumerated.

Numerical data 13

| | | | |
|---|---|---|---|
| r1 = 34.024 | d1 = 1.1 | Nd1 = 1.8061 | vd1 = 40.92 |
| r2 = 10.5 | d2 = 0.35 | Nd2 = 1.54856 | vd2 = 7.04 |
| r3 = 10.855 (Aspheric surface) | d3 = 3 | | |
| r4 = ∞ | d4 = 12.5 | Nd4 = 1.8061 | vd4 = 40.92 |
| r5 = ∞ | d5 = 0.4 | | |
| r6 = 42.711 (Aspheric surface) | d6 = 2.2 | Nd6 = 1.8061 | vd6 = 40.92 |
| r7 = −18.562 | d7 = 0.7 | Nd7 = 1.51742 | vd7 = 52.43 |
| r8 = 14.066 | d8 = D8 | | |
| r9 = 15.115 (Aspheric surface) | d9 = 3.5 | Nd9 = 1.7432 | vd9 = 49.34 |
| r10 = −13 | d10 = 0.7 | Nd10 = 1.84666 | vd10 = 23.78 |
| r11 = −38.815 | d11 = D11 | | |
| r12 = Aperture stop | d12 = D12 | | |
| r13 = −12.644 | d13 = 0.7 | Nd13 = 1.51823 | vd13 = 58.9 |
| r14 = 8.31 | d14 = 1.6 | Nd14 = 1.8061 | vd14 = 40.92 |
| r15 = 24.052 | d15 = D15 | | |
| r16 = 13.981 (Aspheric surface) | d16 = 3.5 | Nd16 = 1.7432 | vd16 = 49.34 |
| r17 = −6 | d17 = 0.7 | Nd17 = 1.84666 | vd17 = 23.78 |
| r18 = −14.538 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 4.16028E−05
A6 = −5.41690E−07
A8 = 0.00000E+00

6th surface k = 0
A4 = 4.63265E−05
A6 = −1.97237E−09
A8 = −421441E−07

9th surface k = 0
A4 = −2.78841E−05
A6 = −7.95828E−08
A8 = −1.28129E−06

16th surface k = 0
A4 = −1.82008E−04

Numerical data 13
-continued

A6 = −7.79912E−07
A8 = 5.27383E−08

Zoom data
When D0 (distance from object up to 1st surface) is ∞

| | wide-angle end | intermediate | telephoto end |
|---|---|---|---|
| Focal length | 6.002 | 13.702 | 17.994 |
| FNO. | 2.87 | 3.43 | 3.76 |
| D8 | 13.83 | 4.04 | 0.8 |
| D11 | 1.6 | 11.39 | 14.64 |
| D12 | 1.4 | 5.72 | 8.81 |
| D15 | 6.18 | 5.01 | 3 |
| D18 | 5.42 | 2.26 | 1.19 |
| D22 | 1.36 | 1.36 | 1.36 |

Fourteenth Embodiment

Figure 27:
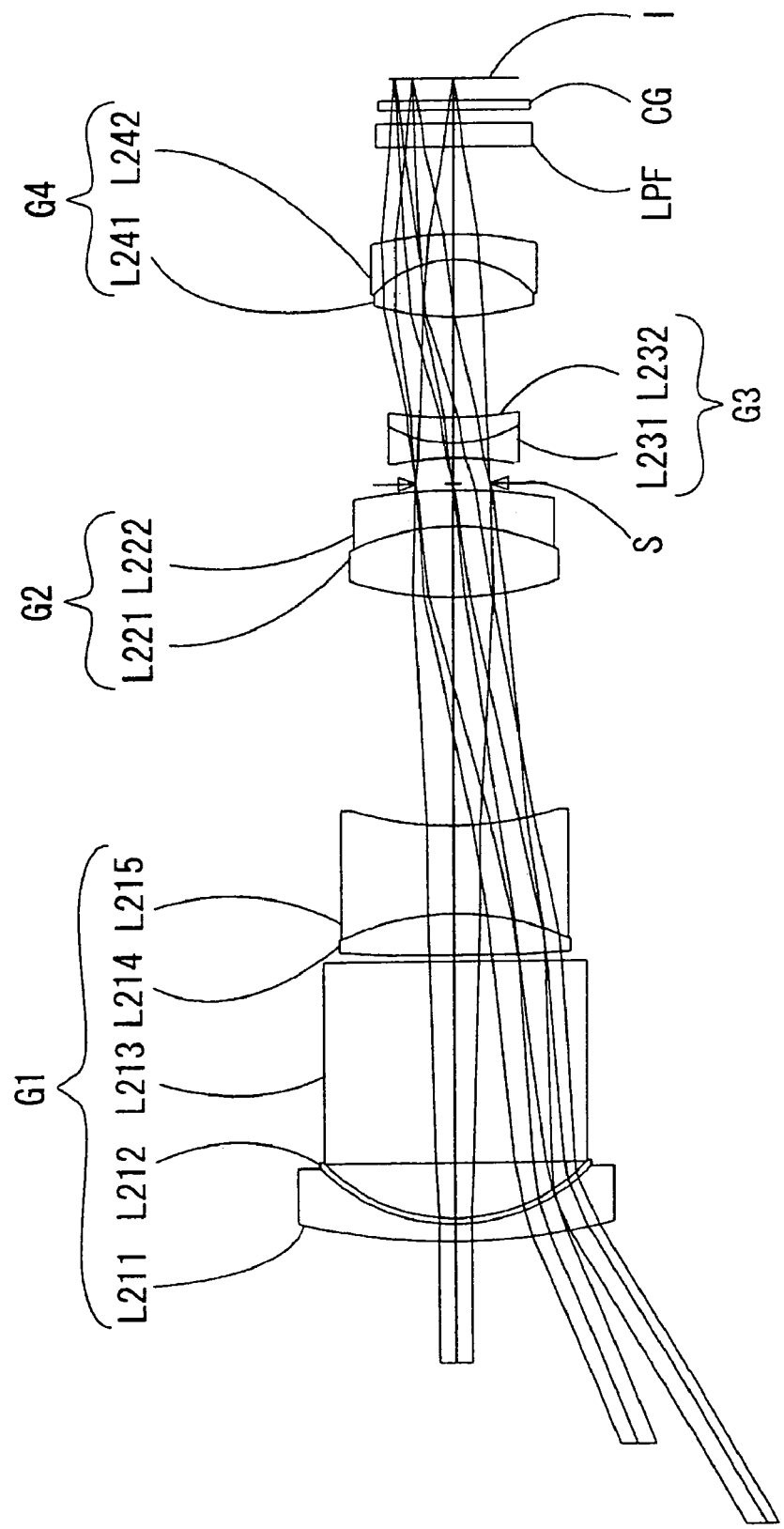
FIG. 27 is a cross-sectional view along the optical axis showing an optical arrangement at the time of the infinite object point focusing at the wide angle end of a zoom lens according to a fourteenth embodiment of the present invention.

FIG. 27 is a cross-sectional view along the optical axis showing an optical arrangement at the time of the infinite object point focusing at the wide angle end of a zoom lens according to a fourteenth embodiment of the present invention.

Figure 28A:
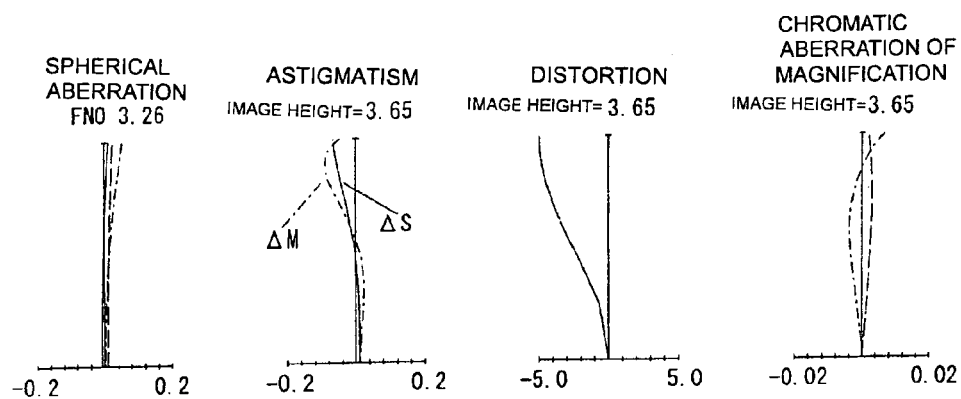
FIG. 28A, FIG. 28B, and FIG. 28C are diagrams showing the spherical aberration, the astigmatism, the distortion, and the chromatic aberration of magnification at the time of the infinite object point focusing of the zoom lens according to the fourteenth embodiment, where.
Figure 28B:
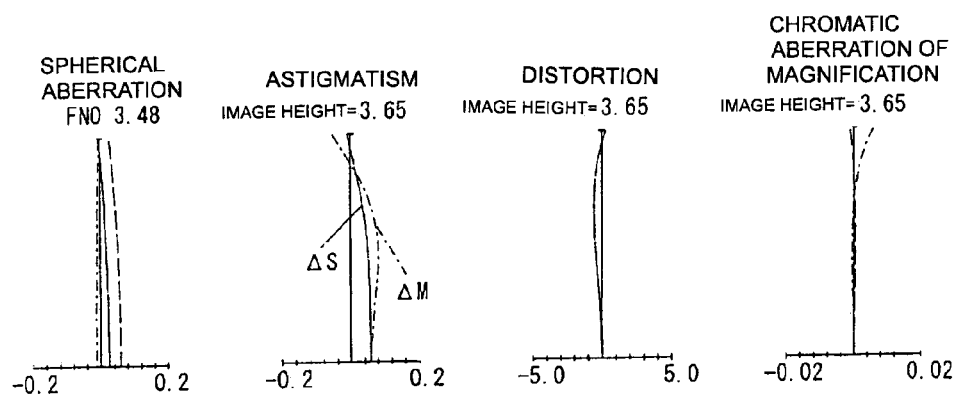
Figure 28C:
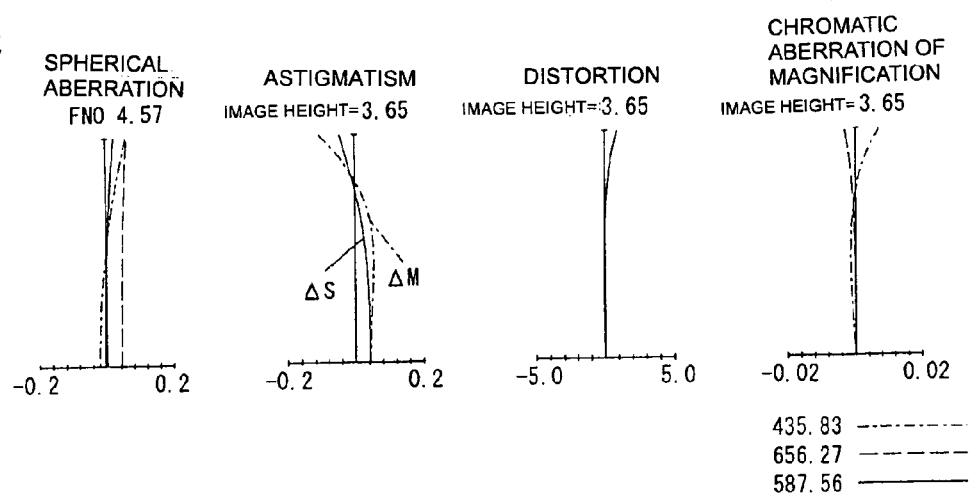

FIG. 28A, FIG. 28B, and FIG. 28C are diagrams showing the spherical aberration, the astigmatism, the distortion, and the chromatic aberration of magnification at the time of the infinite object point focusing of the zoom lens according to the fourteenth embodiment, where, FIG. 28A shows the state at the wide angle end, FIG. 28B shows the intermediate state, and FIG. 28C shows the state at the telephoto end.

The zoom lens of the fourteenth embodiment, as shown in FIG. 27, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a negative meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface toward the image side of the negative meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the fourteenth embodiment will be enumerated.

Numerical data 14

| | | | |
|---|---|---|---|
| r1 = 35.627 | d1 = 1.1 | Nd1 = 1.7432 | vd1 = 49.34 |
| r2 = 10.5 | d2 = 0.35 | Nd2 = 1.65228 | vd2 = 12.75 |
| r3 = 10.257 | d3 = 3.39 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 189.603 | d6 = 2.53 | Nd6 = 1.8061 | vd6 = 40.92 |
| (Aspheric surface) | | | |
| r7 = −14.57 | d7 = 5.4 | Nd7 = 1.51742 | vd7 = 52.43 |
| r8 = 18.292 | d8 = D8 | | |
| r9 = 17.196 | d9 = 4.28 | Nd9 = 1.7432 | vd9 = 49.34 |
| (Aspheric surface) | | | |
| r10 = −13 | d10 = 2.17 | Nd10 = 1.84666 | vd10 = 23.78 |
| r11 = −32.13 | d11 = D11 | | |
| r12 = Aperture stop | d12 = D12 | | |
| r13 = −16.531 | d13 = 0.9 | Nd13 = 1.51823 | vd13 = 58.9 |
| r14 = 7.005 | d14 = 1.57 | Nd14 = 1.8061 | vd14 = 40.92 |
| r15 = 21.588 | d15 = D15 | | |
| r16 = 14.073 | d16 = 3.44 | Nd16 = 1.7432 | vd16 = 49.34 |
| (Aspheric surface) | | | |
| r17 = −6 | d17 = 1.56 | Nd17 = 1.84666 | vd17 = 23.78 |
| r18 = −20.07 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 4.66886E−05
A6 = −3.68390E−07
A8 = 0

6th surface k = 0
A4 = 4.41308E−05
A6 = −1.09516E−08
A8 = 0.00000E+00

9th surface k = 0
A4 = −3.06648E−05
A6 = −2.07782E−08
A8 = 0.00000E+00

16th surface k = 0
A4 = −1.41284E−04
A6 = −9.64511E−07
A8 = 0.00000E+00

Zoom data
When D0 (distance from object up to 1st surface) is ∞

| | wide-angle end | intermediate | telephoto end |
|---|---|---|---|
| Focal length | 6.099 | 13.417 | 17.991 |
| FNO. | 3.26 | 3.52 | 4.58 |
| D8 | 13.95 | 3.68 | 0.4 |
| D11 | 0.4 | 12.53 | 12.79 |
| D12 | 1.57 | 4.97 | 12.55 |
| D15 | 6.19 | 5.04 | 3.12 |
| D18 | 5.41 | 2.24 | 1.07 |
| D22 | 1.36 | 1.36 | 1.36 |

Fifteenth Embodiment

Figure 29:
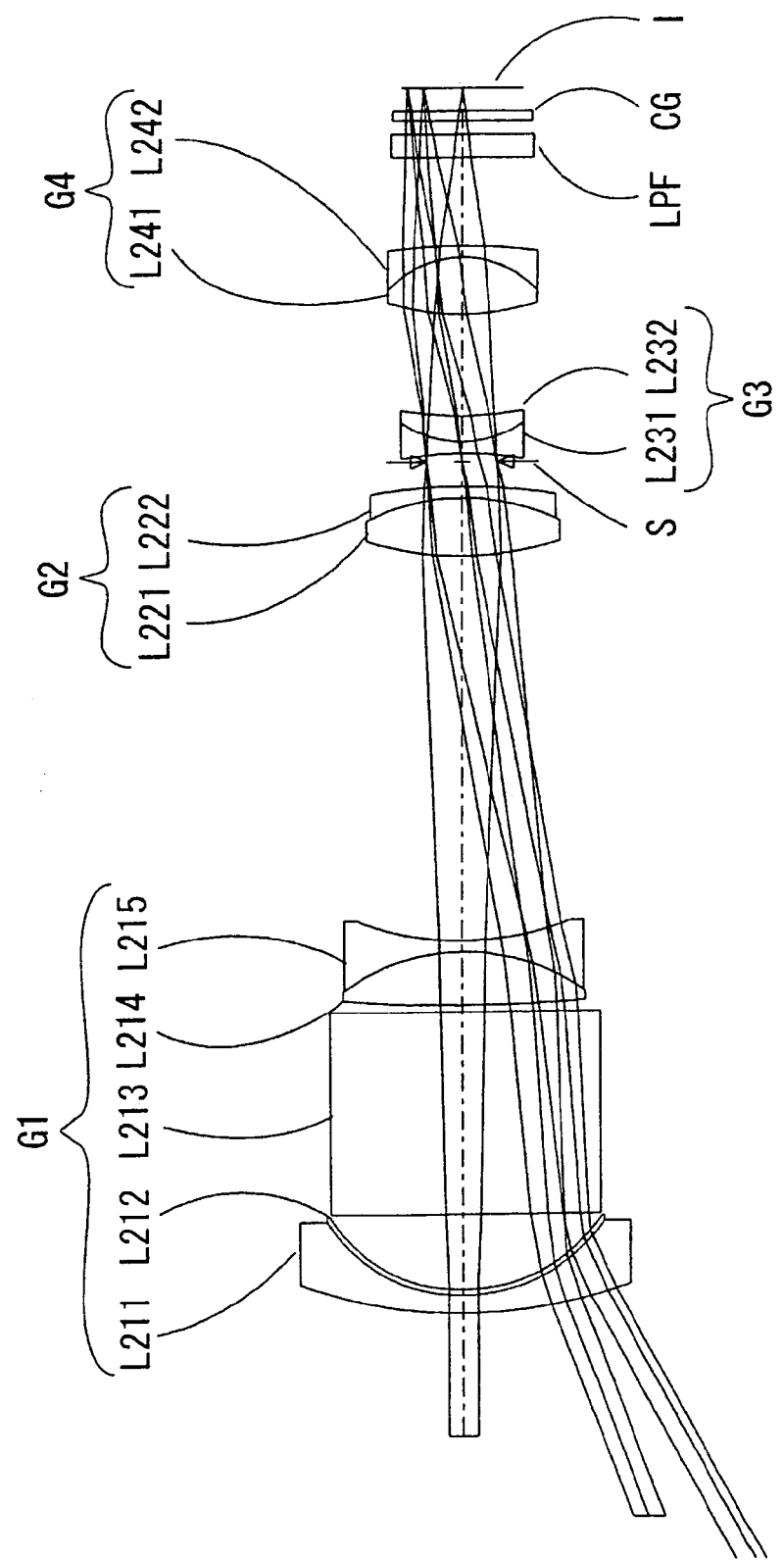
FIG. 29 is a cross-sectional view along the optical axis showing an optical arrangement at the time of the infinite object point focusing at the wide angle end of a zoom lens according to a fifteenth embodiment of the present invention.

FIG. 29 is a cross-sectional view along the optical axis showing an optical arrangement at the time of the infinite object point focusing at the wide angle end of a zoom lens according to a fifteenth embodiment of the present invention.

Figure 30A:
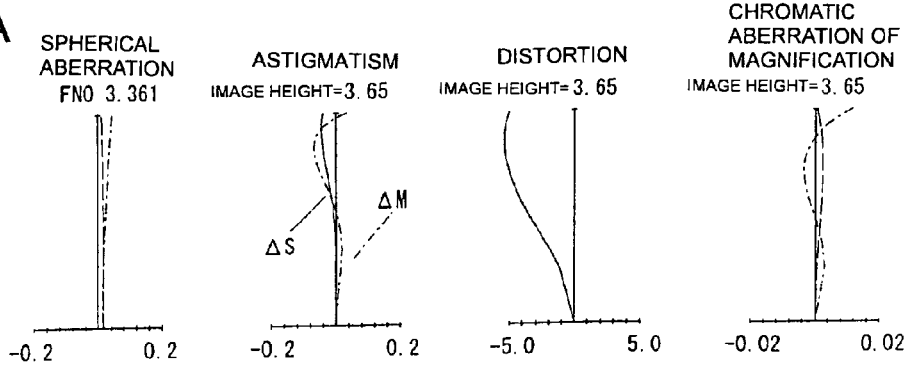
FIG. 30A, FIG. 30B, and FIG. 30C are diagrams showing the spherical aberration, the astigmatism, the distortion, and the chromatic aberration of magnification at the time of the infinite object point focusing of the zoom lens according to the fifteenth embodiment, where.
Figure 30B:
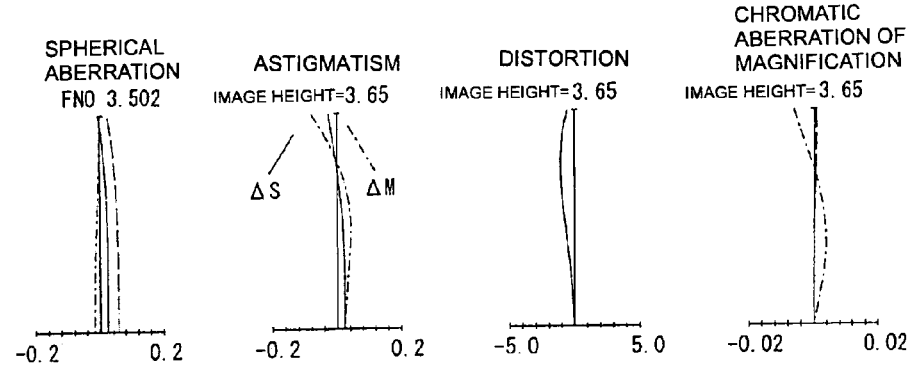
Figure 30C:
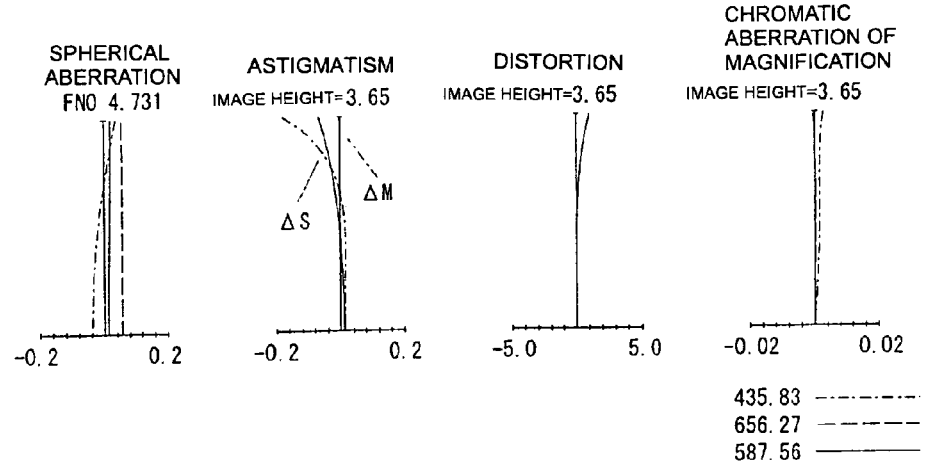

FIG. 30A, FIG. 30B, and FIG. 30C are diagrams showing the spherical aberration, the astigmatism, the distortion, and the chromatic aberration of magnification at the time of the infinite object point focusing of the zoom lens according to the fifteenth embodiment, where, FIG. 30A shows the state at the wide angle end, FIG. 30B shows the intermediate state, and FIG. 30C shows the state at the telephoto end.

The zoom lens of the fifteenth embodiment, as shown in FIG. 29, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group.

Next, numerical data of the fifteenth embodiment will be enumerated.

Numerical data 15

| | | | |
|---|---|---|---|
| r1 = 30.82 | d1 = 1.1 | Nd1 = 1.68184 | vd1 = 39.35 |
| r2 = 10.5 | d2 = 0.35 | Nd2 = 1.59885 | vd2 = 6.52 |
| r3 = 10.648 | d3 = 4.65 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 134.153 | d6 = 3.23 | Nd6 = 1.82682 | vd6 = 41.39 |
| (Aspheric surface) | | | |
| r7 = −12.852 | d7 = 0.7 | Nd7 = 1.54352 | vd7 = 51.79 |
| r8 = 17.506 | d8 = D8 | | |
| r9 = 19.026 | d9 = 3.5 | Nd9 = 1.7432 | vd9 = 49.34 |

-continued

Numerical data 15

(Aspheric surface)
| r10 = −13 | d10 = 0.7 | Nd10 = 1.84666 | vd10 = 23.78 |
| r11 = −34.264 | d11 = D11 | | |
| r12 = Aperture stop | d12 = D12 | | |
| r13 = −18.881 | d13 = 0.7 | Nd13 = 1.51823 | vd13 = 58.9 |
| r14 = 6.389 | d14 = 1.6 | Nd14 = 1.8061 | vd14 = 40.92 |
| r15 = 20.689 | d15 = D15 | | |
| r16 = 13.519 | d16 = 3.5 | Nd16 = 1.7432 | vd16 = 49.34 |
| (Aspheric surface) | | | |
| r17 = −6 | d17 = 0.7 | Nd17 = 1.84666 | vd17 = 23.78 |
| r18 = −33.096 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 6.29124E−05
A6 = −9.94304E−08
A8 = 0

6th surface k = 0
A4 = 3.57536E−05
A6 = −2.19825E−07
A8 = 0.00000E+00

9th surface k = 0
A4 = −2.33627E−05
A6 = 1.44142E−07
A8 = 0.00000E+00

16th surface k = 0
A4 = −1.46902E−04
A6 = −2.18220E−06
A8 = 0.00000E+00

Zoom data
When D0 (distance from object up to 1st surface) is ∞

| | wide-angle end | intermediate | telephoto end |
|---|---|---|---|
| Focal length | 6.1 | 13.421 | 17.996 |
| FNO. | 3.36 | 3.86 | 4.73 |
| D8 | 23.43 | 6.51 | 1.75 |
| D11 | 1.47 | 10 | 10.6 |
| D12 | 0.53 | 6.33 | 13.1 |
| D15 | 6.2 | 5.15 | 3.36 |
| D18 | 5.4 | 2.12 | 0.82 |
| D22 | 1.36 | 1.36 | 1.36 |

Sixteenth Embodiment

Figure 31:
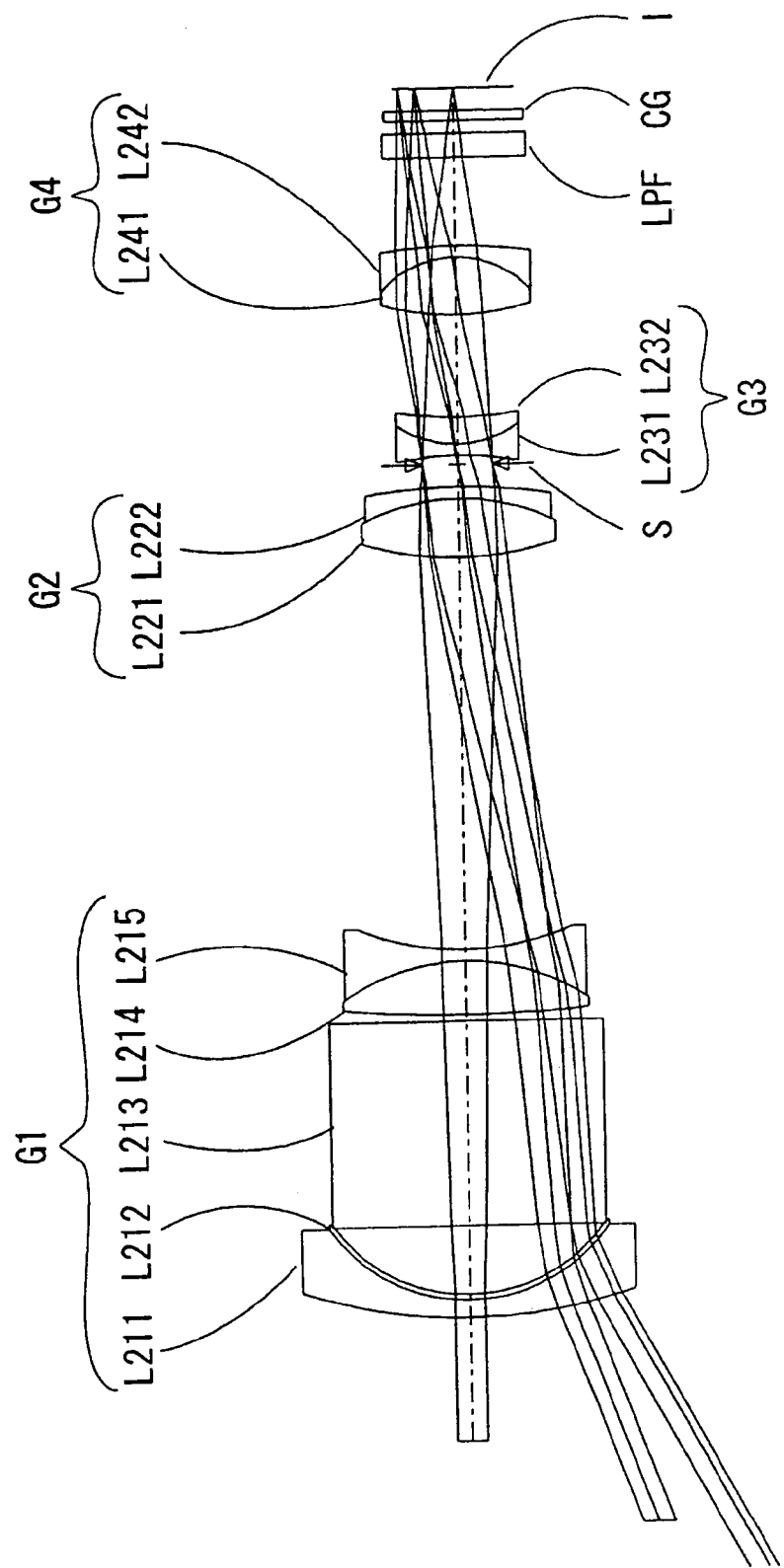
FIG. 31 is a cross-sectional view along the optical axis showing an optical arrangement at the time of the infinite object point focusing at the wide angle end of a zoom lens according to a sixteenth embodiment of the present invention.

FIG. 31 is a cross-sectional view along the optical axis showing an optical arrangement at the time of the infinite object point focusing at the wide angle end of a zoom lens according to a sixteenth embodiment of the present invention.

Figure 32A:
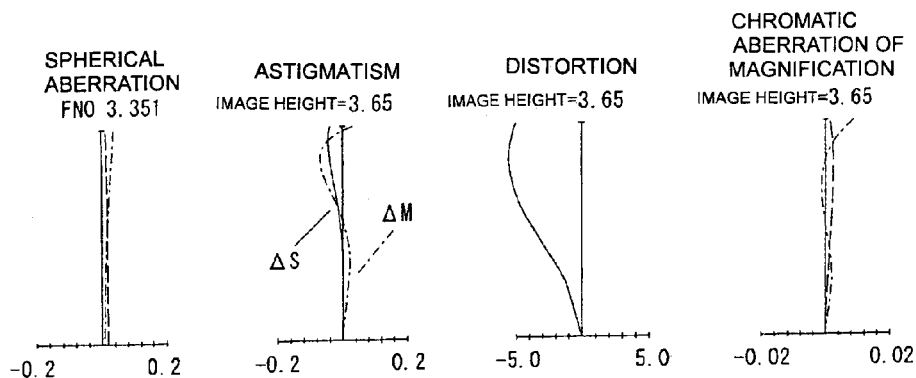
FIG. 32A, FIG. 32B, and FIG. 32C are diagrams showing the spherical aberration, the astigmatism, the distortion, and the chromatic aberration of magnification at the time of the infinite object point focusing of the zoom lens according to the sixteenth embodiment, where.
Figure 32B:
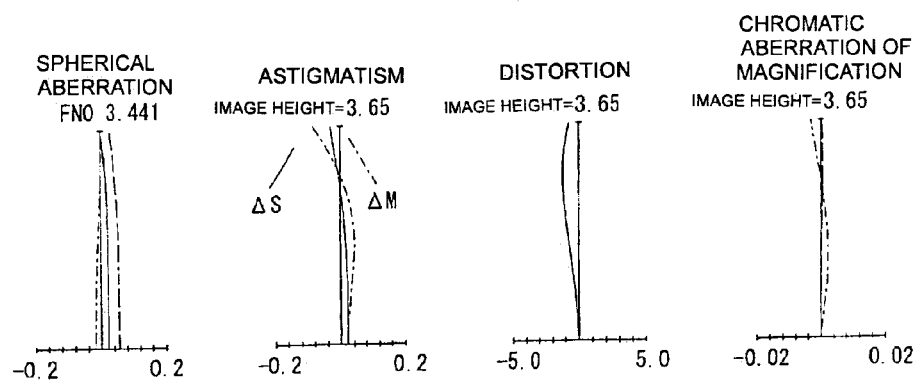
Figure 32C:
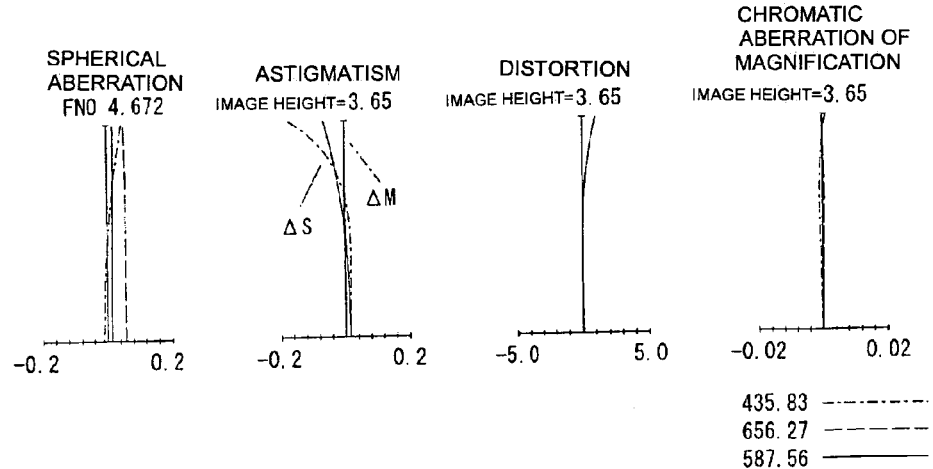

FIG. 32A, FIG. 32B, and FIG. 32C are diagrams showing the spherical aberration, the astigmatism, the distortion, and the chromatic aberration of magnification at the time of the infinite object point focusing of the zoom lens according to the sixteenth embodiment, where, FIG. 32A shows the state at the wide angle end, FIG. 32B shows the intermediate state, and FIG. 32C shows the state at the telephoto end.

The zoom lens of the sixteenth embodiment, as shown in FIG. 31, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens L222 which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the sixteenth embodiment will be enumerated.

Numerical data 16

| r1 = 31.869 | d1 = 1.1 | Nd1 = 1.68455 | vd1 = 38.62 |
| r2 = 10.5 | d2 = 0.35 | Nd2 = 1.79525 | vd2 = 9.95 |
| r3 = 10.719 | d3 = 4.19 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 99.427 | d6 = 3.24 | Nd6 = 1.82739 | vd6 = 42.49 |
| (Aspheric surface) | | | |
| r7 = −13.299 | d7 = 0.7 | Nd7 = 1.54227 | vd7 = 52.3 |
| r8 = 16.692 | d8 = D8 | | |
| r9 = 19.193 | d9 = 3.5 | Nd9 = 1.7432 | vd9 = 49.34 |
| (Aspheric surface) | | | |
| r10 = −13 | d10 = 0.7 | Nd10 = 1.84666 | vd10 = 23.78 |
| r11 = −33.527 | d11 = D11 | | |
| r12 = Aperture stop | d12 = D12 | | |
| r13 = −18.855 | d13 = 0.7 | Nd13 = 1.51823 | vd13 = 58.9 |
| r14 = 6.427 | d14 = 1.6 | Nd14 = 1.8061 | vd14 = 40.92 |
| r15 = 21.117 | d15 = D15 | | |
| r16 = 14.070 | d16 = 3.5 | Nd16 = 1.7432 | vd16 = 49.34 |
| (Aspheric surface) | | | |
| r17 = −6 | d17 = 0.7 | Nd17 = 1.84666 | vd17 = 23.78 |
| r18 = −30.061 | d18 = D18 | | |
| r19 = ∞ | d19 = 1.44 | Nd19 = 1.54771 | vd19 = 62.84 |
| r20 = ∞ | d20 = 0.8 | | |

-continued

Numerical data 16

| | | | |
|---|---|---|---|
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 5.65707E−05
A6 = −8.35153E−09
A8 = 0
6th surface k = 0
A4 = 4.41416E−05
A6 = −2.42655E−07
A8 = 0.00000E+00
9th surface k = 0
A4 = −2.48396E−05
A6 = 1.43316E−07
A8 = 0.00000E+00
16th surface k = 0
A4 = −1.47665E−04
A6 = −2.52326E−06
A8 = 0.00000E+00

Zoom data
When D0 (distance from object up to 1st surface) is ∞

| | wide-angle end | intermediate | telephoto end |
|---|---|---|---|
| Focal length | 6.1 | 13.42 | 17.995 |
| FNO. | 3.35 | 3.84 | 4.67 |
| D8 | 23.69 | 6.89 | 2.16 |
| D11 | 1.33 | 9.95 | 10.69 |
| D12 | 0.53 | 6.23 | 12.79 |
| D15 | 6.2 | 5.15 | 3.38 |
| D18 | 5.4 | 2.12 | 0.81 |
| D22 | 1.36 | 1.36 | 1.36 |

Seventeenth Embodiment

Figure 33:
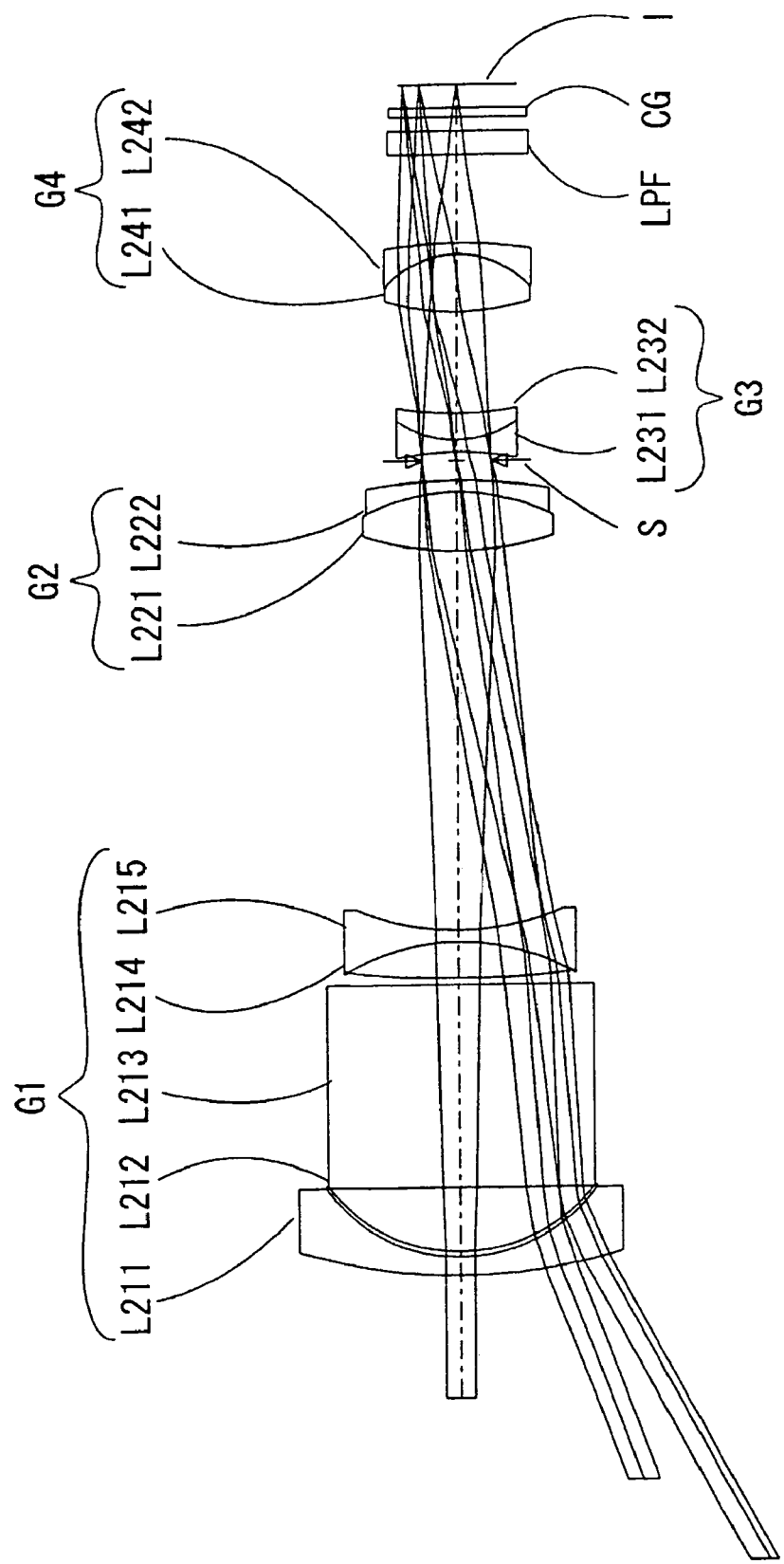
FIG. 33 is a cross-sectional view along the optical axis showing an optical arrangement at the time of the infinite object point focusing at the wide angle end of a zoom lens according to a seventeenth embodiment of the present invention.

FIG. 33 is a cross-sectional view along the optical axis showing an optical arrangement at the time of the infinite object point focusing at the wide angle end of a zoom lens according to a seventeenth embodiment of the present invention.

Figure 34A:
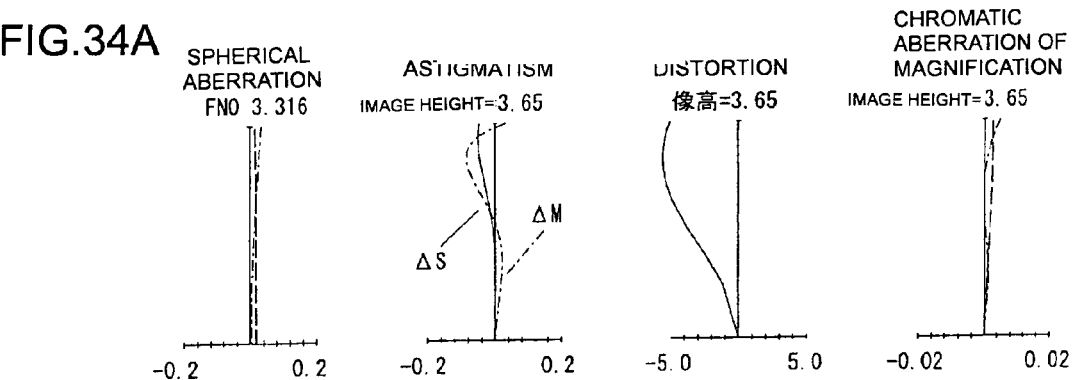
FIG. 34A, FIG. 34B, and FIG. 34C are diagrams showing the spherical aberration, the astigmatism, the distortion, and the chromatic aberration of magnification at the time of the infinite object point focusing of the zoom lens according to the seventeenth embodiment, where.
Figure 34B:
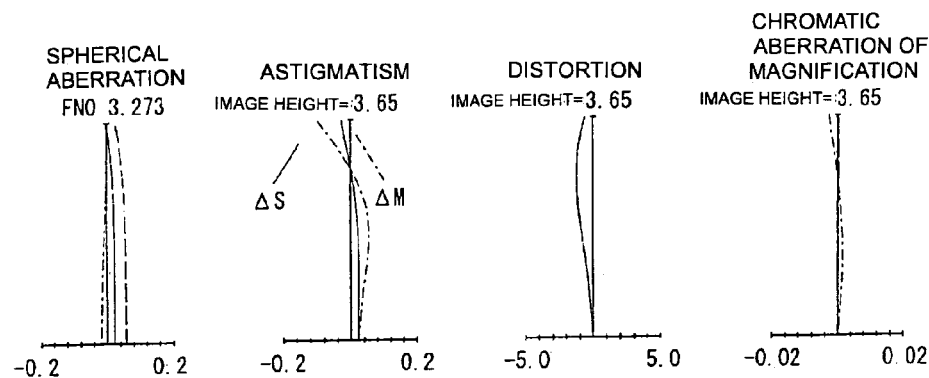
Figure 34C:
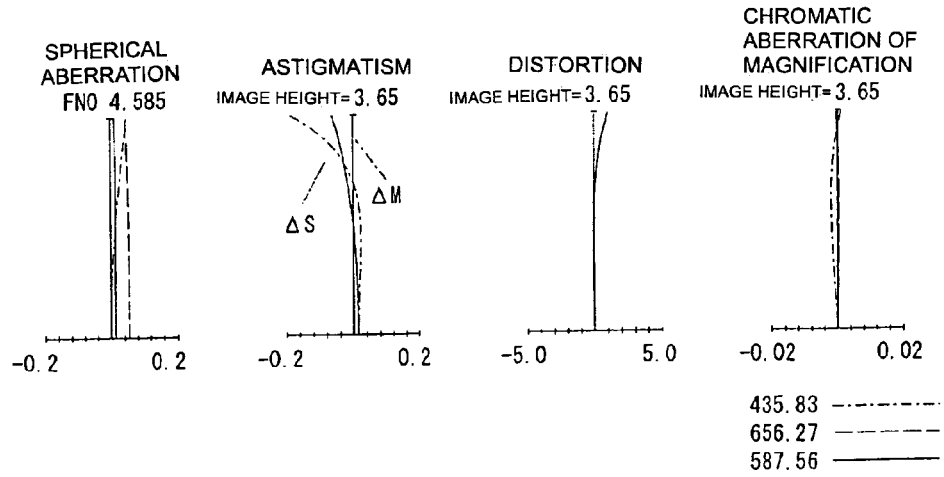

FIG. 34A, FIG. 34B, and FIG. 34C are diagrams showing the spherical aberration, the astigmatism, the distortion, and the chromatic aberration of magnification at the time of the infinite object point focusing of the zoom lens according to the seventeenth embodiment, where, FIG. 34A shows the state at the wide angle end, FIG. 34B shows the intermediate state, and FIG. 34C shows the state at the telephoto end.

The zoom lens of the seventeenth embodiment, as shown in FIG. 33, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the seventeenth embodiment will be enumerated.

Numerical data 17

| | | | |
|---|---|---|---|
| r1 = 36.23 | d1 = 1.1 | Nd1 = 1.69029 | vd1 = 36.36 |
| r2 = 10.5 | d2 = 0.35 | Nd2 = 1.9712 | vd2 = 12.88 |
| r3 = 11.000 | d3 = 3.93 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 88.421 | d6 = 2.2 | Nd6 = 1.82354 | vd6 = 44.73 |
| (Aspheric surface) | | | |
| r7 = −14.187 | d7 = 0.7 | Nd7 = 1.53704 | vd7 = 54.58 |
| r8 = 16.455 | d8 = D8 | | |
| r9 = 18.958 | d9 = 3.5 | Nd9 = 1.7432 | vd9 = 49.34 |
| (Aspheric surface) | | | |
| r10 = −13 | d10 = 0.7 | Nd10 = 1.84666 | vd10 = 23.78 |
| r11 = −32.852 | d11 = D11 | | |
| r12 = Aperture stop | d12 = D12 | | |
| r13 = −18.113 | d13 = 0.7 | Nd13 = 1.51823 | vd13 = 58.9 |
| r14 = 6.38 | d14 = 1.6 | Nd14 = 1.8061 | vd14 = 40.92 |
| r15 = 20.833 | d15 = D15 | | |
| r16 = 13.828 | d16 = 3.5 | Nd16 = 1.7432 | vd16 = 49.34 |
| (Aspheric surface) | | | |
| r17 = −6 | d17 = 0.7 | Nd17 = 1.84666 | vd17 = 23.78 |
| r18 = −29.055 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 5.07303E−05
A6 = −6.94190E−08
A8 = 0
6th surface k = 0
A4 = 4.89135E−05
A6 = −2.70777E−07
A8 = 0.00000E+00

-continued

Numerical data 17

9th surface k = 0
A4 = −2.69831E−05
A6 = 1.67783E−07
A8 = 0.00000E+00

16th surface k = 0
A4 = −1.51906E−04
A6 = −2.58667E−06
A8 = 0.00000E+00

Zoom data
When D0 (distance from object up to 1st surface) is ∞

|  | wide-angle end | intermediate | telephoto end |
|---|---|---|---|
| Focal length | 6.106 | 13.462 | 18.001 |
| FNO. | 3.32 | 3.76 | 4.59 |
| D8 | 22.99 | 6.9 | 2.3 |
| D11 | 1.19 | 10.06 | 10.8 |
| D12 | 0.53 | 5.88 | 12.39 |
| D15 | 6.19 | 5.13 | 3.33 |
| D18 | 5.4 | 2.14 | 0.85 |
| D22 | 1.36 | 1.36 | 1.36 |

Eighteenth Embodiment

FIG. 35 is a cross-sectional view along the optical axis showing an optical arrangement at the time of the infinite object point focusing at the wide angle end of a zoom lens according to an eighteenth embodiment of the present invention.

FIG. 36A, FIG. 36B, and FIG. 36C are diagrams showing the spherical aberration, the astigmatism, the distortion, and the chromatic aberration of magnification at the time of the infinite object point focusing of the zoom lens according to the eighteenth embodiment, where, FIG. 36A shows the state at the wide angle end, FIG. 36B shows the intermediate state, and FIG. 36C shows the state at the telephoto end.

The zoom lens of the eighteenth embodiment, as shown in FIG. 35, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the eighteenth embodiment will be enumerated.

Numerical data 18

| r1 = 31.999 | d1 = 1.1 | Nd1 = 1.71082 | vd1 = 36.25 |
|---|---|---|---|
| r2 = 10.5 | d2 = 0.35 | Nd2 = 2.0512 | vd2 = 6.28 |
| r3 = 10.544 | d3 = 4.21 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 81.783 | d6 = 2.2 | Nd6 = 1.81694 | vd6 = 45.25 |
| (Aspheric surface) | | | |
| r7 = −15.2 | d7 = 0.7 | Nd7 = 1.53247 | vd7 = 56.77 |
| r8 = 16.515 | d8 = D8 | | |
| r9 = 18.404 | d9 = 3.5 | Nd9 = 1.7432 | vd9 = 49.34 |
| (Aspheric surface) | | | |
| r10 = −13 | d10 = 0.7 | Nd10 = 1.84666 | vd10 = 23.78 |
| r11 = −33.096 | d11 = D11 | | |
| r12 = Aperture stop | d12 = D12 | | |
| r13 = −16.544 | d13 = 0.7 | Nd13 = 1.51823 | vd13 = 58.9 |
| r14 = 6.208 | d14 = 1.6 | Nd14 = 1.8061 | vd14 = 40.92 |
| r15 = 20.648 | d15 = D15 | | |
| r16 = 12.668 | d16 = 3.5 | Nd16 = 1.7432 | vd16 = 49.34 |
| (Aspheric surface) | | | |
| r17 = −6 | d17 = 0.7 | Nd17 = 1.84666 | vd17 = 23.78 |
| r18 = −34.221 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 3.63151E−05
A6 = −1.62265E−07
A8 = 0

6th surface k = 0
A4 = 4.72473E−05
A6 = −1.61277E−07
A8 = 0.00000E+00

9th surface k = 0
A4 = −2.67300E−05
A6 = 1.00083E−07
A8 = 0.00000E+00

16th surface k = 0
A4 = −1.61823E−04

-continued

Numerical data 18

A6 = −2.44296E−06
A8 = 0.00000E+00

Zoom data
When D0 (distance from object up to 1st surface) is ∞

|  | wide-angle end | intermediate | telephoto end |
|---|---|---|---|
| Focal length | 6.1 | 13.42 | 17.995 |
| FNO. | 3.3 | 3.75 | 4.63 |
| D8 | 21.27 | 6.21 | 1.88 |
| D11 | 1.45 | 10.47 | 11.12 |
| D12 | 0.54 | 5.9 | 12.67 |
| D15 | 6.19 | 5.11 | 3.29 |
| D18 | 5.4 | 2.16 | 0.9 |
| D22 | 1.36 | 1.36 | 1.36 |

Nineteenth Embodiment

Figure 37:
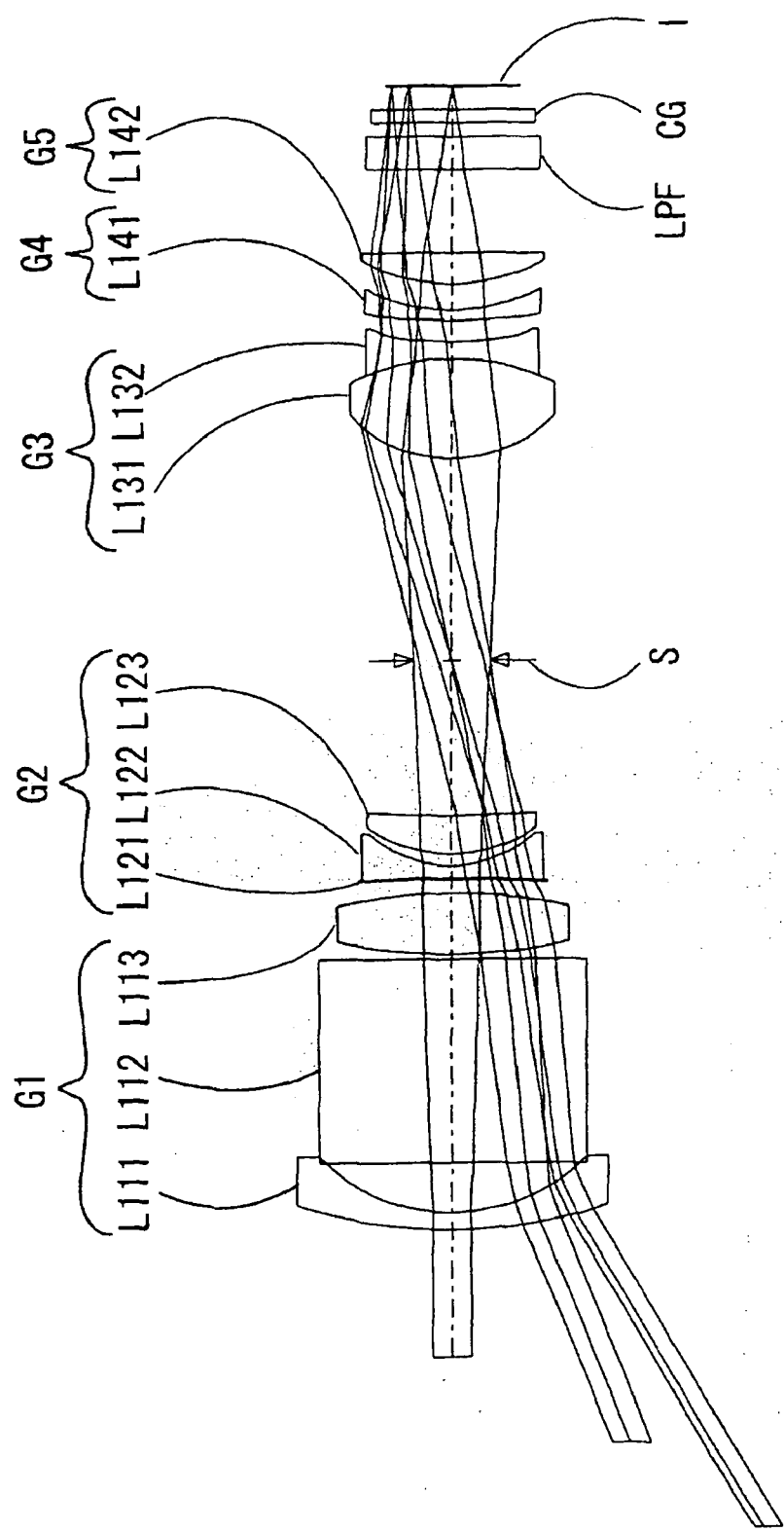
FIG. 37 is a cross-sectional view along the optical axis showing an optical arrangement at the time of the infinite object point focusing at the wide angle end of a zoom lens according to a nineteenth embodiment of the present invention.

FIG. 37 is a cross-sectional view along the optical axis showing an optical arrangement at the time of the infinite object point focusing at the wide angle end of a zoom lens according to a nineteenth embodiment of the present invention.

FIG. 38A, FIG. 38B, and FIG. 38C are diagrams showing the spherical aberration, the astigmatism, the distortion, and the chromatic aberration of magnification at the time of the infinite object point focusing of the zoom lens according to the nineteenth embodiment of the present invention, where, FIG. 38A shows the state at the wide angle end, FIG. 38B shows the intermediate state, and FIG. 38C shows the state at the telephoto end.

The zoom lens of the nineteenth embodiment, as shown in FIG. 37, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a positive meniscus lens L121 having a convex surface directed toward an image side and a biconcave lens L122, and a positive meniscus lens L123 having a convex surface directed toward the object side, and has a negative refracting power as a whole. The positive meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface toward the object side of the biconvex lens L113 in the first lens group G1, a surface on the object side of the positive meniscus lens L121 having the convex surface directed toward the image side and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the nineteenth embodiment will be enumerated.

Numerical data 19

| r1 = 26.23 | d1 = 1 | Nd1 = 1.8061 | vd1 = 40.92 |
|---|---|---|---|
| r2 = 10.006 | d2 = 2.9 | | |
| r3 = ∞ | d3 = 12 | Nd3 = 1.8061 | vd3 = 40.92 |
| r4 = ∞ | d4 = 0.3 | | |
| r5 = 29.400 (Aspheric surface) | d5 = 3.54 | Nd5 = 1.741 | vd5 = 52.64 |
| r6 = −27.224 | d6 = D6 | | |
| r7 = −427.532 (Aspheric surface) | d7 = 0.1 | Nd7 = 1.60687 | vd7 = 27.03 |
| r8 = −85.507 | d8 = 0.7 | Nd8 = 1.8044 | vd8 = 39.59 |
| r9 = 5.812 (Aspheric surface) | d9 = 0.7 | | |
| r10 = 7.784 | d10 = 2.2 | Nd10 = 1.7552 | vd10 = 27.51 |
| r11 = 57.223 | d11 = D11 | | |
| r12 = Aperture stop | d12 = D12 | | |
| r13 = 7.919 (Aspheric surface) | d13 = 5.77 | Nd13 = 1.6935 | vd13 = 53.21 |
| r14 = −11.83 | d14 = 1 | Nd14 = 1.84666 | vd14 = 23.78 |
| r15 = 30.159 (Aspheric surface) | d15 = D15 | | |
| r16 = 31.89 | d16 = 0.6 | Nd16 = 1.48749 | vd16 = 70.23 |
| r17 = 9.783 | d17 = D17 | | |
| r18 = 9.927 (Aspheric surface) | d18 = 1.8 | Nd18 = 1.7432 | vd18 = 49.34 |
| r19 = −446.12 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 7.16645E−06
A6 = 2.11964E−07
A8 = 0.00000E+00

7th surface k = 0
A4 = −2.74688E−04
A6 = 1.59082E−05
A8 = −4.11894E−07

9th surface k = 0
A4 = −6.19261E−04
A6 = 1.66320E−05
A8 = −1.07465E−06

13th surface k = 0
A4 = 1.19177E−04

-continued

Numerical data 19

A6 = 1.52490E−06
A8 = 5.07043E−08
15th surface k = 0
A4 = 7.35553E−04
A6 = 6.73062E−06
A8 = 9.72233E−07
18th surface k = 0
A4 = −8.48549E−05
A6 = 7.84254E−06
A8 = −2.08776E−07

Zoom data
When D0 (distance from object up to 1st surface) is ∞

| | wide-angle end | intermediate | telephoto end |
|---|---|---|---|
| Focal length | 6.004 | 13.699 | 17.993 |
| FNO. | 2.88 | 4.93 | 6.03 |
| D6 | 0.8 | 6.9 | 8.34 |
| D11 | 8.93 | 2.83 | 1.38 |
| D12 | 11.66 | 3.89 | 1.19 |
| D15 | 1.21 | 12.03 | 14.22 |
| D17 | 1.52 | 2.04 | 3.34 |
| D19 | 4.87 | 1.31 | 0.51 |
| D23 | 1.36 | 1.36 | 1.36 |

Twentieth Embodiment

Figure 39:
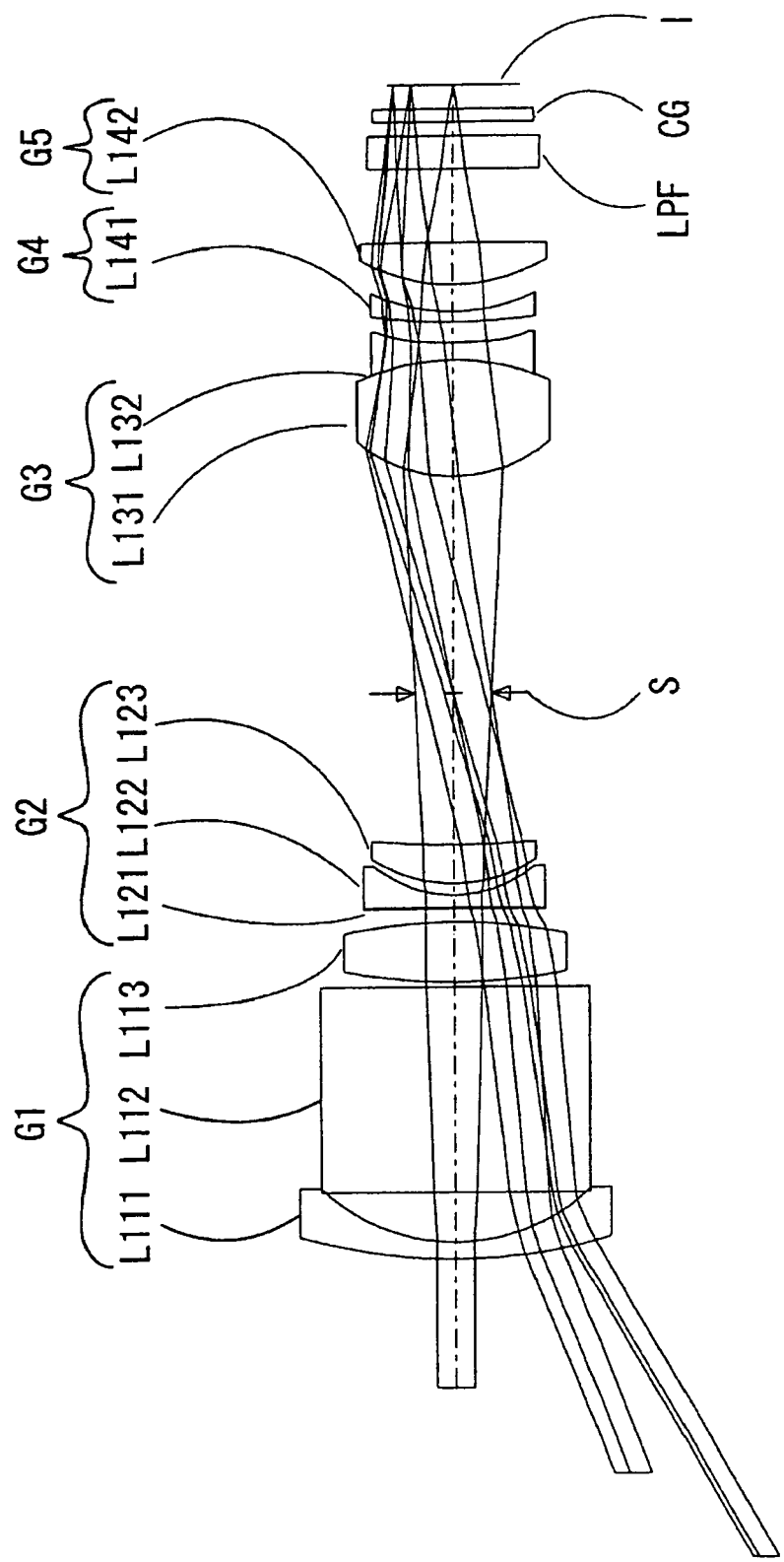
FIG. 39 is a cross-sectional view along the optical axis showing an optical arrangement at the time of the infinite object point focusing at the wide angle end of a zoom lens according to a twentieth embodiment of the present invention.

FIG. 39 is a cross-sectional view along the optical axis showing an optical arrangement at the time of the infinite object point focusing at the wide angle end of a zoom lens according to a twentieth embodiment of the present invention.

Figure 40A:
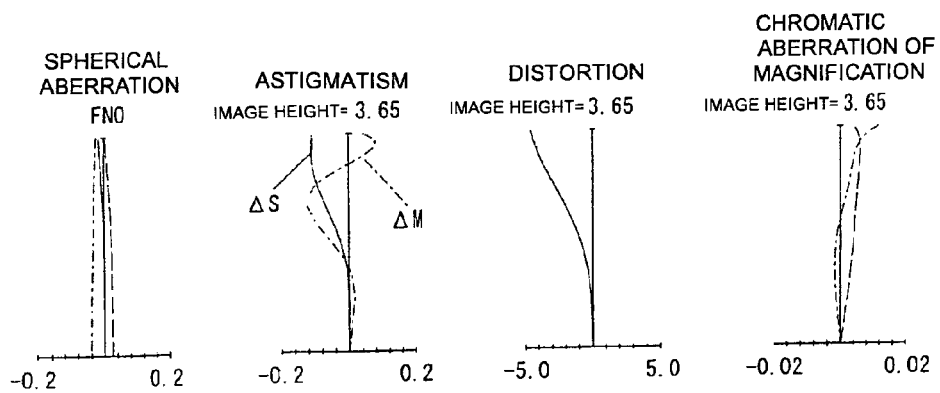
FIG. 40A, FIG. 40B, and FIG. 40C are diagrams showing the spherical aberration, the astigmatism, the distortion, and the chromatic aberration of magnification at the time of the infinite object point focusing of the zoom lens according to the twentieth embodiment, where.
Figure 40B:
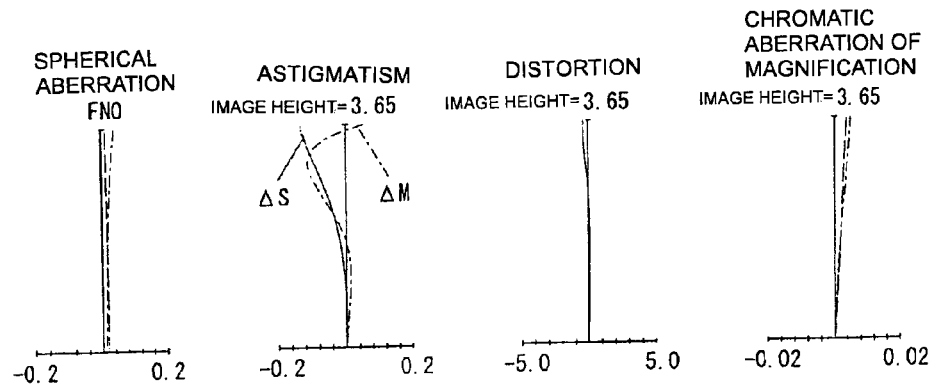
Figure 40C:
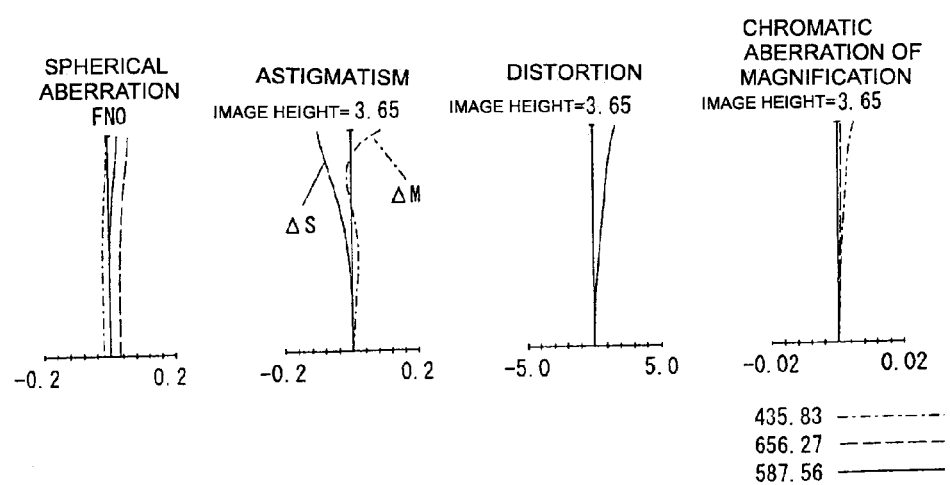

FIG. 40A, FIG. 40B, and FIG. 40C are diagrams showing the spherical aberration, the astigmatism, the distortion, and the chromatic aberration of magnification at the time of the infinite object point focusing of the zoom lens according to the twentieth embodiment, where, FIG. 40A shows the state at the wide angle end, FIG. 40B shows the intermediate state, and FIG. 40C shows the state at the telephoto end.

The zoom lens of the twentieth embodiment, as shown in FIG. 39, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a positive meniscus lens L121 having a convex surface directed toward an image side and a biconcave lens L122, and a positive meniscus lens L123 having a convex surface directed toward the object side, and has a negative refracting power as a whole. The positive meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the positive meniscus lens L121 having the convex surface directed toward the image side and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the twentieth embodiment will be enumerated.

Numerical data 20

| | | | |
|---|---|---|---|
| r1 = 28.665 | d1 = 1 | Nd1 = 1.8061 | vd1 = 40.92 |
| r2 = 10.332 | d2 = 2.9 | | |
| r3 = ∞ | d3 = 12 | Nd3 = 1.8061 | vd3 = 40.92 |
| r4 = ∞ | d4 = 0.3 | | |
| r5 = 31.049 (Aspheric surface) | d5 = 3.54 | Nd5 = 1.741 | vd5 = 52.64 |
| r6 = −27.405 | d6 = D6 | | |
| r7 = −597.656 (Aspheric surface) | d7 = 0.1 | Nd7 = 1.60258 | vd7 = 18.58 |
| r8 = −119.531 | d8 = 0.7 | Nd8 = 1.8044 | vd8 = 39.59 |
| r9 = 6.192 (Aspheric surface) | d9 = 0.7 | | |
| r10 = 7.977 | d10 = 2.2 | Nd10 = 1.7552 | vd10 = 27.51 |
| r11 = 44.985 | d11 = D11 | | |
| r12 = Aperture stop | d12 = D12 | | |
| r13 = 8.062 (Aspheric surface) | d13 = 6.69 | Nd13 = 1.6935 | vd13 = 53.21 |
| r14 = −12.133 | d14 = 1 | Nd14 = 1.84666 | vd14 = 23.78 |
| r15 = 25.526 (Aspheric surface) | d15 = D15 | | |
| r16 = 31.796 | d16 = 0.6 | Nd16 = 1.48749 | vd16 = 70.23 |
| r17 = 9.85 | d17 = D17 | | |
| r18 = 9.439 (Aspheric surface) | d18 = 2.42 | Nd18 = 1.7432 | vd18 = 49.34 |
| r19 = −317.346 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 1.05193E−05
A6 = 1.66357E−07
A8 = 0

7th surface k = 0
A4 = −2.89743E−06
A6 = −8.65818E−07
A8 = −3.60260E−08

-continued

Numerical data 20

9th surface k = 0
A4 = −2.70650E−04
A6 = 8.31779E−07
A8 = −4.74154E−07

13th surface k = 0
A4 = 5.75822E−05
A6 = 8.18087E−07
A8 = 1.34700E−08

15th surface k = 0
A4 = 6.34095E−04
A6 = 7.55761E−06
A8 = 6.75722E−07

18th surface k = 0
A4 = −9.39679E−05
A6 = 5.02231E−06
A8 = −1.47714E−07

Zoom data
When D0 (distance from object up to 1st surface) is ∞

|  | wide-angle end | intermediate | telephoto end |
|---|---|---|---|
| Focal length | 6.133 | 13.699 | 17.991 |
| FNO. | 2.88 | 4.79 | 6.09 |
| D6 | 0.78 | 7.36 | 8.04 |
| D11 | 8.65 | 2.07 | 1.39 |
| D12 | 12.47 | 4.62 | 1.19 |
| D15 | 1.2 | 12.36 | 16.53 |
| D17 | 1.58 | 0.99 | 1.32 |
| D19 | 4.3 | 1.58 | 0.5 |
| D23 | 1.36 | 1.36 | 1.36 |

Twenty First Embodiment

Figure 41:
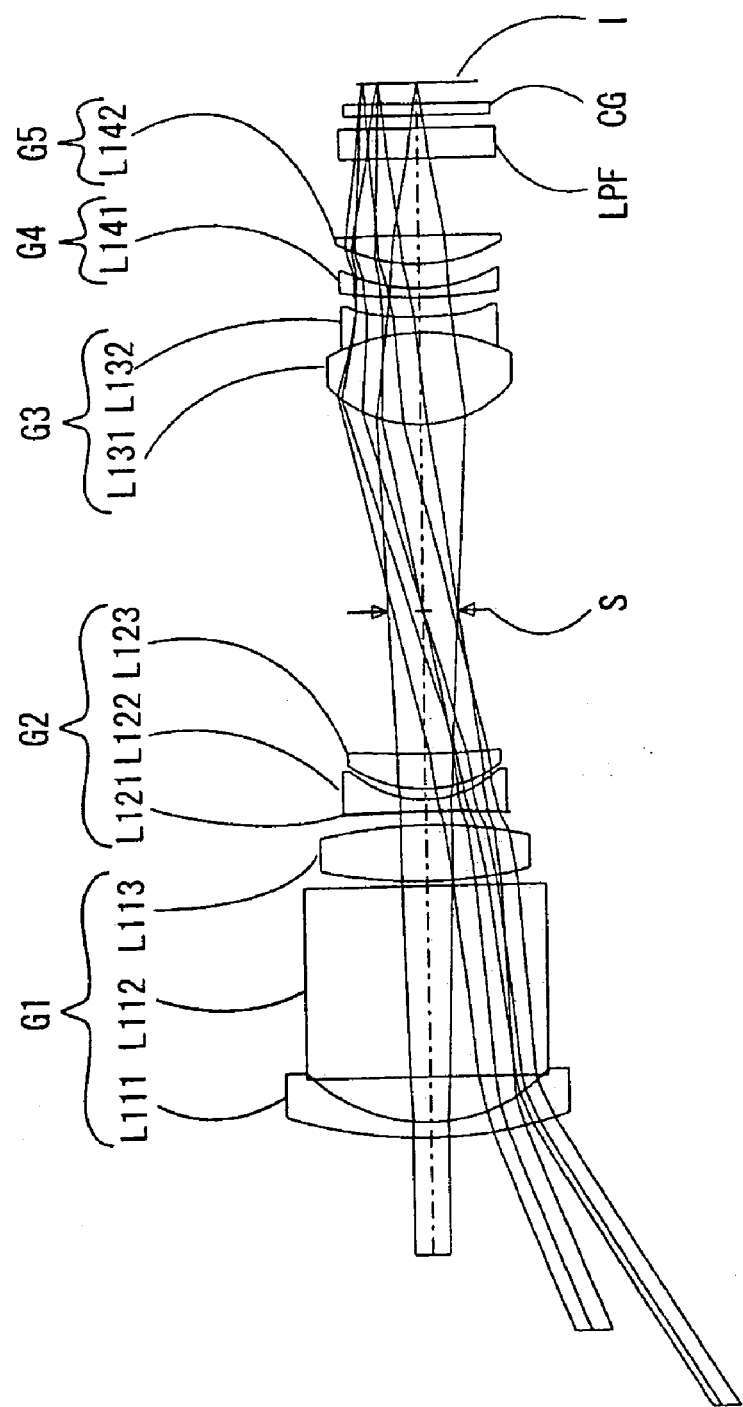
FIG. 41 is a cross-sectional view along the optical axis showing an optical arrangement at the time of the infinite object point focusing at the wide angle end of a zoom lens according to a twenty first embodiment of the present invention.

FIG. 41 is a cross-sectional view along the optical axis showing an optical arrangement at the time of the infinite object point focusing at the wide angle end of a zoom lens according to a twenty first embodiment of the present invention.

FIG. 42A, FIG. 42B, and FIG. 42C are diagrams showing the spherical aberration, the astigmatism, the distortion, and the chromatic aberration of magnification at the time of the infinite object point focusing of the zoom lens according to the twenty first embodiment, where, FIG. 42A shows the state at the wide angle end, FIG. 42B shows the intermediate state, and FIG. 42C shows the state at the telephoto end.

The zoom lens of the twenty first embodiment, as shown in FIG. 41, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a positive meniscus lens L121 having a convex surface directed toward an image side and a biconcave lens L122, and a positive meniscus lens L123 having a convex surface directed toward the object side, and has a negative refracting power as a whole. The positive meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the positive meniscus lens L121 having the convex surface directed toward the image side and a surface on the image side of the biconcave lens L122 in the second lens group G2, a surface on the object side of the biconvex lens L131 and a surface on the image side of the biconcave lens in the third lens group G3, and a surface on the object side of the biconvex lens L142 in the fifth lens group G5.

Next, numerical data of the twenty first embodiment will be enumerated.

Numerical data 21

| r1 = 26.273 | d1 = 1 | Nd1 = 1.8061 | vd1 = 40.92 |
|---|---|---|---|
| r2 = 9.996 | d2 = 2.9 | | |
| r3 = ∞ | d3 = 12 | Nd3 = 1.8061 | vd3 = 40.92 |
| r4 = ∞ | d4 = 0.3 | | |
| r5 = 29.453 (Aspheric surface) | d5 = 3.54 | Nd5 = 1.741 | vd5 = 52.64 |
| r6 = −27.281 | d6 = D6 | | |
| r7 = −427.470 (Aspheric surface) | d7 = 0.1 | Nd7 = 1.69556 | vd7 = 25.02 |
| r8 = −85.503 | d8 = 0.7 | Nd8 = 1.8044 | vd8 = 39.59 |
| r9 = 5.809 (Aspheric surface) | d9 = 0.7 | | |
| r10 = 7.788 | d10 = 2.2 | Nd10 = 1.7552 | vd10 = 27.51 |
| r11 = 57.059 | d11 = D11 | | |
| r12 = Aperture stop | d12 = D12 | | |
| r13 = 7.923 (Aspheric surface) | d13 = 5.77 | Nd13 = 1.6935 | vd13 = 53.21 |
| r14 = −11.824 | d14 = 1 | Nd14 = 1.84666 | vd14 = 23.78 |
| r15 = 30.104 (Aspheric surface) | d15 = D15 | | |
| r16 = 31.829 | d16 = 0.6 | Nd16 = 1.48749 | vd16 = 70.23 |
| r17 = 9.789 | d17 = D17 | | |
| r18 = 9.921 (Aspheric surface) | d18 = 1.8 | Nd18 = 1.7432 | vd18 = 49.34 |
| r19 = −432.356 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 7.43080E−06
A6 = 2.36674E−07
A8 = 0

-continued

Numerical data 21

7th surface k = 0
A4 = −2.72694E−04
A6 = 1.59428E−05
A8 = −4.43258E−07

9th surface k = 0
A4 = −6.24015E−04
A6 = 1.59447E−05
A8 = −1.12342E−06

13th surface k = 0
A4 = 1.19650E−04
A6 = 1.56558E−06
A8 = 5.16124E−08

15th surface k = 0
A4 = 7.34872E−04
A6 = 6.85852E−06
A8 = 1.00204E−06

18th surface k = 0
A4 = −8.49934E−05
A6 = 7.83157E−06
A8 = −1.99542E−07

Zoom data
When D0 (distance from object up to 1st surface) is ∞

| | wide-angle end | intermediate | telephoto end |
|---|---|---|---|
| Focal length | 6.022 | 13.693 | 17.99 |
| FNO. | 2.89 | 4.93 | 6.04 |
| D6 | 0.8 | 6.9 | 8.34 |
| D11 | 8.93 | 2.83 | 1.38 |
| D12 | 11.66 | 3.89 | 1.19 |
| D15 | 1.21 | 12.03 | 14.22 |
| D17 | 1.52 | 2.04 | 3.34 |
| D19 | 4.87 | 1.31 | 0.51 |
| D23 | 1.33 | 1.26 | 1.19 |

Twenty Second Embodiment

Figure 43:
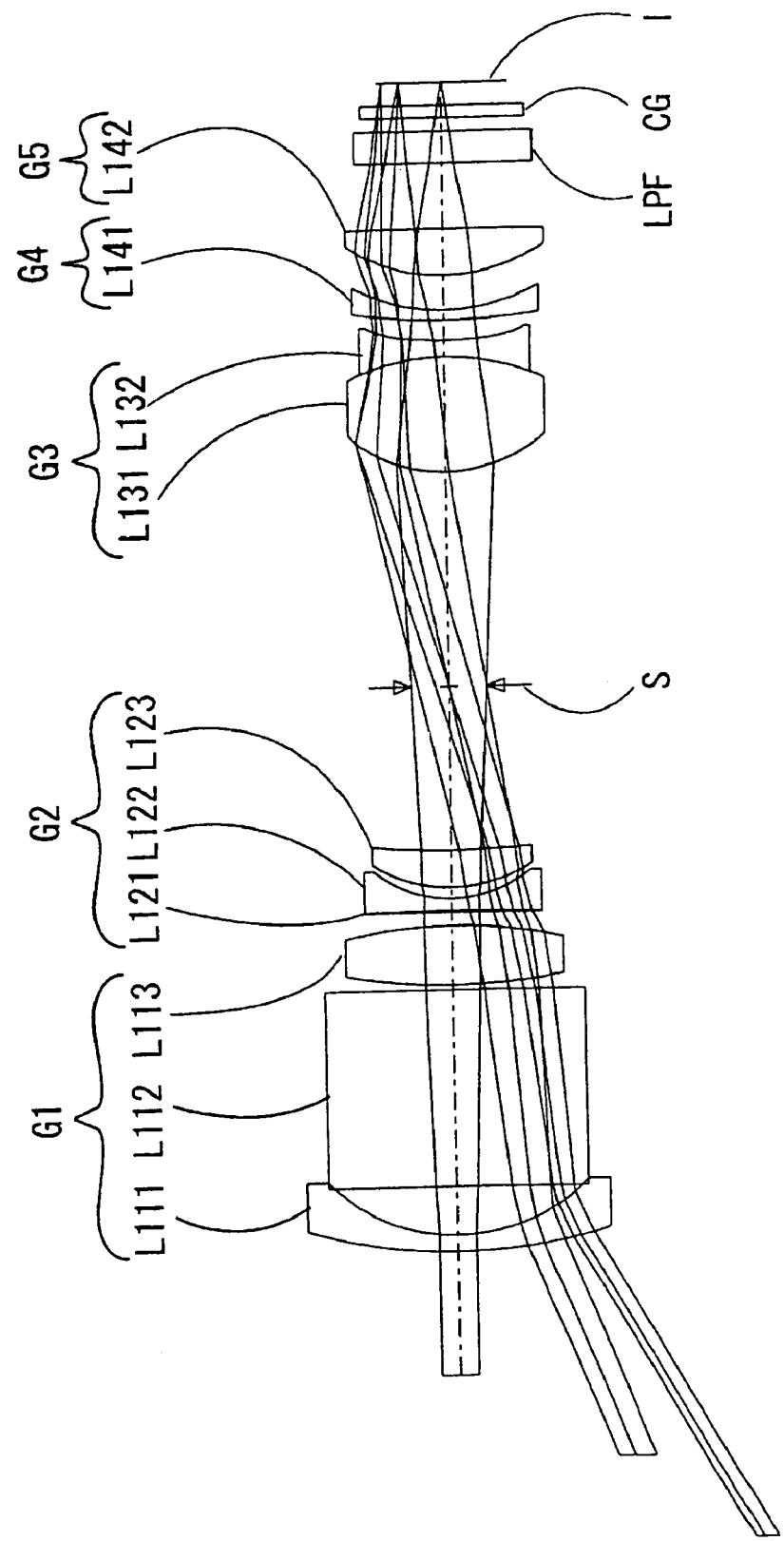
FIG. 43 is a cross-sectional view along the optical axis showing an optical arrangement at the time of the infinite object point focusing at the wide angle end of a zoom lens according to a twenty second embodiment of the present invention.

FIG. 43 is a cross-sectional view along the optical axis showing an optical arrangement at the time of the infinite object point focusing at the wide angle end of a zoom lens according to a twenty second embodiment of the present invention.

Figure 44A:
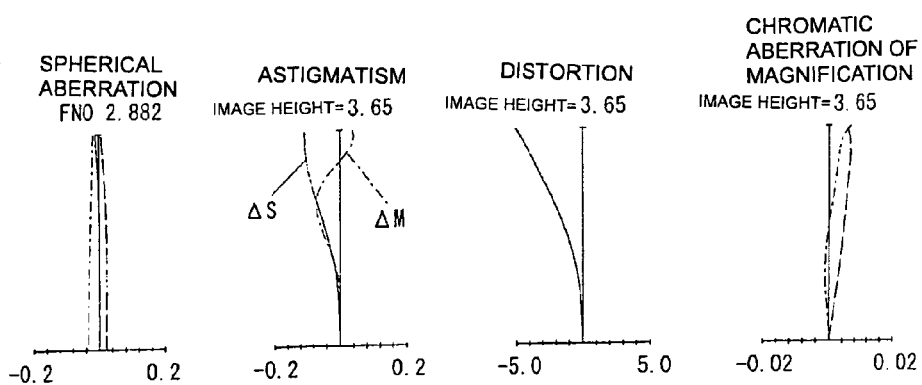
FIG. 44A, FIG. 44B, and FIG. 44C are diagrams showing the spherical aberration, the astigmatism, the distortion, and the chromatic aberration of magnification at the time of the infinite object point focusing of the zoom lens according to the twenty second embodiment, where.
Figure 44B:
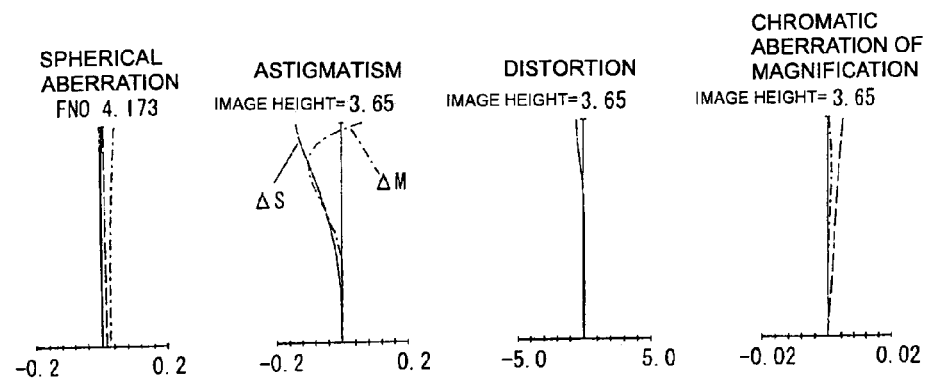
Figure 44C:
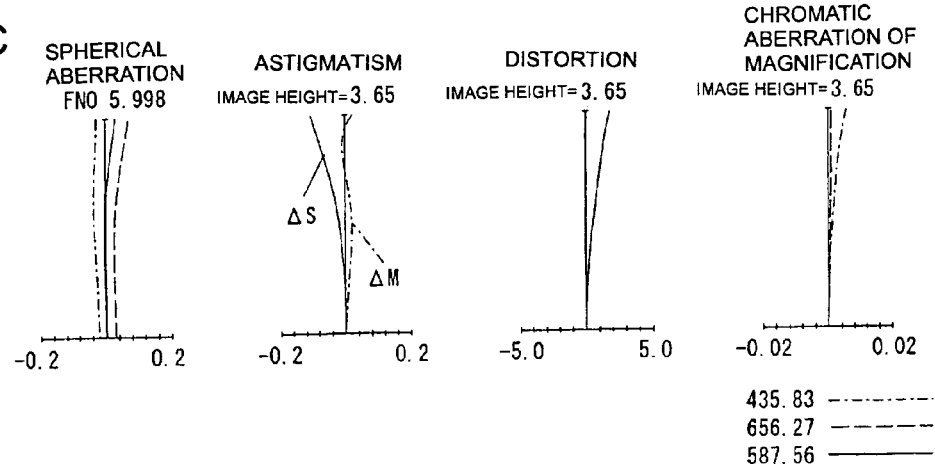

FIG. 44A, FIG. 44B, and FIG. 44C are diagrams showing the spherical aberration, the astigmatism, the distortion, and the chromatic aberration of magnification at the time of the infinite object point focusing of the zoom lens according to the twenty second embodiment, where, FIG. 44A shows the state at the wide angle end, FIG. 44B shows the intermediate state, and FIG. 44C shows the state at the telephoto end.

The zoom lens of the twenty second embodiment, as shown in FIG. 43, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a positive meniscus lens L121 having a convex surface directed toward an image side and a biconcave lens L122, and a positive meniscus lens L123 having a convex surface directed toward the object side, and has a negative refracting power as a whole. The positive meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side and then moves toward the object side, and the fifth lens group G5 moves toward the image side.

An aspheric surface is provided on a surface on the object side of the biconvex lens L113 in the first lens group G1, a surface on the object side of the positive meniscus lens L121 having the convex surface directed toward the image side and a surface on the image side of the biconcave lens L122 in the second lens group G2, a surface on the object side of the biconvex lens L131 and a surface on the image side of the biconcave lens in the third lens group G3, and a surface on the object side of the biconvex lens L142 in the fifth lens group G5.

Next, numerical data of the twenty second embodiment will be enumerated.

Numerical data 22

| | | | |
|---|---|---|---|
| r1 = 28.153 | d1 = 1 | Nd1 = 1.8061 | vd1 = 40.92 |
| r2 = 10.001 | d2 = 2.9 | | |
| r3 = ∞ | d3 = 12 | Nd3 = 1.8061 | vd3 = 40.92 |
| r4 = ∞ | d4 = 0.3 | | |
| r5 = 32.505 (Aspheric surface) | d5 = 3.54 | Nd5 = 1.741 | vd5 = 52.64 |
| r6 = −25.917 | d6 = D6 | | |
| r7 = −740.857 (Aspheric surface) | d7 = 0.1 | Nd7 = 1.72568 | vd7 = 18.68 |
| r8 = −148.171 | d8 = 0.7 | Nd8 = 1.8044 | vd8 = 39.59 |
| r9 = 6.310 (Aspheric surface) | d9 = 0.7 | | |
| r10 = 8.047 | d10 = 2.2 | Nd10 = 1.7552 | vd10 = 27.51 |
| r11 = 44.374 | d11 = D11 | | |
| r12 = Aperture stop | d12 = D12 | | |
| r13 = 8.280 (Aspheric surface) | d13 = 6.86 | Nd13 = 1.6935 | vd13 = 53.21 |
| r14 = −12.441 | d14 = 1 | Nd14 = 1.84666 | vd14 = 23.78 |
| r15 = 23.674 (Aspheric surface) | d15 = D15 | | |
| r16 = 32.089 | d16 = 0.6 | Nd16 = 1.48749 | vd16 = 70.23 |
| r17 = 10.246 | d17 = D17 | | |
| r18 = 8.999 (Aspheric surface) | d18 = 2.84 | Nd18 = 1.7432 | vd18 = 49.34 |
| r19 = −336.916 | d19 = D19 | | |
| r20 = ∞ | d20 = 1.9 | Nd20 = 1.54771 | vd20 = 62.84 |
| r21 = ∞ | d21 = 0.8 | | |

-continued

Numerical data 22

| r22 = ∞ | d22 = 0.75 | Nd22 = 1.51633 | vd22 = 64.14 |
|---|---|---|---|
| r23 = ∞ | d23 = D23 | | |

Aspherical coefficients

5th surface k = 0
A4 = 1.44713E−05
A6 = 1.83334E−07
A8 = 0

7th surface k = 0
A4 = 1.00296E−04
A6 = −2.66735E−06
A8 = −7.23998E−08

9th surface k = 0
A4 = −1.44775E−04
A6 = 1.13466E−06
A8 = −6.29859E−07

13th surface k = 0
A4 = 4.09141E−05
A6 = 1.46004E−06
A8 = −1.30523E−09

15th surface k = 0
A4 = 5.36585E−04
A6 = 9.23484E−06
A8 = 5.21540E−07

18th surface k = 0
A4 = −1.13762E−04
A6 = 2.57069E−06
A8 = −7.70554E−08

Zoom data
When D0 (distance from object up to 1st surface) is ∞

| | wide-angle end | intermediate | telephoto end |
|---|---|---|---|
| Focal length | 6.009 | 13.699 | 17.994 |
| FNO. | 2.88 | 4.75 | 6 |
| D6 | 0.8 | 8.29 | 9.18 |
| D11 | 9.78 | 2.28 | 1.39 |
| D12 | 12.74 | 4.65 | 1.19 |
| D15 | 1.2 | 12.65 | 17.78 |
| D17 | 2.07 | 1.02 | 0.52 |
| D19 | 3.98 | 1.67 | 0.5 |
| D23 | 1.36 | 1.36 | 1.36 |

Twenty Third Embodiment

Figure 45:
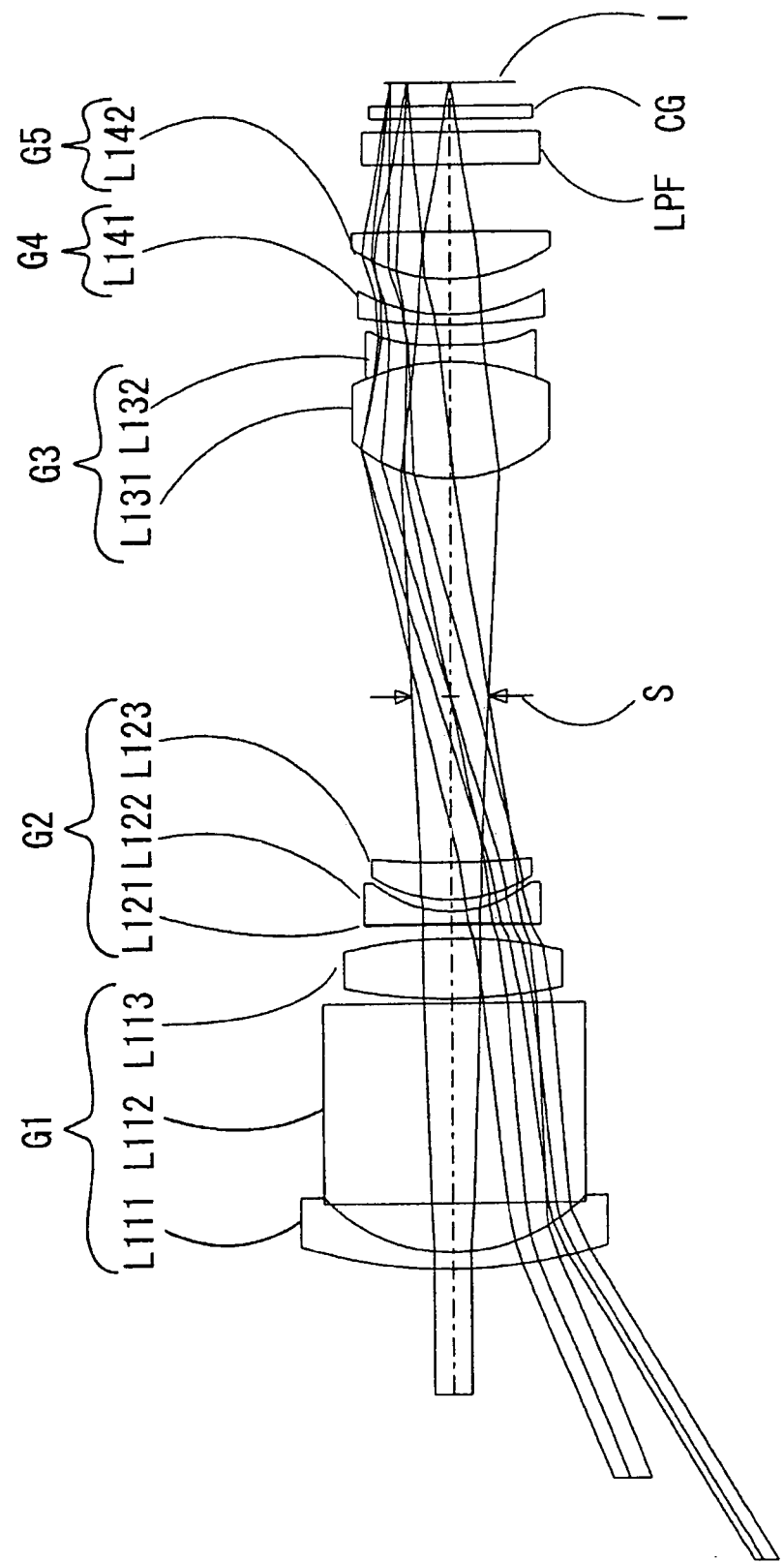
FIG. 45 is a cross-sectional view along the optical axis showing an optical arrangement at the time of the infinite object point focusing at the wide angle end of a zoom lens according to a twenty third embodiment of the present invention.

FIG. 45 is a cross-sectional view along the optical axis showing an optical arrangement at the time of the infinite object point focusing at the wide angle end of a zoom lens according to a twenty third embodiment of the present invention.

Figure 46A:
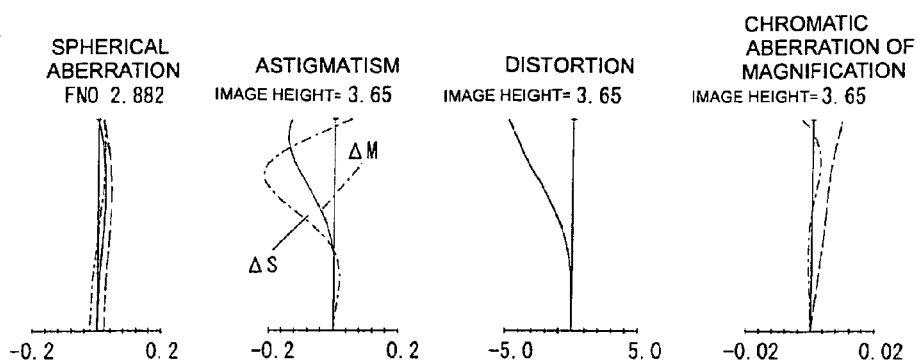
FIG. 46A, FIG. 46B, and FIG. 46C are diagrams showing the spherical aberration, the astigmatism, the distortion, and the chromatic aberration of magnification at the time of the infinite object point focusing of the zoom lens according to the twenty third embodiment, where.
Figure 46B:
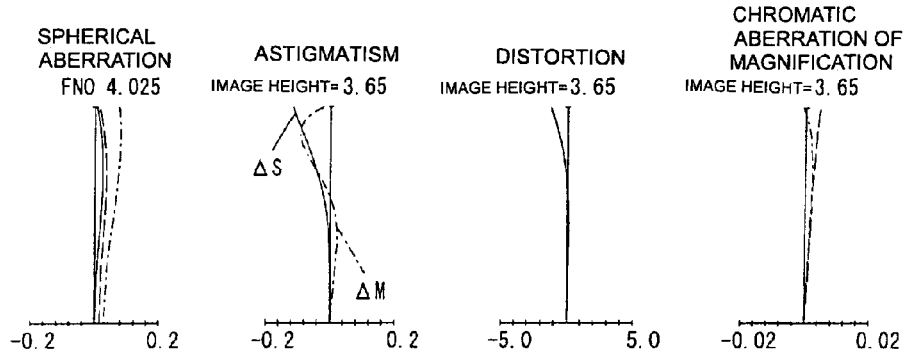
Figure 46C:
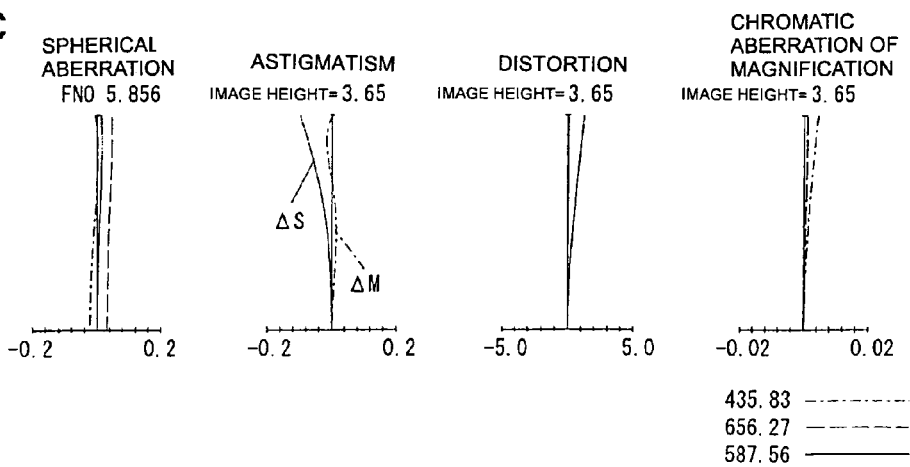

FIG. 46A, FIG. 46B, and FIG. 46C are diagrams showing the spherical aberration, the astigmatism, the distortion, and the chromatic aberration of magnification at the time of the infinite object point focusing of the zoom lens according to the twenty third embodiment, where, FIG. 46A shows the state at the wide angle end, FIG. 46B shows the intermediate state, and FIG. 46C shows the state at the telephoto end.

The zoom lens of the twenty third embodiment, as shown in FIG. 45, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a positive meniscus lens L121 having a convex surface directed toward an image side and a biconcave lens L122, and a positive meniscus lens L123 having a convex surface directed toward the object side, and has a negative refracting power as a whole. The positive meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the positive meniscus lens L121 having the convex surface directed toward the image side and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the twenty third embodiment will be enumerated.

Numerical data 23

| r1 = 28.511 | d1 = 1 | Nd1 = 1.8061 | vd1 = 40.92 |
|---|---|---|---|
| r2 = 9.994 | d2 = 2.9 | | |
| r3 = ∞ | d3 = 12 | Nd3 = 1.8061 | vd3 = 40.92 |
| r4 = ∞ | d4 = 0.3 | | |
| r5 = 38.094 | d5 = 3.54 | Nd5 = 1.741 | vd5 = 52.64 |
| (Aspheric surface) | | | |
| r6 = −24.225 | d6 = D6 | | |
| r7 = −1274.407 | d7 = 0.1 | Nd7 = 1.852 | vd7 = 14.02 |
| (Aspheric surface) | | | |
| r8 = −254.882 | d8 = 0.7 | Nd8 = 1.8044 | vd8 = 39.59 |
| r9 = 6.154 | d9 = 0.7 | | |
| (Aspheric surface) | | | |
| r10 = 7.986 | d10 = 2.2 | Nd10 = 1.7552 | vd10 = 27.51 |
| r11 = 49.528 | d11 = D11 | | |
| r12 = Aperture stop | d12 = D12 | | |
| r13 = 8.197 | d13 = 6.63 | Nd13 = 1.6935 | vd13 = 53.21 |
| (Aspheric surface) | | | |
| r14 = −12.225 | d14 = 1 | Nd14 = 1.84666 | vd14 = 23.78 |
| r15 = 24.043 | d15 = D15 | | |

-continued

Numerical data 23

(Aspheric surface)

| | | | |
|---|---|---|---|
| r16 = 32.547 | d16 = 0.6 | Nd16 = 1.48749 | vd16 = 70.23 |
| r17 = 9.657 | d17 = D17 | | |
| r18 = 9.134 | d18 = 3.3 | Nd18 = 1.7432 | vd18 = 49.34 |
| (Aspheric surface) | | | |
| r19 = −352.2 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 1.39794E−05
A6 = 4.83461E−08
A8 = 0

7th surface k = 0
A4 = −9.91992E−05
A6 = 9.49659E−06
A8 = −1.70473E−07

9th surface k = 0
A4 = −4.20046E−04
A6 = 1.34294E−05
A8 = −4.94118E−07

13th surface k = 0
A4 = 4.51915E−05
A6 = 1.87715E−06
A8 = 1.74240E−08

15th surface k = 0
A4 = 6.19553E−04
A6 = 3.11453E−07
A8 = 1.16717E−06

18th surface k = 0
A4 = −8.62916E−05
A6 = 2.48715E−06
A8 = −6.25373E−08

Zoom data
When D0 (distance from object up to 1st surface) is ∞

| | wide-angle end | intermediate | telephoto end |
|---|---|---|---|
| Focal length | 6.025 | 13.7 | 17.984 |
| FNO. | 2.88 | 4.64 | 5.86 |
| D6 | 0.78 | 9.1 | 10 |
| D11 | 10.6 | 2.28 | 1.38 |
| D12 | 12.19 | 4.66 | 1.18 |
| D15 | 1.18 | 12.47 | 17.95 |
| D17 | 2.51 | 1.08 | 0.33 |
| D19 | 4.09 | 1.76 | 0.5 |
| D23 | 1.36 | 1.36 | 1.36 |

Twenty Fourth Embodiment

Figure 47:
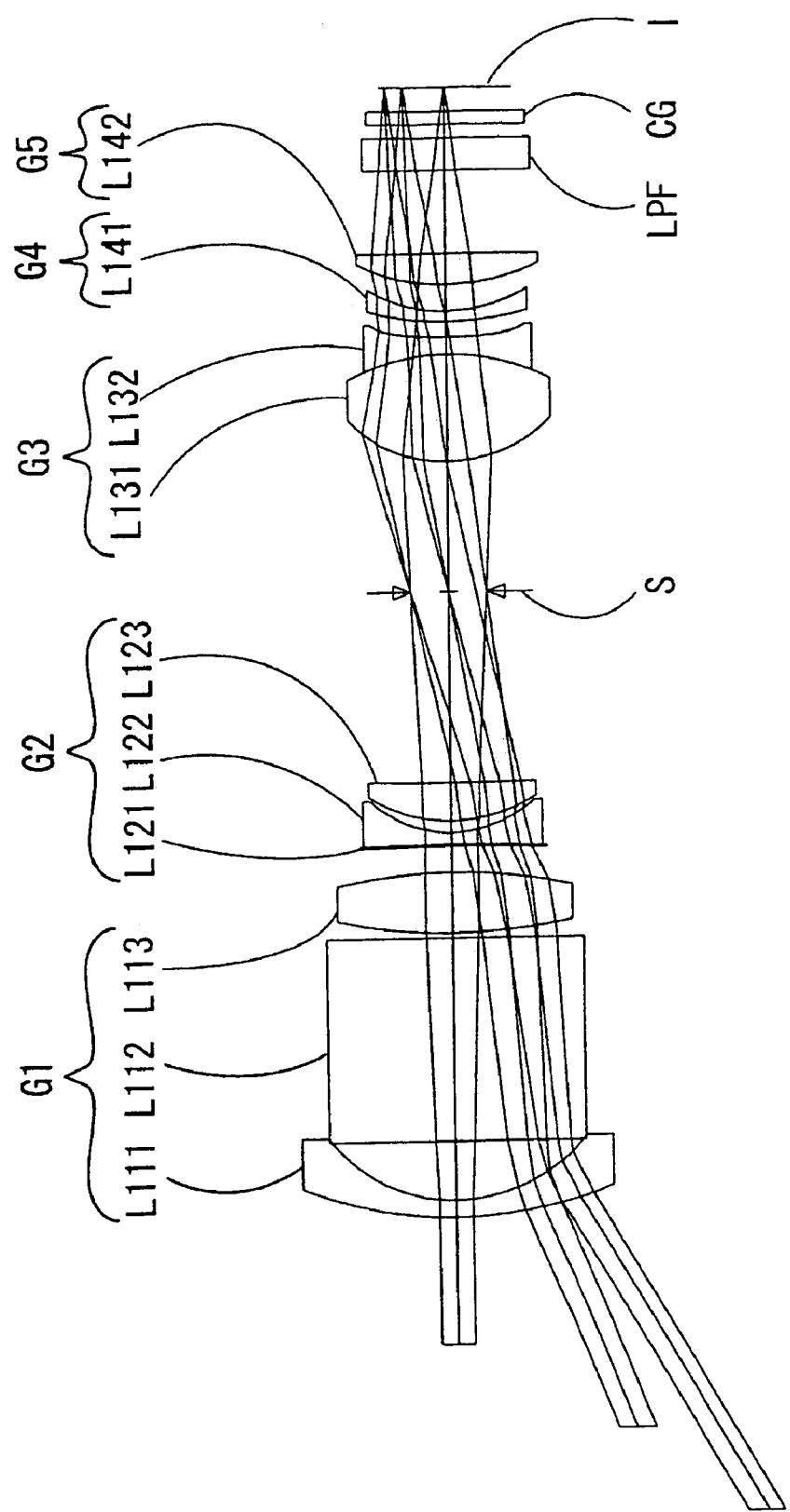
FIG. 47 is a cross-sectional view along the optical axis showing an optical arrangement at the time of the infinite object point focusing at the wide angle end of a zoom lens according to a twenty fourth embodiment of the present invention.

FIG. 47 is a cross-sectional view along the optical axis showing an optical arrangement at the time of the infinite object point focusing at the wide angle end of a zoom lens according to a twenty fourth embodiment of the present invention.

Figure 48A:
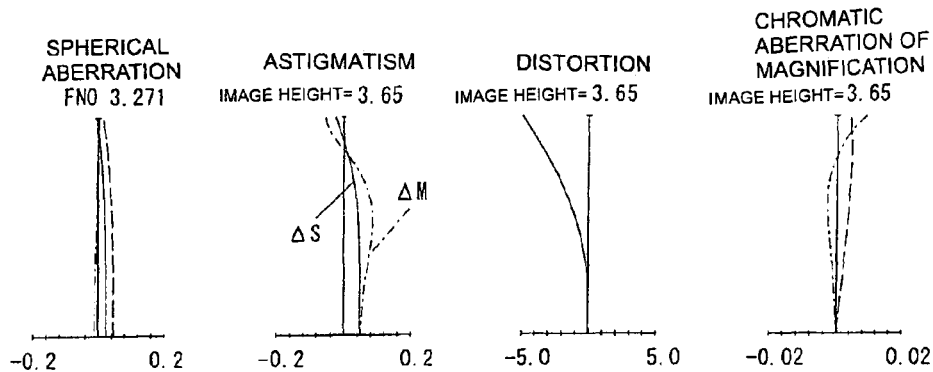
FIG. 48A, FIG. 48B, and FIG. 48C are diagrams showing the spherical aberration, the astigmatism, the distortion, and the chromatic aberration of magnification at the time of the infinite object point focusing of the zoom lens according to the twenty fourth embodiment, where.
Figure 48B:
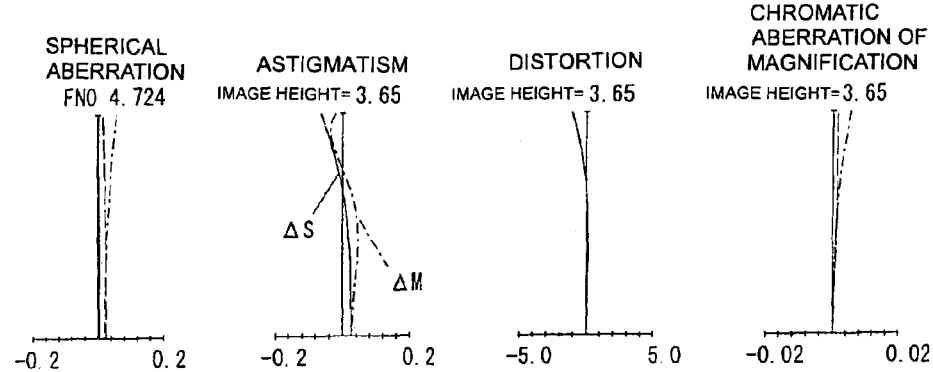
Figure 48C:
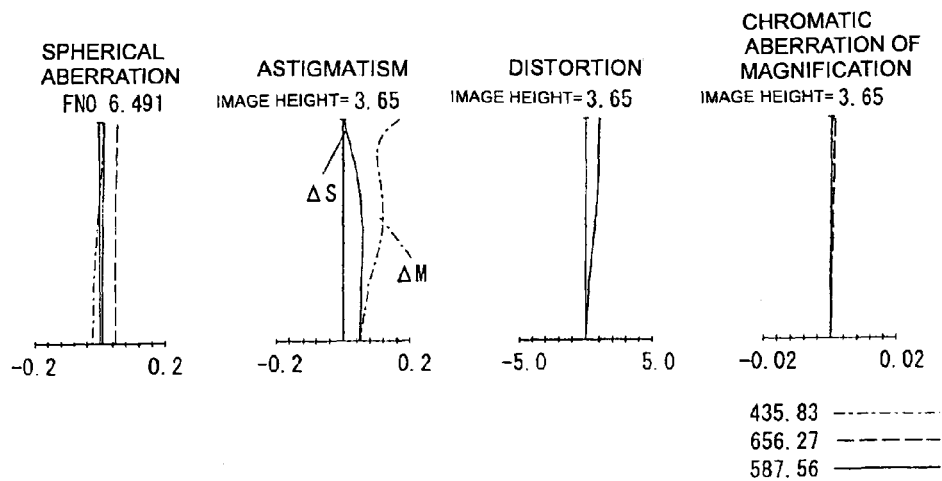

FIG. 48A, FIG. 48B, and FIG. 48C are diagrams showing the spherical aberration, the astigmatism, the distortion, and the chromatic aberration of magnification at the time of the infinite object point focusing of the zoom lens according to the twenty fourth embodiment, where, FIG. 48A shows the state at the wide angle end, FIG. 48B shows the intermediate state, and FIG. 48C shows the state at the telephoto end.

The zoom lens of the twenty fourth embodiment, as shown in FIG. 47, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a negative meniscus lens L121 having a convex surface directed toward an image side and a biconcave lens L122, and a positive meniscus lens L123 having a convex surface directed toward the object side, and has a negative refracting power as a whole. The negative meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the negative meniscus lens L121 having the convex surface directed toward the image side and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the twenty fourth embodiment will be enumerated.

Numerical data 24

| | | | |
|---|---|---|---|
| r1 = 22.06 | d1 = 1 | Nd1 = 1.8061 | vd1 = 40.92 |
| r2 = 8.728 | d2 = 3.48 | | |
| r3 = ∞ | d3 = 12 | Nd3 = 1.8061 | vd3 = 40.92 |
| r4 = ∞ | d4 = 0.3 | | |
| r5 = 30.986 | d5 = 3.54 | Nd5 = 1.741 | vd5 = 52.64 |
| (Aspheric surface) | | | |
| r6 = −27.99 | d6 = D6 | | |
| r7 = −115.268 | d7 = 0.1 | Nd7 = 1.65228 | vd7 = 12.75 |
| (Aspheric surface) | | | |
| r8 = −126.689 | d8 = 0.7 | Nd8 = 1.8044 | vd8 = 39.59 |
| r9 = 5.968 | d9 = 0.7 | | |

-continued

Numerical data 24

(Aspheric surface)
r10 = 8.311        d10 = 2.2      Nd10 = 1.7552    vd10 = 27.51
r11 = 176.709      d11 = D11
r12 = Aperture stop   d12 = D12
r13 = 7.790        d13 = 6.26     Nd13 = 1.6935    vd13 = 53.21
(Aspheric surface)
r14 = −11.462      d14 = 1        Nd14 = 1.84666   vd14 = 23.78
r15 = 28.003       d15 = D15
(Aspheric surface)
r16 = 15.819       d16 = 0.6      Nd16 = 1.48749   vd16 = 70.23
r17 = 8.139        d17 = D17
r18 = 11.145       d18 = 1.8      Nd18 = 1.7432    vd18 = 49.34
(Aspheric surface)
r19 = −741.85      d19 = D19
r20 = ∞            d20 = 1.9      Nd20 = 1.54771   vd20 = 62.84
r21 = ∞            d21 = 0.8
r22 = ∞            d22 = 0.75     Nd22 = 1.51633   vd22 = 64.14
r23 = ∞            d23 = D23

Aspherical coefficients

5th surface k = 0
A4 = 2.56867E−05
A6 = 2.52676E−07
A8 = 0

7th surface k = 0
A4 = −1.22696E−04
A6 = 8.55567E−06
A8 = −7.67236E−08

9th surface k = 0
A4 = −5.12267E−04
A6 = 4.37980E−06
A8 = −3.04805E−07

13th surface k = 0
A4 = 6.62474E−05
A6 = 1.59411E−06
A8 = 2.28358E−08

15th surface k = 0
A4 = 6.81156E−04
A6 = 1.15567E−05
A8 = 8.59263E−07

18th surface k = 0
A4 = −5.99348E−05
A6 = 9.65602E−06
A8 = −1.88588E−07

Zoom data
When D0 (distance from object up to 1st surface) is ∞

|  | wide-angle end | intermediate | telephoto end |
|---|---|---|---|
| Focal length | 6.1 | 13.42 | 17.995 |
| FNO. | 3.27 | 5.28 | 6.49 |
| D6 | 1.53 | 8.13 | 9.28 |
| D11 | 11.01 | 2.98 | 0.41 |
| D12 | 7.5 | 2.21 | 0.4 |
| D15 | 0.9 | 11.71 | 14.54 |
| D17 | 1.54 | 2.08 | 3.46 |
| D19 | 4.85 | 1.27 | 0.39 |
| D23 | 1.36 | 1.36 | 1.36 |

Twenty Fifth Embodiment

Figure 49:
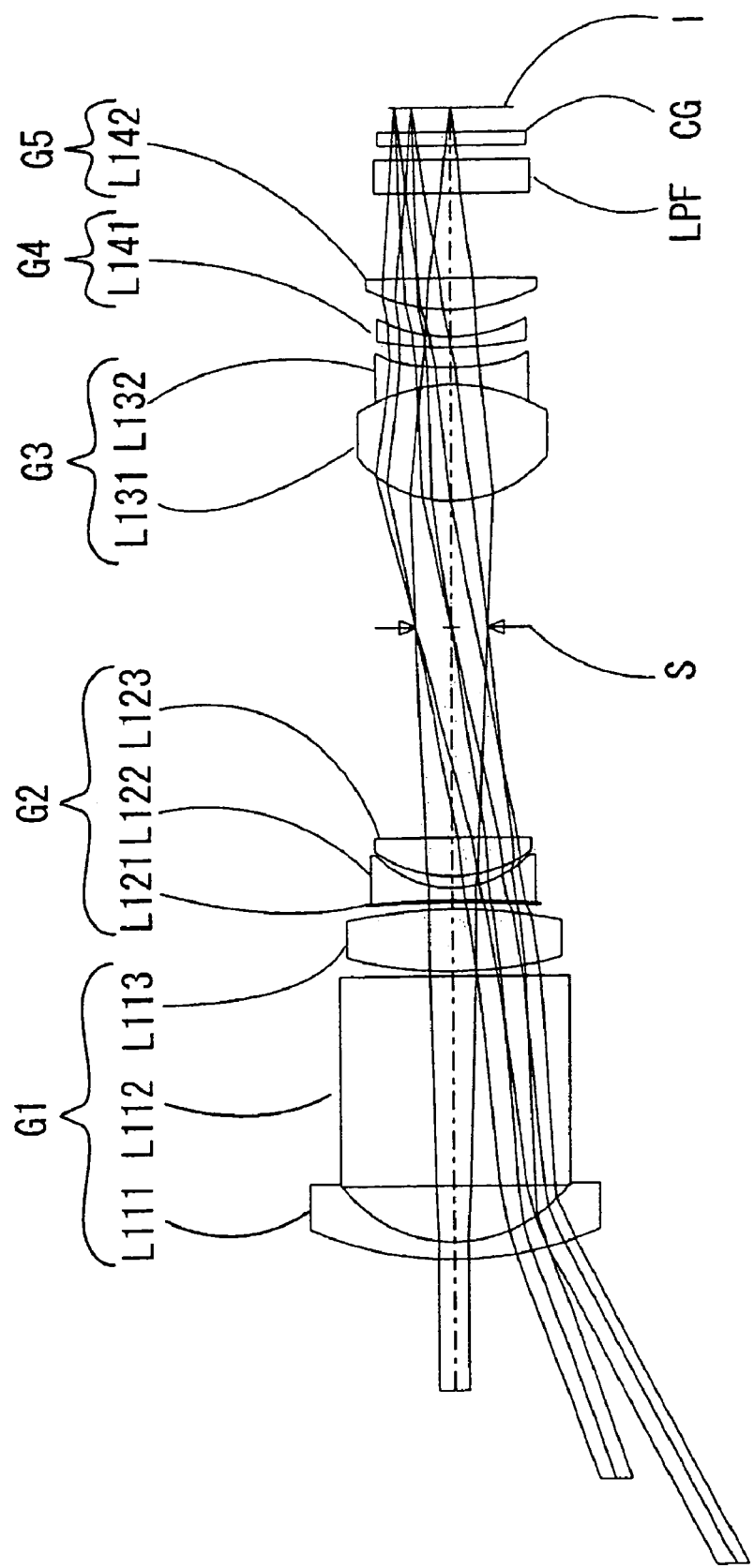
FIG. 49 is a cross-sectional view along the optical axis showing an optical arrangement at the time of the infinite object point focusing at the wide angle end of a zoom lens according to a twenty fifth embodiment of the present invention.

FIG. 49 is a cross-sectional view along the optical axis showing an optical arrangement at the time of the infinite object point focusing at the wide angle end of a zoom lens according to a twenty fifth embodiment of the present invention.

Figure 50A:
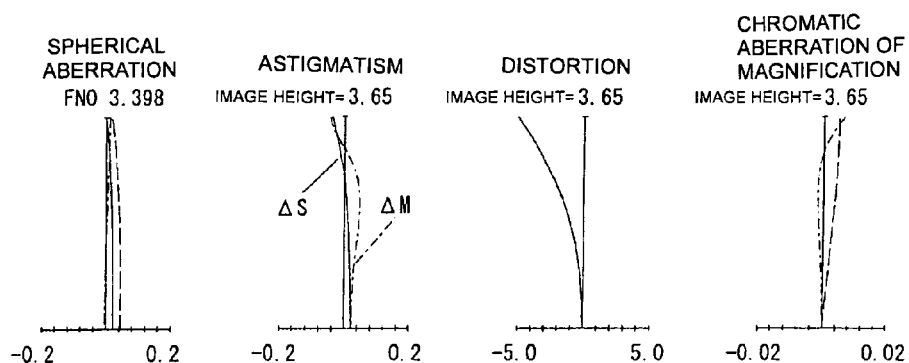
FIG. 50A, FIG. 50B, and FIG. 50C are diagrams showing the spherical aberration, the astigmatism, the distortion, and the chromatic aberration of magnification at the time of the infinite object point focusing of the zoom lens according to the twenty fifth embodiment, where.
Figure 50B:
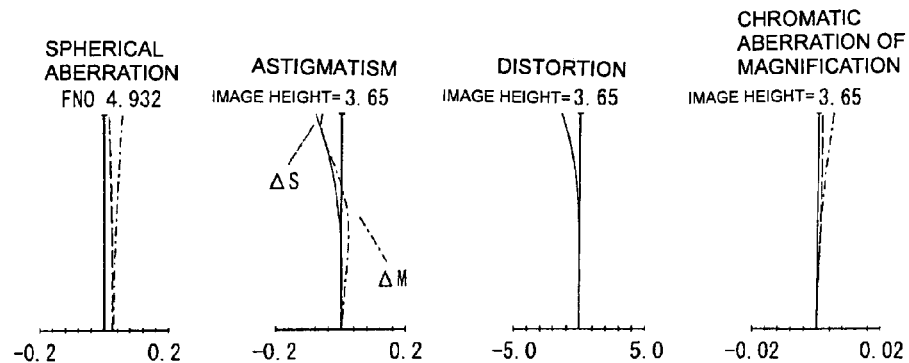
Figure 50C:
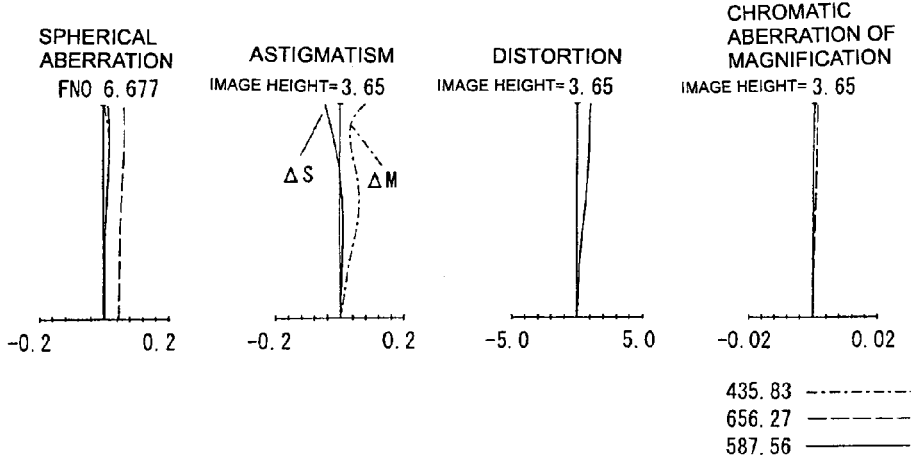

FIG. 50A, FIG. 50B, and FIG. 50C are diagrams showing the spherical aberration, the astigmatism, the distortion, and the chromatic aberration of magnification at the time of the infinite object point focusing of the zoom lens according to the twenty fifth embodiment, where, FIG. 50A shows the state at the wide angle end, FIG. 50B shows the intermediate state, and FIG. 50C shows the state at the telephoto end.

The zoom lens of the twenty fifth embodiment, as shown in FIG. 49, has in order from an object side thereof, a first lens group G1, a second lens group G2, an aperture stop S, a third lens group G3, a fourth lens group G4, and a fifth lens group G5. In the diagrams, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a negative meniscus lens L121 having a convex surface directed toward an image side and a biconcave lens L122, and a biconvex lens L123, and has a negative refracting power as a whole. The negative meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the negative meniscus lens L121 having the convex surface directed toward the image side and a surface on the image side of the biconcave lens L122 in the second lens group G2, a surface on the object side of the biconvex lens L131 and a surface on the image side of the biconcave lens in the third lens group G3, and a surface on the object side of the biconvex lens L142 in the fifth lens group G5.

Next, numerical data of the twenty fifth embodiment will be enumerated.

Numerical data 25 r1 = 22.209    d1 = 1       Nd1 = 1.8061    vd1 = 40.92
r2 = 8.697     d2 = 3.18

-continued

Numerical data 25

| | | | |
|---|---|---|---|
| r3 = ∞ | d3 = 12 | Nd3 = 1.8061 | vd3 = 40.92 |
| r4 = ∞ | d4 = 0.3 | | |
| r5 = 27.453 (Aspheric surface) | d5 = 3.54 | Nd5 = 1.741 | vd5 = 52.64 |
| r6 = −31.911 | d6 = D6 | | |
| r7 = −75.168 (Aspheric surface) | d7 = 0.1 | Nd7 = 1.59885 | vd7 = 6.52 |
| r8 = −83.815 | d8 = 0.7 | Nd8 = 1.8044 | vd8 = 39.59 |
| r9 = 5.799 (Aspheric surface) | d9 = 0.7 | | |
| r10 = 8.228 | d10 = 2.2 | Nd10 = 1.7552 | vd10 = 27.51 |
| r11 = −407.116 | d11 = D11 | | |
| r12 = Aperture stop | d12 = D12 | | |
| r13 = 7.739 (Aspheric surface) | d13 = 6.54 | Nd13 = 1.6935 | vd13 = 53.21 |
| r14 = −10.834 | d14 = 1 | Nd14 = 1.84666 | vd14 = 23.78 |
| r15 = 27.091 (Aspheric surface) | d15 = D15 | | |
| r16 = 25.56 | d16 = 0.6 | Nd16 = 1.48749 | vd16 = 70.23 |
| r17 = 9.672 | d17 = D17 | | |
| r18 = 11.326 (Aspheric surface) | d18 = 1.8 | Nd18 = 1.7432 | vd18 = 49.34 |
| r19 = −227.342 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 2.88429E−05
A6 = 2.98793E−07
A8 = 0

7th surface k = 0
A4 = −2.83811E−05
A6 = 1.81353E−06
A8 = 1.62198E−08

9th surface k = 0
A4 = −4.89938E−04
A6 = −2.91999E−06
A8 = −3.73006E−07

13th surface k = 0
A4 = 5.58218E−05
A6 = 1.85250E−06
A8 = −3.45414E−09

15th surface k = 0
A4 = 6.90896E−04
A6 = 1.56789E−05
A8 = 7.47064E−07

18th surface k = 0
A4 = −8.76384E−05
A6 = 8.91453E−06
A8 = −1.89454E−07

Zoom data
When D0 (distance from object up to 1st surface) is ∞

| | wide-angle end | intermediate | telephoto end |
|---|---|---|---|
| Focal length | 6.1 | 13.42 | 17.995 |
| FNO. | 3.4 | 5.52 | 6.68 |
| D6 | 0.41 | 7.3 | 8.56 |
| D11 | 11.8 | 3.71 | 0.48 |
| D12 | 7.08 | 1.49 | 0.4 |

-continued

Numerical data 25

| | | | |
|---|---|---|---|
| D15 | 1.1 | 11.71 | 14.56 |
| D17 | 1.54 | 2.07 | 3.45 |
| D19 | 4.85 | 1.28 | 0.4 |
| D23 | 1.36 | 1.36 | 1.36 |

Twenty Sixth Embodiment

Figure 51:
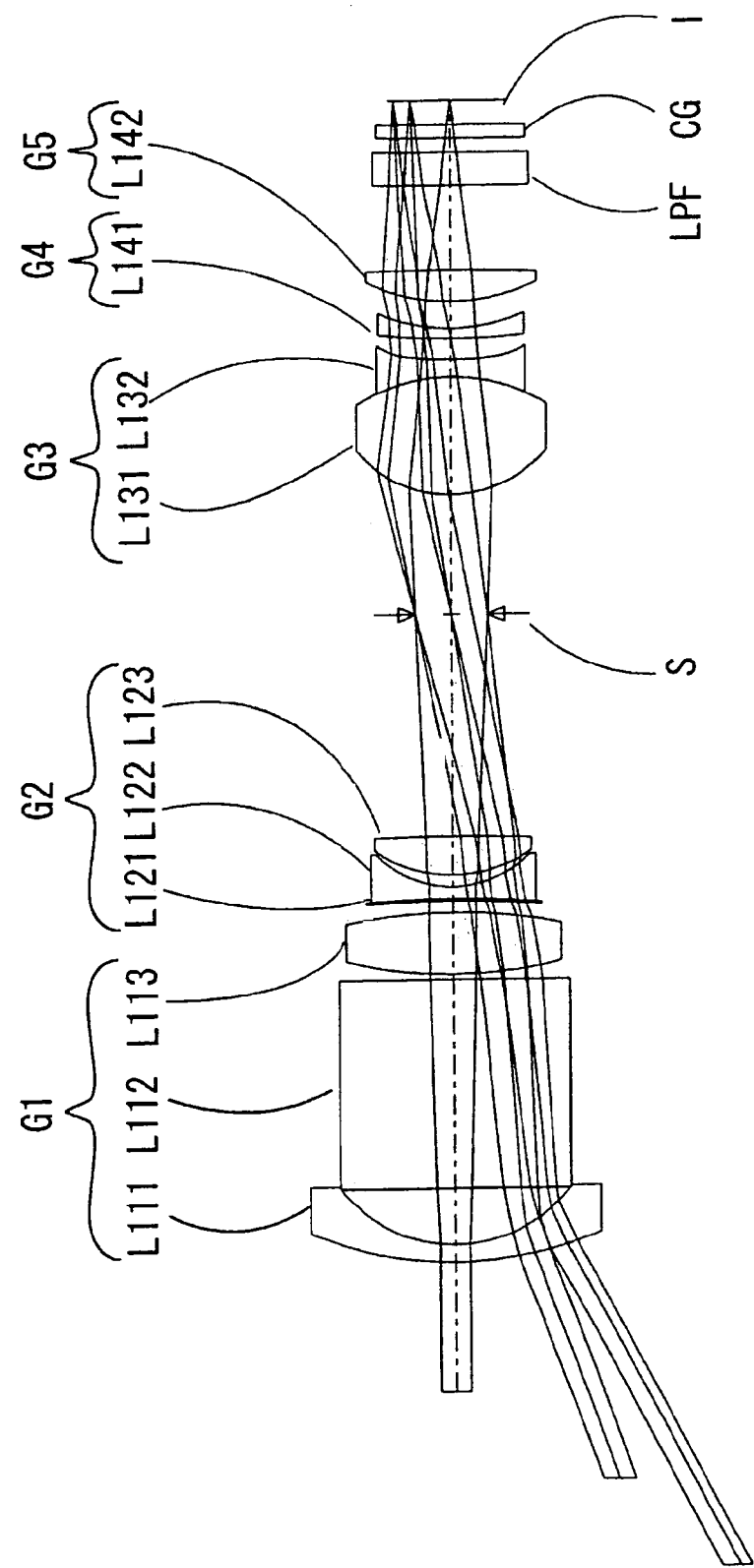
FIG. 51 is a cross-sectional view along the optical axis showing an optical arrangement at the time of the infinite object point focusing at the wide angle end of a zoom lens according to a twenty sixth embodiment of the present invention.

FIG. 51 is a cross-sectional view along the optical axis showing an optical arrangement at the time of the infinite object point focusing at the wide angle end of a zoom lens according to a twenty sixth embodiment of the present invention.

Figure 52A:
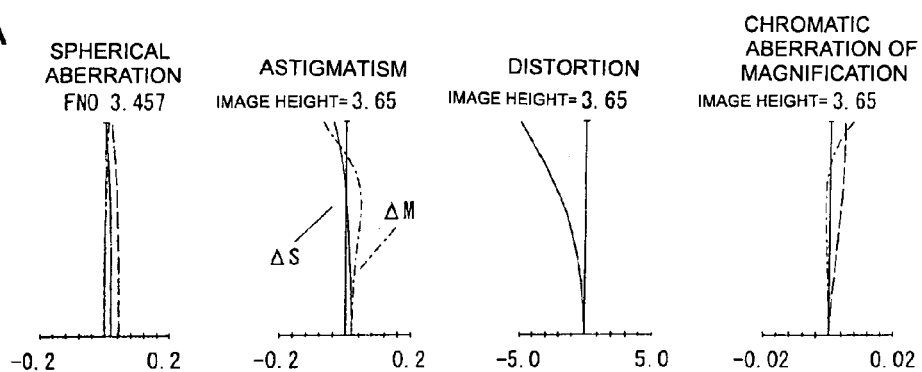
FIG. 52A, FIG. 52B, and FIG. 52C are diagrams showing the spherical aberration, the astigmatism, the distortion, and the chromatic aberration of magnification at the time of the infinite object point focusing of the zoom lens according to the twenty sixth embodiment, where.
Figure 52B:
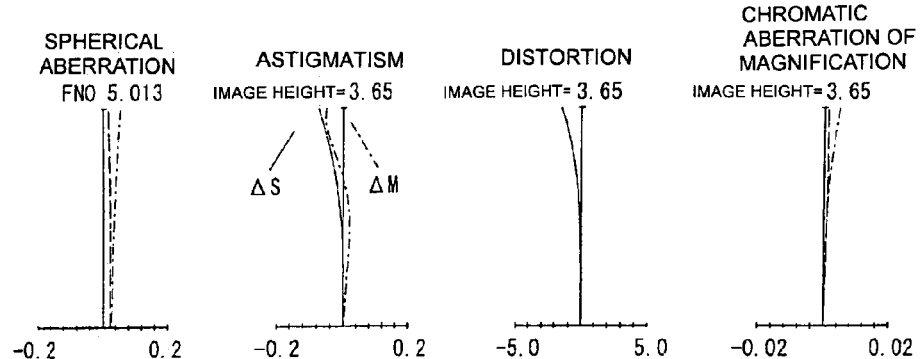
Figure 52C:
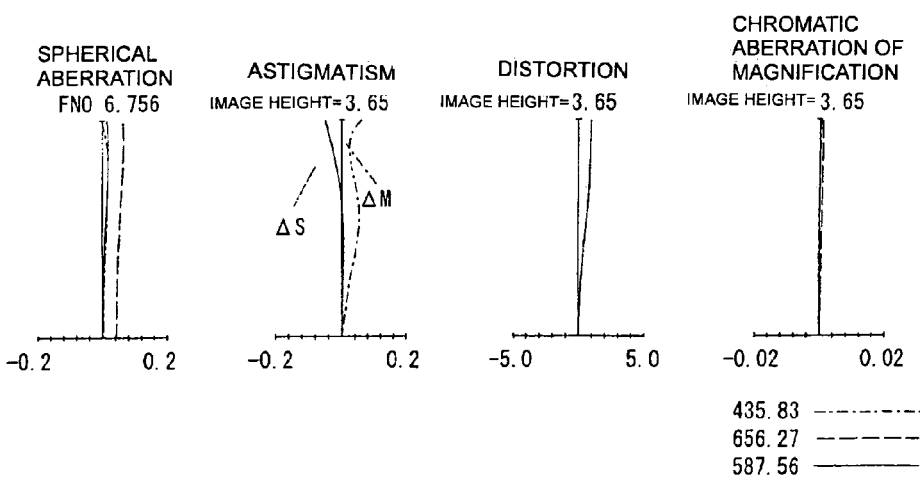

FIG. 52A, FIG. 52B, and FIG. 52C are diagrams showing the spherical aberration, the astigmatism, the distortion, and the chromatic aberration of magnification at the time of the infinite object point focusing of the zoom lens according to the twenty sixth embodiment, where, FIG. 52A shows the state at the wide angle end, FIG. 52B shows the intermediate state, and FIG. 52C shows the state at the telephoto end.

The zoom lens of the twenty sixth embodiment, as shown in FIG. 51, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a negative meniscus lens L121 having a convex surface directed toward an image side and a biconcave lens L122, and a biconvex lens L123, and has a negative refracting power as a whole. The negative meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the negative meniscus lens L121 having the convex surface directed toward the image side and a surface on the image side of the biconcave lens L122 in the second lens group G2, a surface on the object side of the biconvex lens L131 and a surface on the image side of the biconcave lens in the third lens group G3, and a surface on the object side of the biconvex lens L142 in the fifth lens group G5.

Next, numerical data of the twenty sixth embodiment will be enumerated.

Numerical data 26

| | | | |
|---|---|---|---|
| r1 = 22.655 | d1 = 1 | Nd1 = 1.8061 | vd1 = 40.92 |
| r2 = 8.785 | d2 = 3.24 | | |
| r3 = ∞ | d3 = 12 | Nd3 = 1.8061 | vd3 = 40.92 |
| r4 = ∞ | d4 = 0.3 | | |
| r5 = 28.098 (Aspheric surface) | d5 = 3.54 | Nd5 = 1.741 | vd5 = 52.64 |
| r6 = −33.03 | d6 = D6 | | |
| r7 = −73.397 (Aspheric surface) | d7 = 0.1 | Nd7 = 1.79525 | vd7 = 9.95 |
| r8 = −88.456 | d8 = 0.7 | Nd8 = 1.8044 | vd8 = 39.59 |
| r9 = 5.854 (Aspheric surface) | d9 = 0.7 | | |
| r10 = 8.306 | d10 = 2.2 | Nd10 = 1.7552 | vd10 = 27.51 |
| r11 = −244.362 | d11 = D11 | | |
| r12 = Aperture stop | d12 = D12 | | |
| r13 = 7.717 (Aspheric surface) | d13 = 6.62 | Nd13 = 1.6935 | vd13 = 53.21 |
| r14 = −10.82 | d14 = 1 | Nd14 = 1.84666 | vd14 = 23.78 |
| r15 = 26.804 (Aspheric surface) | d15 = D15 | | |
| r16 = 38.158 | d16 = 0.6 | Nd16 = 1.48749 | vd16 = 70.23 |
| r17 = 10.759 | d17 = D17 | | |
| r18 = 11.628 (Aspheric surface) | d18 = 1.8 | Nd18 = 1.7432 | vd18 = 49.34 |
| r19 = −136.914 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 2.99107E−05
A6 = 2.84593E−07
A8 = 0

7th surface k = 0
A4 = −1.93689E−05
A6 = 1.33119E−06
A8 = 2.74251E−08

9th surface k = 0
A4 = −4.76470E−04
A6 = −3.16782E−06
A8 = −3.04345E−07

13th surface k = 0
A4 = 5.07612E−05
A6 = 1.80052E−06
A8 = −5.82045E−09

15th surface k = 0
A4 = 6.95232E−04
A6 = 1.61806E−05
A8 = 7.52248E−07

18th surface k = 0
A4 = −9.66932E−05
A6 = 8.24751E−06
A8 = −1.78280E−07

Zoom data
When D0 (distance from object up to 1st surface) is ∞

| | wide-angle end | intermediate | telephoto end |
|---|---|---|---|
| Focal length | 6.1 | 13.414 | 17.987 |
| FNO. | 3.46 | 5.61 | 6.76 |
| D6 | 0.64 | 7.62 | 8.96 |
| D11 | 12.56 | 3.88 | 0.5 |
| D12 | 6.75 | 1.31 | 0.4 |
| D15 | 1.16 | 11.69 | 14.54 |
| D17 | 1.54 | 2.07 | 3.45 |
| D19 | 4.85 | 1.28 | 0.4 |
| D23 | 1.36 | 1.36 | 1.36 |

Twenty Seventh Embodiment

Figure 53:
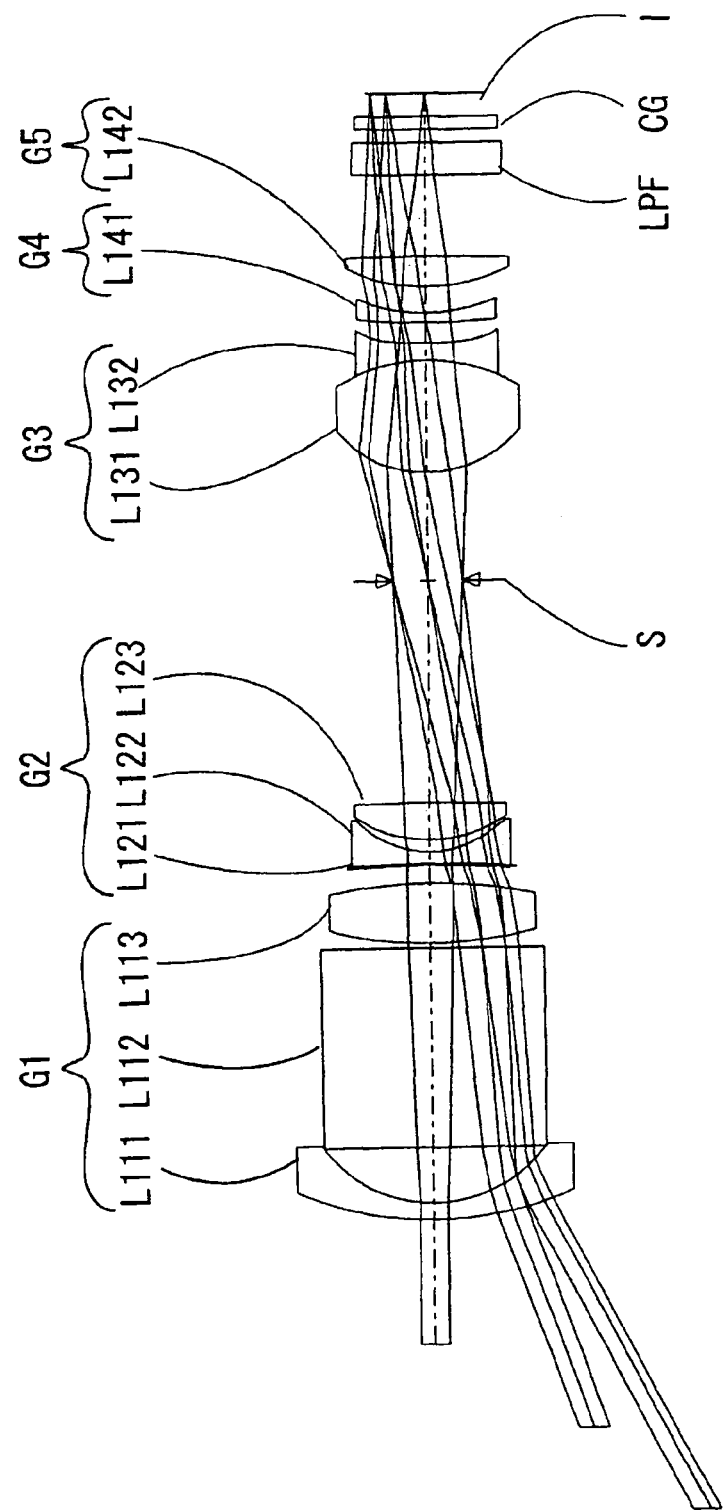
FIG. 53 is a cross-sectional view along the optical axis showing an optical arrangement at the time of the infinite object point focusing at the wide angle end of a zoom lens according to a twenty seventh embodiment of the present invention.

FIG. 53 is a cross-sectional view along the optical axis showing an optical arrangement at the time of the infinite object point focusing at the wide angle end of a zoom lens according to a twenty seventh embodiment of the present invention.

FIG. 54A, FIG. 54B, and FIG. 54C are diagrams showing the spherical aberration, the astigmatism, the distortion, and the chromatic aberration of magnification at the time of the infinite object point focusing of the zoom lens according to the twenty seventh embodiment, where, FIG. 54A shows the state at the wide angle end, FIG. 54B shows the intermediate state, and FIG. 54C shows the state at the telephoto end.

The zoom lens of the twenty seventh embodiment, as shown in FIG. 53, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a negative meniscus lens L121 having a convex surface directed toward an image side and a biconcave lens L122, and a biconvex lens L123, and has a negative refracting power as a whole. The negative meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the negative meniscus lens L121 having the convex surface directed toward the image side and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the twenty seventh embodiment will be enumerated.

Numerical data 27

| | | | |
|---|---|---|---|
| r1 = 22.918 | d1 = 1 | Nd1 = 1.8061 | vd1 = 40.92 |
| r2 = 8.816 | d2 = 3.29 | | |
| r3 = ∞ | d3 = 12 | Nd3 = 1.8061 | vd3 = 40.92 |
| r4 = ∞ | d4 = 0.3 | | |
| r5 = 28.613 | d5 = 3.54 | Nd5 = 1.741 | vd5 = 52.64 |
| (Aspheric surface) | | | |
| r6 = −32.117 | d6 = D6 | | |
| r7 = −65.160 | d7 = 0.1 | Nd7 = 1.9712 | vd7 = 12.88 |
| (Aspheric surface) | | | |
| r8 = −81.741 | d8 = 0.7 | Nd8 = 1.8044 | vd8 = 39.59 |
| r9 = 5.883 | d9 = 0.7 | | |
| (Aspheric surface) | | | |
| r10 = 8.372 | d10 = 2.2 | Nd10 = 1.7552 | vd10 = 27.51 |
| r11 = −174.482 | d11 = D11 | | |
| r12 = Aperture stop | d12 = D12 | | |
| r13 = 7.706 | d13 = 6.66 | Nd13 = 1.6935 | vd13 = 53.21 |
| (Aspheric surface) | | | |
| r14 = −10.835 | d14 = 1 | Nd14 = 1.84666 | vd14 = 23.78 |
| r15 = 26.735 | d15 = D15 | | |
| (Aspheric surface) | | | |
| r16 = 45.204 | d16 = 0.6 | Nd16 = 1.48749 | vd16 = 70.23 |
| r17 = 11.103 | d17 = D17 | | |
| r18 = 11.758 | d18 = 1.8 | Nd18 = 1.7432 | vd18 = 49.34 |
| (Aspheric surface) | | | |
| r19 = −117.417 | d19 = D19 | | |
| r20 = ∞ | d20 = 1.9 | Nd20 = 1.54771 | vd20 = 62.84 |
| r21 = ∞ | d21 = 0.8 | | |
| r22 = ∞ | d22 = 0.75 | Nd22 = 1.51633 | vd22 = 64.14 |
| r23 = ∞ | d23 = D23 | | |

Aspherical coefficients

5th surface k = 0
A4 = 2.87784E−05
A6 = 2.66348E−07
A8 = 0

7th surface k = 0
A4 = −1.38102E−05
A6 = 1.38465E−06
A8 = 2.55312E−08

9th surface k = 0
A4 = −4.75969E−04
A6 = −3.07587E−06
A8 = −2.61770E−07

13th surface k = 0
A4 = 4.93597E−05

-continued

Numerical data 27

A6 = 1.70693E−06
A8 = −4.25329E−09

15th surface k = 0
A4 = 7.00683E−04
A6 = 1.60807E−05
A8 = 7.69068E−07

18th surface k = 0
A4 = −9.75190E−05
A6 = 7.97130E−06
A8 = −1.72283E−07

Zoom data
When D0 (distance from object up to 1st surface) is ∞

| | wide-angle end | intermediate | telephoto end |
|---|---|---|---|
| Focal length | 6.1 | 13.42 | 17.995 |
| FNO. | 3.5 | 5.64 | 6.81 |
| D6 | 1.05 | 7.71 | 9.02 |
| D11 | 13.1 | 3.96 | 0.63 |
| D12 | 6.34 | 1.25 | 0.33 |
| D15 | 1.21 | 11.71 | 14.56 |
| D17 | 1.54 | 2.07 | 3.45 |
| D19 | 4.85 | 1.28 | 0.4 |
| D23 | 1.36 | 1.36 | 1.36 |

Twenty Eighth Embodiment

Figure 55:
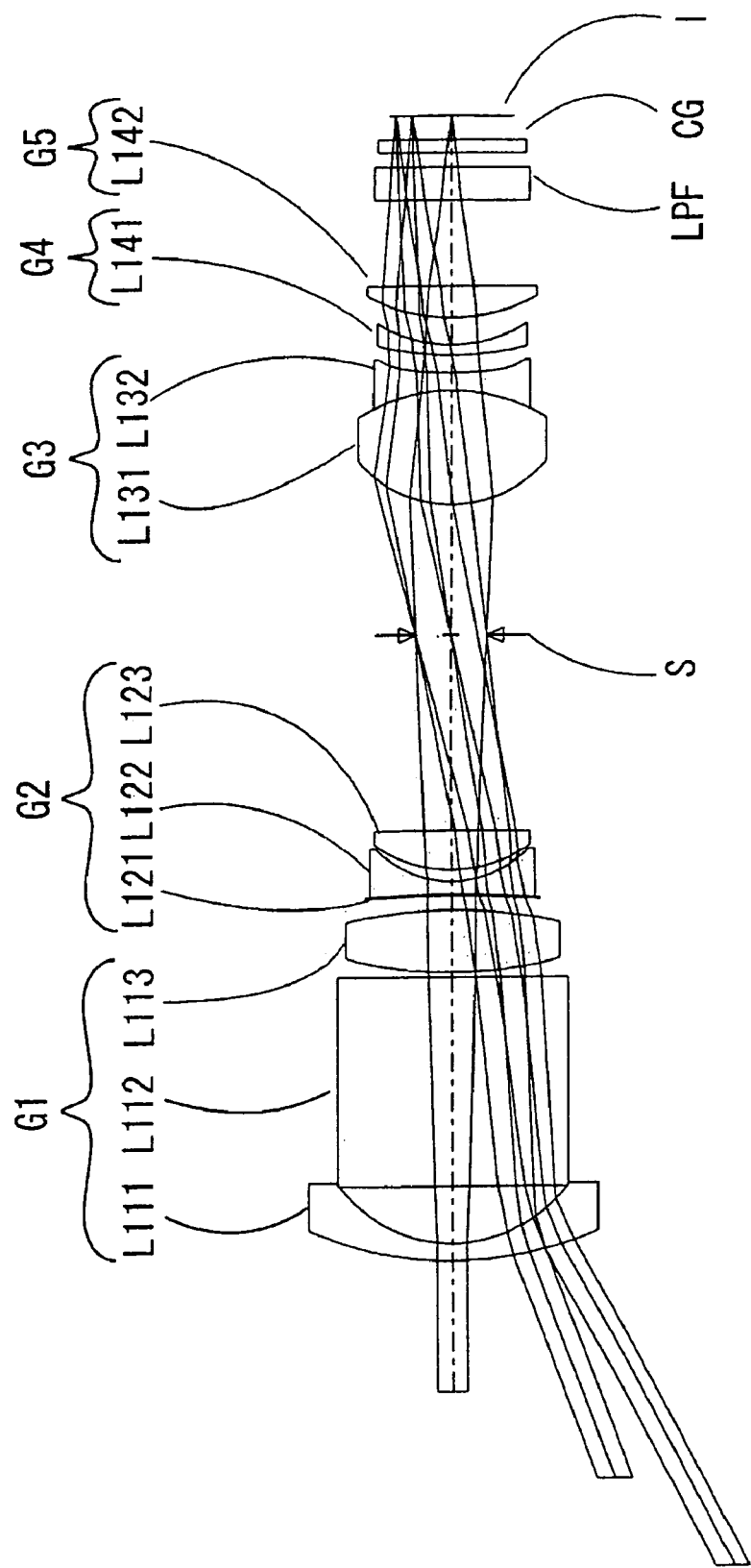
FIG. 55 is a cross-sectional view along the optical axis showing an optical arrangement at the time of the infinite object point focusing at the wide angle end of a zoom lens according to a twenty eighth embodiment of the present invention.

FIG. 55 is a cross-sectional view along the optical axis showing an optical arrangement at the time of the infinite object point focusing at the wide angle end of a zoom lens according to a twenty eighth embodiment of the present invention.

Figure 56A:
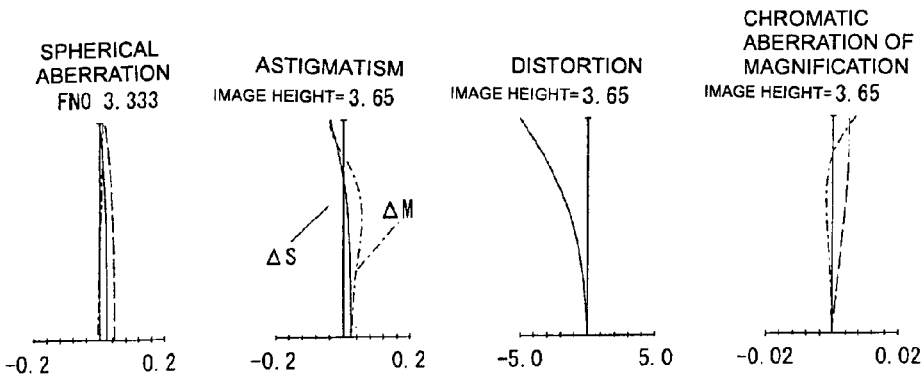
FIG. 56A, FIG. 56B, and FIG. 56C are diagrams showing the spherical aberration, the astigmatism, the distortion, and the chromatic aberration of magnification at the time of the infinite object point focusing of the zoom lens according to the twenty eighth embodiment, where.
Figure 56B:
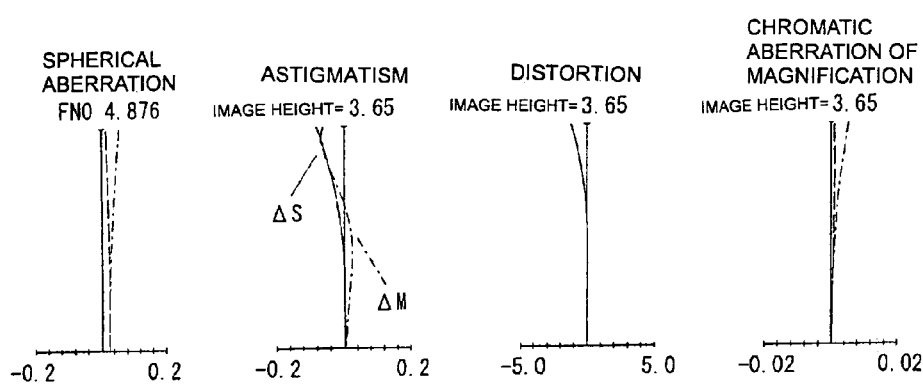
Figure 56C:
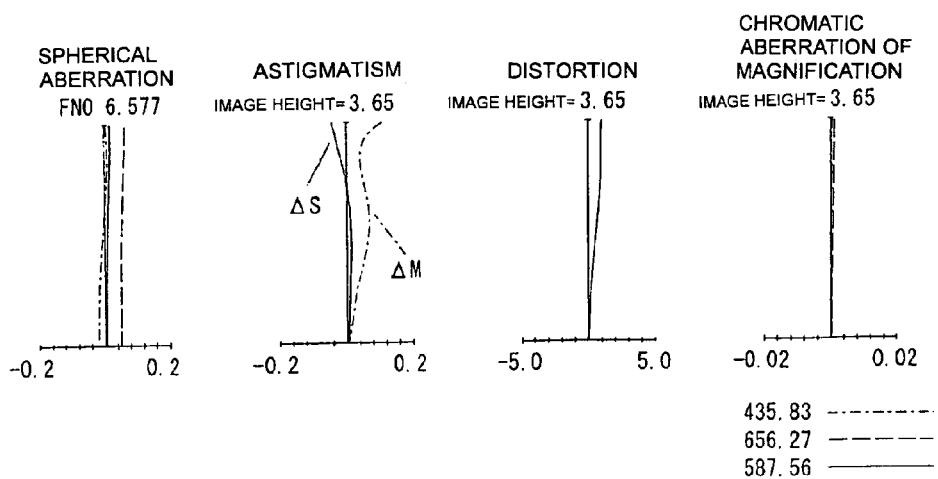

FIG. 56A, FIG. 56B, and FIG. 56C are diagrams showing the spherical aberration, the astigmatism, the distortion, and the chromatic aberration of magnification at the time of the infinite object point focusing of the zoom lens according to the twenty eighth embodiment, where, FIG. 56A shows the state at the wide angle end, FIG. 56B shows the intermediate state, and FIG. 56C shows the state at the telephoto end.

The zoom lens of the twenty eighth embodiment, as shown in FIG. 55, has in order from an object side thereof, a first lens group G1, a second lens group G2, an aperture stop S, a third lens group G3, a fourth lens group G4, and a fifth lens group G5. In the diagram, LPF is a low-pass filter, CG is a cover glass, and I is an image pickup surface of an electronic image pickup element.

The first lens group G1 includes a negative meniscus lens L111 having a convex surface directed toward the object side, a prism L112, and a biconvex lens L113, and has a positive refracting power as a whole.

The second lens group G2 includes a cemented lens which is formed by a negative meniscus lens L121 having a convex surface directed toward an image side and a biconcave lens L122, and a biconvex lens L123, and has a negative refracting power as a whole. The negative meniscus lens L121 having the convex surface directed toward the image side is a lens having a thin center-thickness.

The third lens group G3 includes a cemented lens which is formed by a biconvex lens L131 and a biconcave lens L132, and has a positive refracting power as a whole.

The fourth lens group G4 includes a negative meniscus lens L141 having a convex surface directed toward the object side, and has a negative refracting power as a whole.

The fifth lens group G5 includes a biconvex lens L142, and has a positive refracting power as a whole.

At the time of zooming from the wide angle end to the telephoto end, the first lens group G1 is fixed, the second lens group G2 moves toward the image side, the aperture stop S is fixed, the third lens group G3 moves toward the object side, the fourth lens group G4 moves once toward the image side, and then moves toward the object side, and the fifth lens group G5 moves toward the image side.

An aspheric surface is provided on a surface on the object side of the biconvex lens L113 in the first lens group G1, a surface on the object side of the negative meniscus lens L121 having the convex surface directed toward the image side, and a surface on the image side of the biconcave lens L122 in the second lens group G2, a surface on the object side of the biconvex lens L131 and a surface on the image side of the biconcave lens L132 in the third lens group G3, and a surface on the object side of the biconvex lens L142 in the fifth lens group G5.

Next, numerical data of the twenty eighth embodiment will be enumerated.

Numerical data 28

| | | | |
|---|---|---|---|
| r1 = 22.569 | d1 = 1 | Nd1 = 1.8061 | νd1 = 40.92 |
| r2 = 8.775 | d2 = 3.24 | | |
| r3 = ∞ | d3 = 12 | Nd3 = 1.8061 | νd3 = 40.92 |
| r4 = ∞ | d4 = 0.3 | | |
| r5 = 28.397 (Aspheric surface) | d5 = 3.54 | Nd5 = 1.741 | νd5 = 52.64 |
| r6 = −30.066 | d6 = D6 | | |
| r7 = −68.946 (Aspheric surface) | d7 = 0.1 | Nd7 = 2.0512 | νd7 = 6.28 |
| r8 = −72.063 | d8 = 0.7 | Nd8 = 1.8044 | νd8 = 39.59 |
| r9 = 5.835 (Aspheric surface) | d9 = 0.7 | | |
| r10 = 8.288 | d10 = 2.2 | Nd10 = 1.7552 | νd10 = 27.51 |
| r11 = −350.22 | d11 = D11 | | |
| r12 = Aperture stop | d12 = D12 | | |
| r13 = 7.762 (Aspheric surface) | d13 = 6.44 | Nd13 = 1.6935 | νd13 = 53.21 |
| r14 = −10.924 | d14 = 1 | Nd14 = 1.84666 | νd14 = 23.78 |
| r15 = 27.463 (Aspheric surface) | d15 = D15 | | |
| r16 = 18.162 | d16 = 0.6 | Nd16 = 1.48749 | νd16 = 70.23 |
| r17 = 8.571 | d17 = D17 | | |
| r18 = 11.048 (Aspheric surface) | d18 = 1.8 | Nd18 = 1.7432 | νd18 = 49.34 |
| r19 = −683.995 | d19 = D19 | | |
| r20 = ∞ | d20 = 1.9 | Nd20 = 1.54771 | νd20 = 62.84 |
| r21 = ∞ | d21 = 0.8 | | |
| r22 = ∞ | d22 = 0.75 | Nd22 = 1.51633 | νd22 = 64.14 |
| r23 = ∞ | d23 = D23 | | |

Aspherical coefficients

5th surface k = 0
A4 = 2.65390E−05
A6 = 2.74957E−07
A8 = 0

7th surface k = 0
A4 = −3.03094E−05
A6 = 2.50533E−06
A8 = −2.39841E−08

-continued

Numerical data 28

9th surface k = 0
A4 = −5.10845E−04
A6 = 1.79630E−07
A8 = −4.24947E−07

13th surface k = 0
A4 = 6.06181E−05
A6 = 1.82150E−06
A8 = 5.55091E−09

15th surface k = 0
A4 = 6.87453E−04
A6 = 1.41002E−05
A8 = 7.95382E−07

18th surface k = 0
A4 = −7.29457E−05
A6 = 9.71422E−06
A8 = −2.00168E−07

Zoom data
When D0 (distance from object up to 1st surface) is ∞

| | wide-angle end | intermediate | telephoto end |
|---|---|---|---|
| Focal length | 6.1 | 13.42 | 17.997 |
| FNO. | 3.33 | 5.43 | 6.58 |
| D6 | 0.81 | 7.75 | 9.07 |
| D11 | 10.99 | 3.5 | 0.4 |
| D12 | 7.32 | 1.62 | 0.4 |
| D15 | 0.99 | 11.73 | 14.54 |
| D17 | 1.54 | 2.07 | 3.45 |
| D19 | 4.85 | 1.28 | 0.4 |
| D23 | 1.36 | 1.36 | 1.36 |

Twenty Ninth Embodiment

Figure 57:
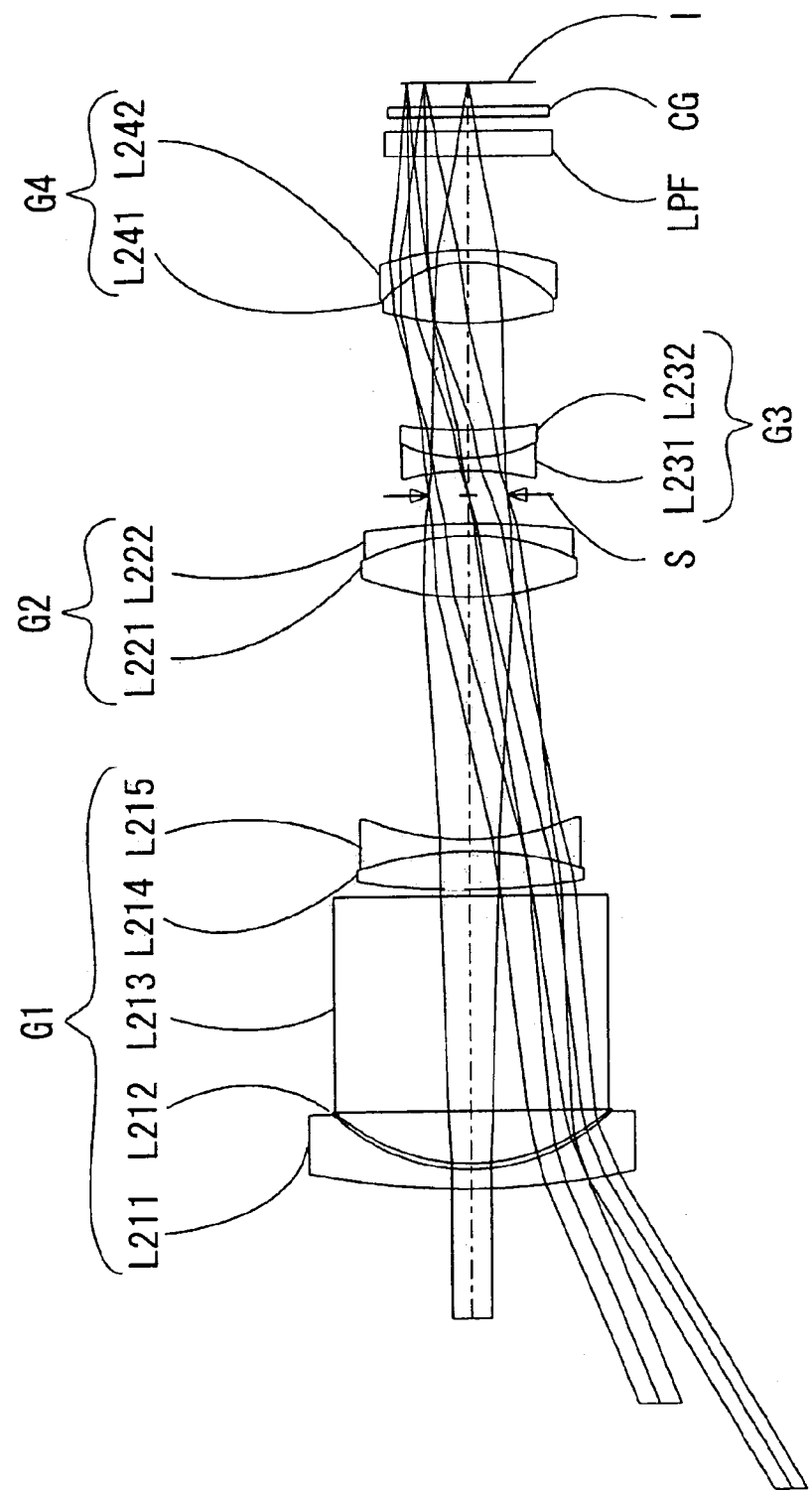
FIG. 57 is a cross-sectional view along the optical axis showing an optical arrangement at the time of the infinite object point focusing at the wide angle end of a zoom lens according to a twenty ninth embodiment of the present invention.

FIG. 57 is a cross-sectional view along the optical axis showing an optical arrangement at the time of the infinite object point focusing at the wide angle end of a zoom lens according to a twenty ninth embodiment of the present invention.

Figure 58A:
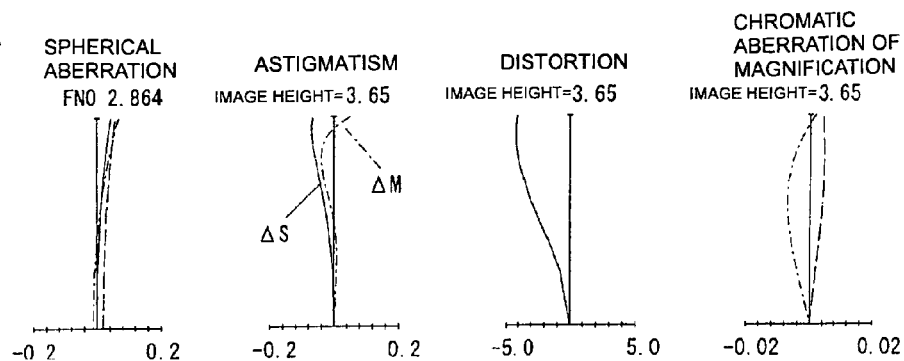
FIG. 58A, FIG. 58B, and FIG. 58C are diagrams showing the spherical aberration, the astigmatism, the distortion, and the chromatic aberration of magnification at the time of the infinite object point focusing of the zoom lens according to the twenty ninth embodiment, where.
Figure 58B:
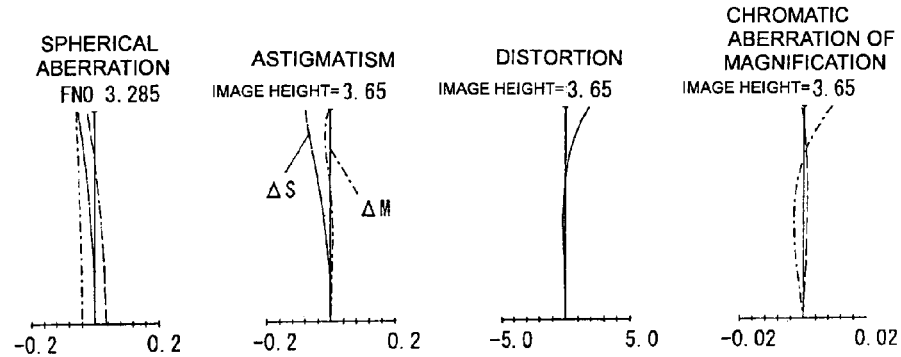
Figure 58C:
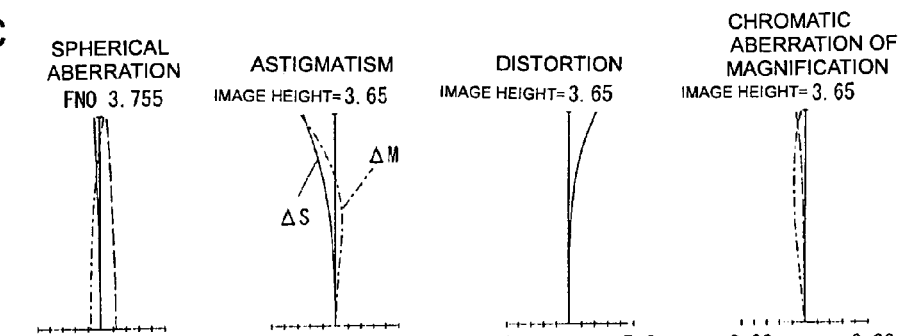

FIG. 58A, FIG. 58B, and FIG. 58C are diagrams showing the spherical aberration, the astigmatism, the distortion, and the chromatic aberration of magnification at the time of the infinite object point focusing of the zoom lens according to the twenty ninth embodiment, where, FIG. 58A shows the state at the wide angle end, FIG. 58B shows the intermediate state, and FIG. 58C shows the state at the telephoto end.

The zoom lens of the twenty ninth embodiment, as shown in FIG. 57, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the twenty ninth embodiment will be enumerated.

Numerical data 29

| | | | |
|---|---|---|---|
| r1 = 42.623 | d1 = 1.1 | Nd1 = 1.7432 | vd1 = 49.34 |
| r2 = 10.5 | d2 = 0.35 | Nd2 = 1.60687 | vd2 = 27.03 |
| r3 = 10.955 | d3 = 3 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 42.697 | d6 = 2.2 | Nd6 = 1.8061 | vd6 = 40.92 |
| (Aspheric surface) | | | |
| r7 = −18.636 | d7 = 0.7 | Nd7 = 1.51742 | vd7 = 52.43 |
| r8 = 14.071 | d8 = D8 | | |
| r9 = 15.077 | d9 = 3.5 | Nd9 = 1.7432 | vd9 = 49.34 |
| (Aspheric surface) | | | |
| r10 = −13 | d10 = 0.7 | Nd10 = 1.84666 | vd10 = 23.78 |
| r11 = −39.184 | d11 = D11 | | |
| r12 = Aperture stop | d12 = D12 | | |
| r13 = −12.629 | d13 = 0.7 | Nd13 = 1.51823 | vd13 = 58.9 |
| r14 = 8.282 | d14 = 1.6 | Nd14 = 1.8061 | vd14 = 40.92 |
| r15 = 24.007 | d15 = D15 | | |
| r16 = 14.042 | d16 = 3.5 | Nd16 = 1.7432 | vd16 = 49.34 |
| (Aspheric surface) | | | |
| r17 = −6 | d17 = 0.7 | Nd17 = 1.84666 | vd17 = 23.78 |
| r18 = −14.453 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 3.77975E−05
A6 = −5.62278E−07
A8 = 0.00000E+00

6th surface k = 0
A4 = 4.40548E−05
A6 = −1.53391E−08
A8 = −4.21441E−07

-continued

Numerical data 29

9th surface k = 0
A4 = −2.73771E−05
A6 = −6.18132E−08
A8 = −1.28129E−06

16th surface k = 0
A4 = −1.85122E−04
A6 = −9.53942E−07
A8 = 5.27383E−08

Zoom data
When D0 (distance from object up to 1st surface) is ∞

| | wide-angle end | intermediate | telephoto end |
|---|---|---|---|
| Focal length | 6.002 | 13.7 | 17.994 |
| FNO. | 2.86 | 3.43 | 3.76 |
| D8 | 13.83 | 4.04 | 0.8 |
| D11 | 1.6 | 11.39 | 14.64 |
| D12 | 1.4 | 5.72 | 8.81 |
| D15 | 6.18 | 5.01 | 3 |
| D18 | 5.42 | 2.26 | 1.19 |
| D22 | 1.36 | 1.36 | 1.36 |

Thirtieth Embodiment

Figure 59:
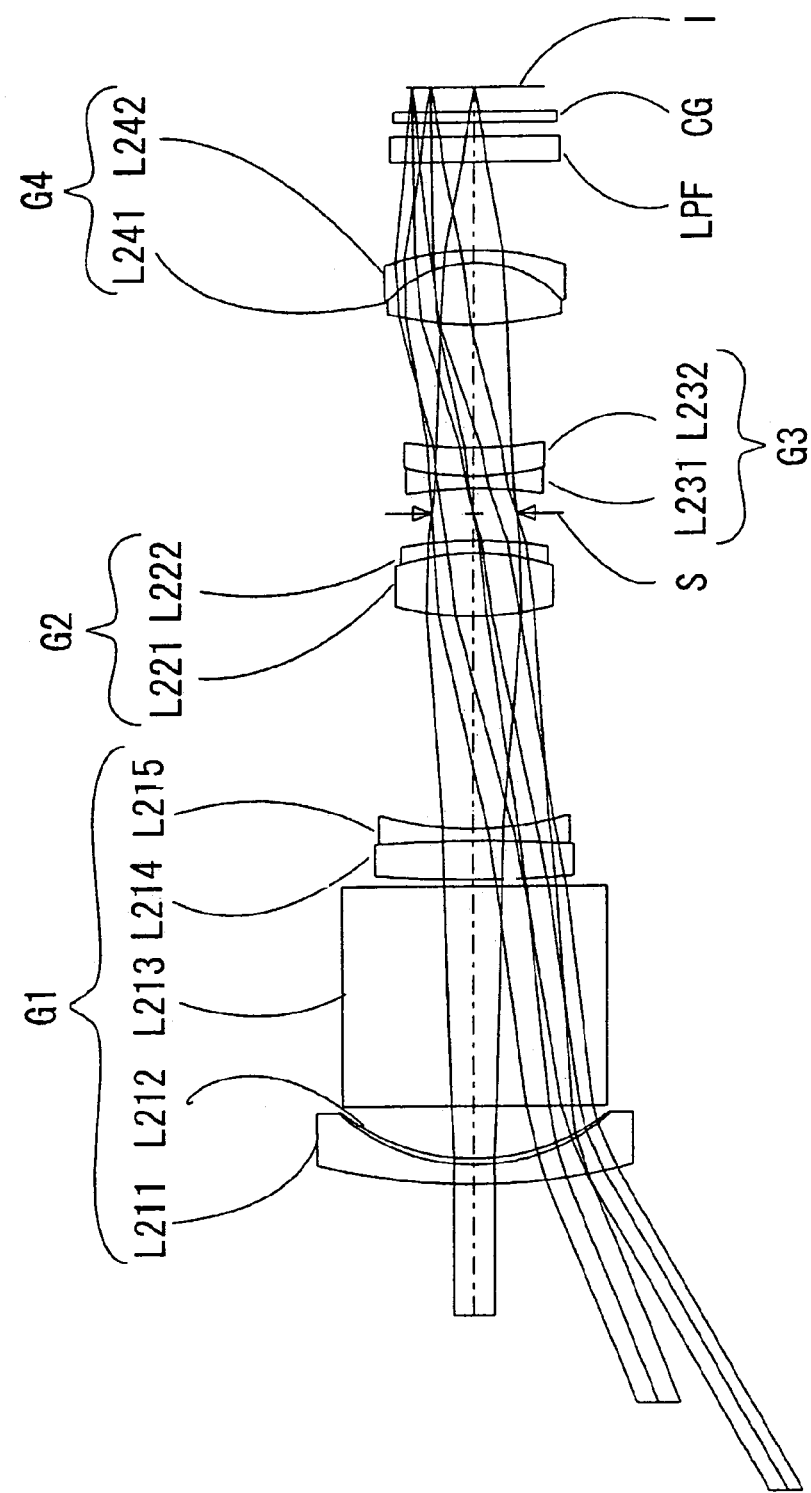
FIG. 59 is a cross-sectional view along the optical axis showing an optical arrangement at the time of the infinite object point focusing at the wide angle end of a zoom lens according to a thirtieth embodiment of the present invention.

FIG. 59 is a cross-sectional view along the optical axis showing an optical arrangement at the time of the infinite object point focusing at the wide angle end of a zoom lens according to a thirtieth embodiment of the present invention.

Figure 60A:
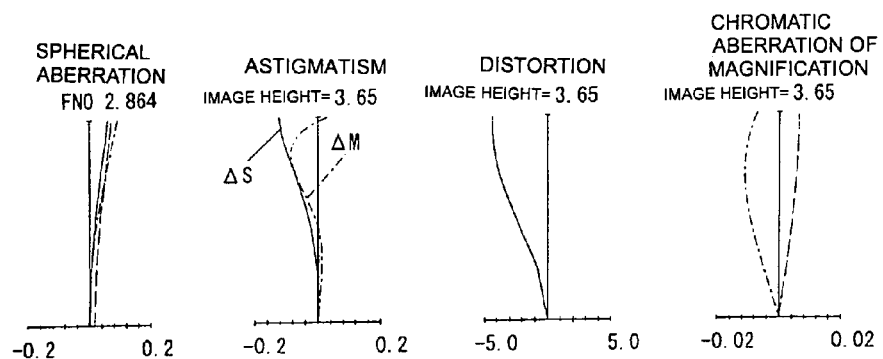
FIG. 60A, FIG. 60B, and FIG. 60C are diagrams showing the spherical aberration, the astigmatism, the distortion, and the chromatic aberration of magnification at the time of the infinite object point focusing of the zoom lens according to the thirtieth embodiment, where.
Figure 60B:
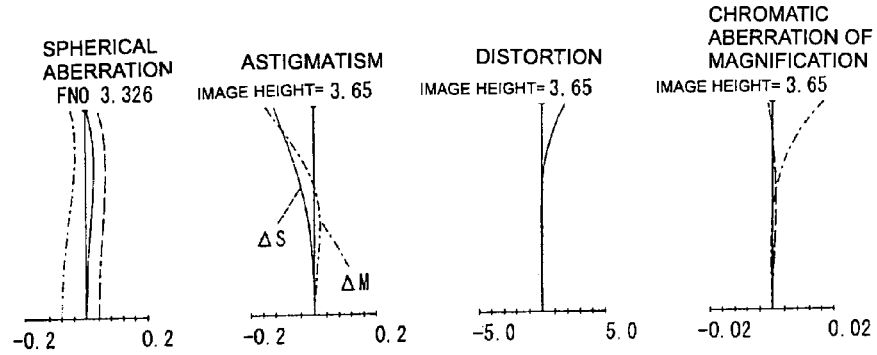
Figure 60C:
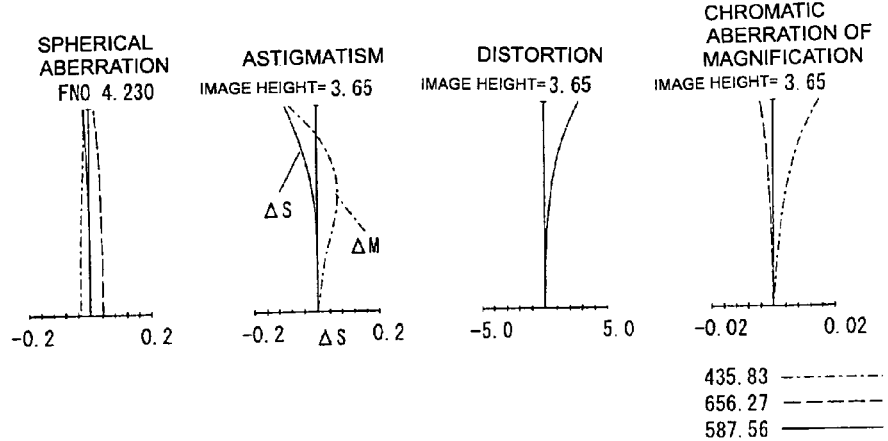

FIG. 60A, FIG. 60B, and FIG. 60C are diagrams showing the spherical aberration, the astigmatism, the distortion, and the chromatic aberration of magnification at the time of the infinite object point focusing of the zoom lens according to the thirtieth embodiment, where, FIG. 60A shows the state at the wide angle end, FIG. 60B shows the intermediate state, and FIG. 60C shows the state at the telephoto end.

The zoom lens of the thirtieth embodiment, as shown in FIG. 59, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the thirtieth embodiment will be enumerated.

Numerical data 30

| | | | |
|---|---|---|---|
| r1 = 33.12 | d1 = 1.1 | Nd1 = 1.7432 | vd1 = 49.34 |
| r2 = 10.5 | d2 = 0.35 | Nd2 = 1.60258 | vd2 = 18.58 |
| r3 = 11.228 (Aspheric surface) | d3 = 3 | | |
| r4 = ∞ | d4 = 12.5 | Nd4 = 1.8061 | vd4 = 40.92 |
| r5 = ∞ | d5 = 0.4 | | |
| r6 = 91.734 (Aspheric surface) | d6 = 2.2 | Nd6 = 1.8061 | vd6 = 40.92 |
| r7 = −72.862 | d7 = 0.7 | Nd7 = 1.51742 | vd7 = 52.43 |
| r8 = 17.372 | d8 = D8 | | |
| r9 = 15.499 (Aspheric surface) | d9 = 3.5 | Nd9 = 1.741 | vd9 = 52.64 |
| r10 = −13 | d10 = 0.7 | Nd10 = 1.84666 | vd10 = 23.78 |
| r11 = −23.524 | d11 = D11 | | |
| r12 = Aperture stop | d12 = D12 | | |
| r13 = −21.048 | d13 = 0.7 | Nd13 = 1.51823 | vd13 = 58.9 |
| r14 = 15.455 | d14 = 1.6 | Nd14 = 1.8061 | vd14 = 40.92 |
| r15 = 23.926 | d15 = D15 | | |
| r16 = 16.462 (Aspheric surface) | d16 = 3.5 | Nd16 = 1.7432 | vd16 = 49.34 |
| r17 = −6 | d17 = 0.7 | Nd17 = 1.84666 | vd17 = 23.78 |
| r18 = −13.956 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 6.13709E−05
A6 = −1.03264E−06
A8 = 0

6th surface k = 0
A4 = 8.62992E−05
A6 = −9.39844E−07
A8 = 0.00000E+00

9th surface k = 0
A4 = −9.05151E−05
A6 = 6.59858E−07
A8 = 0 00000E+00

16th surface k = 0
A4 = −1.54117E−04

-continued

Numerical data 30

A6 = −3.27700E−07
A8 = 0.00000E+00

Zoom data
When D0 (distance from object up to 1st surface) is ∞

| | wide-angle end | intermediate | telephoto end |
|---|---|---|---|
| Focal length | 6.196 | 13.697 | 17.975 |
| FNO. | 2.86 | 3.6 | 4.23 |
| D8 | 11.94 | 3.67 | 0.81 |
| D11 | 1.53 | 9.79 | 12.65 |
| D12 | 1.37 | 4.96 | 9.39 |
| D15 | 6.98 | 6.31 | 2.95 |
| D18 | 5.02 | 2.1 | 1.04 |
| D22 | 1.35 | 1.34 | 1.35 |

Thirty First Embodiment

Figure 61:
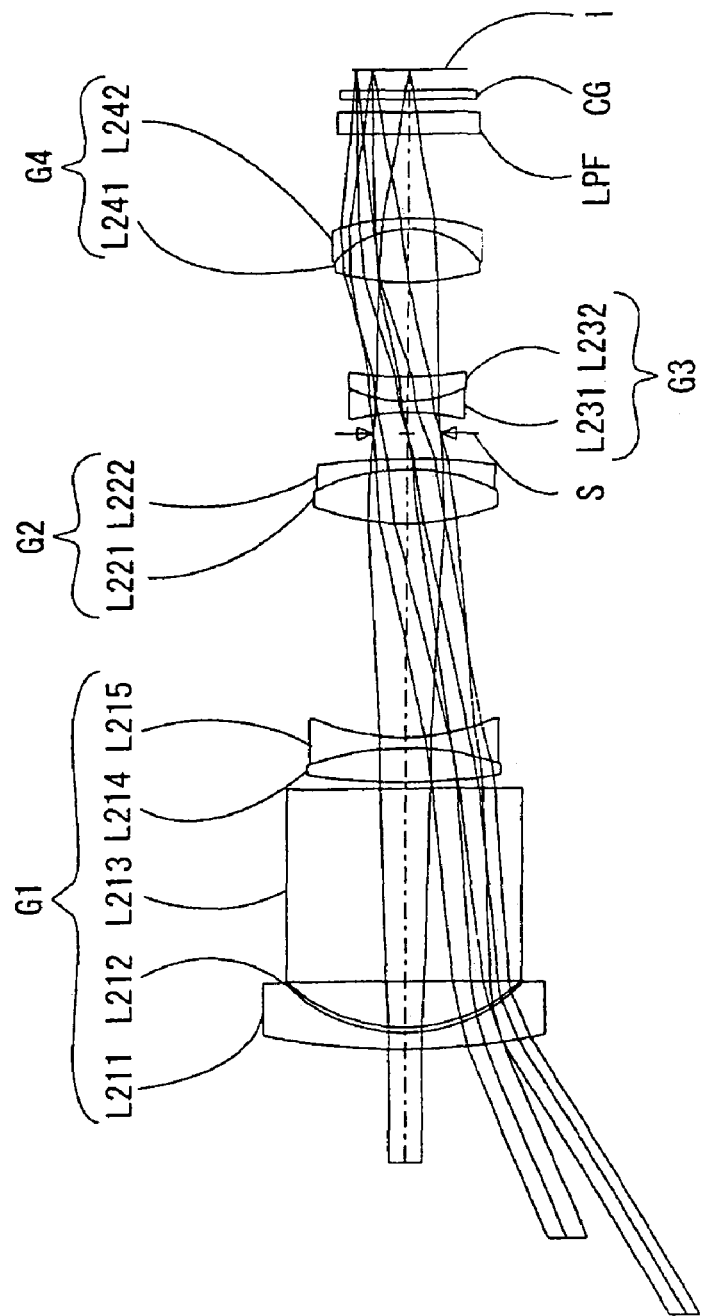
FIG. 61 is a cross-sectional view along the optical axis showing an optical arrangement at the time of the infinite object point focusing at the wide angle end of a zoom lens according to a thirty first embodiment of the present invention.

FIG. 61 is a cross-sectional view along the optical axis showing an optical arrangement at the time of the infinite object point focusing at the wide angle end of a zoom lens according to a thirty first embodiment of the present invention.

Figure 62A:
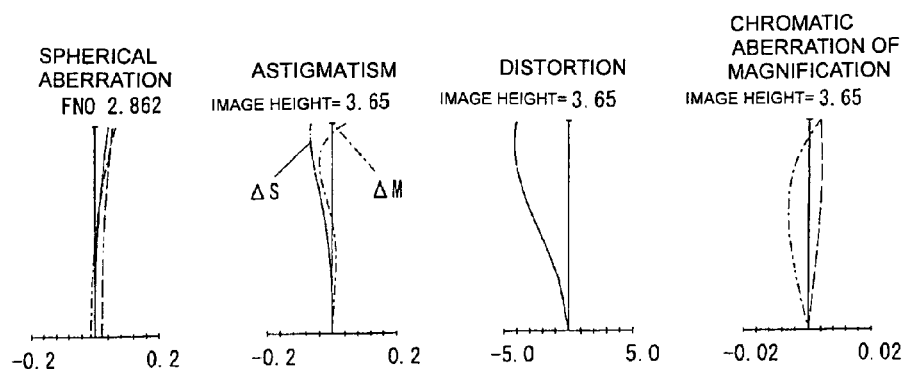
FIG. 62A, FIG. 62B, and FIG. 62C are diagrams showing the spherical aberration, the astigmatism, the distortion, and the chromatic aberration of magnification at the time of the infinite object point focusing of the zoom lens according to the thirty first embodiment, where.
Figure 62B:
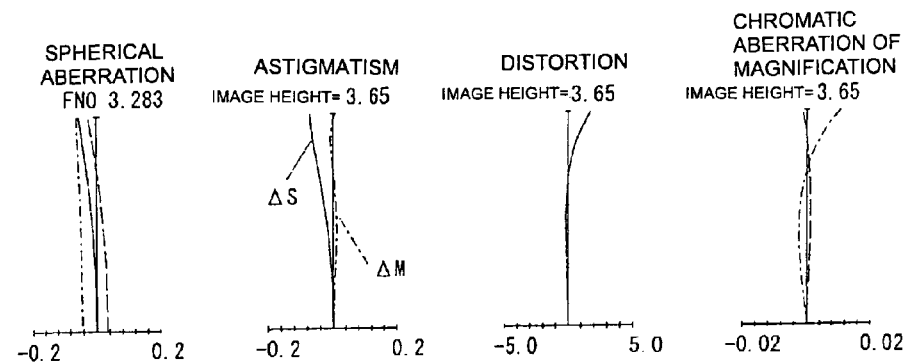
Figure 62C:
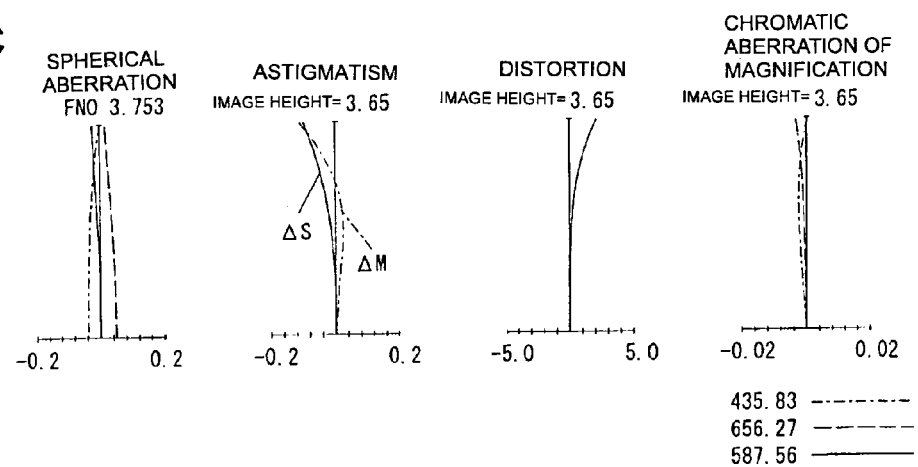

FIG. 62A, FIG. 62B, and FIG. 62C are diagrams showing the spherical aberration, the astigmatism, the distortion, and the chromatic aberration of magnification at the time of the infinite object point focusing of the zoom lens according to the thirty first embodiment, where, FIG. 62A shows the state at the wide angle end, FIG. 62B shows the intermediate state, and FIG. 62C shows the state at the telephoto end.

The zoom lens of the thirty first embodiment, as shown in FIG. 61, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having a convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the thirty first embodiment will be enumerated.

Numerical data 31

| r1 = 42.691 | d1 = 1.1 | Nd1 = 1.7432 | vd1 = 49.34 |
|---|---|---|---|
| r2 = 10.5 | d2 = 0.35 | Nd2 = 1.69556 | vd2 = 25.02 |
| r3 = 10.948 (Aspheric surface) | d3 = 3 | | |
| r4 = ∞ | d4 = 12.5 | Nd4 = 1.8061 | vd4 = 40.92 |
| r5 = ∞ | d5 = 0.4 | | |
| r6 = 42.763 (Aspheric surface) | d6 = 2.2 | Nd6 = 1.8061 | vd6 = 40.92 |
| r7 = −18.652 | d7 = 0.7 | Nd7 = 1.51742 | vd7 = 52.43 |
| r8 = 14.064 | d8 = D8 | | |
| r9 = 15.087 (Aspheric surface) | d9 = 3.5 | Nd9 = 1.7432 | vd9 = 49.34 |
| r10 = −13 | d10 = 0.7 | Nd10 = 1.84666 | vd10 = 23.78 |
| r11 = −39.251 | d11 = D11 | | |
| r12 = Aperture stop | d12 = D12 | | |
| r13 = −12.631 | d13 = 0.7 | Nd13 = 1.51823 | vd13 = 58.9 |
| r14 = 8.281 | d14 = 1.6 | Nd14 = 1.8061 | vd14 = 40.92 |
| r15 = 24.016 | d15 = D15 | | |
| r16 = 14.034 (Aspheric surface) | d16 = 3.5 | Nd16 = 1.7432 | vd16 = 49.34 |
| r17 = −6 | d17 = 0.7 | Nd17 = 1.84666 | vd17 = 23.78 |
| r18 = −14.442 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 3.61554E−05
A6 = −5.07637E−07
A8 = 0

6th surface k = 0
A4 = 4.45689E−05
A6 = −1.88567E−08
A8 = 0.00000E+00

9th surface k = 0
A4 = −2.68975E−05
A6 = −6.60559E−08
A8 = 0.00000E+00

16th surface k = 0
A4 = −1.85460E−04
A6 = −1.01430E−06
A8 = 0.00000E+00

Zoom data
When D0 (distance from object up to 1st surface) is ∞

| | wide-angle end | intermediate | telephoto end |
|---|---|---|---|
| Focal length | 6.025 | 13.747 | 18.059 |
| FNO. | 2.86 | 3.42 | 3.75 |
| D8 | 13.83 | 4.04 | 0.8 |
| D11 | 1.6 | 11.39 | 14.64 |
| D12 | 1.4 | 5.72 | 8.81 |
| D15 | 6.18 | 5.01 | 3 |

-continued

Numerical data 31

| D18 | 5.42 | 2.26 | 1.19 |
|---|---|---|---|
| D22 | 1.36 | 1.36 | 1.36 |

Thirty Second Embodiment

Figure 63:
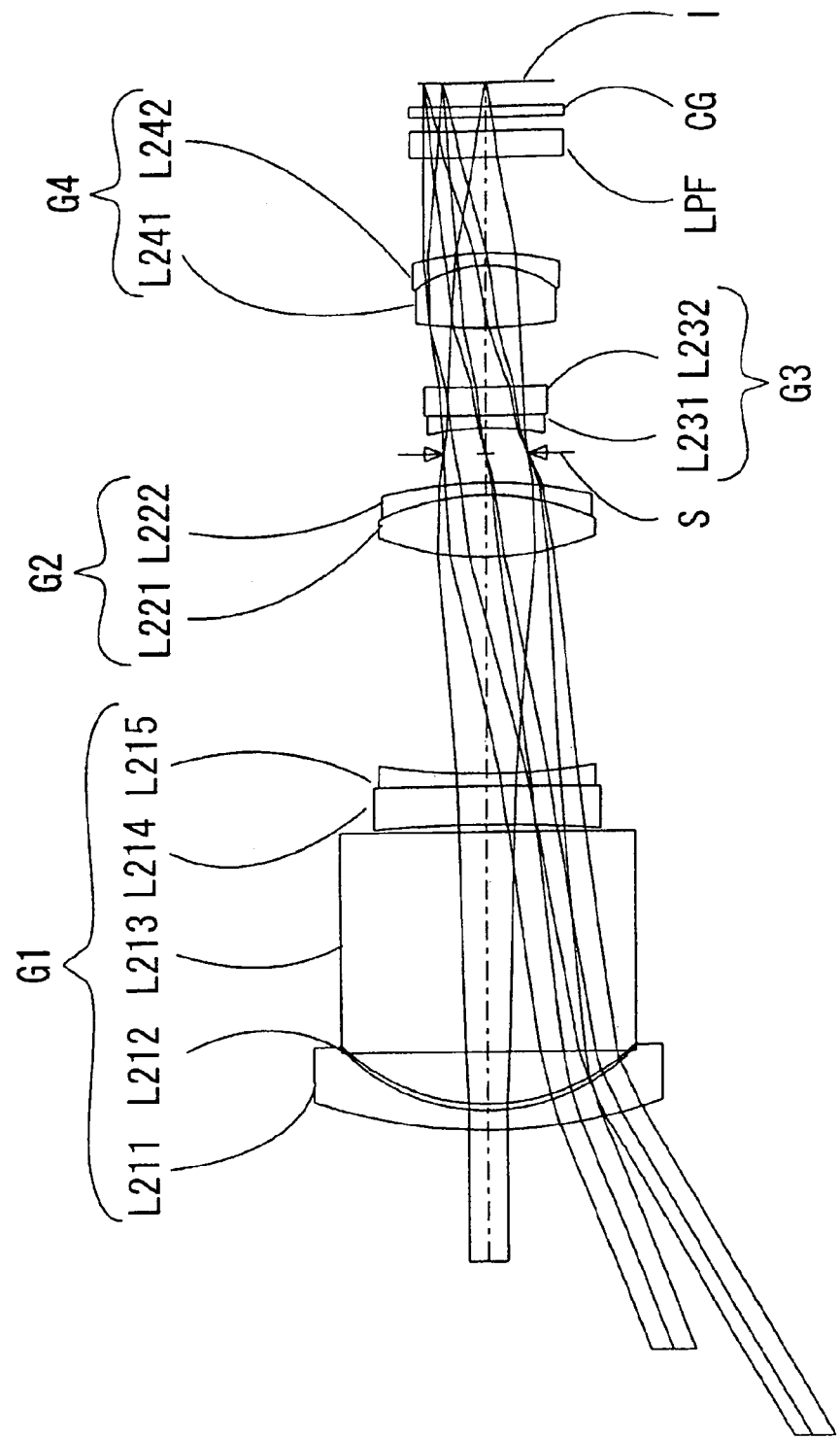
FIG. 63 is a cross-sectional view along the optical axis showing an optical arrangement at the time of the infinite object point focusing at the wide angle end of a zoom lens according to a thirty second embodiment of the present invention.

FIG. 63 is a cross-sectional view along the optical axis showing an optical arrangement at the time of the infinite object point focusing at the wide angle end of a zoom lens according to a thirty second embodiment of the present invention.

FIG. 64A, FIG. 64B, and FIG. 64C are diagrams showing the spherical aberration, the astigmatism, the distortion, and the chromatic aberration of magnification at the time of the infinite object point focusing of the zoom lens according to the thirty second embodiment, where, FIG. 64A shows the state at the wide angle end, FIG. 64B shows the intermediate state, and FIG. 64C shows the state at the telephoto end.

The zoom lens of the thirty second embodiment, as shown in FIG. 63, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a negative meniscus lens L212 having a convex surface directed toward the object side, a prism L213, and a cemented lens which is formed by a negative meniscus lens L214 having a convex surface directed toward an image side and a biconcave lens L215, and has a negative refracting power as a whole.

The second lens group G2 includes a cemented lens which is formed by a biconvex lens L221 and a negative meniscus lens L222 having a convex surface directed toward the image side, and has a positive refracting power as a whole.

The third lens group G3 includes a cemented lens which is formed by a biconcave lens L231 and a negative meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the negative meniscus lens L212 having the convex surface directed toward the object side and a surface on the object side of the negative meniscus lens L214 having the convex surface directed toward the image side in the first lens group G1, a surface on the object side of the biconvex lens L221 in the second lens group G2, and a surface on the object side of the biconvex lens L241 in the fourth lens group G4.

Next, numerical data of the thirty second embodiment will be enumerated.

| Numerical data 32 | | | |
|---|---|---|---|
| r1 = 27.755 | d1 = 1.1 | Nd1 = 1.713 | vd1 = 53.87 |
| r2 = 10.5 | d2 = 0.35 | Nd2 = 1.72568 | vd2 = 18.68 |
| r3 = 10.360 | d3 = 3 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = −88.912 | d6 = 2.2 | Nd6 = 1.741 | vd6 = 52.64 |
| (Aspheric surface) | | | |
| r7 = −384.855 | d7 = 0.7 | Nd7 = 1.51823 | vd7 = 58.9 |
| r8 = 34.674 | d8 = D8 | | |
| r9 = 14.025 | d9 = 3.5 | Nd9 = 1.741 | vd9 = 52.64 |
| (Aspheric surface) | | | |
| r10 = −13 | d10 = 0.7 | Nd10 = 1.84666 | vd10 = 23.78 |
| r11 = −22.307 | d11 = D11 | | |
| r12 = Aperture stop | d12 = D12 | | |
| r13 = −14.038 | d13 = 0.7 | Nd13 = 1.48749 | vd13 = 70.23 |
| r14 = 179.442 | d14 = 1.6 | Nd14 = 1.8061 | vd14 = 40.92 |
| r15 = 120.923 | d15 = D15 | | |
| r16 = 21.227 | d16 = 3.5 | Nd16 = 1.7432 | vd16 = 49.34 |
| (Aspheric surface) | | | |
| r17 = −6 | d17 = 0.7 | Nd17 = 1.84666 | vd17 = 23.78 |
| r18 = −14.726 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface $k = 0$
$A4 = -7.05799E-05$
$A6 = -6.32580E-08$
$A8 = 0$

6th surface $k = 0$
$A4 = -4.90530E-05$
$A6 = 7.20862E-07$
$A8 = 0.00000E+00$

9th surface $k = 0$
$A4 = -7.03137E-05$
$A6 = -4.20920E-07$
$A8 = 0.00000E+00$

16th surface $k = 0$
$A4 = -1.18414E-04$
$A6 = -1.34275E-06$
$A8 = 0.00000E+00$

Zoom data
When D0 (distance from object up to 1st surface) is ∞

| | wide-angle end | intermediate | telephoto end |
|---|---|---|---|
| Focal length | 6.149 | 13.699 | 17.989 |
| FNO. | 2.86 | 2.89 | 3.41 |
| D8 | 12.19 | 2.73 | 0.81 |
| D11 | 1.63 | 11.09 | 13.01 |
| D12 | 1.43 | 1.89 | 6.58 |
| D15 | 3.36 | 5.23 | 2.93 |
| D18 | 5.49 | 3.17 | 0.77 |
| D22 | 1.34 | 1.34 | 1.34 |

Thirty Third Embodiment

Figure 65:
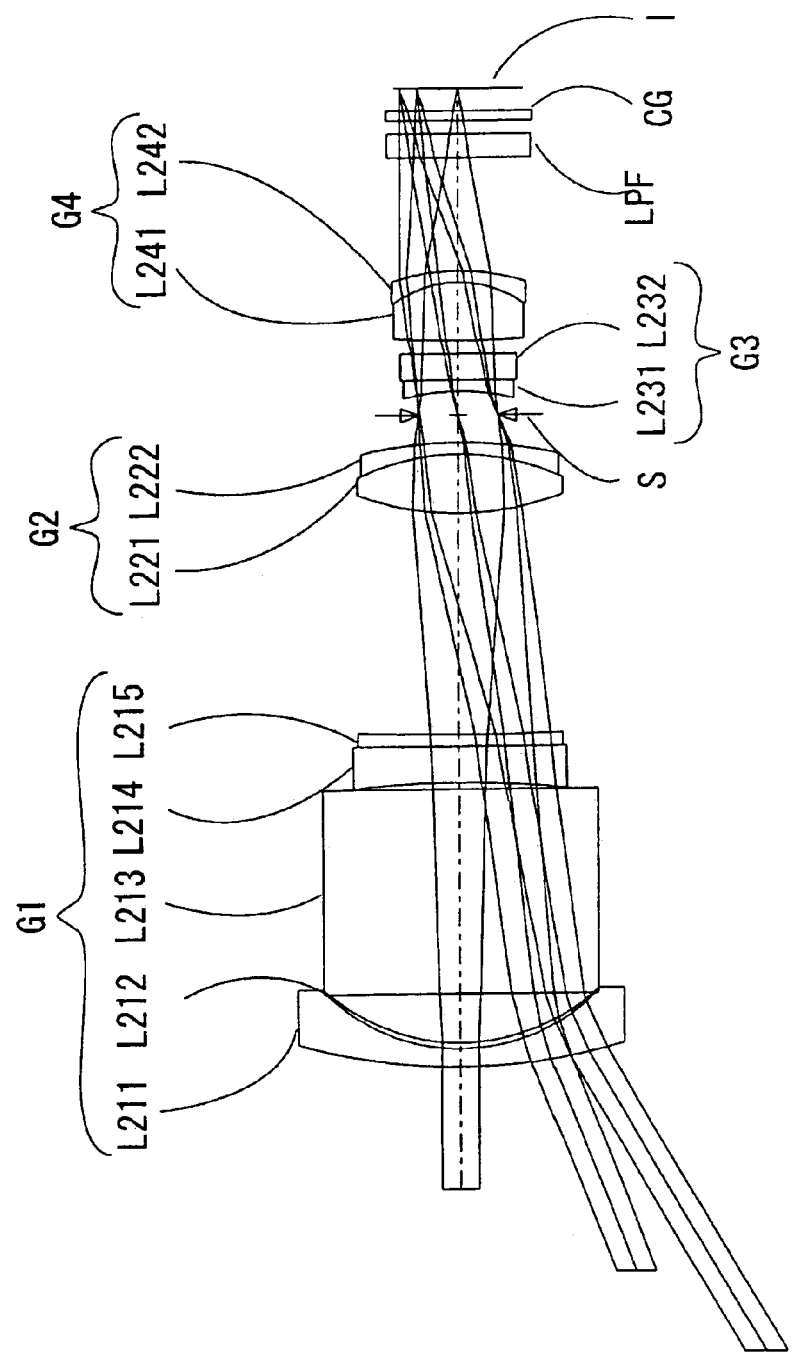
FIG. 65 is a cross-sectional view along the optical axis showing an optical arrangement at the time of the infinite object point focusing at the wide angle end of a zoom lens according to a thirty third embodiment of the present invention.

FIG. 65 is a cross-sectional view along the optical axis showing an optical arrangement at the time of the infinite object point focusing at the wide angle end of a zoom lens according to a thirty third embodiment of the present invention.

Figure 66A:
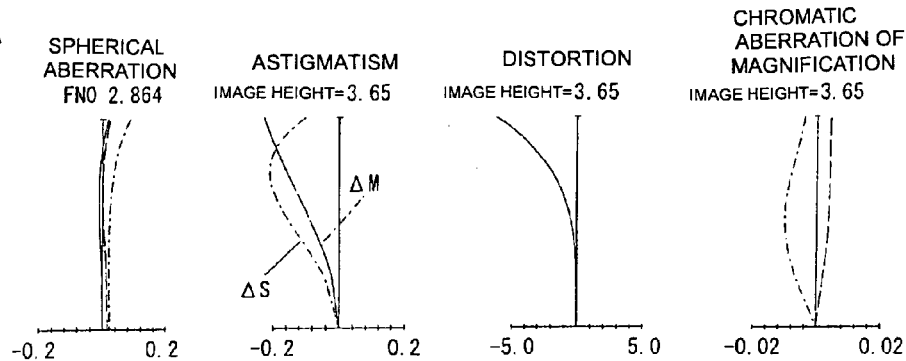
FIG. 66A, FIG. 66B, and FIG. 66C are diagrams showing the spherical aberration, the astigmatism, the distortion, and the chromatic aberration of magnification at the time of the infinite object point focusing of the zoom lens according to the thirty third embodiment, where.
Figure 66B:
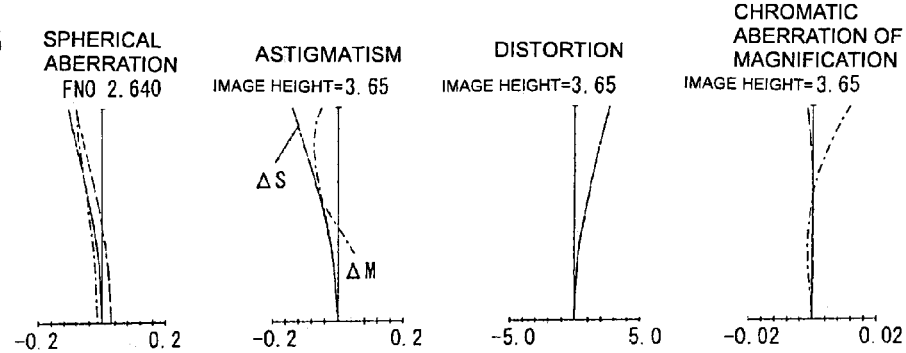
Figure 66C:
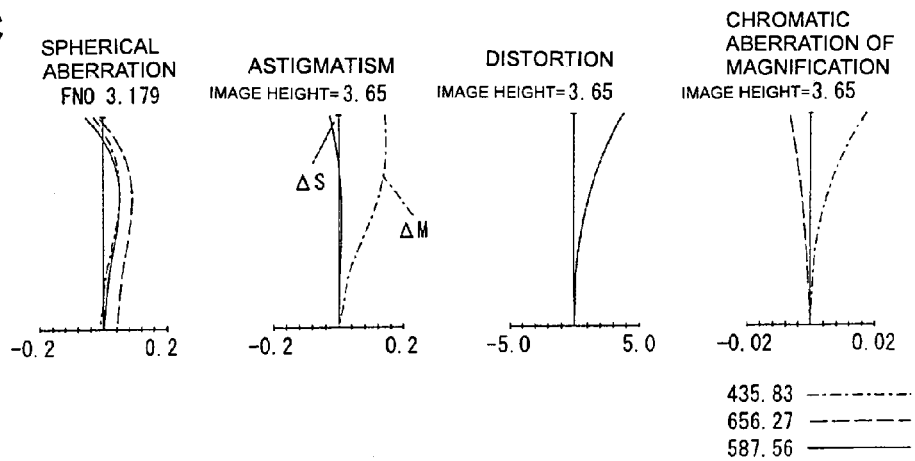

FIG. 66A, FIG. 66B, and FIG. 66C are diagrams showing the spherical aberration, the astigmatism, the distortion, and the chromatic aberration of magnification at the time of the infinite object point focusing of the zoom lens according to the thirty third embodiment, where, FIG. 66A shows the state at the wide angle end, FIG. 66B shows the intermediate state, and FIG. 66C shows the state at the telephoto end.

The zoom lens of the thirty third embodiment, as shown in FIG. 65, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group includes a cemented lens which is formed by a negative meniscus lens L211 having a convex surface directed toward the object side and a negative meniscus lens L212 having a convex surface directed toward the object side, a prism L213, and a cemented lens which is formed by a negative meniscus lens L214 having a convex surface directed toward an image side and a biconcave lens L215, and has a negative refracting power as a whole.

The second lens group G2 includes a cemented lens which is formed by a biconvex lens L221 and a negative meniscus lens L222 having a convex surface directed toward the image side, and has a positive refracting power as a whole.

The third lens group G3 includes a cemented lens which is formed by a biconcave lens L231 and a negative meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of moving from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the negative meniscus lens L212 having the convex surface directed toward the object side and a surface on the object side of the negative meniscus lens L214 having the convex surface directed toward the image side in the first lens group G1, a surface on the object side of the biconvex lens L221 in the second lens group G2, and a surface on the object side of the biconvex lens L241 in the forth lens group G4.

Next, numerical data of the thirty third embodiment will be enumerated.

| Numerical data 33 | | | |
|---|---|---|---|
| r1 = 31.726 | d1 = 1.1 | Nd1 = 1.713 | vd1 = 53.87 |
| r2 = 10.5 | d2 = 0.35 | Nd2 = 1.852 | vd2 = 14.02 |
| r3 = 10.488 | d3 = 3 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = −62.156 | d6 = 2.2 | Nd6 = 1.741 | vd6 = 52.64 |
| (Aspheric surface) | | | |
| r7 = −2391.348 | d7 = 0.7 | Nd7 = 1.51823 | vd7 = 58.9 |
| r8 = 156.429 | d8 = D8 | | |
| r9 = 15.196 | d9 = 3.5 | Nd9 = 1.741 | vd9 = 52.64 |

-continued

Numerical data 33

(Aspheric surface)
| | | | |
|---|---|---|---|
| r10 = −13 | d10 = 0.7 | Nd10 = 1.84666 | vd10 = 23.78 |
| r11 = −23.452 | d11 = D11 | | |
| r12 = Aperture stop | d12 = D12 | | |
| r13 = −12.708 | d13 = 0.7 | Nd13 = 1.48749 | vd13 = 70.23 |
| r14 = 991.277 | d14 = 1.6 | Nd14 = 1.8061 | vd14 = 40.92 |
| r15 = 431.248 | d15 = D15 | | |
| r16 = 46.011 | d16 = 3.5 | Nd16 = 1.7432 | vd16 = 49.34 |

(Aspheric surface)
| | | | |
|---|---|---|---|
| r17 = −6 | d17 = 0.7 | Nd17 = 1.84666 | vd17 = 23.78 |
| r18 = −11.503 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface $k = 0$
$A4 = -7.02659E-05$
$A6 = -1.20251E-07$
$A8 = 0$

6th surface $k = 0$
$A4 = -6.03215E-05$
$A6 = 4.18480E-07$
$A8 = 0.00000E+00$

9th surface $k = 0$
$A4 = -5.02553E-05$
$A6 = -2.74785E-07$
$A8 = 0.00000E+00$

16th surface $k = 0$
$A4 = -1.27377E-04$
$A6 = -7.15856E-06$
$A8 = 0.00000E+00$

Zoom data
When D0 (distance from object up to 1st surface) is ∞

| | wide-angle end | intermediate | telephoto end |
|---|---|---|---|
| Focal length | 6.079 | 13.698 | 18.005 |
| FNO. | 2.86 | 2.7 | 3.18 |
| D8 | 13.32 | 2.66 | 0.81 |
| D11 | 1.62 | 12.29 | 14.13 |
| D12 | 1.42 | 0.98 | 4.94 |
| D15 | 0.81 | 4.08 | 2.94 |
| D18 | 6.89 | 4.06 | 1.25 |
| D22 | 1.36 | 1.36 | 1.36 |

Thirty Fourth Embodiment

Figure 67:
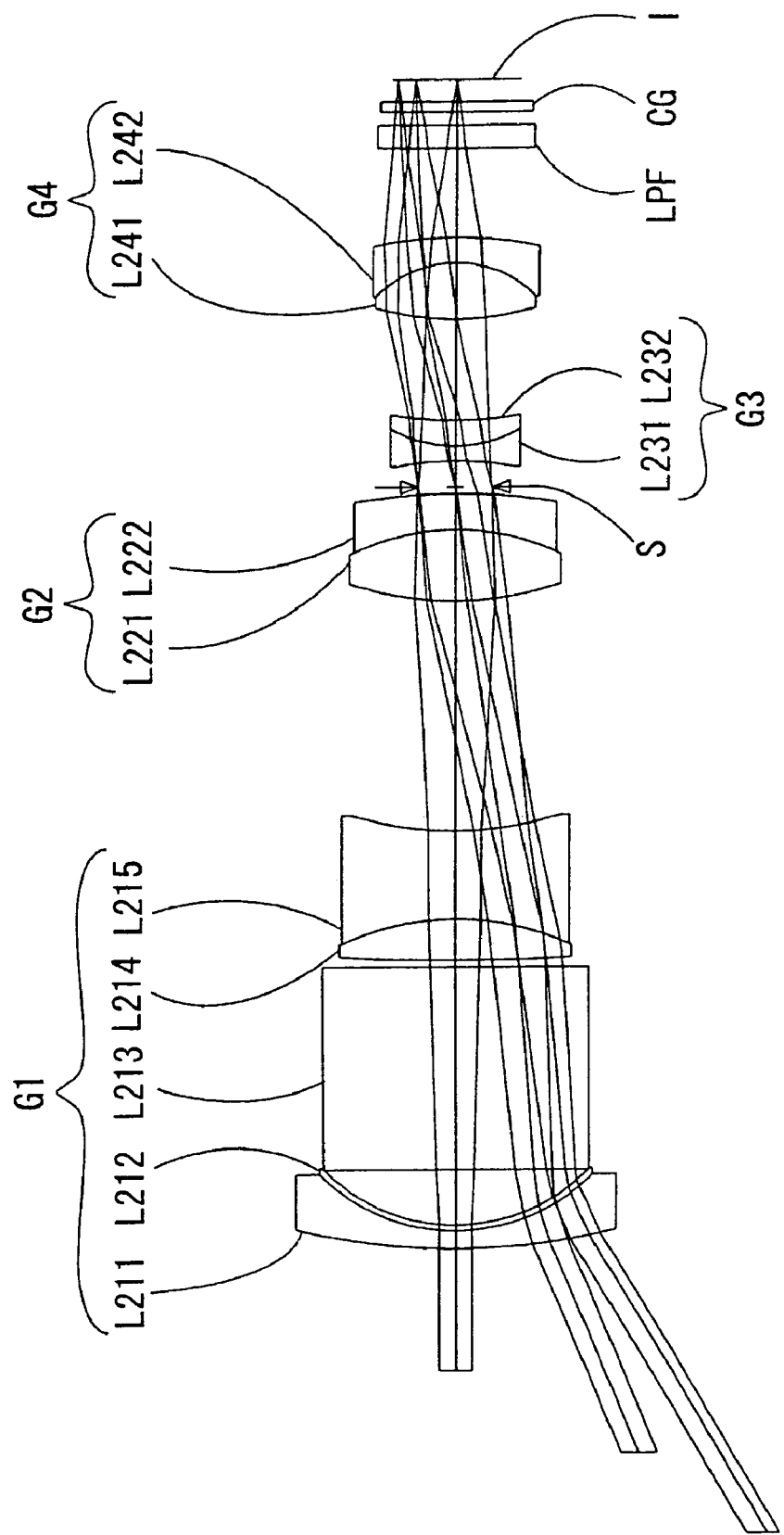
FIG. 67 is a cross-sectional view along the optical axis showing an optical arrangement at the time of the infinite object point focusing at the wide angle end of a zoom lens according to a thirty fourth embodiment of the present invention.

FIG. 67 is a cross-sectional view along the optical axis showing an optical arrangement at the time of the infinite object point focusing at the wide angle end of a zoom lens according to a thirty fourth embodiment of the present invention.

Figure 68A:
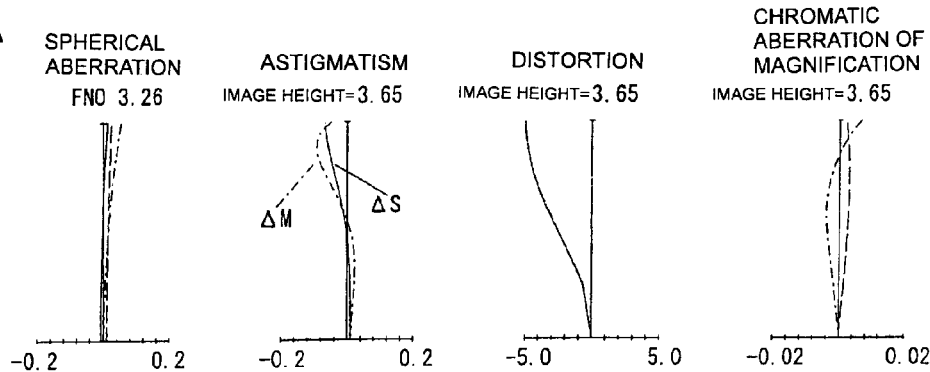
FIG. 68A, FIG. 68B, and FIG. 68C are diagrams showing the spherical aberration, the astigmatism, the distortion, and the chromatic aberration of magnification at the time of the infinite object point focusing of the zoom lens according to the thirty fourth embodiment, where.
Figure 68B:
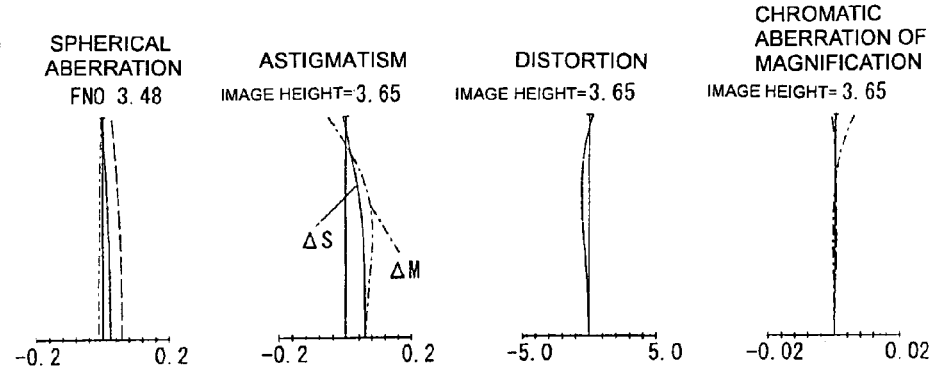
Figure 68C:
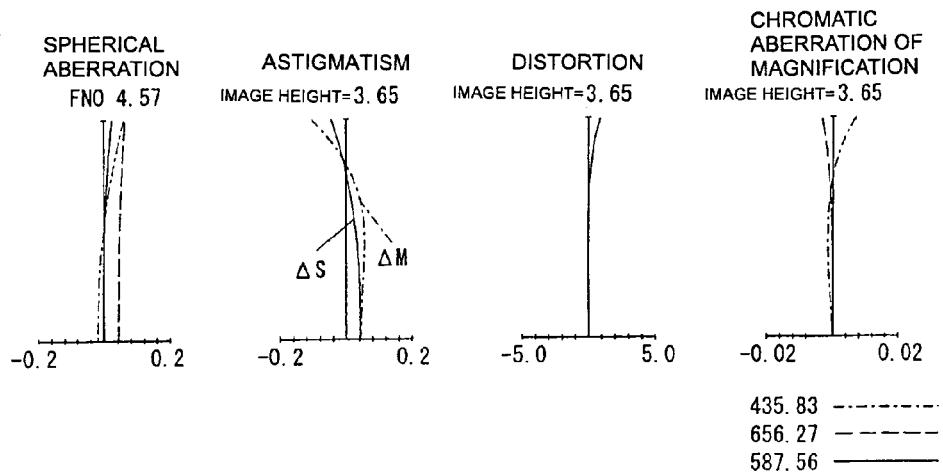

FIG. 68A, FIG. 68B, and FIG. 68C are diagrams showing the spherical aberration, the astigmatism, the distortion, and the chromatic aberration of magnification at the time of the infinite object point focusing of the zoom lens according to the thirty fourth embodiment, where, FIG. 68A shows the state at the wide angle end, FIG. 68B shows the intermediate state, and FIG. 68C shows the state at the telephoto end.

The zoom lens of the thirty fourth embodiment, as shown in FIG. 67, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a negative meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side.

At the time of zooming from the wide angle end to the telephoto end, the first lens group G1 is fixed, the second lens group G2 moves toward the object side, the third lens group G3 moves toward the image side, and the fourth lens group G4 moves toward the image side.

An aspheric surface is provided on a surface on the image side of the negative meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the thirty fourth embodiment will be enumerated.

Numerical data 34

| | | | |
|---|---|---|---|
| r1 = 35.627 | d1 = 1.1 | Nd1 = 1.7432 | vd1 = 49.34 |
| r2 = 10.5 | d2 = 0.35 | Nd2 = 1.65228 | vd2 = 12.75 |
| r3 = 10.257 | d3 = 3.39 | | |

(Aspheric surface)
| | | | |
|---|---|---|---|
| r4 = ∞ | d4 = 12.5 | Nd4 = 1.8061 | vd4 = 40.92 |
| r5 = ∞ | d5 = 0.4 | | |
| r6 = 189.603 | d6 = 2.53 | Nd6 = 1.8061 | vd6 = 40.92 |

(Aspheric surface)
| | | | |
|---|---|---|---|
| r7 = −14.57 | d7 = 5.4 | Nd7 = 1.51742 | vd7 = 52.43 |
| r8 = 18.292 | d8 = D8 | | |
| r9 = 17.196 | d9 = 4.28 | Nd9 = 1.7432 | vd9 = 49.34 |

(Aspheric surface)
| | | | |
|---|---|---|---|
| r10 = −13 | d10 = 2.17 | Nd10 = 1.84666 | vd10 = 23.78 |
| r11 = −32.13 | d11 = D11 | | |
| r12 = Aperture stop | d12 = D12 | | |
| r13 = −16.531 | d13 = 0.9 | Nd13 = 1.51823 | vd13 = 58.9 |
| r14 = 7.005 | d14 = 1.57 | Nd14 = 1.8061 | vd14 = 40.92 |
| r15 = 21.588 | d15 = D15 | | |
| r16 = 14.073 | d16 = 3.44 | Nd16 = 1.7432 | vd16 = 49.34 |

(Aspheric surface)
| | | | |
|---|---|---|---|
| r17 = −6 | d17 = 1.56 | Nd17 = 1.84666 | vd17 = 23.78 |
| r18 = −20.07 | d18 = D18 | | |
| r19 = ∞ | d19 = 1.44 | Nd19 = 1.54771 | vd19 = 62.84 |
| r20 = ∞ | d20 = 0.8 | | |

-continued

Numerical data 34

| r21 = ∞ | d21 = 0.6 | Nd21 = 1.51633 | vd21 = 64.14 |
|---|---|---|---|
| r22 = ∞ | d22 = D22 | | |

Aspherical coefficients

3rd surface k = 0
A4 = 4.66886E−05
A6 = −3.68390E−07
A8 = 0

6th surface k = 0
A4 = 4.41308E−05
A6 = −1.09516E−08
A8 = 0.00000E+00

9th surface k = 0
A4 = −3.06648E−05
A6 = −2.07782E−08
A8 = 0.00000E+00

16th surface k = 0
A4 = −1.41284E−04
A6 = −9.64511E−07
A8 = 0.00000E+00

Zoom data
When D0 (distance from object up to 1st surface) is ∞

| | wide-angle end | intermediate | telephoto end |
|---|---|---|---|
| Focal length | 6.099 | 13.417 | 17.991 |
| FNO. | 3.26 | 3.52 | 4.58 |
| D8 | 13.95 | 3.68 | 0.4 |
| D11 | 0.4 | 12.53 | 12.79 |
| D12 | 1.57 | 4.97 | 12.55 |
| D15 | 6.19 | 5.04 | 3.12 |
| D18 | 5.41 | 2.24 | 1.07 |
| D22 | 1.36 | 1.36 | 1.36 |

Thirty Fifth Embodiment

Figure 69:
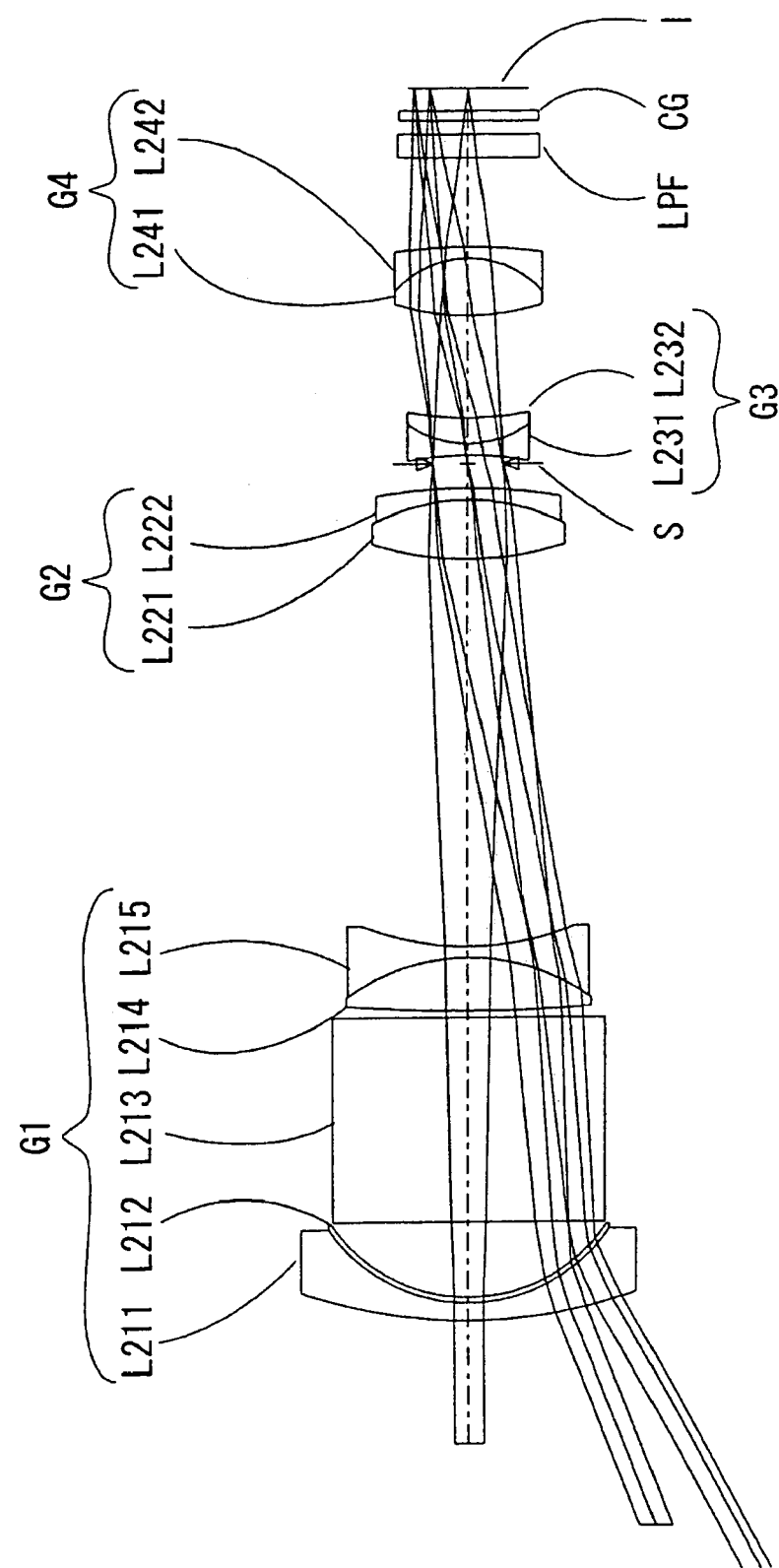
FIG. 69 is a cross-sectional view along the optical axis showing an optical arrangement at the time of the infinite object point focusing at the wide angle end of a zoom lens according to a thirty fifth embodiment of the present invention.

FIG. 69 is a cross-sectional view along the optical axis showing an optical arrangement at the time of the infinite object point focusing at the wide angle end of a zoom lens according to a thirty fifth embodiment of the present invention.

FIG. 70A, FIG. 70B, and FIG. 70C are diagrams showing the spherical aberration, the astigmatism, the distortion, and the chromatic aberration of magnification at the time of the infinite object point focusing of the zoom lens according to the thirty fifth embodiment, where, FIG. 70A shows the state at the wide angle end, FIG. 70B shows the intermediate state, and FIG. 70C shows the state at the telephoto end.

The zoom lens of the thirty fifth embodiment, as shown in FIG. 69, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the thirty fifth embodiment will be enumerated.

Numerical data 35

| r1 = 30.82 | d1 = 1.1 | Nd1 = 1.68184 | vd1 = 39.35 |
|---|---|---|---|
| r2 = 10.5 | d2 = 0.35 | Nd2 = 1.59885 | vd2 = 6.52 |
| r3 = 10.648 | d3 = 4.65 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 134.153 | d6 = 3.23 | Nd6 = 1.82682 | vd6 = 41.39 |
| (Aspheric surface) | | | |
| r7 = −12.852 | d7 = 0.7 | Nd7 = 1.54352 | vd7 = 51.79 |
| r8 = 17.506 | d8 = D8 | | |
| r9 = 19.026 | d9 = 3.5 | Nd9 = 1.7432 | vd9 = 49.34 |
| (Aspheric surface) | | | |
| r10 = −13 | d10 = 0.7 | Nd10 = 1.84666 | vd10 = 23.78 |
| r11 = −34.264 | d11 = D11 | | |
| r12 = Aperture stop | d12 = D12 | | |
| r13 = −18.881 | d13 = 0.7 | Nd13 = 1.51823 | vd13 = 58.9 |
| r14 = 6.389 | d14 = 1.6 | Nd14 = 1.8061 | vd14 = 40.92 |
| r15 = 20.689 | d15 = D15 | | |
| r16 = 13.519 | d16 = 3.5 | Nd16 = 1.7432 | vd16 = 49.34 |
| (Aspheric surface) | | | |
| r17 = −6 | d17 = 0.7 | Nd17 = 1.84666 | vd17 = 23.78 |
| r18 = −33.096 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 6.29124E−05
A6 = −9.94304E−08
A8 = 0

6th surface k = 0
A4 = 3.57536E−05
A6 = −2.19825E−07
A8 = 0.00000E+00

-continued

Numerical data 35

9th surface k = 0
A4 = −2.33627E−05
A6 = 1.44142E−07
A8 = 0.00000E+00

16th surface k = 0
A4 = −1.46902E−04
A6 = −2.18220E−06
A8 = 0.00000E+00

Zoom data
When D0 (distance from object up to 1st surface) is ∞

|  | wide-angle end | intermediate | telephoto end |
|---|---|---|---|
| Focal length | 6.1 | 13.421 | 17.996 |
| FNO. | 3.36 | 3.86 | 4.73 |
| D8 | 23.43 | 6.51 | 1.75 |
| D11 | 1.47 | 10 | 10.6 |
| D12 | 0.53 | 6.33 | 13.1 |
| D15 | 6.2 | 5.15 | 3.36 |
| D18 | 5.4 | 2.12 | 0.82 |
| D22 | 1.36 | 1.36 | 1.36 |

Thirty Sixth Embodiment

Figure 71:
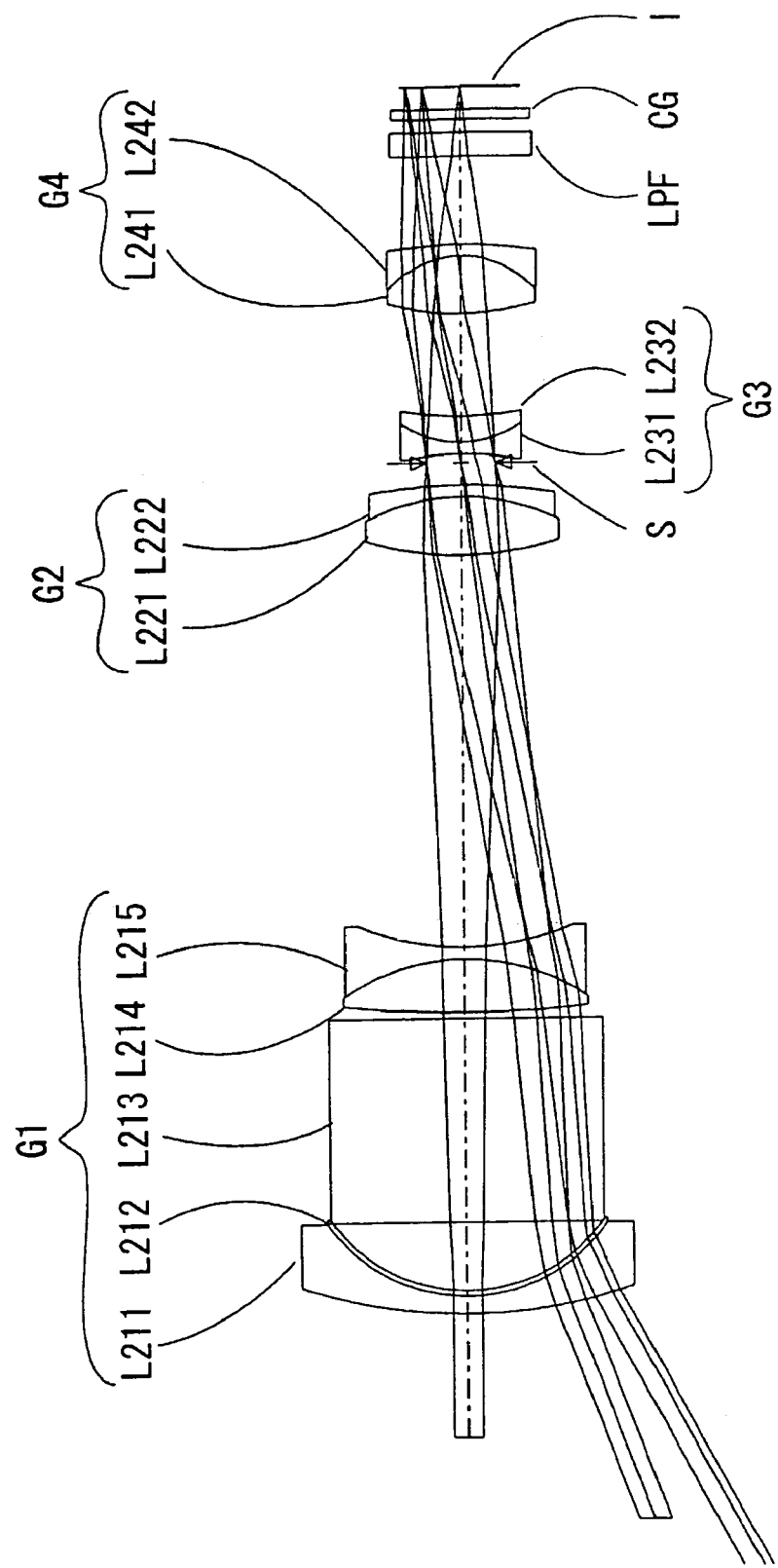
FIG. 71 is a cross-sectional view along the optical axis showing an optical arrangement at the time of the infinite object point focusing at the wide angle end of a zoom lens according to a thirty sixth embodiment of the present invention.

FIG. 71 is a cross-sectional view along the optical axis showing an optical arrangement at the time of the infinite object point focusing at the wide angle end of a zoom lens according to a thirty sixth embodiment of the present invention.

FIG. 72A, FIG. 72B, and FIG. 72C are diagrams showing the spherical aberration, the astigmatism, the distortion, and the chromatic aberration of magnification at the time of the infinite object point focusing of the zoom lens according to the thirty sixth embodiment, where, FIG. 72A shows the state at the wide angle end, FIG. 72B shows the intermediate state, and FIG. 72C shows the state at the telephoto end.

The zoom lens of the thirty sixth embodiment, as shown in FIG. 71, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L242 in the fourth lens group G4.

Next, numerical data of the thirty sixth embodiment will be enumerated.

Numerical data 36

| r1 = 31.869 | d1 = 1.1 | Nd1 = 1.68455 | vd1 = 38.62 |
|---|---|---|---|
| r2 = 10.5 | d2 = 0.35 | Nd2 = 1.79525 | vd2 = 9.95 |
| r3 = 10.719 | d3 = 4.19 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 99.427 | d6 = 3.24 | Nd6 = 1.82739 | vd6 = 42.49 |
| (Aspheric surface) | | | |
| r7 = −13.299 | d7 = 0.7 | Nd7 = 1.54227 | vd7 = 52.3 |
| r8 = 16.692 | d8 = D8 | | |
| r9 = 19.193 | d9 = 3.5 | Nd9 = 1.7432 | vd9 = 49.34 |
| (Aspheric surface) | | | |
| r10 = −13 | d10 = 0.7 | Nd10 = 1.84666 | vd10 = 23.78 |
| r11 = −33.527 | d11 = D11 | | |
| r12 = Aperture stop | d12 = D12 | | |
| r13 = −18.855 | d13 = 0.7 | Nd13 = 1.51823 | vd13 = 58.9 |
| r14 = 6.427 | d14 = 1.6 | Nd14 = 1.8061 | vd14 = 40.92 |
| r15 = 21.117 | d15 = D15 | | |
| r16 = 14.070 | d16 = 3.5 | Nd16 = 1.7432 | vd16 = 49.34 |
| (Aspheric surface) | | | |
| r17 = −6 | d17 = 0.7 | Nd17 = 1.84666 | vd17 = 23.78 |
| r18 = −30.061 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 5.65707E−05
A6 = −8.35153E−09
A8 = 0

6th surface k = 0
A4 = 4.41416E−05
A6 = −2.42655E−07
A8 = 0.00000E+00

9th surface k = 0
A4 = −2.48396E−05
A6 = 1.43316E−07
A8 = 0.00000E+00

16th surface k = 0
A4 = −1.47665E−04

-continued

Numerical data 36

A6 = −2.52326E−06
A8 = 0.00000E+00

Zoom data
When D0 (distance from object up to 1st surface) is ∞

|  | wide-angle end | intermediate | telephoto end |
|---|---|---|---|
| Focal length | 6.1 | 13.42 | 17.995 |
| FNO. | 3.35 | 3.84 | 4.67 |
| D8 | 23.69 | 6.89 | 2.16 |
| D11 | 1.33 | 9.95 | 10.69 |
| D12 | 0.53 | 6.23 | 12.79 |
| D15 | 6.2 | 5.15 | 3.38 |
| D18 | 5.4 | 2.12 | 0.81 |
| D22 | 1.36 | 1.36 | 1.36 |

Thirty Seventh Embodiment

Figure 73:
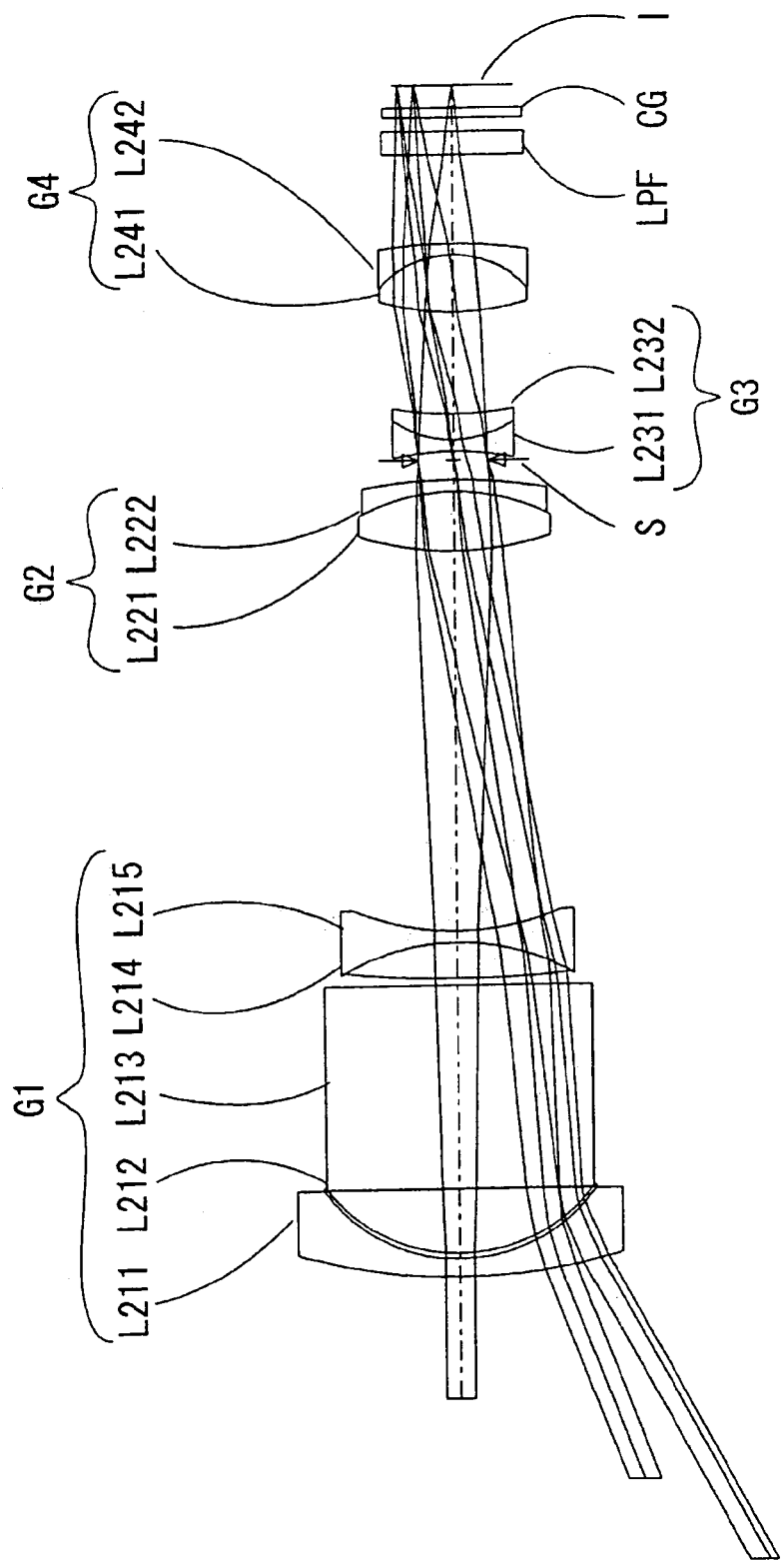
FIG. 73 is a cross-sectional view along the optical axis showing an optical arrangement at the wide angle end of a zoom lens according to a thirty seventh embodiment of the present invention.

FIG. 73 is a cross-sectional view along the optical axis showing an optical arrangement at the wide angle end of a zoom lens according to a thirty seventh embodiment of the present invention.

Figure 74A:
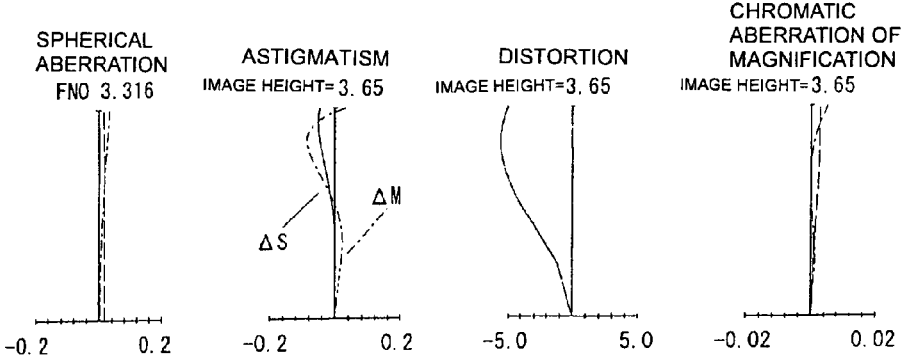
FIG. 74A, FIG. 74B, and FIG. 74C are diagrams showing the spherical aberration, the astigmatism, the distortion, and the chromatic aberration of magnification at the time of the infinite object point focusing of the zoom lens according to the thirty seventh embodiment, where.
Figure 74B:
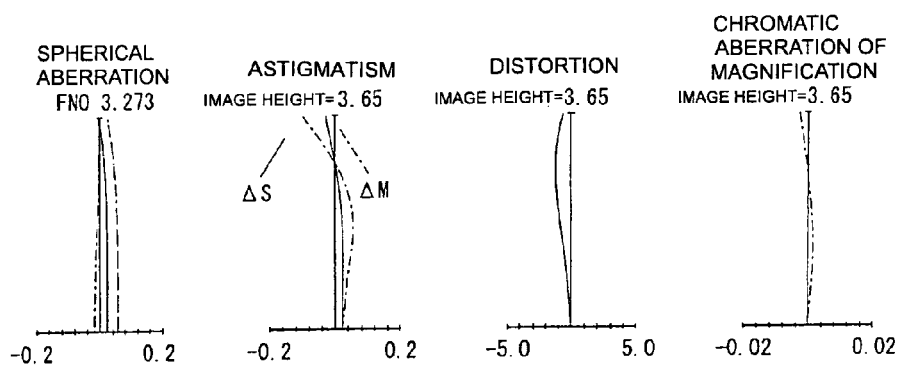
Figure 74C:
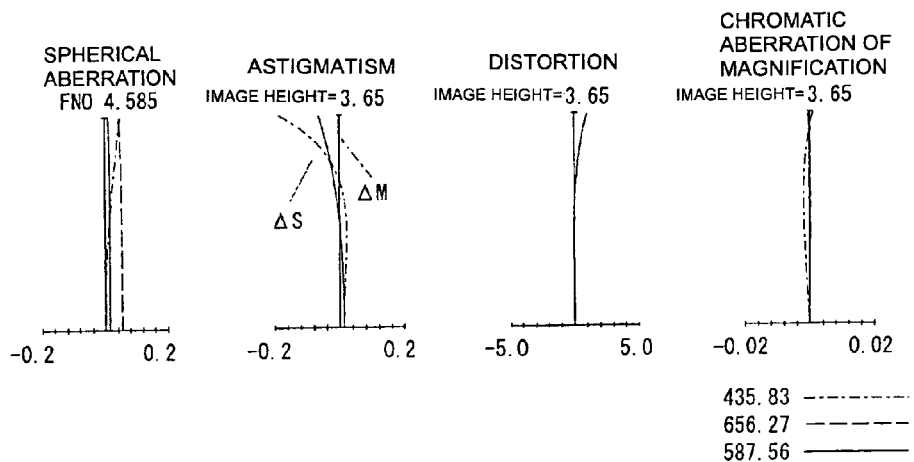

FIG. 74A, FIG. 74B, and FIG. 74C are diagrams showing the spherical aberration, the astigmatism, the distortion, and the chromatic aberration of magnification at the time of the infinite object point focusing of the zoom lens according to the thirty seventh embodiment, where, FIG. 74A shows the state at the wide angle end, FIG. 74B shows the intermediate state, and FIG. 74C shows the state at the telephoto end.

The zoom lens of the thirty seventh embodiment, as shown in FIG. 73, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G2, a surface on the object side of the biconvex lens L221 in the second lens group G2, and a surface on the object side of the biconvex lens L241 in the fourth lens group G4.

Next, numerical data of the thirty seventh embodiment will be enumerated.

Numerical data 37

| r1 = 36.23 | d1 = 1.1 | Nd1 = 1.69029 | vd1 = 36.36 |
|---|---|---|---|
| r2 = 10.5 | d2 = 0.35 | Nd2 = 1.9712 | vd2 = 12.88 |
| r3 = 11.000 | d3 = 3.93 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 88.421 | d6 = 2.2 | Nd6 = 1.82354 | vd6 = 44.73 |
| (Aspheric surface) | | | |
| r7 = −14.187 | d7 = 0.7 | Nd7 = 1.53704 | vd7 = 54.58 |
| r8 = 16.455 | d8 = D8 | | |
| r9 = 18.958 | d9 = 3.5 | Nd9 = 1.7432 | vd9 = 49.34 |
| (Aspheric surface) | | | |
| r10 = −13 | d10 = 0.7 | Nd10 = 1.84666 | vd10 = 23.78 |
| r11 = −32.852 | d11 = D11 | | |
| r12 = Aperture stop | d12 = D12 | | |
| r13 = −18.113 | d13 = 0.7 | Nd13 = 1.51823 | vd13 = 58.9 |
| r14 = 6.38 | d14 = 1.6 | Nd14 = 1.8061 | vd14 = 40.92 |
| r15 = 20.833 | d15 = D15 | | |
| r16 = 13.828 | d16 = 3.5 | Nd16 = 1.7432 | vd16 = 49.34 |
| (Aspheric surface) | | | |
| r17 = −6 | d17 = 0.7 | Nd17 = 1.84666 | vd17 = 23.78 |
| r18 = −29.055 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 5.07303E−05
A6 = −6.94190E−08
A8 = 0

6th surface k = 0
A4 = 4.89135E−05
A6 = −2.70777E−07
A8 = 0.00000E+00

9th surface k = 0
A4 = −2.69831E−05
A6 = 1.67783E−07
A8 = 0.00000E+00

16th surface k = 0
A4 = −1.51906E−04
A6 = −2.58667E−06
A8 = 0.00000E+00

Zoom data
When D0 (distance from object up to 1st surface) is ∞

|  | wide-angle end | intermediate | telephoto end |
|---|---|---|---|
| Focal length | 6.106 | 13.426 | 18.001 |
| FNO. | 3.32 | 3.76 | 4.59 |
| D8 | 22.99 | 6.9 | 2.3 |
| D11 | 1.19 | 10.06 | 10.8 |
| D12 | 0.53 | 5.88 | 12.39 |
| D15 | 6.19 | 5.13 | 3.33 |
| D18 | 5.4 | 2.14 | 0.85 |
| D22 | 1.36 | 1.36 | 1.36 |

Thirty Eighth Embodiment

Figure 75:
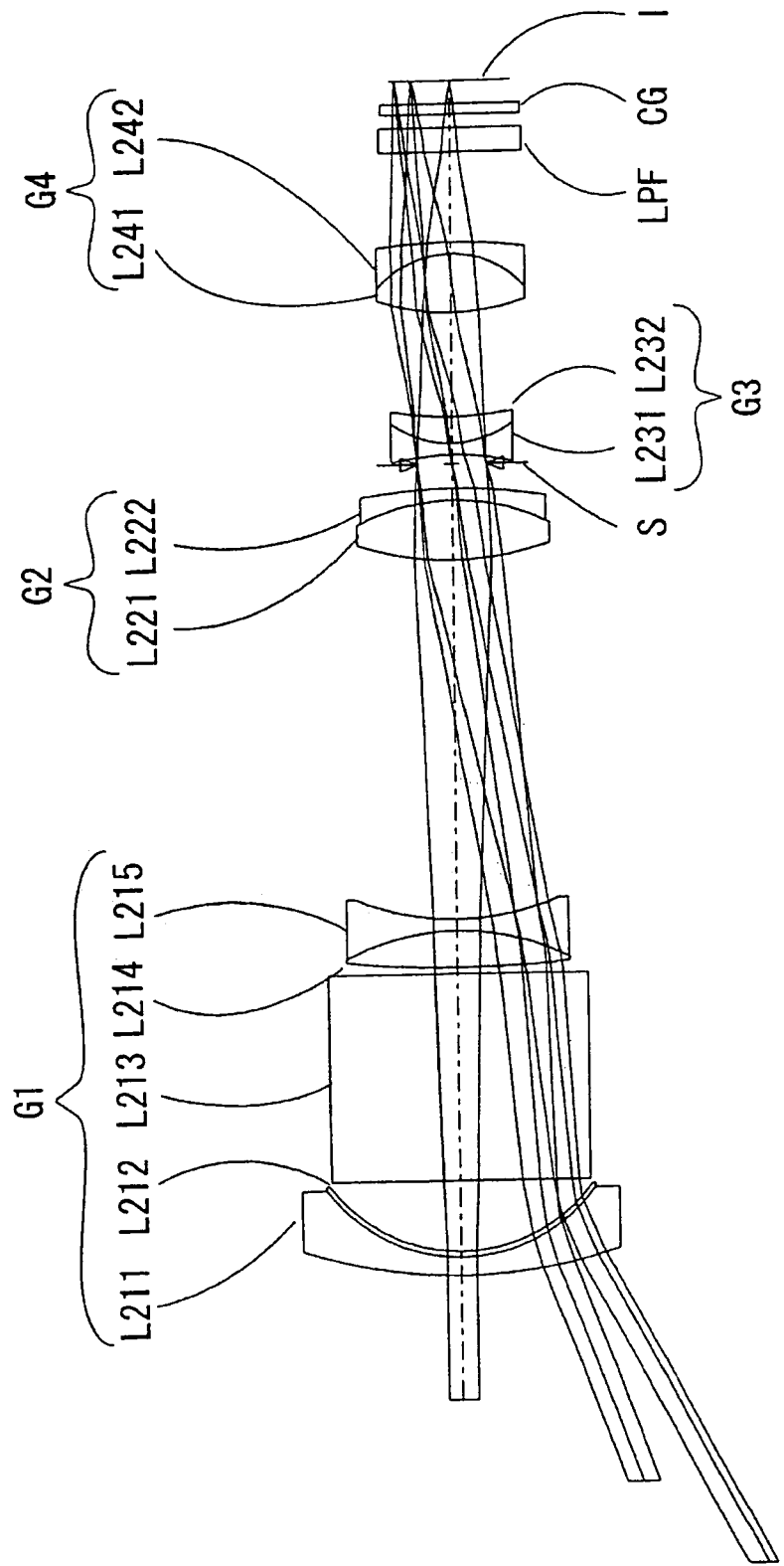
FIG. 75 is a cross-sectional view along the optical axis showing an optical arrangement at the time of the infinite object point focusing at the wide angle end of a zoom lens according to a thirty eighth embodiment of the present invention.

FIG. 75 is a cross-sectional view along the optical axis showing an optical arrangement at the time of the infinite object point focusing at the wide angle end of a zoom lens according to a thirty eighth embodiment of the present invention.

Figure 76A:
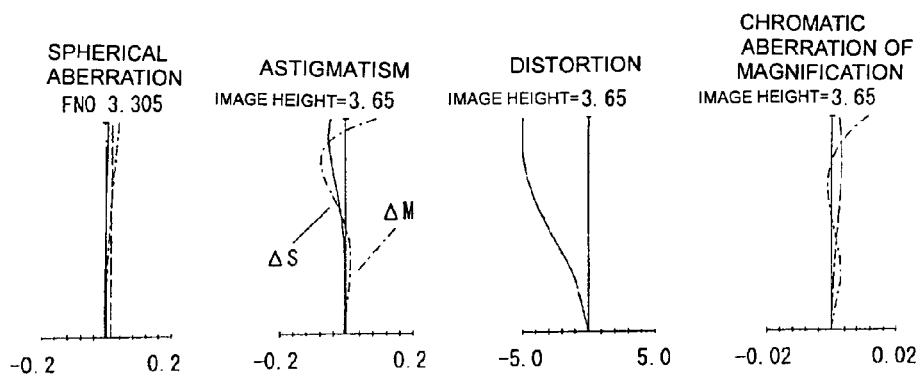
FIG. 76A, FIG. 76B, and FIG. 76C are diagrams showing the spherical aberration, the astigmatism, the distortion, and the chromatic aberration of magnification at the time of the infinite object point focusing of the zoom lens according to the thirty eighth embodiment, where.
Figure 76B:
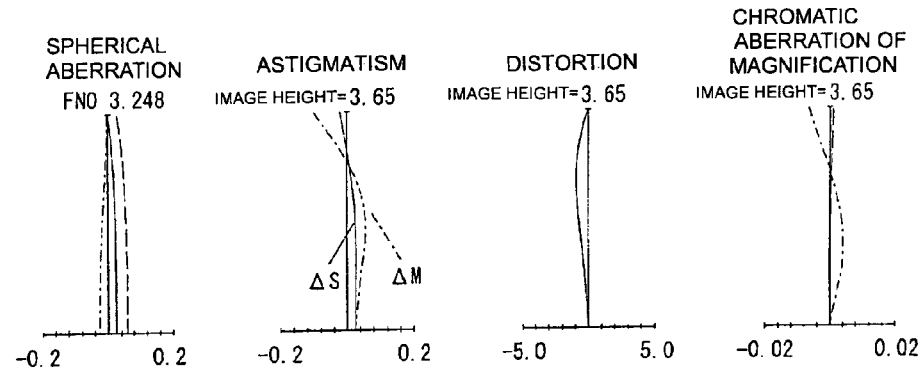
Figure 76C:
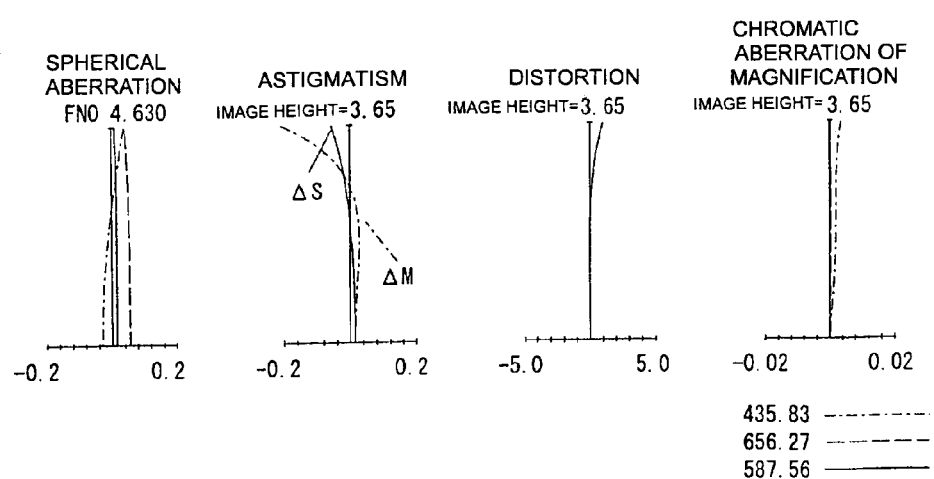

FIG. 76A, FIG. 76B, and FIG. 76C are diagrams showing the spherical aberration, the astigmatism, the distortion, and the chromatic aberration of magnification at the time of the infinite object point focusing of the zoom lens according to the thirty eighth embodiment, where, FIG. 76A shows the state at the wide angle end, FIG. 76B shows the intermediate state, and FIG. 76C shows the state at the telephoto end.

The zoom lens of the thirty eighth embodiment, as shown in FIG. 75, has in order from an object side thereof, a first lens group G1, a second lens group G2, an aperture stop S, a third lens group G3, and a fourth lens group G4. In the diagram, LPF is a low-pass filter, CG is a cover glass, and I is an image pickup surface of an electronic image pickup element.

The first lens group G1 includes a cemented lens which is formed by a negative meniscus lens L211 having a convex surface directed toward the object side and a positive meniscus lens L212 having a convex surface directed toward the object side, a prism L213, and a cemented lens which is formed by a biconvex lens L214 and a biconcave lens L215, and has a negative refracting power as a whole.

The second lens group G2 includes a cemented lens which is formed by a biconvex lens L221 and a negative meniscus lens L222 having a convex surface directed toward an image side, and has a positive refracting power as a whole.

The third lens group G3 includes a cemented lens which is formed by a biconcave lens L231 and a positive meniscus lens L232 having a convex surface directed toward the object side, and has a negative refracting power as a whole.

The fourth lens group G4 includes a cemented lens which is formed by a biconvex lens L241 and a negative meniscus lens L242 having a concave surface directed toward the object side, and has a positive refracting power as a whole.

At the time of zooming from the wide angle end to the telephoto end, the first lens group G1 is fixed, the second lens group G2 moves toward the object side, the aperture stop S is fixed, the third lens group G3 moves toward the image side, and the fourth lens group G4 moves toward the image side.

An aspheric surface is provided on a surface on the image side of the positive meniscus lens L212 having the convex surface directed toward the object side and a surface on the object side of the biconvex lens L214 in the first lens group G1, a surface on the object side of the biconvex lens L221 in the second lens group G2, and a surface on the object side of the biconvex lens L241 in the fourth lens group G4.

Next, numerical data of the thirty eighth embodiment will be enumerated.

Numerical data 38

| | | | |
|---|---|---|---|
| r1 = 31.999 | d1 = 1.1 | Nd1 = 1.71082 | vd1 = 36.25 |
| r2 = 10.5 | d2 = 0.35 | Nd2 = 2.0512 | vd2 = 6.28 |
| r3 = 10.544 | d3 = 4.21 | | |
| (Aspheric surface) | | | |
| r4 = ∞ | d4 = 12.5 | Nd4 = 1.8061 | vd4 = 40.92 |
| r5 = ∞ | d5 = 0.4 | | |
| r6 = 81.783 | d6 = 2.2 | Nd6 = 1.81694 | vd6 = 45.25 |

-continued

Numerical data 38

| | | | |
|---|---|---|---|
| (Aspheric surface) | | | |
| r7 = −15.2 | d7 = 0.7 | Nd7 = 1.53247 | vd7 = 56.77 |
| r8 = 16.515 | d8 = D8 | | |
| r9 = 18.404 | d9 = 3.5 | Nd9 = 1.7432 | vd9 = 49.34 |
| (Aspheric surface) | | | |
| r10 = −13 | d10 = 0.7 | Nd10 = 1.84666 | vd10 = 23.78 |
| r11 = −33.096 | d11 = D11 | | |
| r12 = Aperture stop | d12 = D12 | | |
| r13 = −16.544 | d13 = 0.7 | Nd13 = 1.51823 | vd13 = 58.9 |
| r14 = 6.208 | d14 = 1.6 | Nd14 = 1.8061 | vd14 = 40.92 |
| r15 = 20.648 | d15 = D15 | | |
| r16 = 12.668 | d16 = 3.5 | Nd16 = 1.7432 | vd16-= 49.34 |
| (Aspheric surface) | | | |
| r17 = −6 | d17 = 0.7 | Nd17 = 1.84666 | vd17 = 23.78 |
| r18 = −34.221 | d18 = D18 | | |
| r19 = ∞ | d19 = 1.44 | Nd19 = 1.54771 | vd19 = 62.84 |
| r20 = ∞ | d20 = 0.8 | | |
| r21 = ∞ | d21 = 0.6 | Nd21 = 1.51633 | vd21 = 64.14 |
| r22 = ∞ | d22 = D22 | | |

Aspherical coefficients

3rd surface k = 0
A4 = 3.63151E−05
A6 = −1.62265E−07
A8 = 0

6th surface k = 0
A4 = 4.72473E−05
A6 = −1.61277E−07
A8 = 0.00000E+00

9th surface k = 0
A4 = −2.67300E−05
A6 = 1.00083E−07
A8 = 0.00000E+00

16th surface k = 0
A4 = −1.61823E−04
A6 = −2.44296E−06
A8 = 0.00000E+00

Zoom data
When D0 (distance from object up to 1st surface) is ∞

| | wide-angle end | intermediate | telephoto end |
|---|---|---|---|
| Focal length | 6.1 | 13.42 | 17.995 |
| FNO. | 3.3 | 3.75 | 4.63 |
| D8 | 21.27 | 6.21 | 1.88 |
| D11 | 1.45 | 10.47 | 11.12 |
| D12 | 0.54 | 5.9 | 12.67 |
| D15 | 6.19 | 5.11 | 3.29 |
| D18 | 5.4 | 2.16 | 0.9 |
| D22 | 1.36 | 1.36 | 1.36 |

Thirty Ninth Embodiment

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 77:
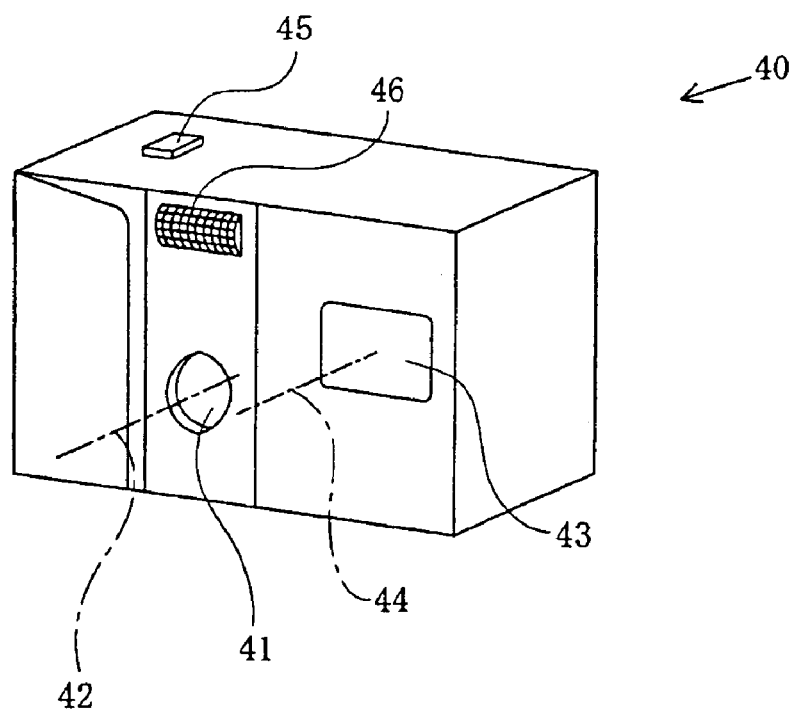
FIG. 77 is a frontward perspective view showing an appearance of a digital camera 40 in which, a zoom optical system according to the present invention is incorporated.
Figure 78:
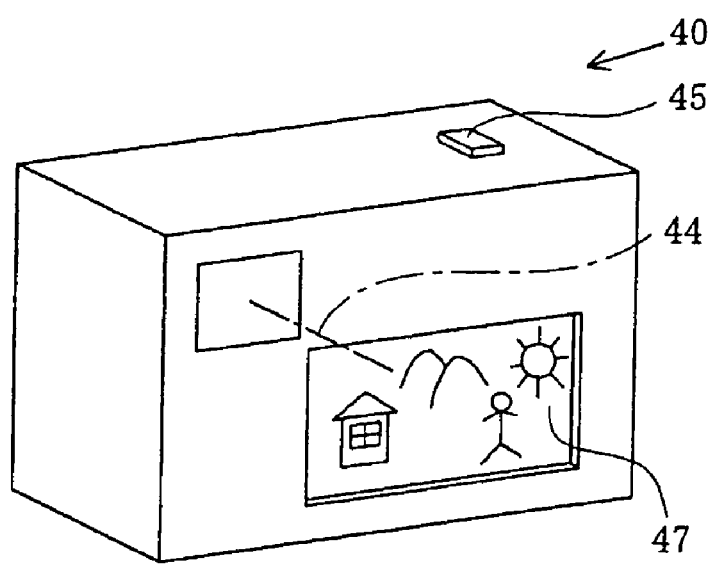
FIG. 78 is a rearward perspective view of the digital camera 40.
Figure 79:
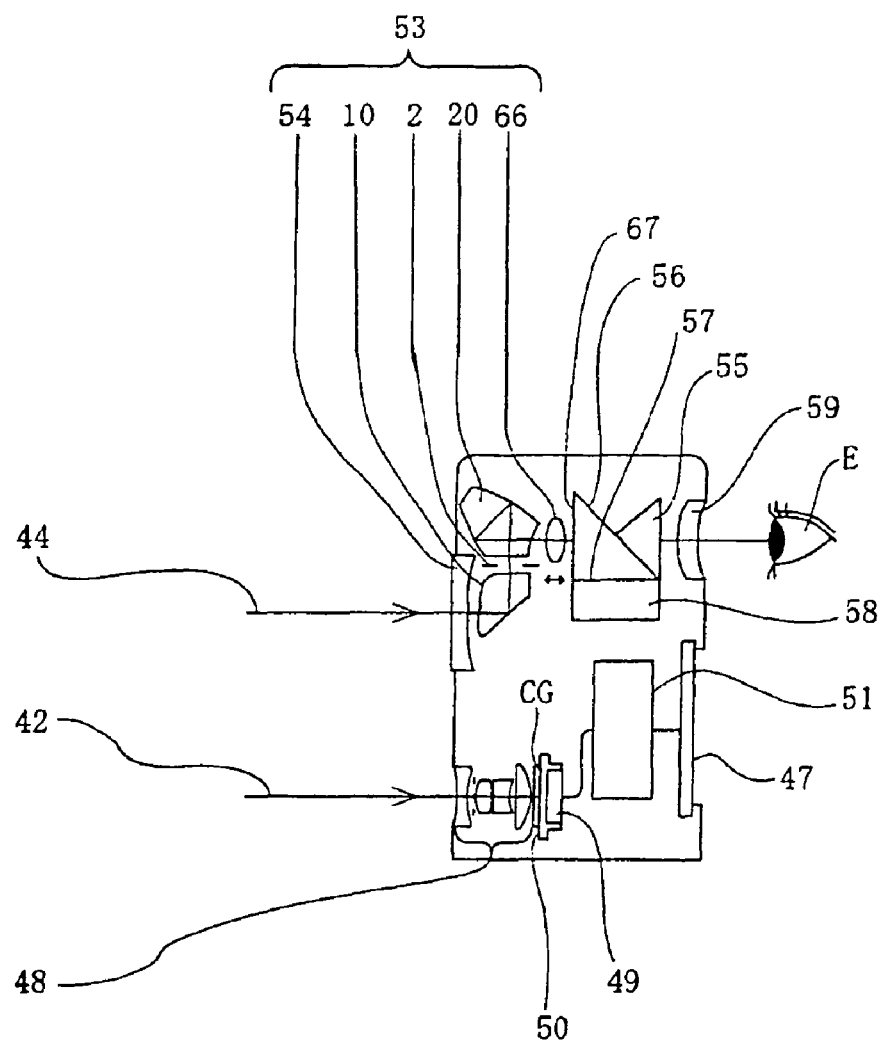
FIG. 79 is a cross-sectional view showing an optical arrangement of the digital camera 40.

In FIG. 77 to FIG. 79 show conceptual diagrams of structures in which the image forming optical system according to the present invention is incorporated in a photographic optical system 41 of a digital camera. FIG. 77 is a frontward perspective view showing an appearance of a digital camera 40, FIG. 78 is a rearward perspective view of the same, and FIG. 79 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Figure 80:
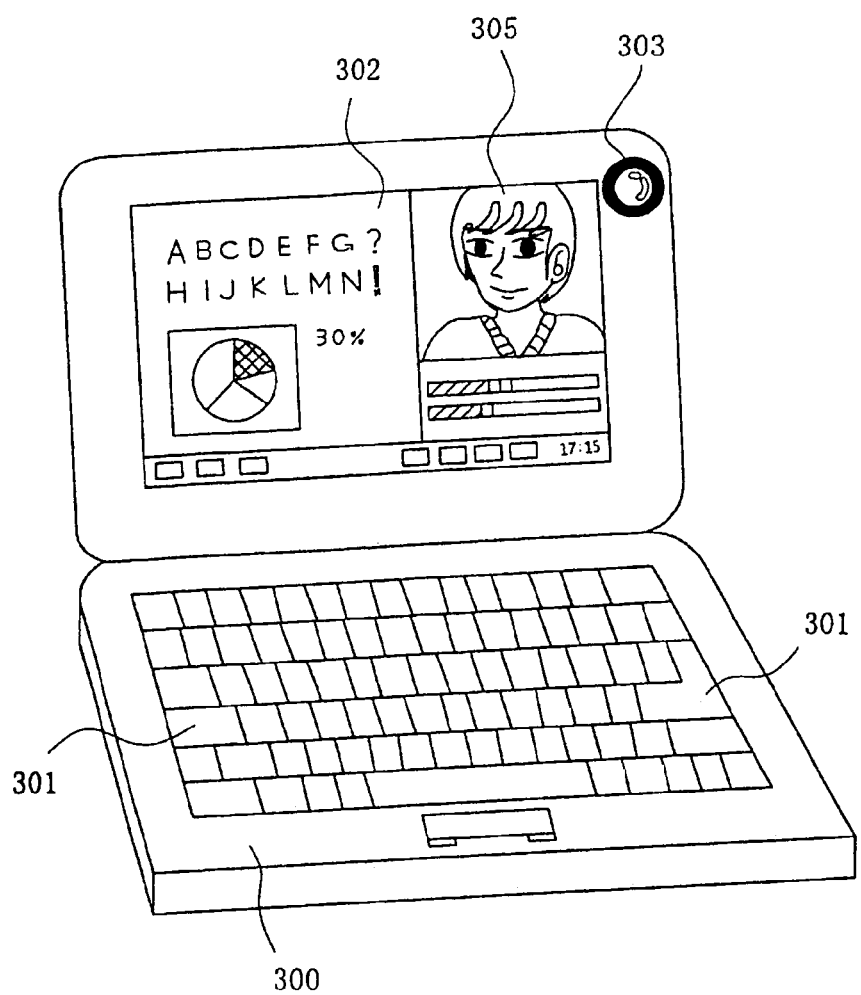
FIG. 80 is a frontward perspective view of a personal computer 300 with its cover opened, which is an example of an information processing apparatus in which, the zoom optical system of the present invention is built-in as an objective optical system.
Figure 81:
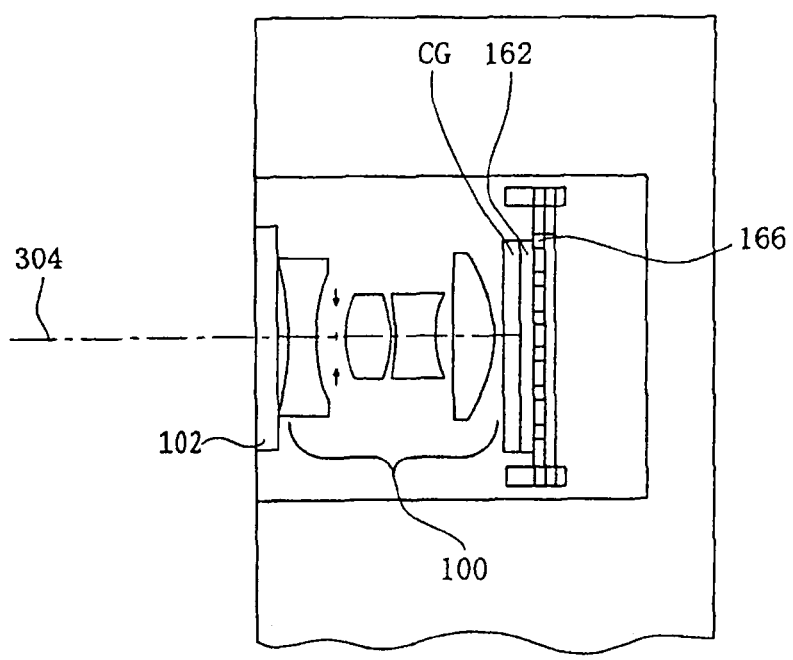
FIG. 81 is a cross-sectional view of a photographic optical system 303 of the personal computer 300.
Figure 82:
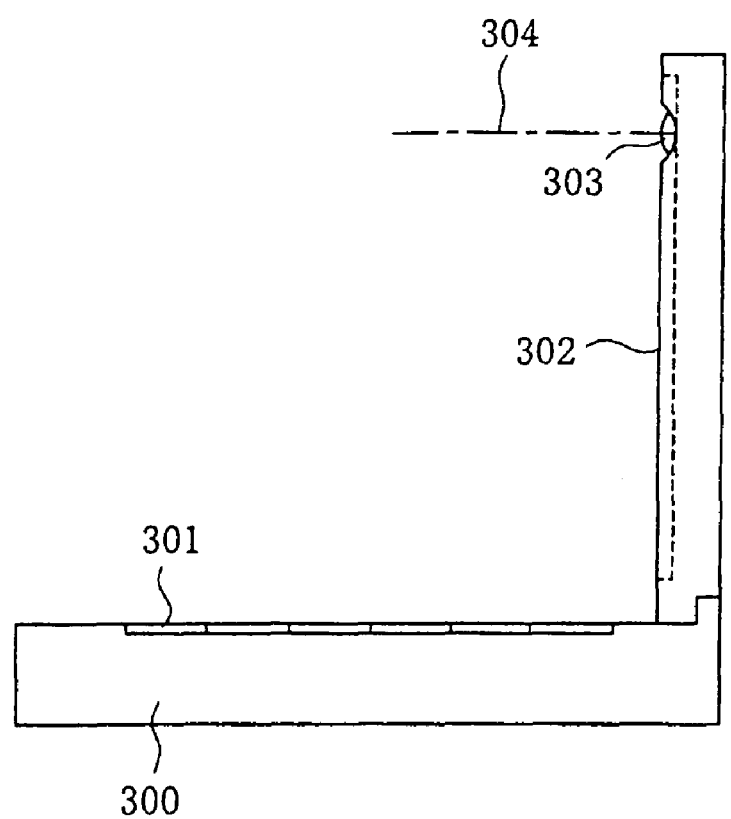
FIG. 82 is a side view of the personal computer 300.

Next, a personal computer which is an example of an information processing apparatus with a built-in image forming system as an objective optical system is shown in FIG. 80 to FIG. 82. FIG. 80 is a frontward perspective view of a personal computer 300 with its cover opened, FIG. 81 is a cross-sectional view of a photographic optical system 303 of the personal computer 300, and FIG. 82 is a side view of FIG. 80. As it is shown in FIG. 80 to FIG. 82, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 40, an image 305 photographed by the user is displayed as an example of the electronic image. Moreover, it is also possible to display the image 305 on a personal computer of a communication counterpart from a remote location via a processing means. For transmitting the image to the remote location, via the Internet and telephone are used.

Figure 83:
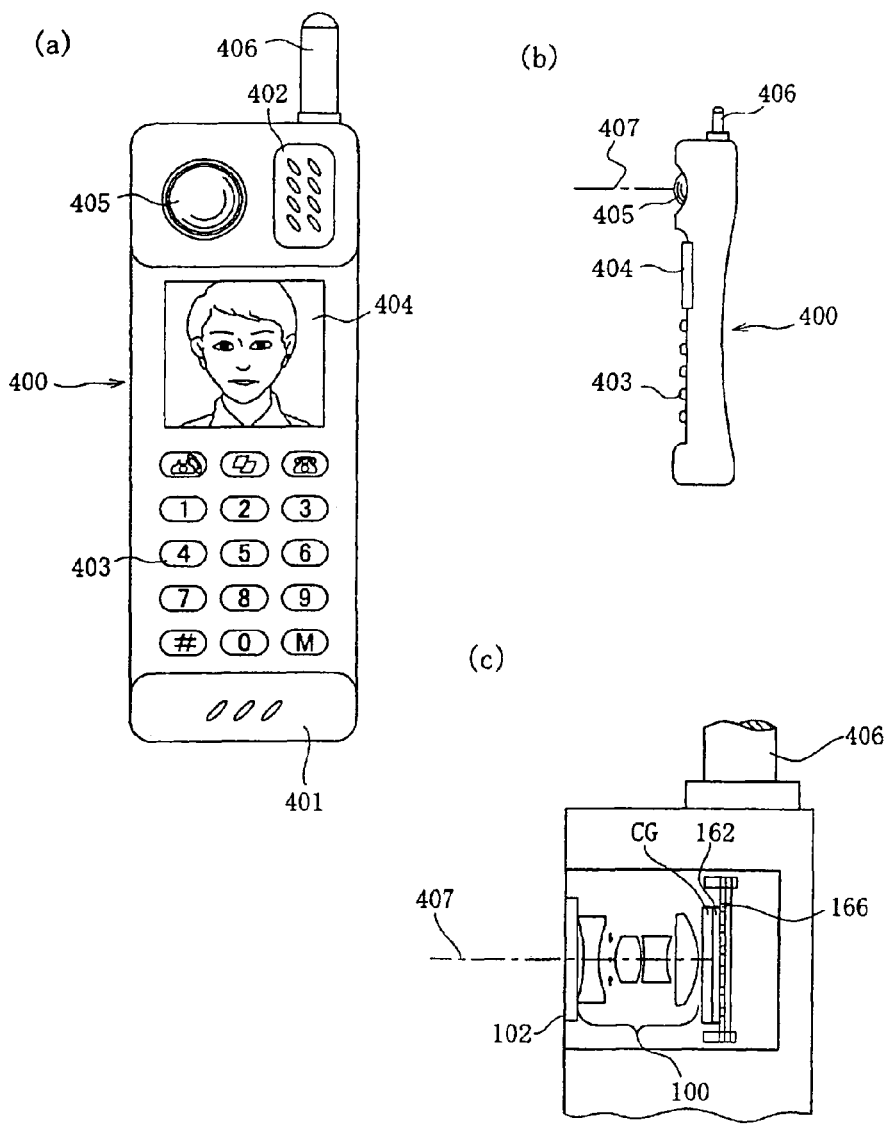
FIG. 83A, FIG. 83B, and FIG. 83C are diagrams showing a portable telephone which is an example of the information processing apparatus in which, the zoom optical system of the present invention is built-in as the taking optical system, where.

Next, a telephone which is an example of an information processing apparatus in which the image forming optical system of the present invention is built-in as a photographic optical system, particularly a portable telephone which is easy to carry is shown in FIG. 83A, FIG. 83B, and FIG. 83C. FIG. 83A is a front view of a portable telephone 400, FIG. 83B is a side view of the portable telephone 400, and FIG. 83C is a cross-sectional view of a photographic optical system 405. As shown in FIG. 83A to FIG. 83C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed, as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

As it has been described above, the image forming optical system of the present invention, and the electronic image pickup apparatus in which the image forming optical system is used have the following characteristics.

(1) It is characterized in that, instead of condition (1a), the following conditional expression is satisfied.

$$1.48 < Nd < 2.04$$

Here, Nd denotes a refractive index of a glass used in a cemented lens, νd denotes an Abbe's number for the glass used in the cemented lens, and a relation $Nd = \alpha \times vd + \beta$ is satisfied.

(2) It is characterized in that, instead of condition (1a), the following conditional expression is satisfied.

$$1.50 < \beta < 2.00$$

Here, Nd denotes a refractive index of the glass used in the cemented lens, νd denotes the Abbe's number for the glass used in the cemented lens, and the relation $Nd = \alpha \times vd + \beta$ is satisfied.

(3) It is characterized in that, instead of condition (2a), the following conditional expression is satisfied.

$$1.58 < Nd < 2.10$$

Here, Nd denotes the refractive index of the glass used in the cemented lens.

(4) It is characterized in that, instead of condition (2a), the following conditional expression is satisfied.

$$1.63 < Nd < 1.95$$

Here, Nd denotes the refractive index of the glass used in the cemented lens.

(5) It is characterized in that, instead of condition (3a), the following conditional expression is satisfied.

$$5 < vd < 10$$

Here, νd denotes the Abbe's number for the glass used in the cemented lens.

(6) It is characterized in that, instead of condition (3a), the following conditional expression is satisfied.

$$6 < vd < 9$$

Here, νd denotes the Abbe's number for the glass used in the cemented lens.

(7) It is characterized in that, instead of condition (1b), the following conditional expression is satisfied.

$$1.48 < \beta < 2.04$$

Here, Nd denotes the refractive index of the glass used in the cemented lens, νd denotes the Abbe's number for the glass used in the cemented lens, and the relation $Nd = \alpha \times vd + \beta$ is satisfied.

(8) It is characterized in that, instead of condition (1b), the following conditional expression is satisfied.

$$1.50 \leq \beta \leq 2.00$$

Here, Nd denotes the refractive index of the glass used in the cemented lens, νd denotes the Abbe's number for the glass used in the cemented lens, and the relation $Nd = \alpha \times vd + \beta$ is satisfied.

(9) It is characterized in that, instead of condition (2b), the following conditional expression is satisfied.

$$1.60 < Nd < 2.10$$

Here, Nd denotes the refractive index of the glass used in the cemented lens.

(10) It is characterized in that, instead of condition (2b), the following conditional expression is satisfied.

$$1.63 < Nd < 1.95$$

Here, Nd denotes the refractive index of the glass used in the cemented lens.

(11) It is characterized in that, instead of condition (3b), the following conditional expression is satisfied.

$$5 < vd < 30$$

Here, νd denotes the Abbe's number for the glass used in the cemented lens.

(12) It is characterized in that, instead of condition (3b), the following conditional expression is satisfied.

$$6 < vd < 25$$

Here, νd denotes the Abbe's number for the glass used in the cemented lens.

(13) It is characterized in that, instead of condition (7), the following conditional expression is satisfied at the time of almost infinite object point focusing.

$$0.75 < y_{07}/(fw \cdot \tan \omega_{07w}) < 0.94$$

where, $y_{07}$ is indicated as $y_{07} = 0.7 y_{10}$ when, in an effective image pickup surface (surface in which, image pickup is possible), a distance from a center up to a farthest point (maximum image height) is let to be $y_{10}$. Moreover, $\omega_{07w}$ is an angle with respect to an optical axis in a direction of an object point corresponding to an image point connecting from a center on the image pickup surface at a wide angle end up to a position of $y_{07}$.

(14) It is characterized in that, instead of condition (7), the following conditional expression is satisfied at the time of almost infinite object point focusing.

$$0.80 < y_{07}/(fw \cdot \tan \omega_{07w}) < 0.92$$

where, $y_{07}$ is indicated by $y_{07} = 0.7 y_{10}$ when, in an effective image pickup surface (surface in which, image pickup is possible), a distance from a center up to a farthest point (maximum image height) is let to be $y_{10}$. Moreover, $\omega_{07w}$ is an angle with respect to an optical axis in a direction of an object point corresponding to an image point connecting from a center on the image pickup surface in a wide angle end up to a position of $y_{07}$.

The present invention can have various modified embodiments which fall within the basic teachings herein set forth.

INDUSTRIAL APPLICABILITY

An image forming optical system according to the present invention is useful in an optical system with a reduced size and thickness, and furthermore, an electronic image pickup apparatus of the present invention is useful in an apparatus in which, both a favorable correction and a widening of an angle have been realized.

The invention claimed is:

1. An image forming optical system comprising:
a positive lens group;
a negative lens group; and
an aperture stop, wherein
the negative lens group is disposed at an object side of the aperture stop, and
the negative lens group includes a cemented lens which is formed by cementing a plurality of lenses, and
in a rectangular coordinate system in which, a horizontal axis is let to be Nd and a vertical axis is let to be νd, when a straight line indicated by Nd=α×νd+β where α=−0.017 is set,
Nd and νd of at least one lens forming the cemented lens are included in both of areas namely, an area which is determined by a line when a lower limit value is in a range of a following conditional expression (1a) and a line when an upper limit value is in a range of the following conditional expression (1a), and an area determined by following conditional expressions (2a) and (3a):

$$1.45 < \beta < 2.15 \quad (1a)$$

$$1.30 < Nd < 2.20 \quad (2a)$$

$$3 < \nu d < 12 \quad (3a)$$

where Nd denotes a refractive index, and νd denotes an Abbe's number.

2. An image forming optical system comprising:
a positive lens group;
a negative lens group; and
an aperture stop, wherein
the negative lens group is disposed at an object side of the aperture stop, and
the negative lens group includes a cemented lens which is formed by cementing a plurality of lenses, and
in a rectangular coordinate system in which, a horizontal axis is let to be Nd and a vertical axis is let to be νd, when a straight line indicated by Nd=α×νd+β where α=−0.017 is set,
Nd and νd of at least one lens forming the cemented lens are included in both of areas namely, an area which is determined by a line when a lower limit value is in a range of a following conditional expression (1b), and a line when an upper limit value is in a range of the following conditional expression (1b), and an area determined by following conditional expressions (2b) and (3b);

$$1.45 < \beta < 2.15 \quad (1b)$$

$$1.58 < Nd < 2.20 \quad (2b)$$

$$3 < \nu d < 40 \quad (3b)$$

where Nd denotes a refractive index, and νd denotes an Abbe's number.

3. The image forming optical system according to one of claim 1 and claim 2, wherein when the one lens of which, Nd and νd are included in both the areas is let to be a predetermined lens, a center thickness of the predetermined lens along an optical axis of the predetermined lens is less than the center thickness along the optical axis of the other lens of the cemented lens.

4. The image forming optical system according to claim 3, wherein the image forming optical system satisfies a following conditional expression $$0.22 < t1 < 2.0$$

where, t1 is a center thickness of the predetermined lens along an optical axis of the predetermined lens.

5. The image forming optical system according to one of claim 1 and claim 2, wherein the cemented lens is a compound lens which is formed by closely adhering and hardening a resin on a lens surface of the one lens which forms the cemented lens.

6. The image forming optical system according to one of claim 1 and claim 2, wherein the cemented lens is a compound lens which is formed by closely adhering and hardening a glass on a lens surface of the one lens which forms the cemented lens.

7. The image forming optical system according to one of claim 1 and claim 2, wherein the image forming optical system is a zoom lens of which, a lens group on the closest side of an object is a positive lens group.

8. The image forming optical system according to one of claim 1 and claim 2, wherein the image forming optical system is a zoom lens of which, a lens group on the closest side of an object is a negative lens group.

9. The image forming optical system according to one of claim 1 and claim 2, comprising:
a prism for folding.

10. The image forming optical system according to claim 9, wherein the prism is in a lens group on the closest side of an object.

11. An electronic image pickup apparatus comprising:
an image forming optical system according to claim 1 or claim 2;
an electronic image pickup element; and
an image processing means which processes image data obtained by image pickup by the electronic image pickup element, of an image which is formed through the image forming optical system, and outputs as image data in which, a shape of the image is changed, wherein
the image forming optical system is a zoom lens, and the zoom lens satisfies a following conditional expression at a time of an infinite object point focusing $$0.7 < y_{07}/(f_w \cdot \tan \omega_{07w}) < 0.96$$

where, $y_{07}$ is indicated as $y_{07}=0.7y_{10}$ when, in an effective image pickup surface, a distance from a center up to a farthest point is let to be $y_{10}$ and, $\omega_{07w}$ is an angle with respect to an optical axis in a direction of an object point corresponding to an image point connecting from a center on the image pickup surface in a wide angle end up to a position of $y_{07}$.

* * * * *